US008372185B2

(12) United States Patent
Bullinger et al.

(10) Patent No.: US 8,372,185 B2
(45) Date of Patent: Feb. 12, 2013

(54) APPARATUS AND METHOD OF ENHANCING THE QUALITY OF HIGH-MOISTURE MATERIALS AND SEPARATING AND CONCENTRATING ORGANIC AND/OR NON-ORGANIC MATERIAL CONTAINED THEREIN

(75) Inventors: Charles W. Bullinger, Bismarck, ND (US); Mark A. Ness, Underwood, ND (US); Nenad Sarunac, Easton, PA (US); Edward K. Levy, Bethlehem, PA (US); Richard S. Weinstein, Bismarck, ND (US); James R. Dennis, Bismarck, ND (US); Matthew P. Coughlin, Hibbing, MN (US); John M. Wheeldon, Birmingham, AL (US)

(73) Assignee: Great River Energy, Maple Grove, MN (US)

(*) Notice: Subject to any disclaimer, the term of this patent is extended or adjusted under 35 U.S.C. 154(b) by 0 days.

(21) Appl. No.: 13/269,868

(22) Filed: Oct. 10, 2011

(65) Prior Publication Data
US 2012/0067789 A1    Mar. 22, 2012

Related U.S. Application Data

(60) Division of application No. 11/786,321, filed on Apr. 11, 2007, now Pat. No. 8,062,410, which is a continuation-in-part of application No. 11/199,743, filed on Aug. 8, 2005, now Pat. No. 7,540,384, which is a continuation-in-part of application No. 11/107,153, filed on Apr. 15, 2005, now Pat. No. 7,275,644, which is a continuation-in-part of application No. 11/199,838, filed on Aug. 8, 2005, which is a continuation-in-part of application No. 11/107,152, filed on Apr. 15, 2005.

(60) Provisional application No. 60/618,379, filed on Oct. 12, 2004.

(51) Int. Cl.
*B01D 50/00* (2006.01)
(52) U.S. Cl. ............ 96/150; 34/363; 209/133; 209/134; 209/143; 209/147
(58) Field of Classification Search .................... 96/150; 34/363; 209/133, 134, 143, 147
See application file for complete search history.

(56) References Cited

U.S. PATENT DOCUMENTS
3,800,427 A * 4/1974 Kemmetmueller ............. 34/363

* cited by examiner

*Primary Examiner* — Robert A Hopkins
(74) *Attorney, Agent, or Firm* — Moss & Barnett

(57) ABSTRACT

The present invention harvests and utilizes fluidized bed drying technology and waste heat streams augmented by other available heat sources to dry feedstock or fuel. This method is useful in many industries, including coal-fired power plants. Coal is dried using the present invention before it goes to coal pulverizers and on to the furnace/boiler arrangement to improve boiler efficiency and reduce emissions. This is all completed in a low-temperature, open-air system. Also included is an apparatus for segregating particulate by density and/or size including a fluidizing bed having a particulate receiving inlet for receiving particulate to be fluidized. This is useful for segregating contaminants like sulfur and mercury from the product stream.

19 Claims, 71 Drawing Sheets

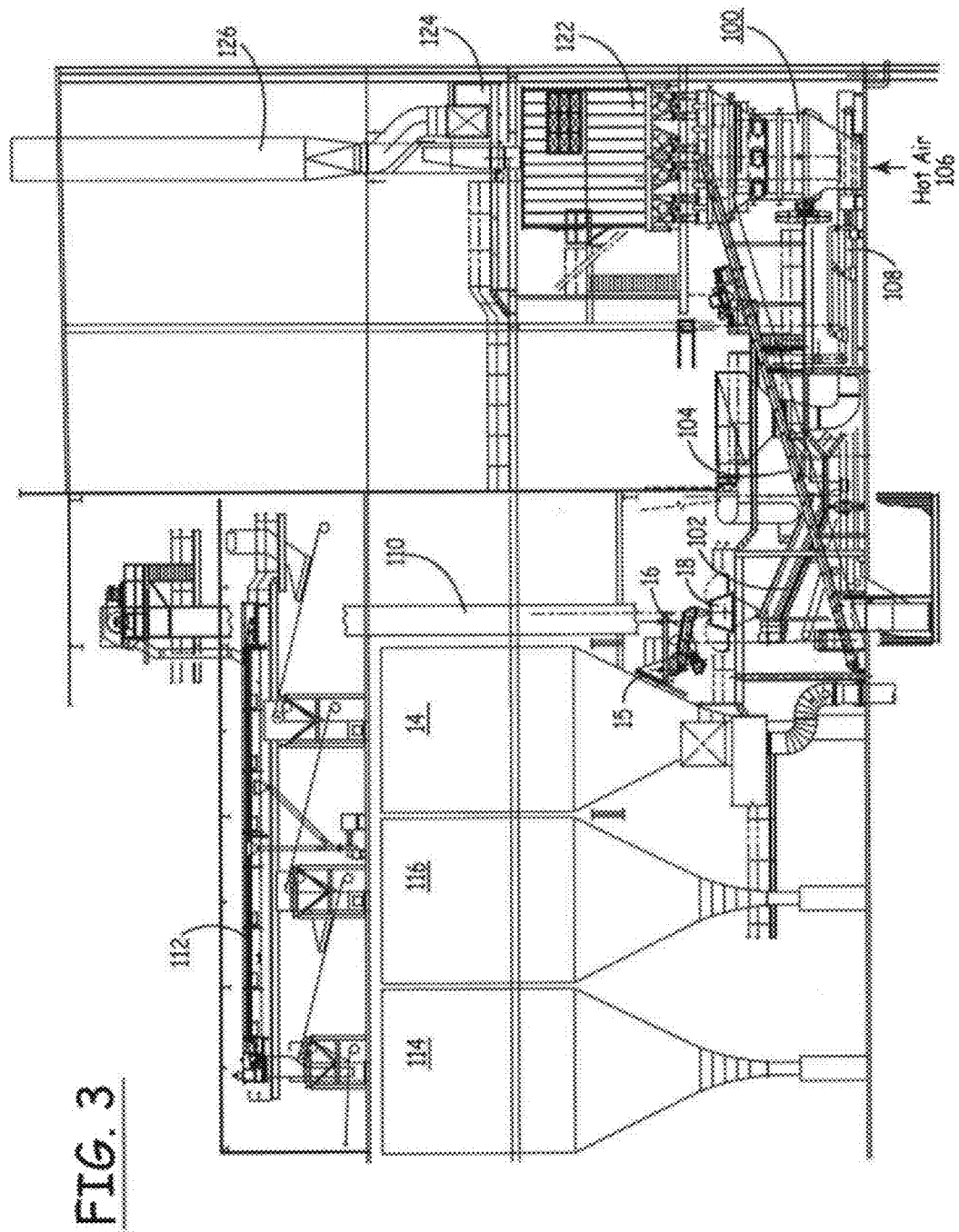

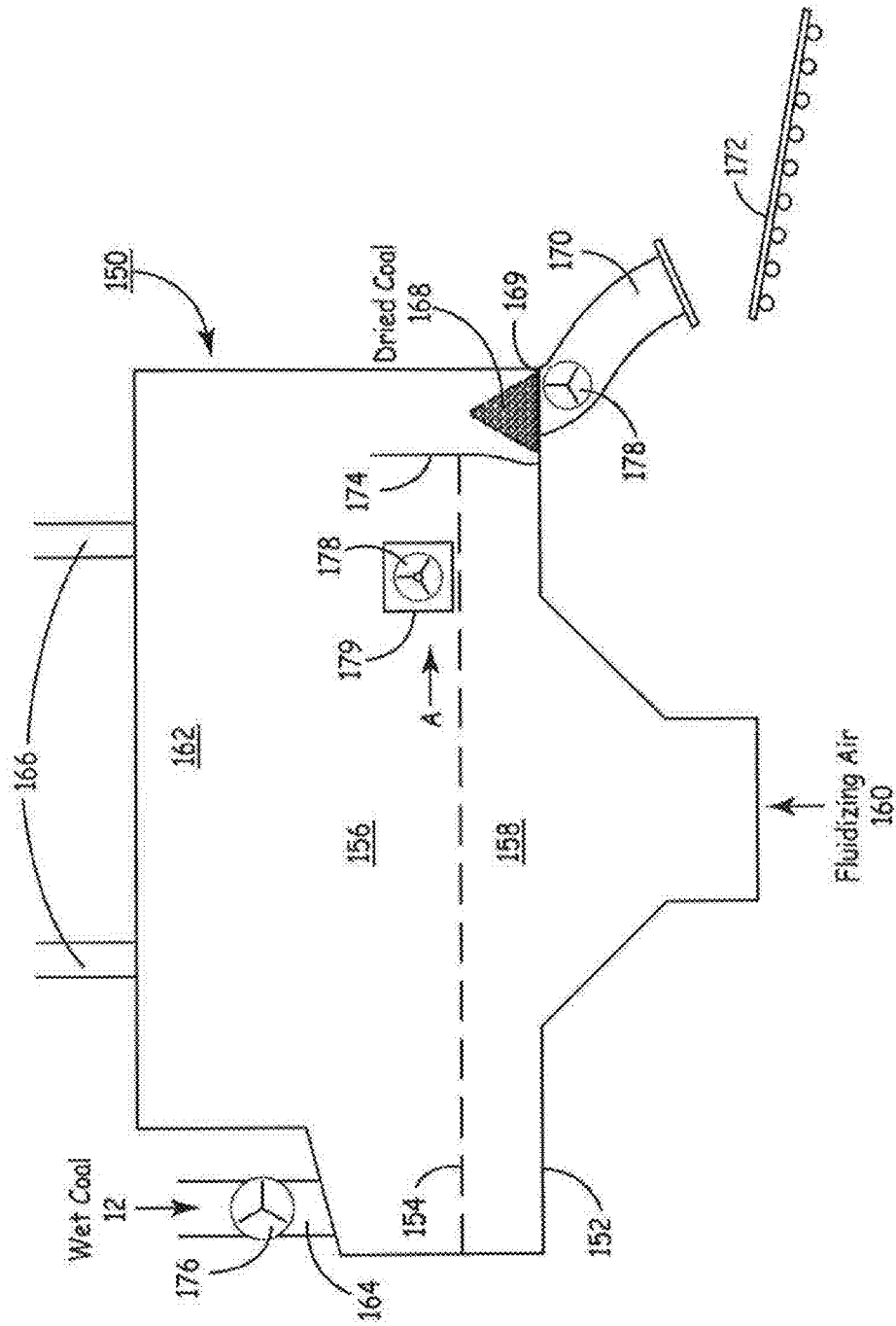

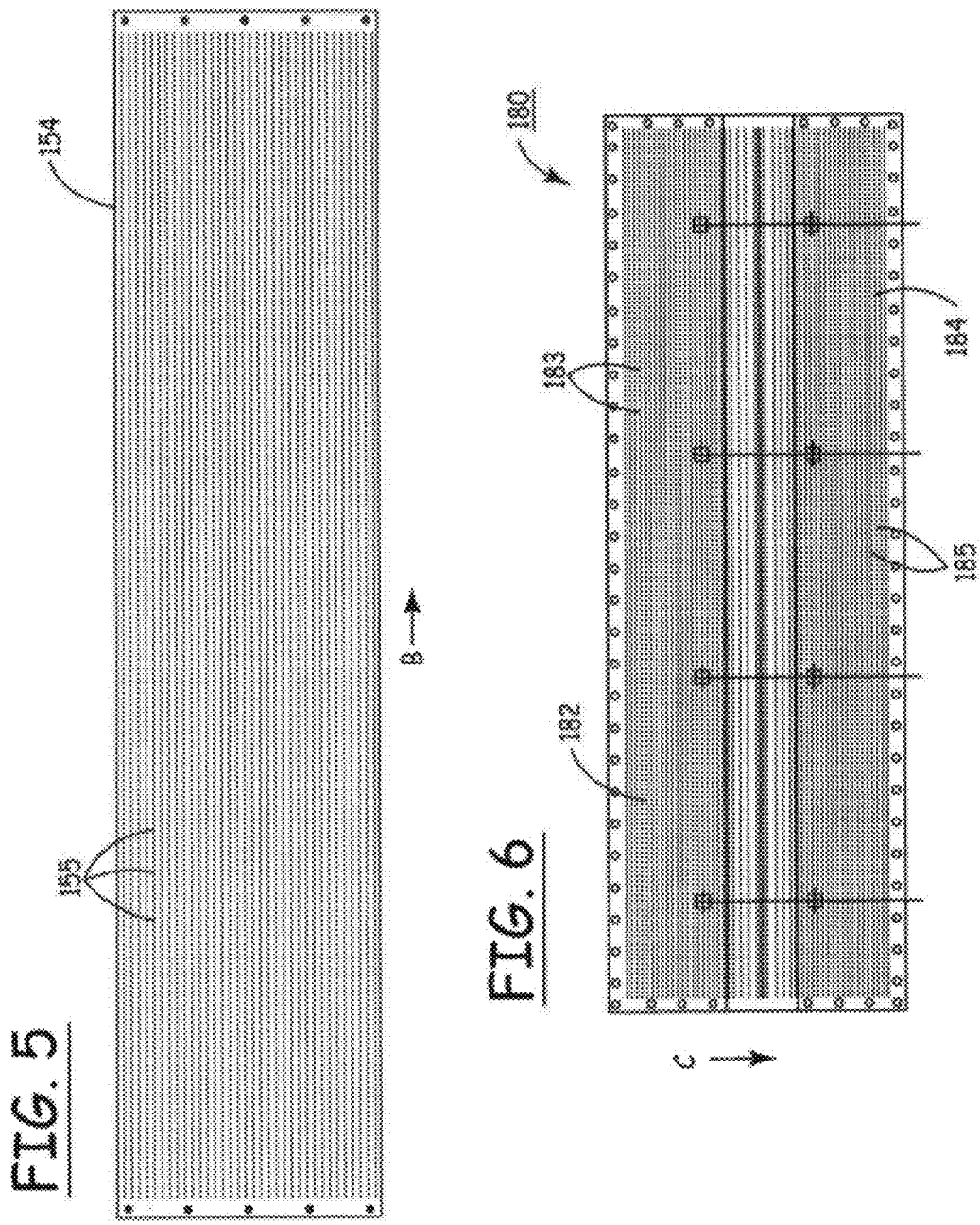

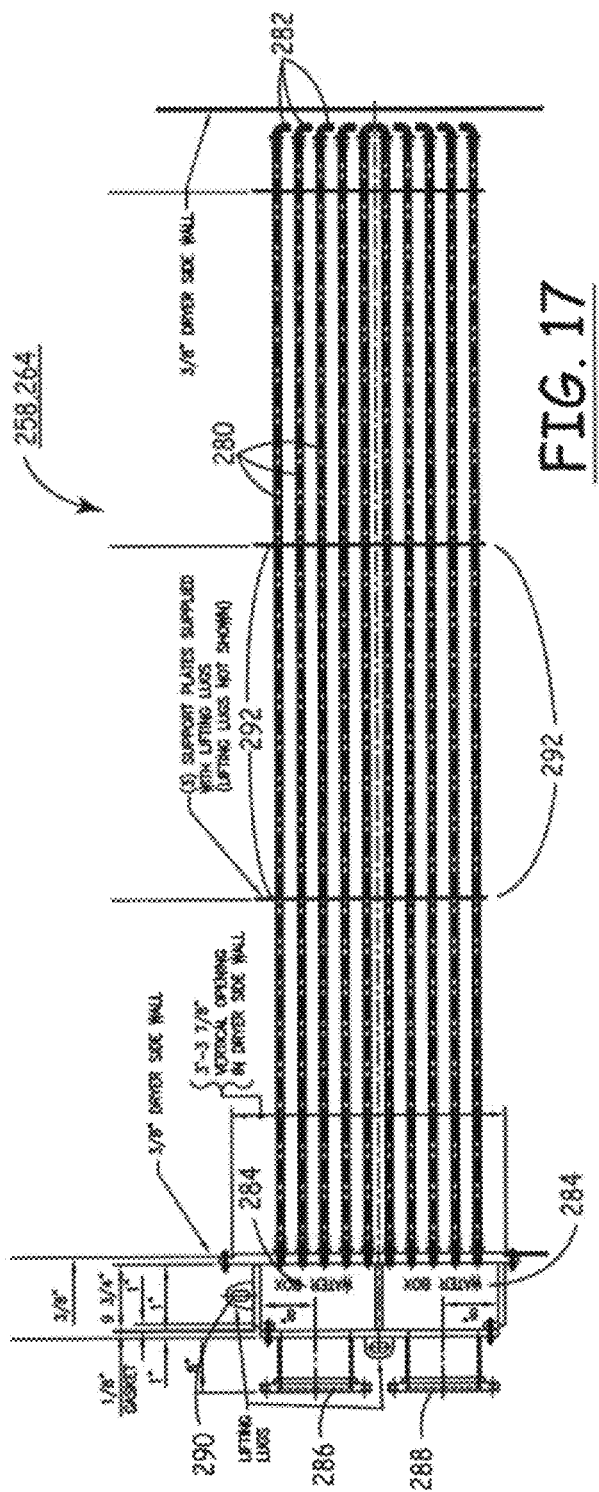
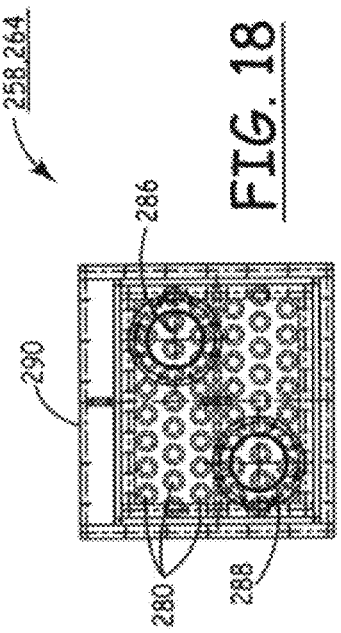
FIG. 17
FIG. 18

APPARATUS AND METHOD OF ENHANCING THE QUALITY OF HIGH-MOISTURE MATERIALS AND SEPARATING AND CONCENTRATING ORGANIC AND/OR NON-ORGANIC MATERIAL CONTAINED THEREIN

CROSS-REFERENCE TO RELATED APPLICATION

This application is a divisional of U.S. Ser. No. 11/786,321 (U.S. Pat. No. 8,062,410) filed on Apr. 11, 2007;
U.S. Ser. No. 11/786,321 (U.S. Pat. No. 8,062,410) filed on Apr. 11, 2007 is a continuation-in-part of U.S. Ser. No. 11/199,743 (U.S. Pat. No. 7,540,384) filed on Aug. 8, 2005, which is a continuation-in-part of U.S. Ser. No. 11/107,153 (U.S. Pat. No. 7,275,644) filed on Apr. 15, 2005, which claims the benefit of U.S. provisional application Ser. No. 60/618,379 filed on Oct. 12, 2004; and is also a continuation-in-part of U.S. Ser. No. 11/199,838 filed on Aug. 8, 2005, which is a continuation-In-part of U.S. Ser. No. 11/107,152 filed on Apr. 15, 2005, which claims the benefit of U.S. provisional application Ser. No. 60/618,379 filed on Oct. 12, 2004;
all of which are hereby incorporated by reference in their entirety.

FIELD OF THE INVENTION

This invention relates to an apparatus and method for improving the quality characteristics of high-moisture materials like coal. More specifically, the invention utilizes existing industrial process plant waste heat sources in a low-temperature, open-air process to dry such materials to improve their thermal content or processibility and reduce plant emissions before the particulate material is processed or combusted at the plant. In another aspect of the invention, a scrubber assembly in operative communication with a fluidized bed is used to process coal or another organic material in such a manner that the denser and/or larger material containing contaminates or other undesirable constituents is separated from the rest of the coal or other organic material. While this process and scrubber assembly may be utilized in many varied industries in an efficient or economical manner, it is particularly well suited for use in electric power generation plants for reducing moisture content and sulfur, mercury, and fly ash constituents in coal, before it is fired.

BACKGROUND OF THE INVENTION

About 63% of the world's electric power and 70% of the electric power produced in the United States is generated from the burning of fossil fuels like coal, oil, or natural gas at electric power plants. Such fuel is burned in a combustion chamber at the power plant to produce heat used to convert water in a boiler to steam. This steam is then superheated and introduced to huge steam turbines whereupon it pushes against the fanlike blades of the turbine to rotate a shaft. This spinning shaft, in turn, turns the rotor of an electric generator to produce electricity.

Once the steam has passed through the turbine, it enters a condenser where it passes around pipes carrying cooling water, which absorbs heat from the steam. As the steam cools, it condenses into water which can then be pumped back to the boiler to repeat the process of heating it into steam once again. In many power plants, this water in the condenser pipes that has absorbed this heat from the steam is pumped to a spray pond or cooling tower to be cooled. The cooled water can then be recycled through the condenser or discharged into lakes, rivers, or other water bodies.

Eighty-nine percent of the coal mined in the United States is used as the heat source for electric power plants. Unlike petroleum and natural gas, the available supplies of coal that can be economically extracted from the earth are plentiful.

There are four primary types of coal: anthracite, bituminous, subbituminous, and lignite. While all four types of these coals principally contain carbon, hydrogen, nitrogen, oxygen, and sulfur, as well as moisture, the specific amounts of these solid elements and moisture contained in coal varies widely. For example, the highest ranking anthracite coals contain about 98% wt carbon, while the lowest ranking lignite coals (also called "brown coal") may only contain about 30% wt carbon. At the same time, the amount of moisture may be less than 1% in anthracite and bituminous coals, but 25-30% wt for subbituminous coals like Powder River Basin ("PRB"), and 35-40% wt for North American lignites. For Australia and Russia, these lignite moisture levels may be as high as 50% and 60%, respectively. These high-moisture subbituminous and lignite coals have lower heating values compared with bituminous and anthracite coals because they produce a smaller amount of heat when they are burned. Moreover, high fuel moisture affects all aspects of electric power unit operation including performance and emissions. High fuel moisture results in significantly lower boiler efficiencies and higher unit heat rates than is the case for higher-rank coals. The high moisture content can also lead to problems in areas such as fuel handling, fuel grinding, fan capacity, and high flue gas flow rates.

Bituminous coals have been the most widely used rank of coal in the U.S. for electric power production because of their abundance and relatively high heating values. However, they also contain medium to high levels of sulfur. As a result of increasingly stringent environmental regulations like the Clean Air Act in the U.S., electric power plants have had to install costly scrubber devices in front of chimneys at of these plants to prevent the sulfur dioxide ("$SO_2$"), nitrous oxides ("$NO_x$"), and fly ash that result from burning these coals to pollute the air.

Lower rank coals like subbituminous and lignite coals have gained increasing attention as heat sources for power plants because of their low sulfur content and cost. However, they still produce sufficient levels of $SO_2$, $NO_x$, and fly ash when burned such that treatment of the flue gas is required to comply with federal and state pollution standards. Additionally, ash and sulfur are the chief impurities appearing in coal. The ash consists principally of mineral compounds of aluminum, calcium, iron, and silicon. Some of the sulfur in coal is also in the form of minerals—particularly pyrite, which is a compound of iron and sulfur. The remainder of the sulfur in coal is in the form of organic sulfur, which is closely combined with the carbon in the coal.

It has previously been recognized within the industry that heating coal reduces its moisture, and therefore enhances the rank and heating value (BTU per pound) of the coal by drying the coal. Prior to its combustion in hot water boilers, drying of the coal can enhance the resulting efficiency of the boiler.

A wide variety of dryer devices have been used within the prior art to dry coal, including rotary kilns (U.S. Pat. No. 5,103,743 issued to Berg), cascaded whirling bed dryers (U.S. Pat. No. 4,470,878 issued to Petrovic et al.), elongated slot dryers (U.S. Pat. No. 4,617,744 issued to Siddoway et al.), hopper dryers (U.S. Pat. No. 5,033,208 issued to Ohno et al.), traveling bed dryers (U.S. Pat. No. 4,606,793 issued to Petrovic et al.), and vibrating fluidized bed dryers (U.S. Pat.

No. 4,444,129 issued to Ladt). Also well-known within the industry are fluidized-bed dryers or reactors in which a fluidizing medium is introduced through holes in the bottom of the bed to separate and levitate the coal particles for improved drying performance. The fluidizing medium may double as a direct heating medium, or else a separate indirect heat source may be located within the fluidized bed reactor. See, e.g., U.S. Pat. No. 5,537,941 issued to Goldich; U.S. Pat. No. 5,546,875 issued to Selle et al.; U.S. Pat. No. 5,832,848 issued to Reynoldson et al.; U.S. Pat. Nos. 5,830,246, 5,830,247, and 5,858,035 issued to Dunlop; U.S. Pat. No. 5,637,336 issued to Kannenberg et al.; U.S. Pat. No. 5,471,955 issued to Dietz; U.S. Pat. No. 4,300,291 issued to Heard et al.; and U.S. Pat. No. 3,687,431 issued to Parks.

Many of these conventional drying processes, however, have employed very high temperatures and pressures. For example, the Bureau of Mines process is performed at 1500 psig, while the drying process disclosed in U.S. Pat. No. 4,052,168 issued to Koppelman requires pressures of 1000-3000 psi. Similarly, U.S. Pat. No. 2,671,968 issued to Criner teaches the use of updrafted air at 1000° F. Likewise, U.S. Pat. No. 5,145,489 issued to Dunlop discloses a process for simultaneously improving the fuel properties of coal and oil, wherein a reactor maintained at 850-1050° F. is employed. See also U.S. Pat. No. 3,434,932 issued to Mansfield (1400-1600° F.); and U.S. Pat. No. 4,571,174 issued to Shelton ($\leq$1000° F.).

The use of such very high temperatures for drying or otherwise treating the coal requires enormous energy consumption and other capital and operating costs that can very quickly render the use of lower-ranked coals economically unfeasible. Moreover, higher temperatures for the drying process create another emission stream that needs to be managed as volatiles are driven off. Further complicating this economic equation is the fact that prior art coal drying processes have often relied upon the combustion of fossil fuels like coal, oil, or natural gas to provide the very heat source for improving the heat value of the coal to be dried. See, e.g., U.S. Pat. No. 4,533,438 issued to Michael et al.; U.S. Pat. No. 4,145,489 issued to Dunlop; U.S. Pat. No. 4,324,544 issued to Blake; U.S. Pat. No. 4,192,650 issued to Seitzer; U.S. Pat. No. 4,444,129 issued to Ladt; and U.S. Pat. No. 5,103,743 issued to Berg. In some instances, this combusted fuel source may constitute coal fines separated and recycled within the coal drying process. See, e.g., U.S. Pat. No. 5,322,530 issued to Merriam et al; U.S. Pat. No. 4,280,418 issued to Erhard; and U.S. Pat. No. 4,240,877 issued to Stahlherm et al.

Efforts have therefore been made to develop processes for drying coal using lower temperature requirements. For example, U.S. Pat. No. 3,985,516 issued to Johnson teaches a drying process for low-rank coal using warm inert gas in a fluidized bed within the 400-500° F. range as a drying medium. U.S. Pat. No. 4,810,258 issued to Greene discloses the use of a superheated gaseous drying medium to heat the coal to 300-450° F., although its preferred temperature and pressure is 850° F. and 0.541 psi. See also U.S. Pat. Nos. 4,436,589 and 4,431,585 issued to Petrovic et al. (392° F.); U.S. Pat. No. 4,338,160 issued to Dellessard et al. (482-1202° F.); U.S. Pat. No. 4,495,710 issued to Ottoson (400-900° F.); U.S. Pat. No. 5,527,365 issued to Coleman et al. (302-572° F.); U.S. Pat. No. 5,547,549 issued to Fracas (500-600° F.); U.S. Pat. No. 5,858,035 issued to Dunlop; and U.S. Pat. No. 5,904,741 and U.S. Pat. No. 6,162,265 issued to Dunlop et al. (480-600° F.).

Several prior art coal drying processes have used still lower temperatures—albeit, only to dry the coal to a limited extent. For example, U.S. Pat. No. 5,830,247 issued to Dunlop discloses a process for preparing irreversibly dried coal using a first fluidized bed reactor with a fluidized bed density of 20-40 lbs/ft$^3$ wherein coal with a moisture content of 15-30% wt, an oxygen content of 10-20%, and a 0-2-inch particle size is subjected to 150-200° F. for 1-5 minutes to simultaneously comminute and dewater the coal. The coal is then fed to a second fluidized bed reactor in which it is coated with mineral oil and then subjected to a 480-600° F. temperature for 1-5 minutes to further comminute and dehydrate the product. Thus, it is apparent that not only is this process applied to coals having relatively lower moisture contents (i.e., 15-30%), but also the coal particles are only partially dewatered in the first fluidized bed reactor operated at 150-200° F., and the real drying takes place in the second fluidized bed reactor that is operated at the higher 480-600° F. bed temperature.

Likewise, U.S. Pat. No. 6,447,559 issued to Hunt teaches a process for treating coal in an inert atmosphere to increase its rank by heating it initially at 200-250° F. to remove its surface moisture, followed by sequentially progressive heating steps conducted at 400-750° F., 900-1100° F., 1300-1550° F., and 2000-2400° F. to eliminate the water within the pores of the coal particles to produce coal with a moisture content and volatiles content of less than 2% and 15%, respectively, by weight. Again, it is clear that the initial 200-250° F. heating step provides only a limited degree of drying to the coal particles.

One of the problems that can be encountered with the use of fluidized bed reactors to dry coal is the production of large quantities of fines entrapped in the fluidizing medium. Especially at higher bed operating conditions, these fines can spontaneously combust to cause explosions. Therefore, many prior art coal drying processes have resorted to the use of inert fluidizing gases within an air-free fluidized bed environment to prevent combustion. Examples of such inert gas include nitrogen, carbon dioxide, and steam. See, e.g., U.S. Pat. No. 3,090,131 issued to Waterman, Jr.; U.S. Pat. No. 4,431,485 issued to Petrovic et al.; U.S. Pat. Nos. 4,300,291 and 4,236,318 issued to Heard et al.; U.S. Pat. No. 4,292,742 issued to Ekberg; U.S. Pat. No. 4,176,011 issued to Knappstein; U.S. Pat. No. 5,087,269 issued to Cha et al.; U.S. Pat. No. 4,468,288 issued to Galow et al.; U.S. Pat. No. 5,327,717 issued to Hauk; U.S. Pat. No. 6,447,559 issued to Hunt; and U.S. Pat. No. 5,904,741 issued to Dunlop et al. U.S. Pat. No. 5,527,365 issued to Coleman et al. provides a process for drying low-quality carbonaceous fuels like coal in a "mildly reducing environment" achieved through the use of lower alkane inert gases like propane or methane. Still other prior art processes employ a number of heated fluidizing streams maintained at progressively decreasing temperatures as the coal travels through the length of the fluidized bed reactor to ensure adequate cooling of the coal in order to avoid explosions. See, e.g., U.S. Pat. No. 4,571,174 issued to Shelton; and U.S. Pat. No. 4,493,157 issued to Wicker.

Still another problem previously encountered by the industry when drying coal is its natural tendency to reabsorb water moisture in ambient air conditions over time after the drying process is completed. Therefore, efforts have been made to coat the surface of the dried coal particles with mineral oil or some other hydrocarbon product to form a barrier against adsorption of moisture within the pores of the coal particles. See, e.g., U.S. Pat. Nos. 5,830,246 and 5,858,035 issued to Dunlop; U.S. Pat. No. 3,985,516 issued to Johnson; and U.S. Pat. Nos. 4,705,533 and 4,800,015 issued to Simmons.

In order to enhance the process economics of drying low-rank coals, it is known to use waste heat streams as supplemental heat sources to the primary combustion fuel heat source. See U.S. Pat. No. 5,322,530 issued to Merriam et al. This is particularly true within coking coal production wherein the cooling gas heated by the hot coke may be recycled for purposes of heating the drying gas in a heat exchanger. See, e.g., U.S. Pat. No. 4,053,364 issued to Poersch; U.S. Pat. No. 4,308,102 issued to Wagener et al.; U.S. Pat. No. 4,338,160 issued to Dellessard et al.; U.S. Pat. No. 4,354,903 issued to Weber et al.; U.S. Pat. No. 3,800,427 issued to Kemmetmueller; U.S. Pat. No. 4,533,438 issued to Michael et al.; and U.S. Pat. Nos. 4,606,793 and 4,431,485 issued to Petrovic et al. Likewise, flue gases from fluidized bed combustion furnaces have been used as a supplemental heat source for a heat exchanger contained inside the fluidized bed reactor for drying the coal. See, e.g., U.S. Pat. No. 5,537,941 issued to Goldich; and U.S. Pat. No. 5,327,717 issued to Hauk. U.S. Pat. No. 5,103,743 issued to Berg discloses a method for drying solids like wet coal in a rotary kiln wherein the dried material is gasified to produce hot gases that are then used as the combustion heat source for radiant heaters used to dry the material within the kiln. In U.S. Pat. No. 4,284,476 issued to Wagener et al., stack gas from an associated metallurgical installation is passed through hot coke in a coke production process to cool it, thereby heating the stack gas which is then used to preheat the moist coal feed prior to its conversion into coke.

None of these prior art processes, however, appear to employ a waste heat stream in a coal drying operation as the sole source of heat used to dry the coal. Instead, they merely supplement the primary heat source which remains combustion of a fossil fuel like coal, oil or natural gas. Thus, the process economics for drying the coal products, including low-rank coals, continues to be limited by the need to burn fossil fuels in order to dry a fossil fuel (i.e., coal) to improve its heat value for firing a boiler in a process plant (e.g., an electric power plant).

Coal mining companies typically clean their coal products to remove impurities before supplying them to end users like electric power plants and coking production plants. After sorting the pieces of coal by means of a screening device to form coarse, medium, and fine streams, these three coal streams are delivered to washing devices in which the coal particles are mixed with water. Using the principle of specific gravity, the heaviest pieces containing the largest amounts of impurities settle to the bottom of the washer, whereupon they drop into a refuse bin for subsequent disposal. The cleaned coal particles from the three streams are then combined together again and dried by means of vibrators, jigs, or hot-air blowers to produce the final coal product ready for shipment to the end user.

While the cleaning process employed by coal mining operations removes much of the ash from the coal, it has little effect on sulfur, since the organic sulfur is closely bound to the carbon within the coal. Thus, other methods need to be used to further purify the coal prior to its combustion. Methods are known in industry for separating different types of particulate materials. For example, U.S. Pat. No. 3,852,168 issued to Oetiker discloses a large machine for separating corn kernels from husk parts, wherein they are subjected to vibration and pulsated air currents. U.S. Pat. No. 5,244,099 issued to Zaltzman et al., on the other hand, teaches the delivery of granular materials through an upwardly inclined trough through which a fluidizing gas is forced from the bottom of the trough to create a fluidized material bed. A vertical oscillatory motion is also imparted to the trough to assist in the separation of the various components contained in the material mixture. Less dense components of the mixture rise to the surface of the fluidized bed, while the denser components settle to the bottom. At the output end of the trough, a stream splitter can be used to recover different layers of materials. This apparatus is good for separating agricultural products and sand.

It is known in the prior art that under some circumstances a fluidized bed may be used without the addition of mechanical vibration or vertical oscillation to achieve particle separation. For example, U.S. Pat. No. 4,449,483 issued to Strohmeyer uses a heated fluidized bed dryer to treat municipal trash and remove heavier particles like glass from the trash before its combustion to produce heat. Meanwhile, U.S. Pat. No. 3,539,001 issued to Binnix et al. classifies materials from an admixture by means of intermediate selective removal of materials of predetermined sizes and specific gravities. The material mixture travels along a downwardly sloped screen support and is suspended by upwardly directed pneumatic pulses. U.S. Pat. No. 2,512,422 issued to Fletcher et al. again uses a downwardly inclined fluidized bed with upwardly directed pulses of air, wherein small particles of coal can be separated and purified from a coal mixture by providing holes in the top of the fluidized bed unit of a sufficient cross sectional area relative to the total cross sectional area of the bed to control the static pressure level within the fluidized bed to prevent the small particles of higher specific gravity from rising within the coal bed.

The process and devices disclosed in these Strohmeyer, Binnix, and Fletcher patents, however, all seem to be directed to the separation of different constituents within an admixture having a relatively large difference in specific gravity. Such processes may work readily to separate nuts, bolts, rocks, etc. from coal, however, they would not be expected to separate coal particles containing organic sulfur from coal particles largely free of sulfur since the specific gravities of these two coal fractions can be relatively close.

Another air pollutant of great concern is mercury, which occurs naturally in coal. Regulations promulgated by the U.S. Environmental Protection Agency ("EPA") require coal-fired power plants to dramatically reduce the mercury levels contained in their flue gases by 2010. Major efforts within the industry have focused upon the removal of mercury from the flue gas by the use of carbon-based sorbents or optimization of existing flue gas emissions control technologies to capture the mercury. However, utilization of carbon sorbent-based scrubber devices can be very expensive to install and operate. Moreover, currently existing emissions control equipment can work less well for high-rank coals (anthracite and bituminous) vs. low-rank coals (subbitumionous and lignite).

Western Research Institute has therefore developed and patented a pre-combustion thermal process for treating low-rank coals to remove the mercury. Using a two-zone reactor, the raw coal is heated in the first zone at approximately 300° F. to remove moisture which is purged from the zone with a sweep gas. The dried coal is then transferred to a second zone where the temperature is raised to approximately 550° F. Up to 70-80% of the mercury contained in the coal is volatilized and swept from the zone with a second sweep gas stream. The mercury is subsequently separated from the sweep gas and collected for disposal. See Guffey, F. D. & Bland, A. E., "Thermal Pretreatment of Low-Ranked Coal for Control of Mercury Emissions," 85 *Fuel Processing Technology* 521-31 (2004); Merriam, N. W., "Removal of Mercury from Powder River Basin Coal by Low-Temperature Thermal Treatment," Topical Report WRI-93-R021 (1993); U.S. Pat. No. 5,403,365 issued to Merriam et al.

However, this pre-combustion thermal pretreatment process is still capital-intensive in that it requires a dual zone reactor to effectuate the drying and mercury volatilization steps. Moreover, an energy source is required to produce the 550° F. bed temperature. Furthermore, 20-30% of the mercury cannot be removed from the coal by this process, because it is tightly bound to the carbon contained in the coal. Thus, expensive scrubber technology will still be required to treat flue gas resulting from combustion of coal pretreated by this method because of the appreciable levels of mercury remaining in the coal after completion of this thermal pretreatment process.

Therefore, the ability to pre-treat particulate material like coal with a fluidized bed operated at a very low temperature without mechanical or chemical additives in order to separate and remove most of the pollutant constituents within the coal (e.g., mercury and sulfur) would be desirable. Such a process could be applied to all ranks of coal, and would alleviate the need for expensive scrubber technology for treatment of flue gases after combustion of the coal.

The concerted use of waste heat sources available within industrial plants using boilers that would otherwise be lost as the exclusive heat source for drying the coal prior to its introduction to the boiler furnace to improve the process economics of using low-rank coals like subbituminous and lignite coal would also be desirable. Such low-rank coal sources could suddenly become viable fuel sources for power plants compared with the more traditionally used bituminous and anthracite coals. The economical use of lower-sulfur subbituminous and lignite coals, in addition to removal of undesirable elements found within the coal that causes pollution, would also be greatly beneficial to the environment.

SUMMARY OF THE INVENTION

A method for enhancing the quality characteristics of materials used as an essential component in an industrial plant operation through the use of waste heat sources available in that plant operation is provided according to the invention. Such materials can include fuel sources combusted within the industrial plant operation, or raw materials used to make the finished products resulting from the plant operation. Such waste heat sources include, but are not limited to, hot flue or stack gases from furnaces, hot condenser cooling water or air, process steam from turbines, and other process streams with elevated heat values. The present invention relates in particular to the process for identifying and exploiting the various available waste heat sources, alone or in combination, to provide heat of appropriate magnitude and temperature level that is needed to enhance the quality or characteristic of the material.

Although the invention has application to many varied industries and particulate materials, for illustrative purposes, the invention is described herein with respect to a typical coal-burning electric power generating plant, where removal of some of the moisture from the coal in a dryer is desirable for improving the heat value of the coal and the resulting boiler efficiency of the plant. Drying coal in this manner can enhance or even enable the use of low-rank coals like subbituminous and lignite coals. By reducing the moisture content of the coal, regardless of whether it constitutes low-rank or high-rank coal, other enhanced operating efficiencies may be realized, as well. For example, drier coal will reduce the burden on the coal handling system, conveyers and coal crushers in the electric generating plant. Since drier coal is easier to convey, this reduces maintenance costs and increases availability of the coal handling system. Drier coal is also easier to pulverize, so less "mill" power is needed to achieve the same grind size (coal fineness). With less fuel moisture, moisture content leaving the mill is reduced. This will improve the results of grinding of the coal. Additionally, less primary air used to convey, fluidize, and heat the coal is needed. Such lower levels of primary air reduces air velocities and with lower primary air velocities, there is a significant reduction of erosion in coal mills, coal transfer pipes, coal burners, and associated equipment. This has the effect of reducing coal transfer pipe and mill maintenance costs, which are, for lignite-fired plants, very high. Reductions in stack emissions should also be realized, thereby improving collection efficiency of downstream environmental protection equipment.

Such coal fuel stock need not be dried to absolute zero moisture levels in order to fire the power plant boilers on an economically viable basis. Instead, by using such available waste heat sources to dry the coal to a sufficient level, the boiler efficiency can be markedly increased, while maintaining the processing costs at an economically viable level. This provides true economic advantage to the plant operator. Reduction of the moisture content of lignite coals from a typical 39-60% level to 10% or lower is possible, although 27-32% is preferable. This preferred level is dictated by the mass transfer limit for the boilers transferring heat to superheat and reheat the steam sent to the turbines.

The present invention preferably utilizes multiple plant waste heat sources in various combinations to dry the material without adverse consequences to plant operations. In a typical power plant, waste process heat remains available from many sources for further use. One possible source is a steam turbine. Steam may be extracted from the steam turbine cycle to dry coal. For many existing turbines, this could reduce power output and have an adverse impact on performance of turbine stages downstream from the extraction point, making this source for heat extraction of limited desirability. For newly built power plants, however, steam turbines are designed for steam extraction without having a negative effect on stage efficiency, thereby enabling such steam extraction to be a part of the waste heat source used for coal drying for new plants.

Another possible source of waste heat for drying coal is the thermal energy contained within flue gas leaving the plant. Using the waste heat contained in flue gas to remove coal moisture may decrease stack temperature, which in turn reduces buoyancy in the stack and could result in condensation of water vapor and sulfuric acid on stack walls. This limits the amount of heat that could be harvested from flue gas for coal drying, especially for units equipped with wet scrubbers, which may thereby dictate that hot flue gas is not the sole waste heat source used in many end-use applications under this invention.

In a Rankine power cycle, heat is rejected from the cycle in the steam condenser and/or cooling tower. Heat rejected in a steam condenser typically used in utility plants represents a large source of waste heat, the use of which for a secondary purpose minimally impacts plant operation. A portion of this hot condenser cooling water leaving the condenser could therefore be diverted and used instead for coal drying. Engineering analyses show that, at full unit load, only two percent of the heat rejected in the condenser is needed to decrease coal moisture content by four percentage points. Utilization of this heat source, solely or in combination with other available plant waste heat sources, provides optimal use of plant waste heat sources without adverse impact on plant operations.

While this invention focuses upon the use of available waste heat sources to enable the moisture reduction or other processing step, it should be appreciated that a primary heat source like combustion heat may be added to the system for utilizing waste heat sources to achieve the desired result on an economic basis. Typically, this will be a small amount of primary heat relative to the waste heat sources used.

The present invention utilizes fixed bed dryers and fluidized bed dryers, both single and multiple-stage, to pre-dry and further clean the material before it is consumed within the industrial plant operation, although other commercially known types of dryers may be employed. Moreover, this drying process takes place in a low-temperature, open-air system, thereby further reducing the operating costs for the industrial plant. The drying temperature may advantageously be kept below 300° F., more preferably between 200-300° F.

With the present invention, a portion of the hot condenser cooling water leaving the condenser could be diverted and used for preheating the inlet air directed to the APH.

The present invention also includes an apparatus for segregating particulate material by density and/or size and concentrating pollutants like fly ash, sulfur, and mercury-bearing materials, or other undesirable constituents for separation from the particulate material feed. In contrast to current prior art systems that attempt to remove the pollutants and other contaminants after the coal is burned, the apparatus of the present invention includes a fluidizing bed having a receiving inlet for receiving the particulate material to be fluidized. The fluidized bed also includes an opening for receiving a first fluidizing stream, which can be a primary heat stream, a secondary heat stream, at least one waste stream, or any combination thereof. At least one discharge outlet is provided on the fluidized bed for discharging the desirable fluidized particulate stream, as well as at least one discharge outlet for discharging the non-fluidized particulate stream containing a concentration of the pollutant or other undesirable constituents. A conveyor is operatively disposed within the fluidized bed for conveying the non-fluidized particulates to the non-fluidized particulate discharge outlet. A collector box is in operative communication with the fluidized bed for receiving the discharged non-fluidized particulate material stream. There is also an optional means within the collector box for directing a second fluidizing stream through the non-fluidized particulate material while it is in the collector box in order to further concentrate the pollutants or other undesirable constituents contained therein.

Removal of such pollutants and other contaminants before the coal is burned eliminates potential harm that may be caused to the environment by the contaminants in the plant processes, with the expected benefits of lower emissions, coal input levels, auxiliary power needs to operate the plant, plant water usage, equipment maintenance costs caused by metal erosion and other factors, and capital costs arising from equipment needed to extract these contaminants from the flue gas.

One advantage of the present invention is that it permits generally continuous processing of the particulate material. As the non-fluidized particulate stream is discharged from the fluidized bed, more particulate material feed can be added to the fluidized bed for processing.

Another advantage of the present invention is a generally horizontal conveyance of the non-particulate material. This generally horizontal conveyance of the non-fluidized particulate material ensures that all of the particulate material is processed evenly and quickly by mixing or churning the material while it is being conveyed.

Yet another advantage of the present invention is that it permits the segregation of contaminants and their removal from a particulate material feed. This can provide a significant environmental benefit for an industrial plant operation.

Still yet another advantage of the present invention is that it includes a second fluidizing step or apparatus to capture more non-contaminated fluidizable particulates that are still trapped, or have become trapped, in the non-fluidized particulate material. Capturing more of the fluidized particulate increases the amount of usable non-contaminated particulates, while reducing the amount of contaminated particulates that will be subject to further processing or disposal. By capturing more of the usable non-contaminated particulates and reducing the amount of contaminated particulate material, a company is able to increase its efficiency while reducing its costs.

BRIEF DESCRIPTION OF THE DRAWINGS

In the accompanying drawings:

FIG. 3 is a view of a fluidized-bed dryer of the present invention and its associated equipment for conveying coal and hot fluidizing air.

FIG. 4 is a schematic-diagram of a single-stage fluidized-bed dryer of the present invention.

FIG. 5 is a plan view of a distributor plate for the fluidized-bed dryer of the present invention.

FIG. 6 is a plan view of another embodiment of the distributor plate for the fluidized-bed dryer.

FIG. 17. is a side view of the heating coils employed within the dryer bed.

FIG. 18 is a view of the heating coils taken along line 18-18 of FIG. 17.

Figure 1:
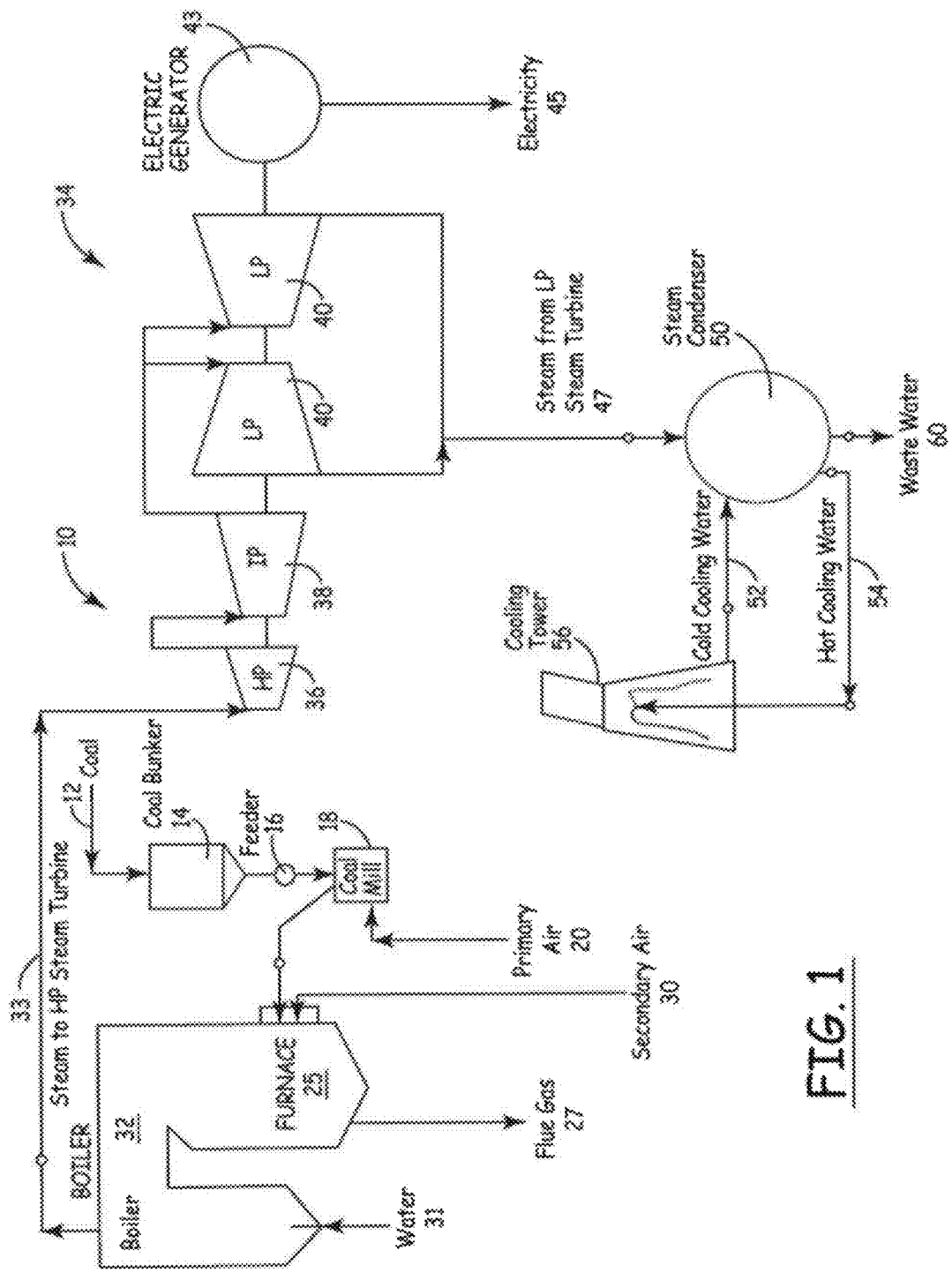
FIG. 1 is a schematic diagram illustrating a simplified coal-fired power plant operation for producing electricity.

The foregoing summary and are provided for example purposes only and are amenable to various modifications and arrangements that fall within the spirit and scope of the present invention. Therefore, the figures should not be considered limiting, but rather as a supplement to aid one skilled in the art to understand the novel concepts that are included in the following detailed description.

DETAILED DESCRIPTION OF THE PREFERRED EMBODIMENT

A method for enhancing the quality characteristics of materials used as an essential component in an industrial plant operation through the use of one or more waste heat sources available in the plant operation is provided by the invention. Such invention allows for the drying of the material on a more economic basis, thereby enabling the use of lower-ranked (e.g., higher moisture) material that might not otherwise be viable within the industrial plant operation. The invention may also enable reductions in pollutants and other undesirable elements contained within the material before it is processed within the industrial plant operation.

The invention also includes an apparatus for, and a method of, separating a particulate material feed stream into a fluidized particulate stream having reduced levels of pollutants or other undesirable constituents ("contaminants"), and a non-fluidized particulate stream formed from denser and/or larger particles having an increased concentration of the contaminants. The method of separation utilized in the present invention capitalizes on the physical characteristics of the contaminants. In particular, it capitalizes on the difference between the specific gravity of contaminated and non-contaminated material. The contaminants can be removed from a majority of the particulate material by separating and removing the denser and/or larger material in which such contaminants are concentrated. The present invention uses a fluidization method of separating the contaminated denser and/or larger material from the non-contaminated material.

For purposes of the present invention, "particulate material" means any granular or particle compound, substance, element, or ingredient that constitutes an integral input to an industrial plant operation, including but not limited to combustion fuels like coal, biomass, bark, peat, forestry waste matter, corn stover, and switch grass; refuse-derived fuels like garbage; bauxite and other ores; and substrates to be modified or transformed within the industrial plant operation like grains, cereals, malt, cocoa, and paper pulps.

In the context of the present invention, "industrial plant operation" means any combustion, consumption, transformation, modification, or improvement of a substance to provide a beneficial result or end product. Such operation can include but is not limited to electric power plants; coking operations; iron, steel, or aluminum manufacturing facilities; cement manufacturing operations; glass manufacturing plants; ethanol production plants; drying operations for grains and other agricultural materials, and biomass materials like corn stover, switch grass, bark and peat; food processing facilities; refuse-derived fuel combustion plants; pulping mills; and heating operations for factories and buildings. Industrial plant operations encompass other manufacturing operations incorporating heat treatment of a product or system, including but not limited to green houses, district heating, regeneration processes for amines or other extractants used in carbon dioxide or organic acid sequestration, and synthetic fuels production, including coal liquification.

As used in this application, "coal" means anthracite, bituminous, subbituminous, and lignite or "brown" coals, and peat. Powder River Basin coal is specifically included.

For purposes of the present invention, "quality characteristic" means a distinguishing attribute of the particulate material that impacts its combustion, consumption, transformation, modification, or improvement within the industrial plant operation, including but not limited to moisture content, carbon content, sulfur content, mercury content, fly ash content, and production of $SO_2$ and $NO_x$, carbon dioxide, mercury oxide when burned.

As used in this application, "heat treatment apparatus" means any apparatus that is useful for the application of heat to a product, including but not limited to furnaces, dryers, cookers, ovens, incubators, growth chambers, and heaters.

In the context of the present invention, "dryer" means any apparatus that is useful for the reduction of the moisture content of a particulate material through the application of direct or indirect heat, including but not limited to a fluidized bed dryer, vibratory fluidized bed dryer, fixed bed dryer, traveling bed dryer, cascaded whirling bed dryer, elongated slot dryer, hopper dryer, or kiln. Such dryers may also consist of single or multiple vessels, single or multiple stages, be stacked or unstacked, and contain internal or external heat exchangers.

For purposes of this application "principal heat source" means a quantity of heat produced directly for the principal purpose of performing work in a piece of equipment, such as a boiler, turbine, oven, furnace, dryer, heat exchanger, reactor, or distillation column. Examples of such a principal heat source include but are not limited to combustion heat and process steam directly exiting a boiler.

As used in this application, "waste heat source" means any residual gaseous or liquid by-product stream having an elevated heat content resulting from work already performed by a principal heat source within a piece of equipment within an industrial plant operation that is used for the secondary purpose of performing work in a piece of equipment instead of being discarded. Examples of such waste heat sources include but are not limited to cooling water streams, hot condenser cooling water, hot condenser cooling air, hot flue or stack gas, spent process steam from, e.g., a turbine, or discarded heat from operating equipment like a compressor, reactor, or distillation column.

For purposes of this application, "contaminant" means any pollutant or other undesirable element, compound, chemical, or constituent contained within a particulate material that it is desirable to separate from or reduce its presence within the particulate material prior to its use, consumption, or combustion within an industrial plant operation.

Although the present invention may be used in a variety of end-use applications, such as in farming, manufacturing, or industrial plant operations, for illustrative purposes only, the invention is described herein with respect to coal-burning electric power generating plants that utilize fluidized dry beds to dry the coal feed. This is not meant to limit in any way the application of the apparatus and method of this invention to other appropriate or desirable end-use applications outside of coal or the electric power generation industry.

For background purposes, FIG. 1 shows a simplified coal-fired electric power plant 10 for the generation of electricity. Raw coal 12 is collected in a coal bunker 14 and is then fed by means of feeder 16 to a coal mill 18 in which it is pulverized to an appropriate or predetermined particle size as is known in the art with the assistance of primary air stream 20. The pulverized coal particles are then fed to furnace 25 in which they are combusted in conjunction with secondary air stream 30 to produce a heat source. Flue gas 27 is also produced by the combustion reaction. The flue gas 27 is subsequently transported to the stack via environmental equipment.

This heat source from the furnace, in turn, converts water 31 in tangentially wall-fired boiler 32 into steam 33, which is delivered to steam turbine 34. Steam turbine 34 may consist more fully of high pressure steam turbine 36, intermediate pressure steam turbine 38, and low pressure steam turbines 40 operatively connected in series. Steam 33 performs work by pushing against the fan-like blades connected to a series of wheels contained within each turbine unit which are mounted on a shaft. As the steam pushes against the blades, it causes both the wheels and turbine shaft to spin. This spinning shaft turns the rotor of electric generator 43, thereby producing electricity 45.

Steam 47 leaving the low-pressure steam turbines 40 is delivered to condenser 50 in which it is cooled by means of cooling water 52 to convert the steam into water. Most steam condensers are water-cooled, where either an open or closed-cooling circuit is used. In the closed-loop arrangement show in FIG. 1, the latent heat contained within the steam 47 will increase the temperature of cold cooling water 52, so that it is discharged from steam condenser 50 as hot cooling water 54, which is subsequently cooled in cooling tower 56 for recycle as cold cooling water 52 in a closed-loop arrangement. In an open-cooling circuit, on the other hand, the heat carried by cooling water is rejected into a cooling body of water (e.g., a river or a lake). In a closed-cooling circuit, by contrast, the heat carried by cooling water is rejected into a cooling tower.

Note that other condensers are air-cooled. The heated air produced by such cooling step could be used as a waste heat source within the process of the present invention.

Figure 2:
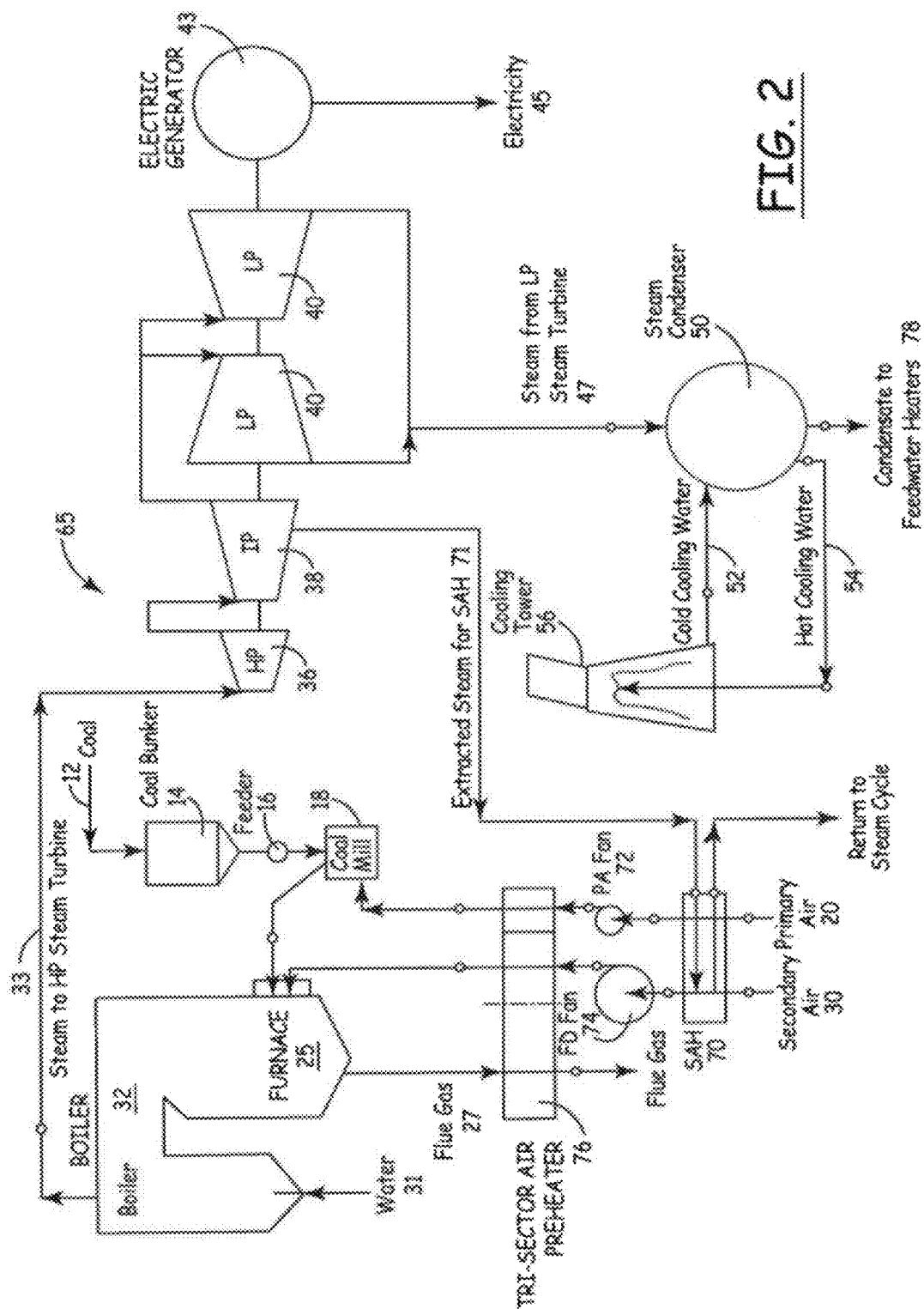
FIG. 2 is a schematic diagram showing an improved coal-fired power plant, which utilizes the flue gas and steam turbine waste heat streams to enhance the boiler efficiency.

The operational efficiency of the electric power plant 10 of FIG. 1 may be enhanced by extracting and utilizing some of the waste heat and byproduct streams of the electricity power plant, as illustrated in FIG. 2. Fossil-fired plant boilers are typically equipped with air pre-heaters ("APH") utilized to heat primary and secondary air streams used in the coal milling and burning process. Burned coal is used in a boiler system (furnace, burner and boiler arrangement) to convert water to steam, which is then used to operate steam turbines that are operatively connected to electrical generators. Heat exchangers, often termed steam-to-air pre-heaters ("SAH"), use steam extracted from the steam turbine to preheat these primary and secondary air streams upstream of the air preheater. Steam extraction from the turbine results in a reduced turbine (and plant) output and decreases the cycle and unit heat rate.

A typical APH could be of a regenerative (Ljungstrom or Rothemule) or a tubular design. The SAHs are used to maintain elevated temperature of air at an APH inlet and protect a cold end of the APH from corrosion caused by the deposition of sulfuric acid on APH heat transfer surfaces, and from plugging which results in an increase in flow resistance and fan power requirements. A higher APH inlet air temperature results in a higher APH gas outlet temperature and higher temperature of APH heat transfer surfaces (heat transfer passages in the regenerative APH, or tubes in a tubular APH) in the cold end of the APH. Higher temperatures reduce the acid deposition zone within the APH and also reduce the acid deposition rate.

Thus, within the modified system 65, SAH 70 uses a portion 71 of the spent process steam extracted from intermediate-pressure steam turbine 38 to preheat primary air stream 20 and secondary air stream 30 before they are delivered to coal mill 18 and furnace 25, respectively. The maximum temperature of primary air stream 20 and secondary air stream 30 which can be achieved in SAH 70 is limited by the temperature of extracted steam 71 exiting steam turbine 38 and the thermal resistance of SAH 70. Moreover, primary air stream 20 and secondary air stream 30 are fed by means of PA fan 72 and FD fan 74, respectively, to tri-sector APH 76, wherein these air streams are further heated by means of flue gas stream 27 before it is discharged to the atmosphere. In this manner, primary air stream 20 and secondary air stream 30 with their elevated temperatures enhance the efficiency of the operation of coal mill 18 and production of process heat in furnace 25. Furthermore, the condensate 78 discharged by condenser 50 may be recycled to boiler 32 to be converted into process steam once again. Flue gas 27 and process steam 71 exiting steam turbine 38 and the condensate 78 exiting the condenser which might otherwise go to waste have been successfully used to enhance the overall efficiency of the electric power generating plant 65.

As discussed above, it would further benefit the operational efficiency of the electric generating plant if the moisture level of coal 12 could be reduced prior to its delivery to furnace 25. Such a preliminary drying process could also enable the use of lower-rank coals like subbituminous and lignite coals on an economic basis.

Application U.S. Ser. No. 11/199,838, entitled "Apparatus for Heat Treatment of Particulate Materials" filed on Aug. 8, 2005, which shares a common co-inventor and owner with the present application, discloses in greater detail fluidized-bed dryers and other dryer apparati that can be used in conjunction with the present invention, and is hereby incorporated by reference in its entirety. Nevertheless, the following details regarding the fluidized bed and segregating means are disclosed herein.

FIG. 3 shows a fluidized bed dryer 100 used as the fluidized bed apparatus for purposes of separating the fluidized coal particle stream and the non-fluidized particle stream, although it should be understood that any other type of dryer may be used within the context of this invention. Moreover, the entire fluidized bed apparatus system may consist of multiple coal dryers connected in series or parallel to remove moisture from the coal. A multi-dryer approach, involving a number of identical coal drying units, provides operating and maintenance flexibility and, because of its generally smaller size requirements, allows coal dryers to be installed and integrated within existing power plant equipment, as well as in stages, one at a time. This will minimize interference with normal plant operations.

The fluidized bed(s) will operate in open air at relatively low-temperature ranges. An in-bed heat exchanger will be used in conjunction with a stationary fluidized-bed or fixed-bed design to provide additional heat for coal drying and, thus, reduce the necessary equipment size. With a sufficient in-bed heat transfer surface in a fluidized bed dryer, the fluidizing/drying air stream can be reduced to values corresponding to the minimum fluidization velocity. This will reduce erosion damage to and elutriation rate for the dryer.

Heat for the in-bed heat exchanger can be supplied either directly or indirectly. A direct heat supply involves diverting a portion of hot fluidizing air stream, hot condenser cooling water, hot condenser cooling air, process steam, hot flue gas, or other waste heat sources and passing it through the in-bed heat exchanger. An indirect heat supply involves use of water or other heat transfer liquid, which is heated by hot primary air stream, hot condenser cooling water, hot condenser cooling air, steam extracted from steam turbine cycle, hot flue gas, or other waste heat sources in an external heat exchanger before it is passed through the in-bed heat exchanger.

The bed volume can be unitary or divided into several sections, referred to herein as "stages." A fluidized-bed dryer is a good choice for treating sized coal to be burned at the same site where the coal is to be combusted. The multiple stages could be contained in a single vessel or multiple vessels. A multi-stage design allows maximum utilization of fluidized-bed mixing, segregation, and drying characteristics. The coal dryer may include a direct or indirect heat source for drying the coal.

FIG. 3 discloses a coal dryer in the form of a fluidized-bed dryer 100 and associated equipment at an industrial plant site. Wet coal 12 is stored in bunker 14 whereupon it is released by means of feed gate 15 to vibrating feeder 16 which transports it to coal mill 18 to pulverize the coal particles. The pulverized coal particles are then passed through screen 102 to properly size the particles to less than ¼ inch in diameter. The sized pulverized coal particles are then transported by means of conveyor 104 to the upper region of the fluidized-bed dryer 100 in which the coals particles are fluidized and dried by means of hot air 160. The dried coal particles are then conveyed by lower dry coal conveyor 108, bucket elevator 110, and upper dry coal conveyor 112 to the top of dried coal bunkers 114 and 116 in which the dried coal particles are stored until needed by the boiler furnace 25.

Moist air and elutriated fines 120 within the fluidized-bed dryer 100 are transported to the dust collector 122 (also known as a "baghouse") in which elutriated fines are separated from the moist air. Dust collector 122 provides the force for pulling the moist air and elutriated fines into the dust collector. Finally, the air cleaned of the elutriated fines is passed through stack 126 for subsequent treatment within a scrubber unit (not shown) of other contaminants like sulfur, $NO_x$, and mercury contained within the air stream.

FIG. 4 discloses an embodiment of a coal drying bed under the present invention that is a single-stage, single-vessel, fluidized-bed dryer 150 with a direct heat supply. While there are many different possible arrangements for the fluidized-bed dryer 150, common functional elements include a vessel 152 for supporting coal for fluidization and transport. The vessel 152 may be a trough, closed container, or other suitable arrangement. The vessel 152 includes a distributor plate 154 that forms a floor towards the bottom of vessel 152, and divides the vessel 154 into a fluidized bed region 156 and a plenum region 158. As shown in FIG. 5, the distributor plate 154 may be perforated or constructed with suitable valve means to permit fluidizing air 160 to enter the plenum region 158 of vessel 152. The fluidizing air 160 is distributed throughout the plenum region 158 and forced upwards through the openings 155 or valves in the distributor plate 154 at high pressure to fluidize the coal 12 lying within the fluidized bed region 156.

An upper portion of vessel 152 defines a freeboard region 162. Wet sized coal 12 enters the fluidized bed region 156 of fluidized bed dryer 150 through entry point 164, as shown in FIG. 4. When the wet sized coal 12 is fluidized by fluidizing air 160, the coal moisture and elutriated coal fines are propelled through the freeboard region 162 of vessel 152 and exit the vessel typically at the top of the fluidized-bed dryer 150 at vent outlet points 166, as shown. Meanwhile, fluidized coal product 168 will exit the vessel 152 via discharge chute 170 to a conveyor 172 for transport to a storage bin or furnace boiler. As the fluidized coal particles move across the fluidized bed region 156 above the distributor plate 154 in the direction A shown in FIG. 4, they will build up against weir 174 which constitutes a wall traversing the width of the fluidized-bed dryer. The height of the weir 174 will define the maximum thickness of the fluidized-bed of coal particles within the dryer, for as the accumulated coal particles rise above the height of the weir, they will necessarily pass over the top of the weir and fall into a region of the fluidized-bed dryer 150 adjacent to the discharge chute 170. Meanwhile, the larger and denser coal particles ("segregation stream") will naturally gravitate towards the bottom of the fluidized bed 156 due to their higher specific gravity. A conveyor means 178 described more fully herein will push or otherwise transfer these non-fluidized segregation stream coal particles through a discharge outlet 179, so they exit the fluidized bed. The structure and location of the coal inlet 164 and outlet points 169 and 179, the elutriated fines outlet 166, the distributor plate 154, and configuration of the vessel 152 may be modified as desired for best results.

Fluidized-bed dryer 150 preferably includes a wet bed rotary airlock 176 operationally connected to wet coal inlet 164 maintaining a pressure seal between the coal feed and the dryer, while permitting introduction of the wet coal feed 12 to the fluidized bed 156. Rotary airlock 176 should have a housing of cast iron construction with a nickel-carbide coated bore. The end plates of the airlock should be of cast iron construction with a nickel-carbide coated face. Airlock rotors should be of cast iron construction with closed end, leveled tips, and satellite welded. In an embodiment of the invention, airlock 176 should be sized to handle approximately 115 tons/hour of wet coal feed, and should rotate at approximately 13 RPM at 60% fill to meet this sizing criterion. The airlock is supplied with a 3-hp inverter duty gear motor and an air purge kit. While airlock 176 is directly connected to the motor, any additional airlocks provided at additional wet coal inlets to the fluidized-bed dryer can be chain driven. Note that an appropriate coating material like nickel carbide is used on cast iron surfaces of the airlock that are likely to suffer over time from passage of the abrasive coal particles. This coating material also provides a "non-stick surface" to the airlock parts that come into contact with the coal particles.

A product rotary airlock 178 is supplied air in operative connection to the fluidized-bed dryer outlet point 169 to handle the dried coal product 168 as it exits the dryer. In an embodiment of the invention, airlock 178 should have a housing of cast iron construction with a nickel-carbide coated bore. Airlock end plates should likewise be of cast iron construction with a nickel-carbide coated face. The airlock rotor should be of cast iron construction with a closed end, leveled tips, and satellite welded. The airlock should preferably rotate at approximately 19 RPM at 60% fill to meet the sizing criterion. The airlock should be supplied with a 2-hp inverter duty generator, chain drive, and air purge kit.

Distributor plate 154 separates the hot air inlet plenum 158 from the fluidized-bed drying chambers 156 and 162. The distributor plate should preferably be fabricated from ⅜-inch thick water jet drilled 50,000 psi-yield carbon steel as shown in FIG. 5. The distributor plate 154 may be flat and be positioned in a horizontal plane with respect to the fluidized-bed dryer 150. The openings 155 should be approximately ⅛-inch in diameter and be drilled on approximately 1-inch centers from feed end to discharge end of the distributor plate, ½-inch center across, and in a perpendicular orientation with respect to the distributor plate. More preferably, the openings 155 may be drilled in approximately a 65°-directional orientation with respect to the distributor plate so that the fluidizing air 160 forced through the opening 155 in the distributor plate blows the fluidized coal particles within the fluidized-bed region 156 towards the center of the dryer unit and away from the side walls. The fluidized coal particles travel in direction B shown in FIG. 5. Such a flat, planar distributor plate 154 would work well where the conveyor means 178 is a belt, ram, drag chain, or other similar device located in the fluidized bed above the distributor plate.

Figure 7:
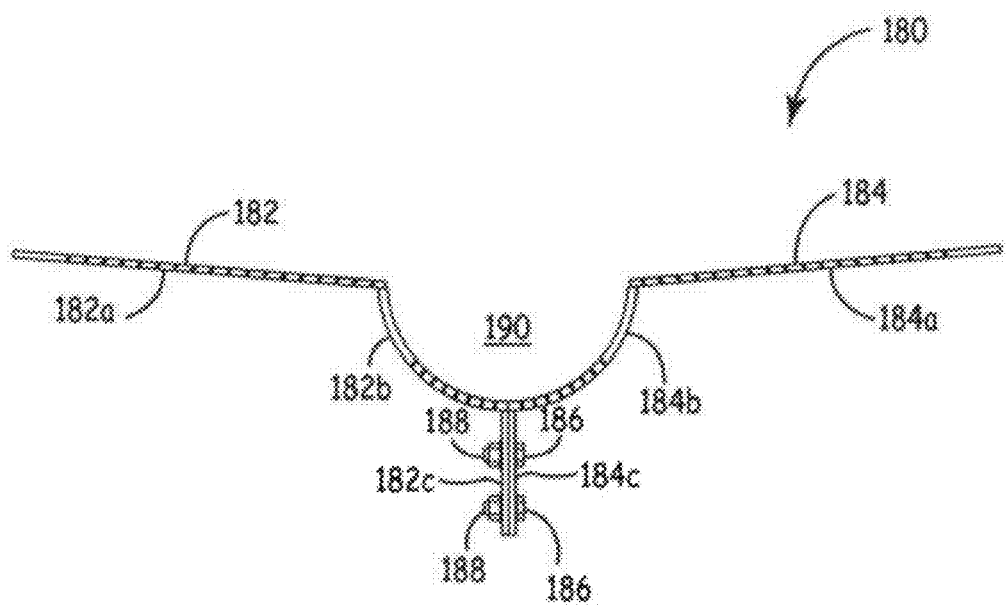
FIG. 7 is a view of the distributor plate taken along line 7-7 of FIG. 6.

Another embodiment of the distributor plate 180 is shown in FIGS. 6-7. Instead of a flat planar plate, this distributor plate 180 consists of two drilled plates 182 and 184 that have flat portions 182a and 184b, rounded portions 182b and 184b, and vertical portions 182c and 184c, respectively. The two vertical portions 182c and 184c are bolted together by means of bolts 186 and nuts 188 in order to form the distributor plate unit 180. "Flat" portions 182a and 184a of the distributor plate 180 are actually installed on a 5° slope towards the middle of the dryer unit in order to encourage the coal particles to flow towards the center of the distributor plate. Meanwhile, rounded portions 182b and 184b of the distributor plate units cooperate to define a half-circle region 190 approximately one foot in diameter for accommodating a screw auger 194, as shown more clearly in FIG. 8. The drilled openings 183 and 185 in the distributor plate units 182 and 184, respectively, will once again be on an approximately 1-inch centers from the feed end to the discharge end and ½-inch center across, having a 65°-directional slope with respect to the horizontal plane of the dryer unit). While the flat portions 182a and 184a and vertical portions 182a and 184c of the distributor plate units 182 and 184 should be made from ⅜-inch thick water jet drilled 50,000 psi-yield carbon steel, the rounded portions 182b and 184b will preferably be formed from ½-inch thick carbon steel for increased strength around the screw trough 190. Fluidized coal particles travel in direction C shown in FIG. 6.

Figure 8:
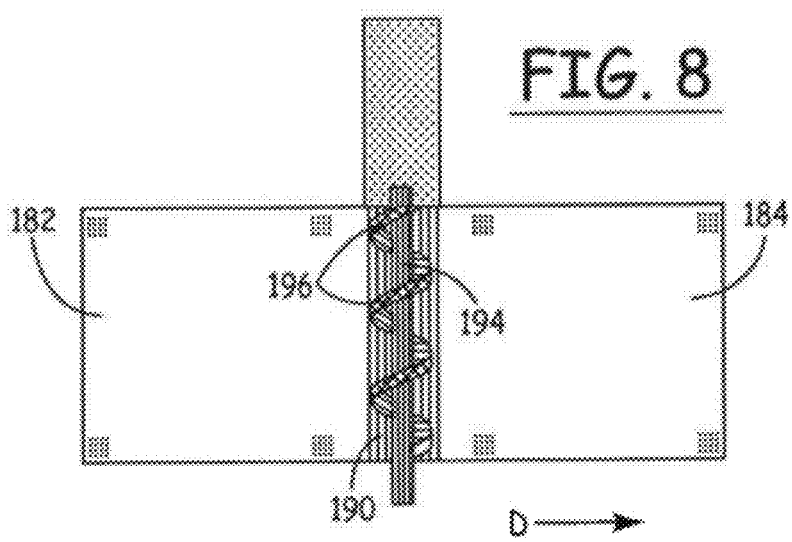
FIG. 8 is a plan view of the distributor plate of FIG. 6 containing a screw auger.

A screw auger 194 is positioned within the trough region 190 of the distributor plate, as shown on FIG. 8. This screw auger should have a 12-inch diameter, be sized for 11.5 tons/hour removal of the oversized coal particles in the dryer bed, and have sufficient torque to start under a 4-foot thick deep bed of coal particles. The drive will be a 3-hp inverter duty motor with a 10:1 turndown. The screw auger 194 should be of carbon steel construction for durability.

The trough 190 of the distributor plate 180 and screw auger 194 should be perpendicular to the longitudinal direction of the dryer. This enables the fins 196 of the screw auger during operation to engage the segregation stream coal particles along the bottom of the fluidized coal bed and push them out the discharge outlet 179 of the fluidized bed dryer.

Figure 9:
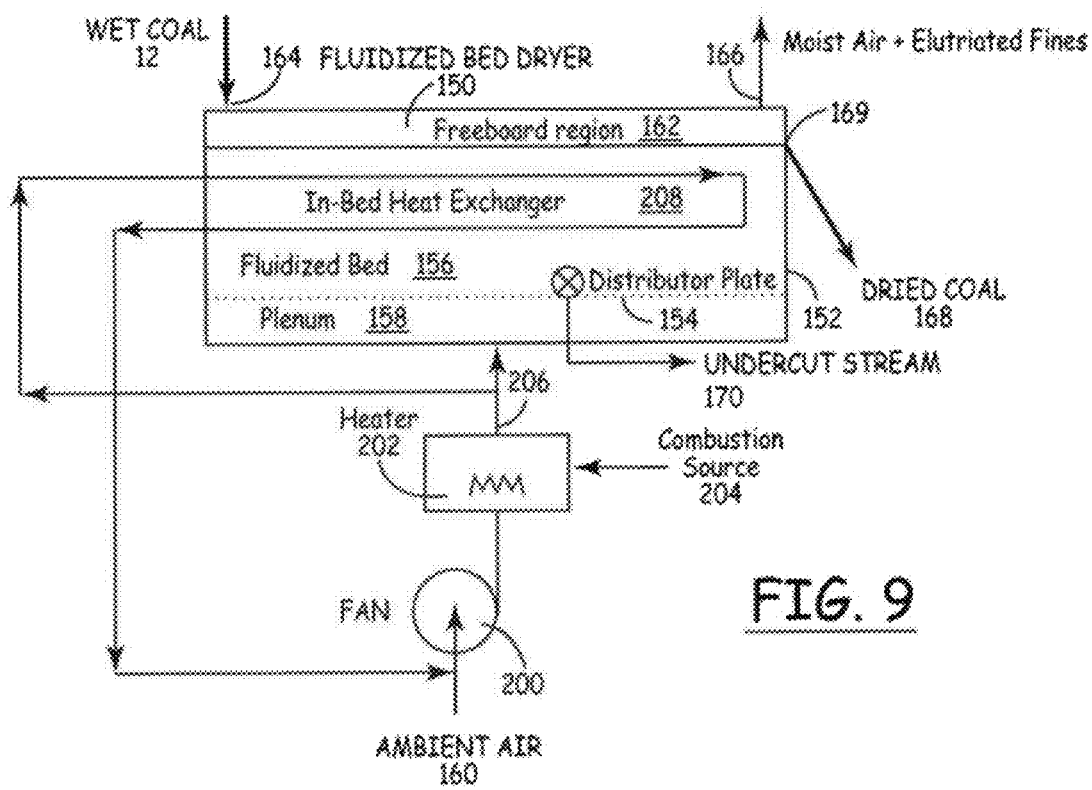
FIG. 9 is a schematic diagram of a single-stage fluidized-bed dryer of the present invention that utilizes a primary heat source to heat indirectly the fluidizing air used both the dry and fluidize the coal.

FIG. 9 discloses the fluidized bed dryer 150 of FIG. 4 in schematic form, wherein the same numbers have been used for the corresponding dryer parts for ease of understanding. Ambient air 160 is drawn by means of a fan 200 through a heater 202 heated by a combustion source 204. A portion of the fluidizing air 206, heated by circulation through heater 202, is directed to the fluidized bed region 156 for fluidizing the wet sized coal 12. Any suitable combustion source like coal, oil, or natural gas may be used for heater 202.

While such heated fluidizing air 206 can be used to heat the coal particles 12 that are fluidized within the bed region 156 and evaporate water on the surface of the particles by conductive heat transfer with the heated fluidizing air, an inbed heat exchanger 208 is preferably included within the dryer bed to provide heat conduction to the coal particles to further enhance this heating and drying process. A direct heat supply is created by diverting the remainder of the fluidizing hot air 206 (heated by heater 202) through in-bed heat exchanger 208, which extends throughout the fluidized bed 156, to heat the fluidized coal to drive out moisture. The fluidizing air 206 exiting the in-bed heat exchanger 208 is recycled back to fan 200 to once again be circulated through and heated by the heater 202. Some loss of fluidizing air 206 results when fluidizing air directly enters the fluidized bed region 156 through plenum 158. This lost air is replaced by drawing further ambient air 160 into the circulation cycle.

Figure 10:
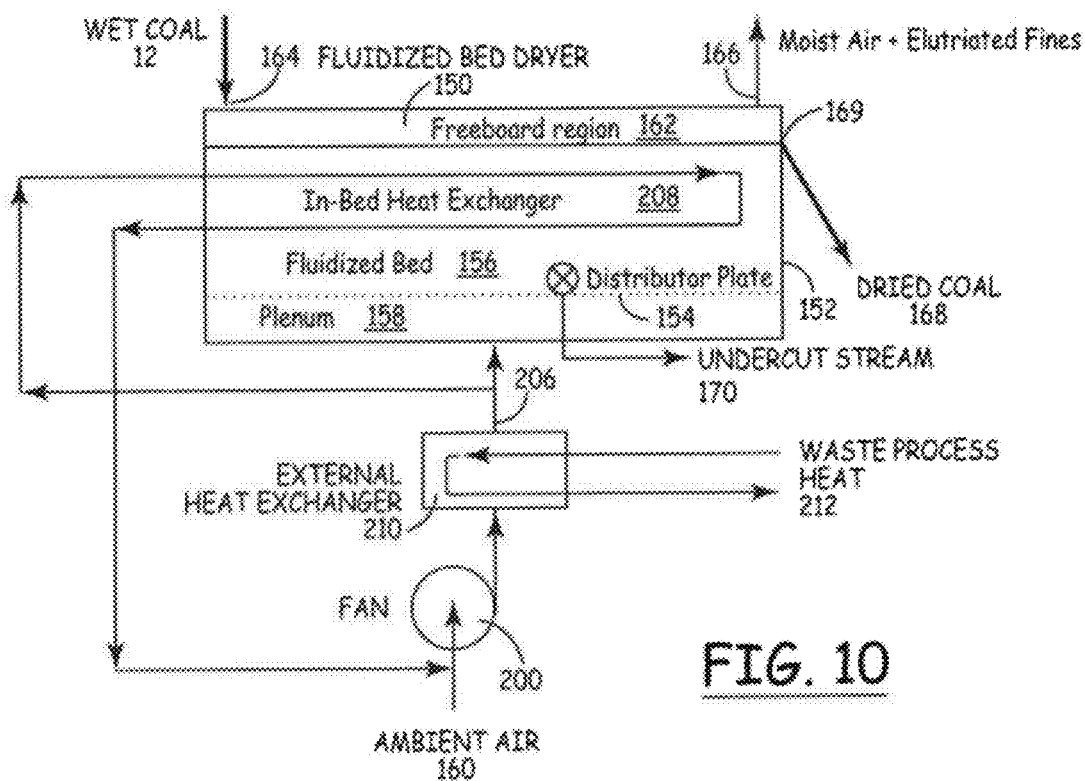
FIG. 10 is a schematic diagram of a single-stage fluidized bed dryer of the present invention that utilizes waste process heat to indirectly heat the fluidizing air used both to dry and fluidize the coal.

FIG. 10 illustrates another embodiment of the single-stage, single-vessel, fluidized bed dryer 150 of FIG. 4 except that an external heat exchanger 210 is substituted for heater 202, and waste process heat 212 from the surrounding industrial process plant is used to heat this external heat exchanger. Because industrial process plants like electricity generation plants typically have available waste process heat sources that would otherwise be discarded, this configuration of the present invention enables the productive use of this waste process heat to heat and dry the wet coal 12 in the fluidized bed dryer 150 in order to enhance the boiler efficiencies from the combustion of such dried coal on a more commercially viable basis. The use of a primary heat source like coal, oil, or natural gas, as shown in FIG. 9, is a more expensive option for drying the coal particles.

Figure 11:
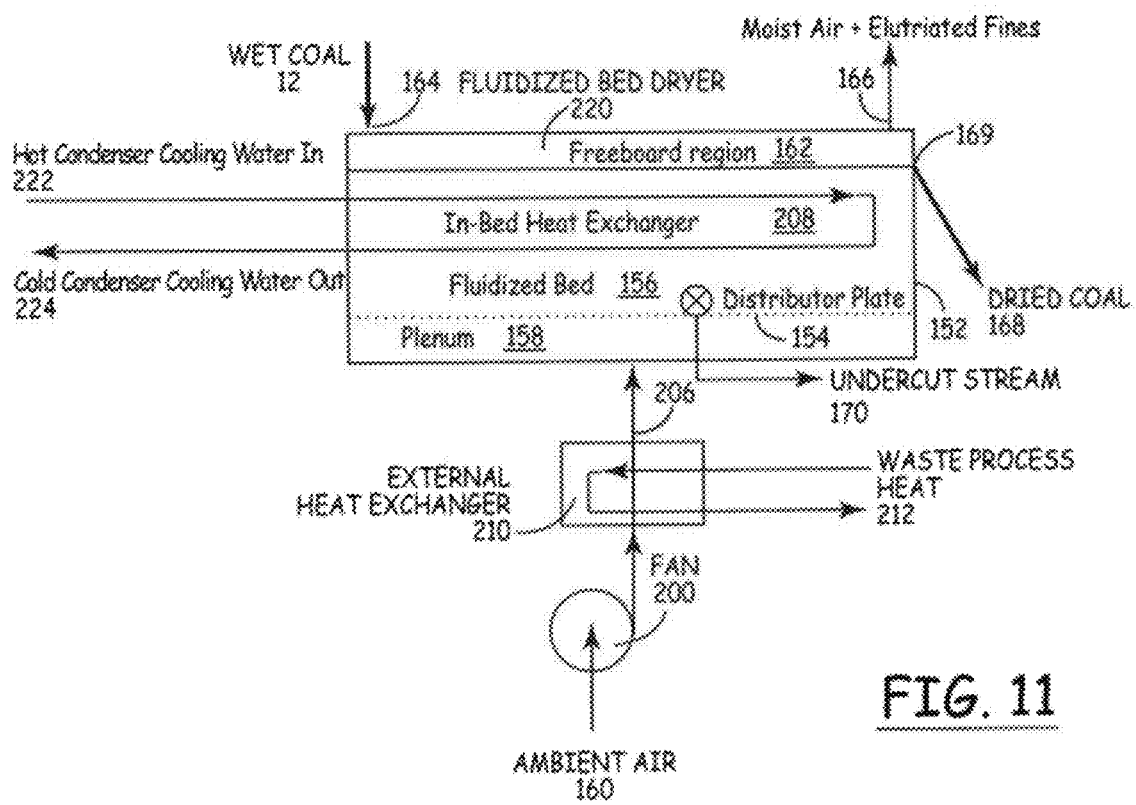
FIG. 11 is a schematic diagram of a single-stage fluidized bed dryer of the present invention that utilizes a combination of waste process heat to heat the fluidizing air used to fluidize the coal (indirect heat), and hot condenser cooling water circulated through an in-bed heat exchanger contained inside the fluidized bed dryer to dry the coal (direct heat).

FIG. 11 illustrates yet another embodiment of a single-stage, single-vessel, fluidized bed dryer 220 that is similar to the one shown in FIG. 10, except that the waste process heat 212 is not used to heat both the external heat exchanger 210 and the in-bed heat exchanger 208. Instead, a portion of the hot condenser cooling water 222 from elsewhere in the electricity generation plant operation is diverted to in-bed heat exchanger 208 to provide the necessary heat source. Thus, in the fluidized dryer embodiment 220 of FIG. 11, two separate waste heat sources (i.e., waste process heat and hot condenser cooling water) are employed to enhance the operational efficiency of the coal drying process.

Figure 12:
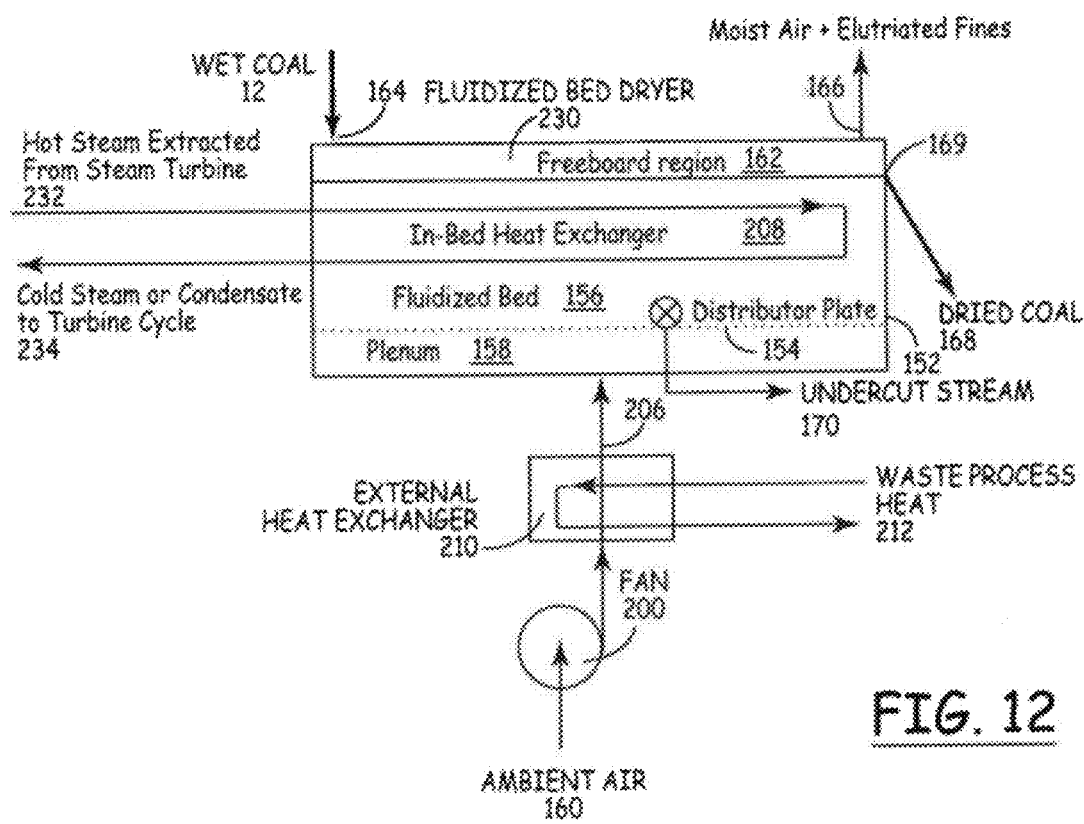
FIG. 12 is a schematic diagram of a single-stage fluidized bed dryer of the present invention that utilizes a combination of waste process heat to heat the fluidizing air used to fluidize the coal (indirect heat), and hot steam extracted from a steam turbine cycle and circulated through an in-bed heat exchanger contained inside the fluidized bed dryer to dry the coal (direct heat).

FIG. 12 shows still another embodiment of a single-stage, single-vessel, fluidized bed dryer 230 similar to the one depicted in FIG. 11, except that hot process steam 232 extracted from the steam turbines of the electricity power plant is used instead of hot condenser cooling water as a heat source for in-bed heat exchanger 208. Again, fluidized bed dryer 230 uses two different waste heat sources (i.e., waste process heat 212 and hot process steam 232) in order to enhance the operating efficiency of the coal drying process.

Figure 13:
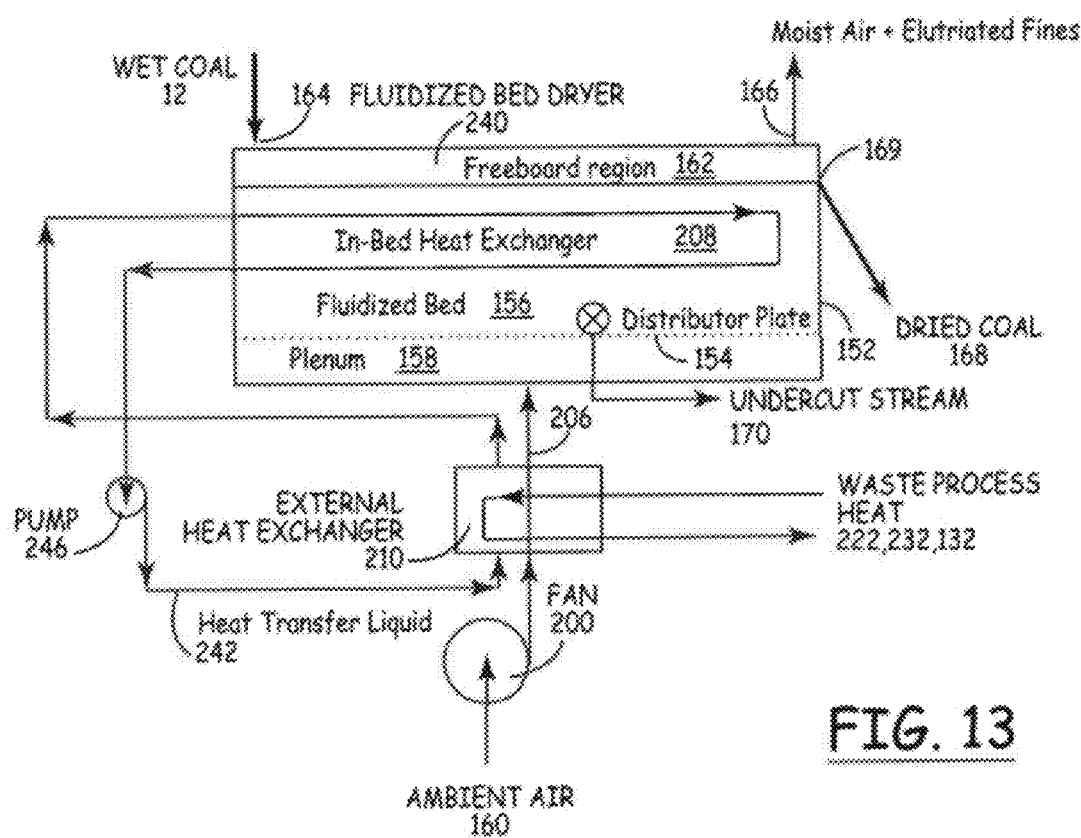
FIG. 13 is a schematic diagram of a single-stage fluidized bed dryer of the present invention that utilizes waste process heat to both heat the fluidizing air used to fluidize the coal (indirect heat), and to heat the transfer liquid circulated through an in-bed heat exchanger contained inside the fluidized bed dryer to dry the coal (indirect heat).
Figure 14:
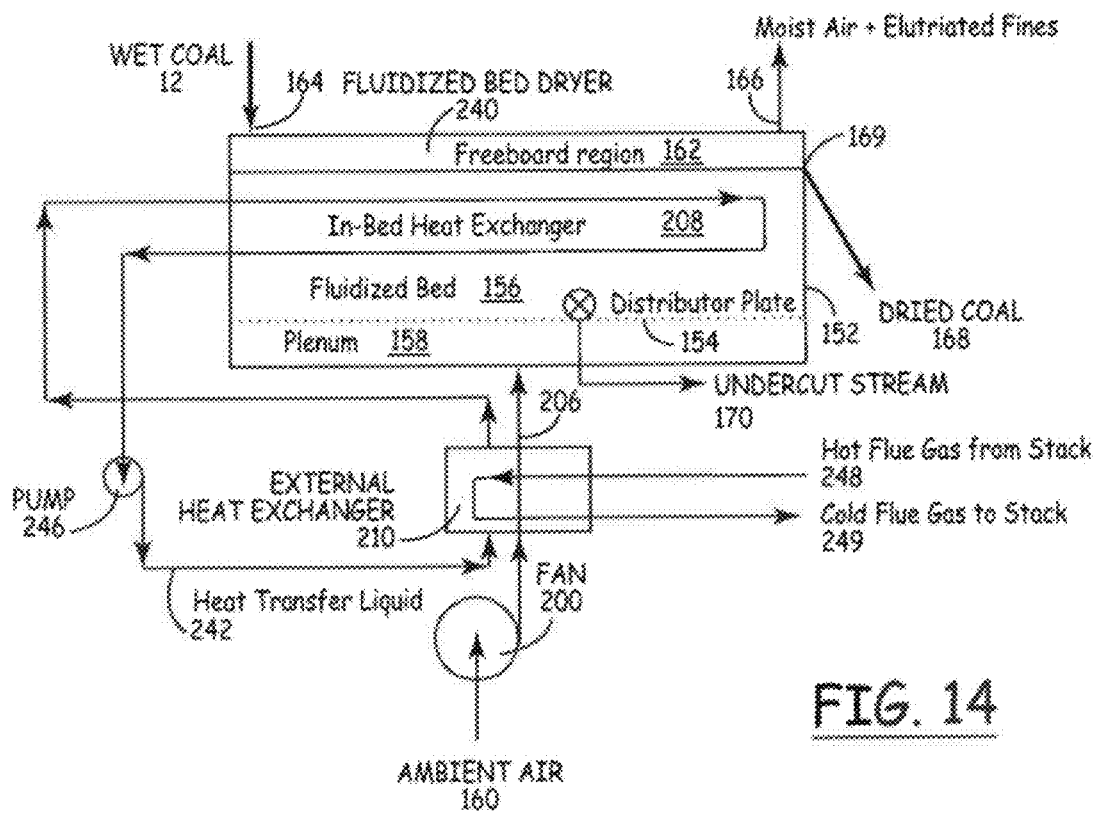
FIG. 14 is a schematic diagram of a single-stage fluidized bed dryer of the present invention that utilizes hot flue gas from a plant furnace stack to both heat the fluidizing air used to fluidize the coal (indirect heat), and to heat the transfer liquid circulated through an in-bed heat exchanger contained inside the fluidized bed dryer to dry the coal (indirect heat).

Another embodiment of a fluidized bed dryer is shown in FIGS. 13-14, entailing a single-stage, single-vessel, fluidized bed dryer 240 with an indirect heat supply. An indirect heat supply to the in-bed heat exchanger 208 is provided by the use of water or other heat transfer liquid 242, which is heated by the fluidizing air 206, hot condenser cooling water 222, process steam 232 extracted from the steam turbine cycle, or hot flue gas 248 from the furnace stack in an external heat exchanger 210, and then circulated through the in-bed heat exchanger 208 by means of pump 246, as illustrated in FIG. 13. Any combination of these sources of heat (and other sources) may also be utilized.

Figure 15:
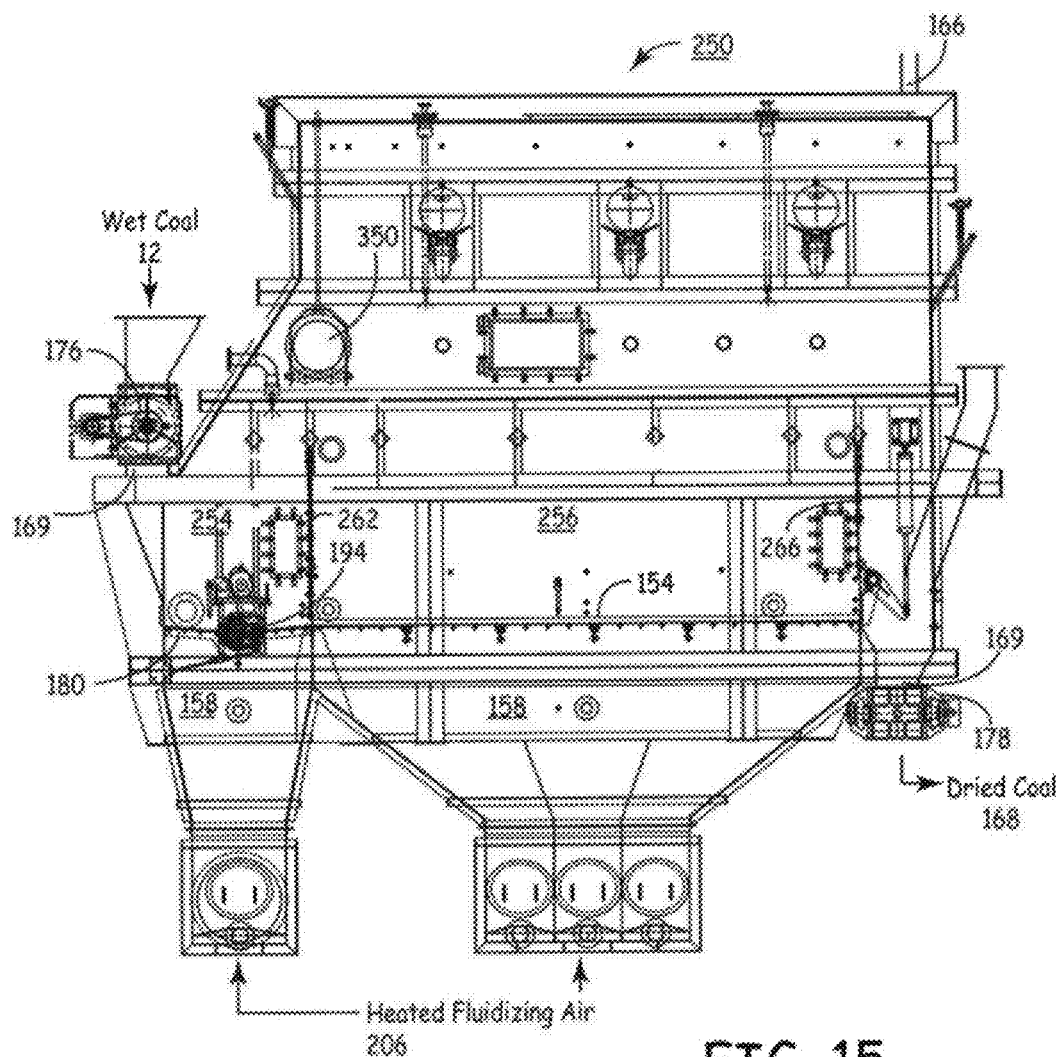
FIG. 15 is a view of a two-stage fluidized-bed dryer of the present invention.
Figure 16:
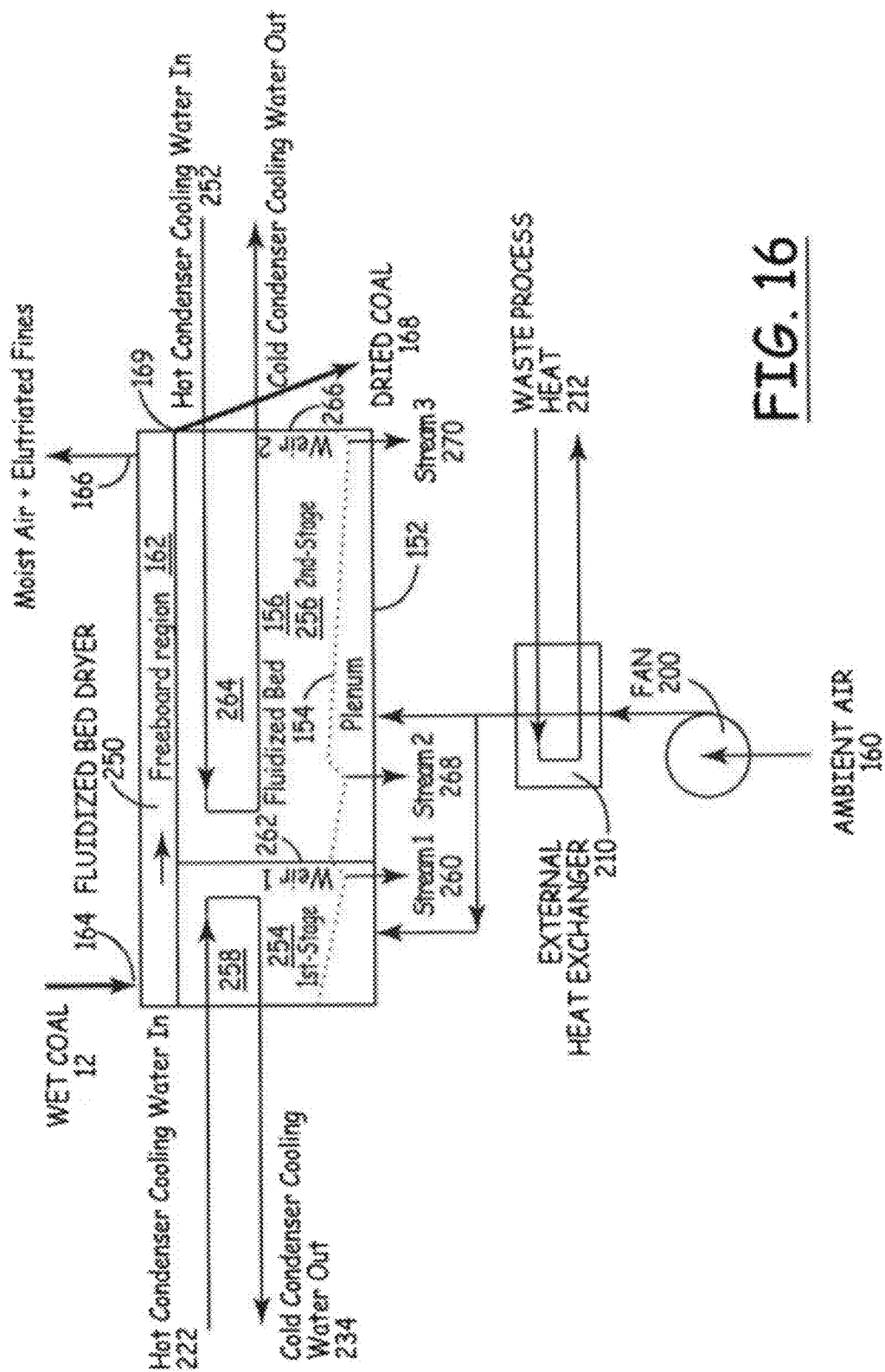
FIG. 16 is a schematic diagram of a two-stage fluidized bed dryer of the present invention that utilizes waste process heat from the plant operations to heat the fluidizing air used to fluidize the coal in both chambers of the fluidized bed dryer (indirect), and hot condenser cooling water circulated through in-bed heat exchangers contained inside both chambers of the fluidized bed dryer to dry the coal (direct heat).

Still another embodiment of an open-air, low-temperature fluidized bed dryer design of the present invention is illustrated in FIGS. 15-16, which is a multiple-stage, single-vessel, fluidized bed dryer 250 with a direct heat supply (hot condenser cooling water 252 from the cooling tower of electric power plant) to an in-bed heat exchanger 208. Vessel 152 is divided in two stages: a first stage 254 and second stage 256. Although illustrated in FIGS. 15-16 as a two-stage dryer, additional stages may be added and further processing can be achieved. Typically, wet sized coal 12 enters the first stage 254 of the fluidized bed drier 250 through the freeboard region 162 at entry point 164. The wet sized coal 12 is preheated and partially dried (i.e., a portion of surface moisture is removed) by hot condenser cooling water 252 entering, circulating and exiting through the heating coils of in-bed heat exchanger 258 contained inside the first stage 254 (direct heat). The wet sized coal 12 is also heated and fluidized by hot fluidizing air 206. Fluidizing air 206 is forced by fan 200 through the distributor plate 154 of the first stage 254 of the fluidized bed dryer 250 after being heated by waste process heat 212 in external heat exchanger 210.

In the first stage 254, the hot fluidization air stream 206 is forced through the wet sized coal 12 supported by and above distributor plate 154 to dry the coal and separate the fluidizable particles and non-fluidizable particles contained within the coal. Heavier or denser, non-fluidizable particles segregate out within the bed and collect at its bottom on the distributor plate 154. These non-fluidizable particles ("segregation stream") are then discharged from the first stage 254 as Stream 1 (260). Fluidized bed dryers are generally designed to handle non-fluidized material up to four inches thick collecting at the bottom of the fluidized bed. The non-fluidized material may account for up to 25% of the coal input stream. This segregation stream 260 can be directed through another beneficiation process or simply be rejected. Movement of the segregated material along the distributor plate 154 to the discharge point for stream 260 is accomplished by an inclined horizontal-directional distributor plate 154, as shown in FIG. 16. The first stage 254 therefore separates the fluidizable and non-fluidizable material, pre-dries and preheats the wet sized coal 12, and provides uniform flow of the wet sized coal 12 to the second stage 256 contained within the fluidized bed dryer 250. From the first stage 254, the fluidized coal 12 flows airborne over a first weir 262 to the second stage 256 of the bed dryer 250. In this second stage of the bed dryer 250, the fluidized coal 12 is further heated and dried to a desired outlet moisture level by direct heat, hot condenser cooling water 252 entering, circulating, and exiting the heating coils of the in-bed heat exchanger 264 contained within the second stage 256 to radiate sensible heat therein. The coal 12 is also heated, dried, and fluidized by hot fluidizing air 206 forced by fan 200 through the distributor plate 154 into the second stage 256 of the fluidized bed dryer 250 after being heated by waste process heat 212 in external heat exchanger 210.

The dried coal stream is discharged airborne over a second weir 266 at the discharge end 169 of the fluidized bed dryer 250, and elutriated fines 166 and moist air are discharged through the top of the dryer unit. This second stage 256 can also be used to further separate fly ash and other impurities from the coal 12. Segregated material will be removed from the second stage 256 via multiple extraction points 268 and 270 located at the bottom of the bed 250 (or wherever else that is appropriate), as shown in FIG. 16 as Streams 2 (268) and 3 (270). The required number of extraction points may be modified depending upon the size and other properties of the wet sized coal 12, including without limitation, nature of the undesirable impurities, fluidization parameters, and bed design. The movement of the segregated material to the discharge point(s) 260, 268, and 270 can be accomplished by an inclined distributor plate 154 shown in FIG. 16, or by existing commercially available horizontal-directional distributor plates. Segregation streams 1, 2 and 3 may be either removed from the process and land-filled or further processed to remove undesirable impurities.

The fluidization air stream 206 is cooled and humidified as it flows through the coal bed 250 and wet sized coal 12 contained in both the first stage 254 and second stage 256 of the fluidized bed 156. The quantity of moisture which can be removed from the coal 12 inside the dryer bed is limited by the drying capacity of the fluidization air stream 206. Therefore, the heat inputted to the fluidized bed 156 by means of the heating coils of the in-bed heat exchangers 258 and 264 increases the drying capacity of fluidizing air stream 206, and reduces the quantity of drying air required to accomplish a desired degree of coal drying. With a sufficient in-bed heat transfer surface, drying air stream 206 could be reduced to values corresponding to the minimum fluidization velocity needed to keep particulate suspended. This is typically in the 0.8 meters/second range, but the rate could be increased to run at a higher value, such as 1.4 meters/second, to assure that the process never drops below the minimum required velocity.

To achieve maximum drying efficiency, drying air stream 206 leaves fluidized bed 156 at saturation condition (i.e., with 100% relative humidity). To prevent condensation of moisture in the freeboard region 162 of the fluidized bed dryer 250 and further downstream, coal dryer 250 is designed for outlet relative humidity less than 100%. Also, a portion of the hot fluidizing air 206 may be bypassed around the fluidized bed 156, and mixed with the saturated air in the freeboard region 162 to lower its relative humidity (e.g., sparging), as explained more fully herein. Alternatively, reheat surfaces may be added inside the freeboard region 162 of the fluidized bed dryer 250 or heating of vessel skin, or other techniques may be utilized to increase the temperature and lower the relative humidity of fluidization air 206 leaving the bed dryer 250, and prevent downstream condensation. The moisture removed in the dryer is directly proportional to the heat input contained in the fluidizing air and heat radiated by the in-bed heat exchangers. Higher heat inputs result in higher bed and exit temperatures, which increase the water transport capabilities of the air, thereby lowering the required air-to-coal ratio required to achieve the desired degree of drying. The power requirements for drying are dependent upon the air flow and the fan differential pressure. The ability to add heat in the dryer bed is dependant upon the temperature differential between the bed and heating water, the heat transfer coefficient, and the surface area of the heat exchanger. In order to use lower temperature waste heat, more heat transfer area is therefore needed to introduce the heat into the process. This typically means a deeper bed to provide the necessary volume for the heat coils of the in-bed heat exchangers. Thus, intended goals may dictate the precise dimensions and design configuration of the fluidized bed dryer of the present invention.

Coal streams going into and out of the dryer include the wet sized coal 12, processed coal stream, elutriated fines stream 166, and the segregation streams 260, 268, and 270. To deal with the non-fluidizable coal, the dryer 250 is equipped with a screw auger 194 contained within the trough region 190 of first-stage distributor plate 180 in association with a collection hopper and scrubber unit for collecting the segregation stream coal particles, as disclosed more fully herein.

Typical associated components of a dryer include, amongst others, coal delivery equipment, coal storage bunker, fluidized bed dryer, air delivery and heating system, in-bed heat exchanger(s), environmental controls (dust collector), instrumentation, and a control and data acquisition system. In one embodiment, screw augers are used for feeding moist coal into and extracting the dried coal product out of the dryer. Vane feeders can be used to control the feed rates and provide an air lock on the coal streams into and out of the dryer. Load cells on the coal bunker provide the flow rate and total coal input into the dryer. Instrumentation could include, without limitation, thermocouples, pressure gauges, air humidity meters, flow meters and strain gauges.

With respect to fluidized-bed dryers, the first stage accomplishes pre-heating and separation of non-fluidizable material. This can be designed as a high-velocity, small chamber to separate the coal. In the second stage, coal dries by evaporation of coal moisture due to the difference in the partial pressures between the water vapor and coal. In a preferred embodiment, most of the moisture is removed in the second stage.

The heating coils 280 contained within the in-bed heat exchanges 258 and 264 of fluidized-bed dryer 250 are shown more clearly in FIGS. 17-18. Each heating coil is of carbon steel construction consisting of a two-pass, U-tube coil connection 282 with an integral water box 284 connected thereto with a cover, inlet flange 286, outlet flange 288, and lifting lugs 290. These heating coil bundles are designed for 150 psig at 300° F. with 150# ANSI flanges for the water inlet 286 and outlet 288. The heating coil tubes 280 are oriented across the width of the first-stage 254 and second-stage 256 of the dryer unit, and support plates 292 with lifting lugs are interspaced along the length of the heating coil bundles to provide lateral support.

An embodiment of the first-stage heat exchanger 258 contains 50 heating coil pipes (280) having a 1½-inch diameter with Sch 40 SA-214 carbon steel finned pipe, ½-inch-high fins, and ½-inch fin pitch×16-garage solid helical-welded carbon steel fins with a 1-inch horizontal clearances and a 1½-inch diagonal clearance. The second-stage heat exchanger 264, meanwhile, can consist of one long set of tube bundles, or multiple sets of tube bundles in series, depending upon the length of the second stage of the dryer. The tubes of the second-stage heat exchanger 264 will generally consist of 1½-inch OD tubing×10 BWG wall SA-214 carbon steel finned pipe, ¼-½-inch-high fins, and ½-¾-inch fin pitch× 16-gauge solid helical-welded carbon steel fins with 1-inch horizontal clearance and 1½-inch diagonal clearance. In an embodiment of this invention, the second-stage heating coil pipes contain 110-140 tubes running the length of the second stage. The combined surface area of the tube bundles for both the first-stage and second-stage heat exchangers 258 and 264 is approximately 8,483 ft².

The heat source provided to the fluidized bed under the present invention may be primary heat. More preferably, the heat source should be a waste heat source like hot condenser cooling water, hot condenser cooling air, hot water drain, process waste heat, hot flue gas, or spent turbine steam, which may be used alone or in combination with another waste heat source(s) or primary heat. Such waste heat sources are typically available in many if not most industrial plant operations, and therefore may be used to operate the low-temperature processing and contaminant separation process of the present invention on a more commercially economical basis, instead of being discarded within the industrial plant operation. U.S. Ser. No. 11/107,152 filed on Apr. 15, 2005, which shares a common co-inventor and owner with this application, describes more fully how to integrate such primary or waste heat sources into the fluidized bed apparatus, and is incorporated hereby by reference in its entirety.

The dryer bed designs for this invention are intended to be custom designed to maximize use of waste heat streams available from a variety of power plant processes without exposing the coal to temperatures greater than 300° F., preferably between 200-300° F. (Other feedstock or fuel temperature gradients and fluid flows will vary, depending upon the intended goal to be achieved, properties of the fuel or feedstock and other factors relevant to the desired result). Above 300° F., typically closer to 400° F., oxidation occurs and volatiles are driven out of the coal, producing another stream containing undesirable constituents that need to be managed (e.g., $SO_2$ and mercury, and other potential problems for the plant operations).

The dryers are able to handle higher-temperature waste heat sources by tempering the air input to the dryer to less than 300° F. and inputting this heat into heat exchanger coils within the bed. The multi-stage design of a fluidized-bed dryer creates temperature zones which can be used to achieve more efficient heat transfer by counter flowing of the heating medium. The coal outlet temperature from a dryer bed is relatively low (typically less than 140° F.) and produces a product which is relatively easy to store and handle. If a particular particulate material requires a lower or higher product temperature, the dryers can be designed to provide the reduced or increased temperature.

Selection of appropriate dryer design, dryer temperature, and residence time for the coal contained within the bed will produce a reduction in moisture to the desired level. For low-rank coals for power plant applications, this may entail a moisture reduction for North American lignite from approximately 35-40% wt to 10-35% wt, more preferably 27-32% wt. In other geographical markets like Australia and Russia that start out with high moisture levels for lignite as high as 50-60% wt, coal users may choose to reduce the moisture level through drying to below 27%. wt For subbituminous coals, this moisture reduction might be from approximately 25-30% wt to approximately 10-30% wt, more preferably 20-25% wt. While properly designed dryer processes under this invention can reduce the moisture level of particulate materials to 0% using low-temperature heat, in the case of coal for electric power plant operations, this may be unnecessary and increase processing costs. Custom designs permit the beds to be constructed to dry high-moisture coal to a level best suited for the particular power plant process.

Figure 31:
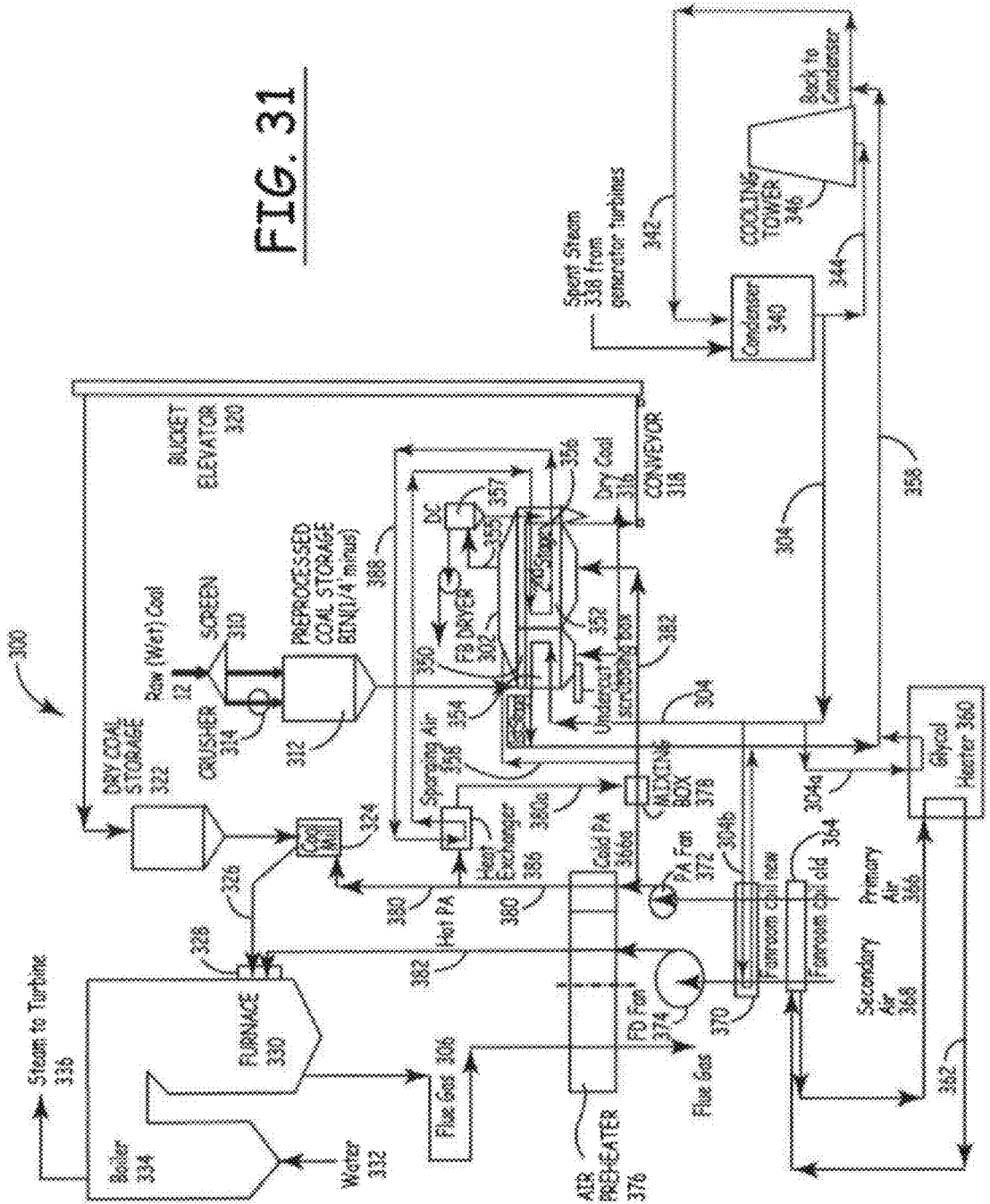
FIG. 31 is a schematic diagram of a two-stage fluidized bed dryer of the present invention integrated into an electric power plant that uses hot condenser cooling water to heat the coal contained in the first dryer stage, and to heat the fluidizing air used to fluidize the coal in both dryer stages. The hot condenser cooling water in combination with hot flue gas dries the coal in the second dryer stage.

Many possible implementation options are available for use of the low-temperature, open-air dry process utilizing waste heat options of the present invention within an industrial plant operation. A preferred embodiment is shown in FIG. 31 in the form of a two-stage, single-vessel fluidized bed dryer 302 integrated within an electrical power generation plant 300, using hot condenser cooling water 304 and hot flue gas 306 as the sole heat sources for the drying operation. Raw lignite coal 12 having a moisture level of 35-40% wt is fed into a screen 310 to sort the coal for suitable size for handling within the process. Appropriately sized coal 12 within the range of two inch minus, more preferably 0.25 inches or less, is conveyed by standard means directly into preprocess coal storage bin 312. Any oversized coal greater than 0.25 inches is first run through a crusher 314 before it is conveyed by standard means to coal storage bin 312.

From the storage bin, the wet, sized coal 12 is then transported by a conveyor system known within the art to the fluidized bed dry 302, wherein the total moisture on the surface of and within the pores of the coal particles is reduced to a predetermined level to yield "dried" coal 316 having an average moisture level of approximately 28-30% wt. This resulting dried coal 316 is transported by conveyor 318 to bucket elevator 320 to dry coal storage hopper 322 where it is kept until needed for the boiler furnace.

The dried coal 316 collected in storage hopper 322 is conveyed by conventional means to coal mill 324 in which it is pulverized into dried, pulverized coal 326 prior to being conveyed to wind box 328 for entry into furnace 330. For purposes of this application, the process parameters typical of "winter conditions" in North Dakota for a 4 million lbs/hr boiler capacity are provided for the coal drying process shown in FIG. 31. Upon combustion of the coal 326 in furnace 330, the resulting heat within the 6 billion BTU/hr range is transferred to water 332 contained in boiler 334. Steam 336 at an average temperature of 1000° F. and pressure of 2,520 psig. is then passed onto the first of a series of high-pressure, intermediate-pressure, and low-pressure steam turbines (not shown) used to drive at least one generator (not shown) for the production of electricity. The spent steam will typically leave the high-pressure turbine at 600° F. and 650 psi, and leave the downstream intermediate pressure turbine(s) at approximately 550-600° F. and 70 psi.

The spent steam 338 exiting the low-pressure turbine at approximately 125-130° F. and 1.5 psia is thereafter delivered to condenser 340 wherein it is converted to water. Cold cooling water 342 at approximately 85° F. is circulated through condenser 340 to withdraw latent heat energy from the spent steam 338. In the process, the cooling water 342 will become hotter and exits the condenser as hot cooling water 344 at approximately 120° F. This hot condenser cooling water 344 is then passed to cooling tower 346 wherein its temperature is reduced again to approximately 85° F. to produce the cold condenser cooling water for recycle to condenser 340. The condensate from the condenser is thereafter re-circulated through boiler 334 to be reheated into steam 336 for use again to drive the steam turbine.

Fluidized bed dryer 302 consists of first stage 350 having a distribution area of 70 ft² for receiving the coal 12 to be dried, and a larger second stage 352 having a distribution area of 245 ft². These stages of the fluidized bed dryer 302 are equipped with in-bed heat exchangers 354 and 356, respectively, which will be discussed in greater detail below.

A portion 304 of the hot condenser cooling water is diverted and circulated through heat exchanger 354 to provide the direct source of heat to the first stage 350 of the dryer. This hot condenser cooling water 304 will typically average 120° F., and causes first-stage in-bed heat exchanger to emit 2.5 million BTU/hr of heat. The spent hot condenser cooling water 358 exiting the heat exchanger at approximately 100° F.

returns indirectly to the condenser whereupon it will assist in the cooling down of the spent turbine steam 358, and become hot condenser cooling water 304 once again.

A portion 304a of the hot condenser cooling water is circulated through external heat exchanger 360, which is used to heat up the glycol-based circulation fluid 362 used to heat preliminary fan room coil 364. This preliminary fan room coil 364 increases the temperature of primary air stream 366 and secondary air stream 368 from ambient temperature, which will vary throughout the time of year, to approximately 25-30° F. (winter conditions). Glycol will not freeze at low temperatures, so it ensures that the primary and secondary air streams likewise will not fall below a minimum temperature of 25° F.

Primary air stream 366 and secondary air stream 368 leaving preliminary fan room coil 364 are then passed onto the principal fan room coil 370, which constitutes an air-water heat exchanger unit. A portion 304b of hot condenser cooling water 304 is circulated through principal fan room coil 370 to provide the necessary heat source. The primary air stream 366 and secondary air stream 368 exit primary fan room coil at approximately 80-100° F., whereupon they are conveyed by means of PA fan 372 and FD. fan 374, at 140° F. and 112° F., respectively, to external air heater 376, which constitutes a tri-sector, rotating regenerative air pre-heater.

The use of the fanroom coils 364 and 370 to preheat inlet air to the air preheater 376 and the hot and cold primary air streams 380 and 366a, respectively, increases the temperature of the heat available to the outer heat exchanger 386 and heat transfer fluid stream 388 from the 120° F. range to the 200° F.-plus range. This has a positive effect on the flow rate of fluidizing/drying air 382 and on the required surface area of the in-bed heat exchanger 302. Both are reduced as the temperature of drying and heating streams is increased.

A portion 366a of the primary air 366 is diverted prior to external air pre-heater 376 to mixing box 378 at approximately 145° F. After mixing with a hotter stream 380a (at approximately 283° F.) of the primary air, it forms fluidizing air 382 at approximately 187° F., which is used as the fluidizing medium for both first stage 350 and second stage 352 of fluidized bed dryer 302. In order to achieve this 187° F. fluidizing air temperature, approximately 54% of the air entering mixing box 378 will be provided by hot PA air 380a, and approximately 46% will be provided by cold PA air 366a. The fluidizing air 382 will enter first stage 350 at velocity of approximately 3.5 ft/sec to fluidize the approximately 40 inch-thick bed of coal particles. The coal particles 12 travel across the first stage 350 at approximately 132,000 lbs/hr, wherein they are heated by in-bed heat exchanger 354 and the fluidizing air to approximately 92° F. and undergo a small moisture reduction. Upon reaching the end of the first stage 350, they will spill over the top of a weir into second stage 352.

Flue gas 306 exits the boiler furnace 330 at approximately 825° F. This waste heat source is passed through external air heater 376 to provide the heating medium. The flue gas exits the external heater at approximately 343° F. and is vented to the stack via a precipitator and scrubber. But, in the process, the flue gas heats primary air stream 366 and secondary air stream 368 to approximately 757° F. and 740° F., respectively, to form hot primary air 380 and heated secondary air 382. The heated secondary air stream 382 is delivered to furnace 330 at approximately 117% of what is needed to aid the combustion process and enhance the boiler efficiency.

Hot primary air 380 at approximately 757° F. is delivered to coal mill 324, whereupon it forms a source of positive pressure to push the pulverized coal particles to wind box 328 and furnace 330. Again, preheating the pulverized coal particles 326 in this manner enhances the boiler efficiency and enables the use of a smaller boiler and associated equipment.

With drier coal, the flame temperature is higher due to lower moisture evaporation loss, and the heat transfer processes in the furnace 330 are modified. The higher flame temperature results in larger radiation heat flux to the walls of furnace 330. Since the moisture content of the exiting flue gas 306 is reduced, radiation properties of the flame are changed, which also affects radiation flux to the walls of furnace 330. With higher flame temperature, the temperature of coal ash particles exiting the furnace 330 is higher, which could increase furnace fouling and slagging. Deposition of slag on furnace walls reduces heat transfer and results in a higher flue gas temperature ("FEGT") at the furnace exit. Due to reduction in coal flow rate as fuel moisture is reduced, the amount of ash entering the boiler will also be reduced. This reduces solid particle erosion in the boiler 334 and maintenance of the boiler 334 (e.g., the required removal of the soot that collects on the interior surface of the boiler).

A portion of the hot primary air stream 380 is diverted to heat exchanger 386, which heats a liquid medium 388 to approximately 201° F., which is used as the heat source for in-bed heat exchanger 356 contained in second stage 352 of the fluidized bed dryer 302. This liquid medium will leave the heat exchanger at approximately 160° F. whereupon it is routed back to heat exchanger 386 to be reheated. As already mentioned above, primary air stream 380a leaving heat exchanger 386 at approximately 283° F. combines with cold primary air 366a in mixing box 378 to form the fluidizing air stream 382 directed to the fluidized bed dryer 302. This mixing box allows the temperature of the fluidizing air to be adjusted to a desired level The fluidized coal particles that were delivered from first stage 350 at approximately 92° F. and slightly reduced moisture to second stage 352 of the fluidized bed dryer will form a bed of approximately 38-42 inches in depth that will be fluidized by air stream 382 and further heated by in-bed heat exchanger 356. These coal particles will take approximately 12 minutes to travel the length of the second stage 352 of the fluidized bed, whereupon they will be discharged as dried coal 316 at approximately 118° F. and 29.5% wt moisture. More importantly, the heat value of the coal 12 that entered the first stage of dryer 302 at approximately 6200 BTU/lb has been increased to approximately 7045 BTU/lb.

Within the industry, an "X ratio" is calculated to represent the relative efficiency of the transfer of heat across air pre-heater 376 from flue gas 306 to primary air 366 and secondary air 368. Represented by the equation:

$$m_{PA+FD} \cdot cp_{PA+FD} \cdot (T_{out}-T_{in})_{PA+FD} = m_{flue} \cdot cp_{flue} \cdot (T_{in}-T_{out})_{flue}$$

where m is the mass flow, cp is the specific heat, $T_{in}$ is the inlet temperature, and $T_{out}$ is the outlet temperature for the respective combustion air (i.e., primary air and secondary air) and flue gas streams, respectively. Because the product of (m·cp) for the combustion air stream (stated in BTU/hr) is typically only 80% of the corresponding value for the flue gas stream, this means that under ordinary circumstances for a power plant the temperature drop in the flue gas across the air heat exchanger can only equal 80% of the temperature gain in the combustion air stream. By reducing the moisture content of the coal and consequently the flue gas produced via combustion of that coal product in the furnace in accordance with this invention, however, the mass flow rate and specific heat values for the flue gas stream 306 will be reduced, while pre-heating of primary air stream 366 and secondary air stream 368 via fan room coils 364 and 370 will increase the mass flow rate for the combustion air stream. This will cause the X ratio to increase towards 100%, thereby greatly enhancing the boiler efficiency of the power plant operation. Moreover, careful design of the dryer system in accordance with the principles of this invention can further enhance the X ratio value to approximately 112%, thereby rendering the boiler operation even more efficient for producing electricity. Furthermore, this greatly enhanced X ratio for the air heat exchanger and boiler efficiency has been achieved through the use of available waste heat sources within the power plant operation, which enables improvement of the economics for the power plant operation on a synergistic basis.

Figure 32:
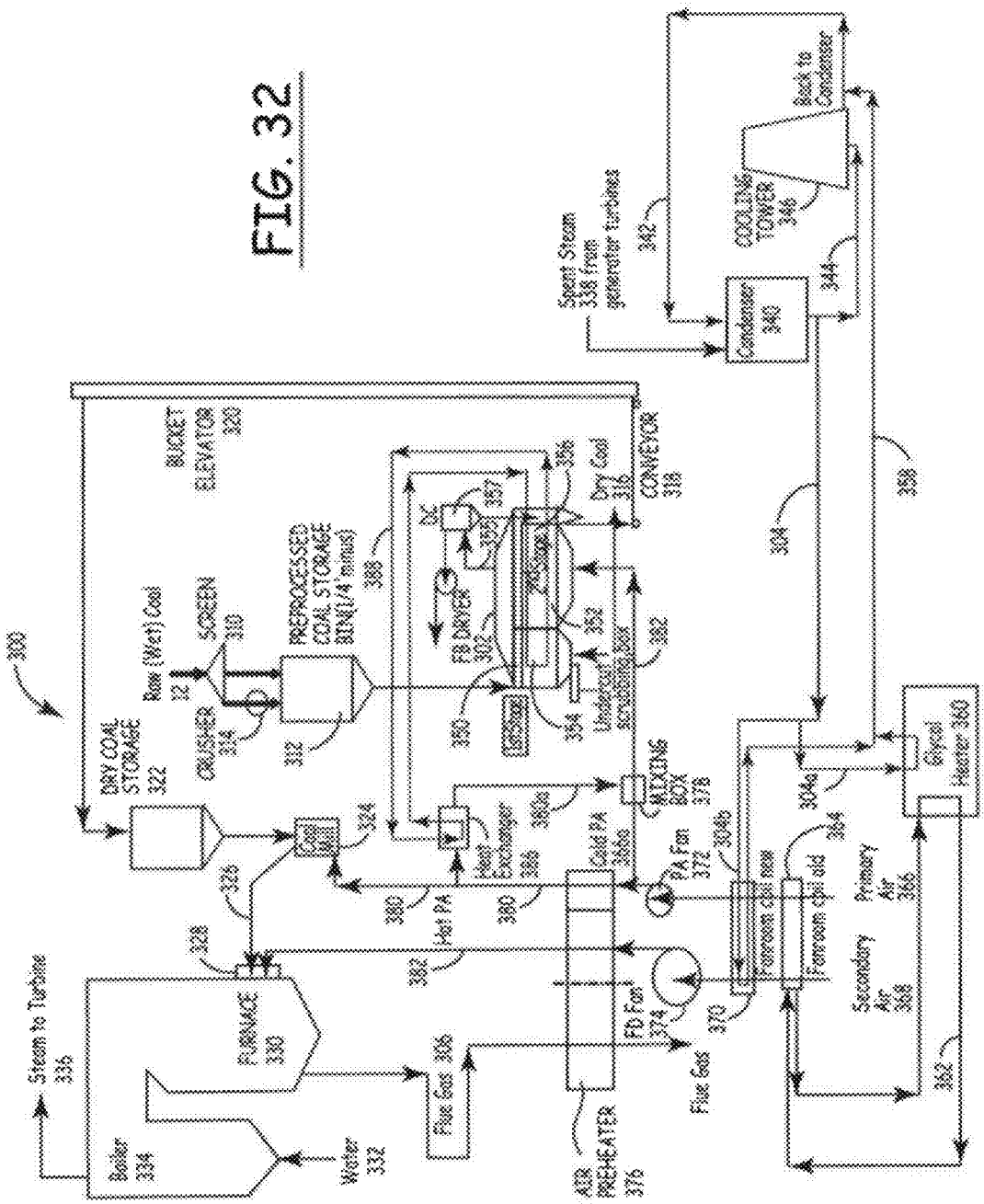
FIG. 32 is a schematic diagram of a two-stage fluidized bed dryer of the present invention integrated into an electric power plant that uses the combined waste heat provided by the hot condenser cooling water and hot flue gas to heat and/or dry the coal in both dryer stages.
Figure 33:
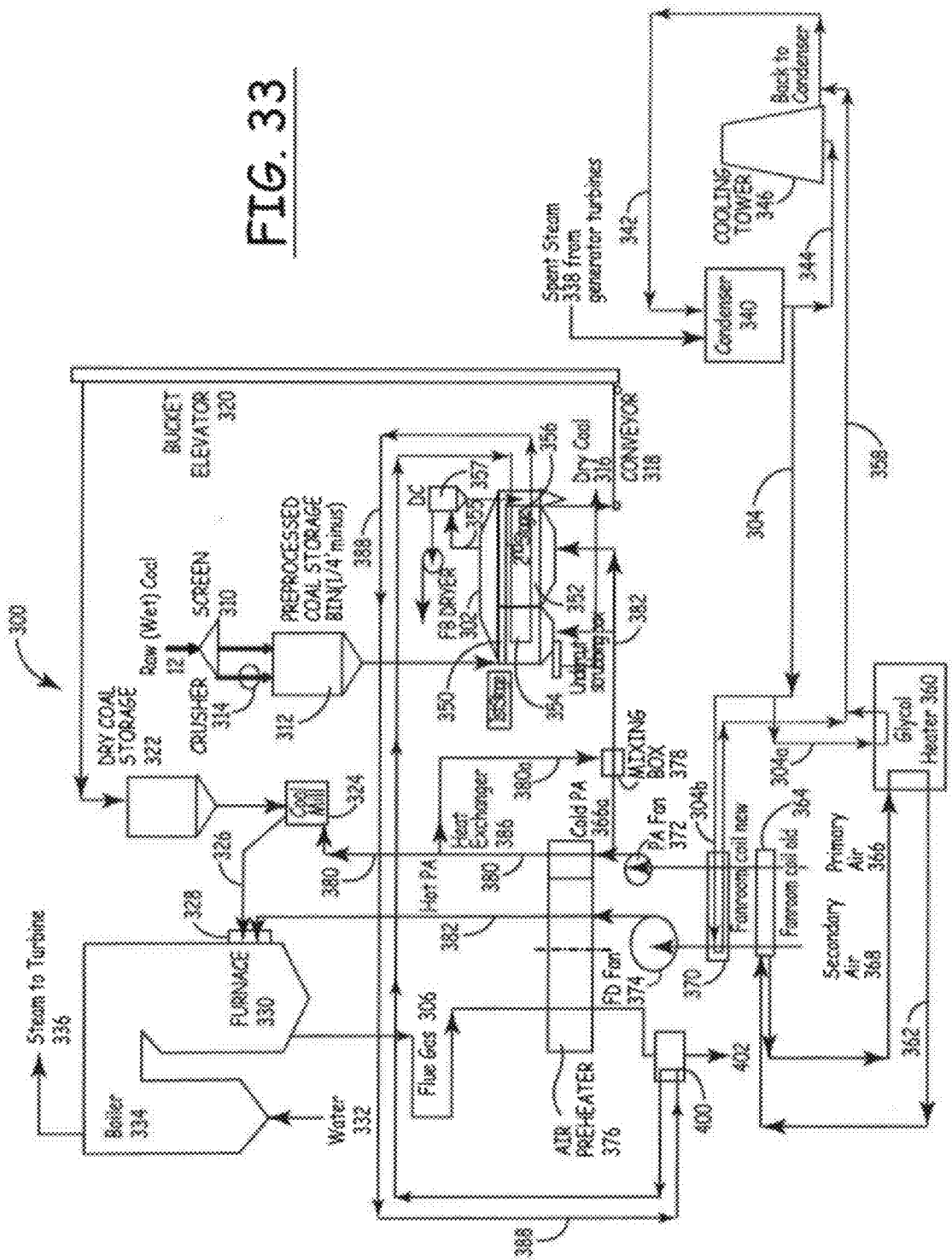
FIG. 33 is a schematic diagram a two-stage fluidized bed dryer of the present invention integrated into an electric power plant that uses the hot flue gas to heat and/or dry the coal in both dryer stages.

It is important to appreciate that other variations can be made to the fluidized bed dryer arrangements show in FIGS. 31-33. For example, other waste heat streams available within the electric power plant like the spent process steam coming off the turbines could be used in substitution for the hot flue gas or hot condenser cooling water streams. Moreover, separate mixing boxes could be inserted within the lines used to deliver the fluidizing air to the first and second stages of the fluidized bed in order to permit separate adjustment and control of the temperature of each fluidizing stream. Furthermore, a bi-sector or external air heater could be employed with both the primary and secondary airstreams passed through the one side to be heated by the hot flue gas traveling through the other side. If needed, a steam-air pre-heater ("SAH") can be placed in the hot primary air stream to further increase its temperature before it reaches the mixing boxes. The heat input for this SAH could be provided by steam extracted from the steam turbine cycle or from other waste heat sources available within the plant. Still another variation would be to place a low-temperature economizer heat exchanger in the path of the flue gas after it exits the external air pre-heater in order to heat a circulating fluid that provides further heat enhancement to the primary and/or secondary air streams before they reach the external air heater, as shown in FIG. 33. Such a heat exchanger could also be placed before the external air preheater.

FIG. 32 shows a slightly different integration of the fluidized bed dryer 302 into electric power plant 300, compared with FIG. 31 in which like elements have been given the same numbers for ease of understanding. Hot condenser cooling water 304 is still used to heat glycol heater 360 for preliminary fan room coil 364 and primary fan room coil 370, which, in turn, collectively preheat primary air stream 366 and secondary air stream 368 before they are further heated in external air heater 376 by flue gas 306 to create hot secondary air 382 and hot primary air 380. The cold primary air stream 366a is also still directed through mixing box 378 to control the temperature of the fluidizing air directed through the bottoms of first stage 350 and second stage 352 of the fluidized bed dryer. However, circulating liquid medium 388 heated in heat exchanger 386 is used as the heating medium for both in-bed heat exchanger 354 in first stage 350 and in-bed heat exchanger 356 in second stage 352. Unlike the arrangement shown in FIG. 31, hot condenser cooling water 304 is not used as the heating medium for in-bed heat exchanger 354 in the first stage 350. This FIG. 32 embodiment allows higher temperature heat to be directed to both heat exchangers in fluidized-bed dryer 302 and enhances the flexibility of the overall drying system.

FIG. 33 shows a still slightly different arrangement for the fluidized bed dryer 302 and electric power plant 300. Like FIG. 32, a common source of waste heat is used for both in-bed heat exchangers contained in the first stage 350 and second stage 352 of the fluidized-bed dryer 302. However, unlike FIG. 32 where the hot primary air 380 exiting the external air heater 376 is used to heat the heat exchanger circulating liquid 388, in FIG. 33 this circulating liquid 388 is heated inside external heat exchanger 400 by means of the flue gas stream 402 exiting the external air pre-heater 376. In this manner, the circulating liquid 388 can be heated to approximately 200-300° F. for use in the in-bed heat exchangers 354 and 356. Moreover, this FIG. 33 embodiment provides additional advantages, because it enables further productive use of the heat content of the flue gas stream, and provides even greater flexibility to the dryer system design which renders it more efficient in producing the same or better drying performance compared with the embodiments shown in FIGS. 31 and 32.

Figure 34:
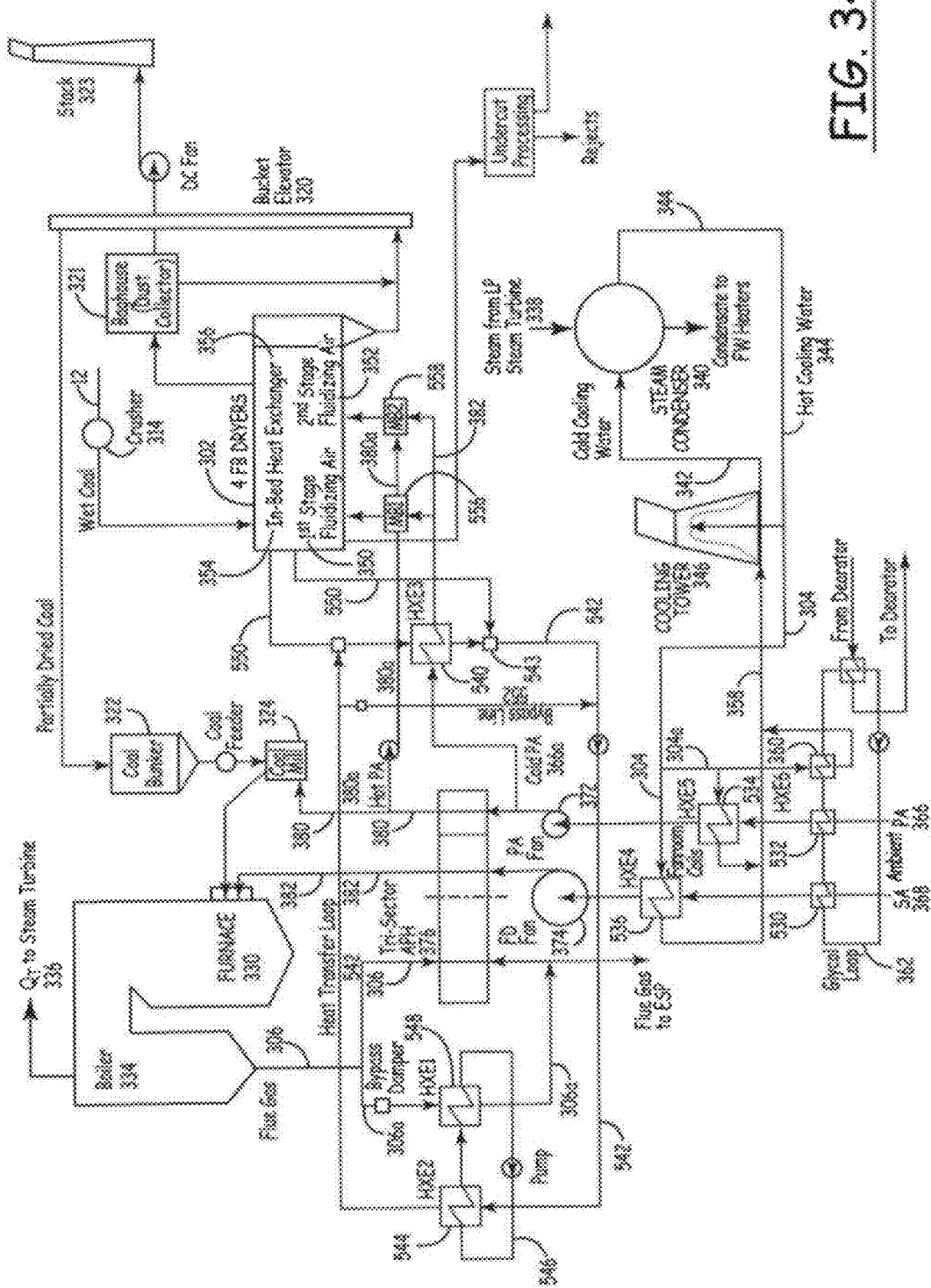
FIG. 34 is a schematic diagram of a further preferred embodiment of a two-stage fluidized bed dryer integrated into an electric power plant that uses hot condenser cooling water and hot flue gas to heat the fluidizing airstreams for the dryer and provide a heat source to the inbed heat exchangers located within the dryer.

Still another possible and preferred embodiment of the low-temperature, open-air process utilizing waste heat sources of the present invention is depicted in FIG. 34. Like elements from FIGS. 31-33 are shown in FIG. 34 with the same numbering used previously for ease of understanding of the reader.

Instead of a single initial fanroom coil 364 heated by glycol heater 360, as shown in FIGS. 31-33, the FIG. 34 embodiment contains separate heat exchangers 530 and 532 that are used initially to preheat primary and secondary airstreams 366 and 368. Glycol loop 362 heated by means of hot condenser cooling water slip stream 304a circulates through heat exchangers 530 and 532 to increase the temperature of the two airstreams. Such a glycol preheating loop is particularly helpful when the low-temperature process system is operated in a cold weather environment.

The primary fanroom coil 370 of FIGS. 31-33 is divided into separate heat exchangers 534 and 536 in the FIG. 34 embodiment. This arrangement permits greater individual control of the temperature increase provided to primary airstream 366 and secondary airstream 368. Primary airstream 366 and secondary airstream 368 exit heat exchangers 534 and 536 at approximately 100° F. Hot condenser cooling water 304 provides a heat source to heat exchanger 536, while hot condenser cooling water slip stream 304a provides a heat source to heat exchanger 534. Hot condenser cooling water streams 304 and 304a combine into stream 358 for return to cooling tower 346 that produces cold cooling water 342 used to cool spent turbine steam 338 in steam condenser 340.

Like the FIGS. 31-33 embodiments, primary aistream 366 and secondary airstream 368 are heated by means, of trisector air preheater 376 before they are directed as airstreams 380 and 382 to the coal mill 324 and furnace 330, respectively. Flue gas 306 is directed to APH 376, so that its valuable waste heat content may be utilized before it is sent to the plant's environmental scrubbers. APH 376 increases the temperature of primary airstream 380 and secondary airstream 382 from approximately 100° F. to approximately 660-690° F. The temperature of flue gas 306 used to heat APH 376 drops from approximately 800-830° F. to approximately 265-277° F.

Cold primary airstream 366a is diverted from primary airstream 366 upstream of APH 376 to provide the fluidizing airstreams 382 for the first stage 350 and second stage 352 of fluidized bed dryer 302. Such cold PA 366a is typically at 145-150° F. However, it may be heated by means of heat exchanger 540 to increase its temperature in a regulated manner. The heat source for heat exchanger 540 is provided by means of heat transfer loop 542, which circulates through heat exchanger 540 and heat exchanger 544. Heat exchanger 544, in turn, is heated by means of heat transfer loop 546, which draws its heat source from flue gas substream 306a in heat exchanger 548. Flue gas substream 306a exiting heat exchanger 548 is combined with flue gas stream 306 exiting APH 376 and passed onto the environmental scrubber equipment before it is vented to the environment.

The thermal content of heat transfer loop 542 is also directed as stream 550 to inbed heat exchangers 354 and 356 contained within fluidizing bed 302 for drying the coal. Stream 550 exiting the inbed heat exchangers 354 and 356 is reunited with heat transfer loop 542 (bypassing heat exchanger 540 in view of its reduced thermal content), whereupon it is heated once again by means of flue gas 306 in heat exchanger 544 before being directed once again to cold PA 366a heat exchanger 540 and inbed heat exchangers 354 and 356. In this manner, hot condenser cooling water 344 and hot flue gas 306 are utilized in combination to heat the airstream 382 that fluidizes the coal passing through dryer 302, and provides heating sources for the inbed heat exchangers 354 and 356 that dry the coal. In this manner, the multiple heat exchangers 360, 530, 532, 534, 536, 540, 544, and 548 contained within the system enable greater regulation of use of the waste heat sources to dry the coal, and maximize the system's flexibility for various types of coal and process cycles. Bypass line 552 enables a portion of the thermal fluid contained within heat transfer loop 542 to bypass heat exchanger 540 to achieve greater control of the temperature of the heat transfer loop.

Hot PA air substream 380a is diverted from hot PA air stream 380 for transfer to mixing boxes 556 and 558. Cold PA airstream 382 that has been thermally modified inside heat exchanger 540 is combined with hot PA sub airstream 380a to regulate the temperature of the fluidizing airstreams provided to the first stage 350 and second stage 352 of dryer 302. Separate mixing boxes 556 and 558 permit fluidizing airstreams with different temperatures to be directed to the two dryer stages for more efficient drying of the coal.

Figure 35:
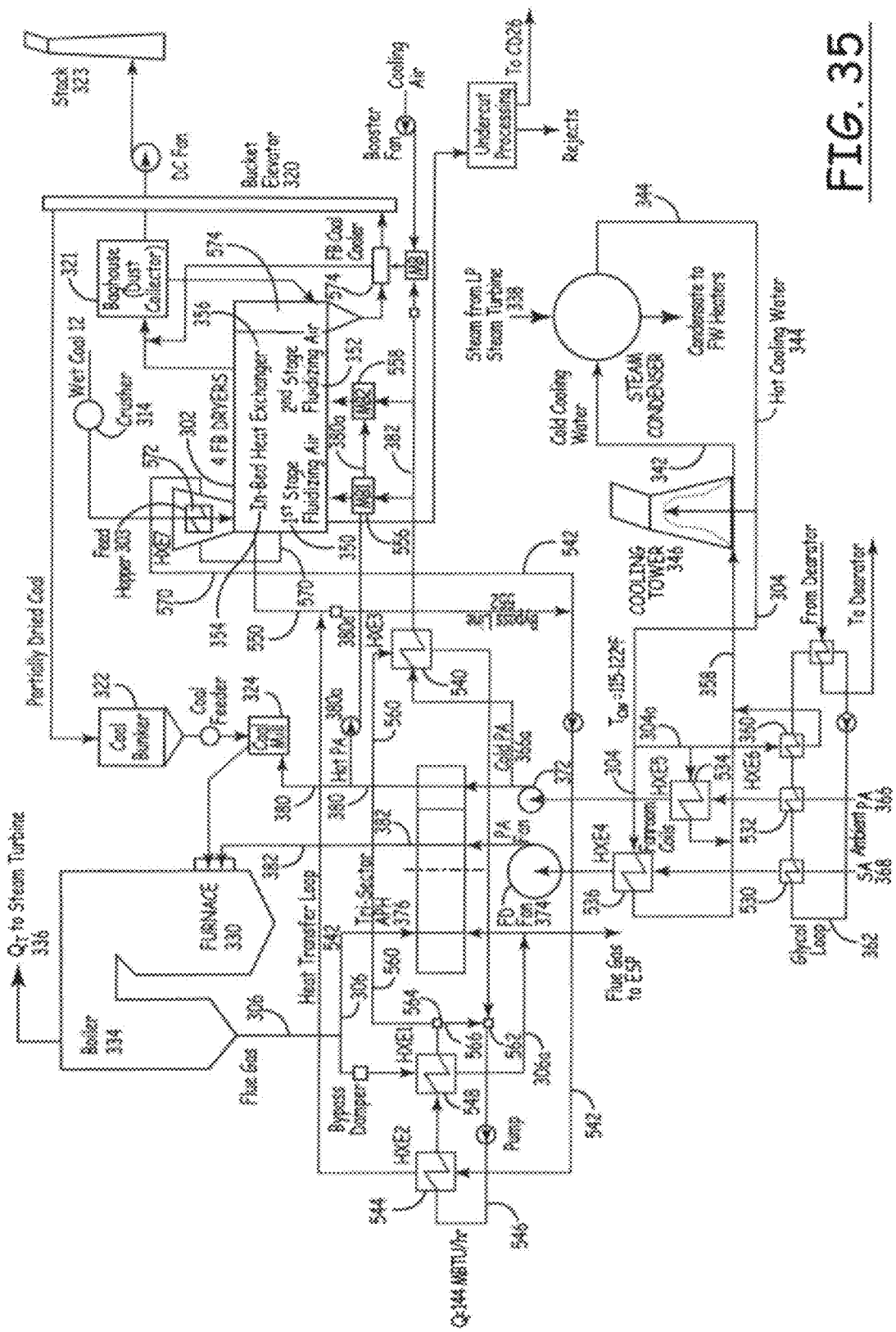
FIG. 35 is another variation upon the low-temperature drying process utilizing waste heat sources of FIG. 34 further comprising a coal preheater and a dried coal cooler.

FIG. 35 shows yet another possible embodiment of the low-temperature, open air process of the present invention. It is similar to the embodiment depicted in FIG. 34, with a couple of important exceptions. Like numbers have been used for the same components found in FIGS. 34 and 35.

Heat exchanger 540 used to increase the temperature of cold PA 366a is heated directly by hot flue gas 306 within the FIG. 35 embodiment. Heat transfer loop 546 has connected to it another heat transfer loop 560, which directly conveys that thermal heat content provided to heat exchanger 548 by flue gas 306. The heating fluid 560 that exits heat exchanger 540 is reunited with heat transfer loop 546 at valve 562. Piping 566 between valves 562 and 564 enables heat transfer loop 546 to be isolated from heat transfer loop 560. Direct transfer of the thermal content of flue gas 306 to heat exchanger 540 permits a greater temperature increase in cold PA 366a, compared with the FIG. 34 embodiment where heat exchanger 540 is heated indirectly by flue gas 306 via outer heat transfer loop 542.

Like the FIG. 34 embodiment, the thermal content contained within heat transfer loop 542 of the FIG. 35 embodiment is transported to inbed heat exchangers 354 and 356 of dryer 302 via stream 550. However, instead of immediately returning spent stream 550 from the inbed heat exchangers to heat transfer loop 542 at valve 543 (see FIG. 34), the spent thermal stream 550 is diverted in the FIG. 35 embodiment as stream 570 to heat exchanger 572 contained within feed hopper 303. In this manner, stream 570 is used to preheat the coal 12 before the coal passes into the first stage 350 of dryer 302 in which it is further preheated and partially dried. Stream 570 leaves heat exchanger 572, whereupon it is reunited with heat transfer loop 542. This preheater may be useful for processing coal in winter months, when ambient temperatures are colder. It may also be useful for operation of the low-temperature processing system of the present invention in countries like Australia where coal naturally contains higher moisture levels. The preheater can also provide significantly increased efficiencies to the thermal processing of other particulate materials like refuse-derived fuels, biomass, etc.

Another feature of the process embodiment set forth in FIG. 35 is coal cooler 574. It may constitute a stand-alone unit as shown in FIG. 35, or else a third stage of dryer 302 at its exit end. In this case of such a coal cooler integrated into the fluidized bed dryer, the dried coal exits the second stage 352 over a weir into coal cooler stage section 574.

Figure 36:
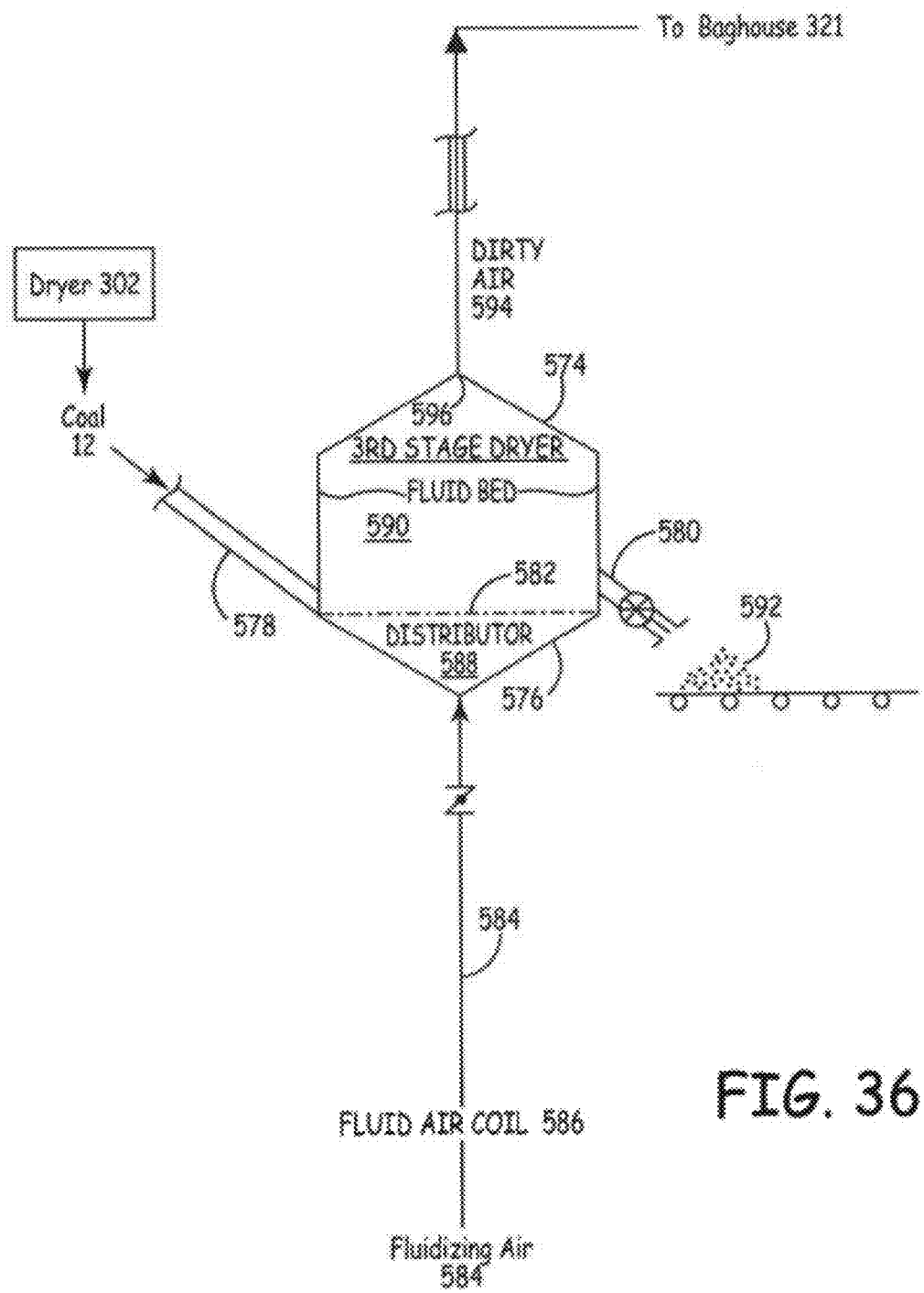
FIG. 36 is a schematic diagram of a coal cooler of the present invention.

As illustrated schematically in FIG. 36, stand-alone coal cooler 574 constitutes a vessel 576, having a coal inlet port 578 and a coal discharge port 580. Located within vessel 576 is distributor plate 582, which comprises a metal plate having a plurality of holes bored through it—much like the distributor plates employed within the first and second stages of the fluidized bed dryer 302. Fluidizing air 584 may be preheated by means of heating coil 586, whereupon it passes under pressure into the plenum region 588 of vessel 576 below distribution plate 582.

Coal 12 dried in the second stage 352 of dryer 302 at approximately 28% moisture and 139° F. is transported through inlet port 578 and collects inside vessel 576 to form fluidized bed 590. Airstream 584 at approximately 100° F. and a humidity ratio of approximately 0.0210 is forced through the holes in distributor plate 582 to fluidize the coal 590. In doing so, the fluidizing air reduces the temperature of the coal, and takes on a small portion of its moisture, thereby slightly drying it further. The coal is discharged from vessel 576 at outlet 580 to produce cooled coal 592 at approximately 27% moisture and 117° F. By cooling the coal, the chances of it spontaneously combusting in storage before it is fed to the furnace are significantly reduced. Unlike prior art systems, inert gases need not be introduced into contact with the dried coal to prevent its spontaneous combustion.

Fluidization of the coal in coal cooler 574 produces particulate fines 594, which are vented at outlet 596 and conveyed to baghouse 321, where they can be collected before the airstream is passed through stack 323 to the atmosphere. This dirty air 594 (pre-baghouse treatment) is characterized by approximately 69° F. and a 0.0557 humidity ratio.

Figure 37A:
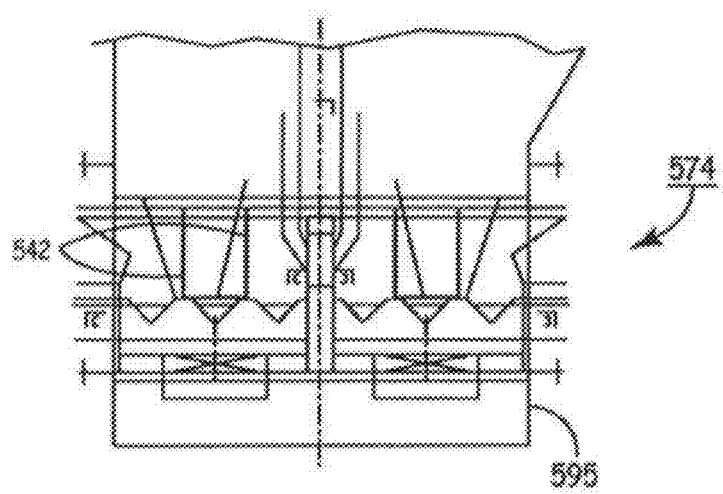
FIG. 37a is a view of a weir gate located within the fluidized bed dryer leading to an integrated coal cooler stage.
Figure 37C:
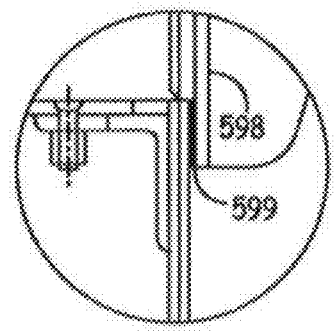
FIG. 37c is a partial view of the coal cooler discharge end wall and discharge gate.

Portions of a coal cooler 574 that is integrally attached to the discharge end of a fluidized bed dryer 302 as a third stage are depicted in FIG. 37. FIG. 37a shows the weir 595, which is adjustably suspended by means of chains 596 to divide cooler stage 574 from dryer second stage 352 and define the height of the fluidized coal bed inside the second stage as it passes over the top of the weir 595 into the cooler stage.

Figure 37B:
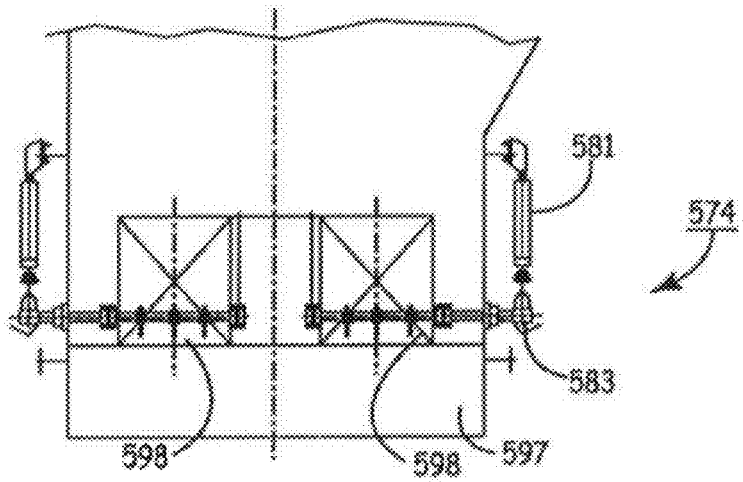
FIG. 37b is a view of the discharge gates of the coal cooler stage.

FIG. 37b depicts the discharge end 597 of cooler 574 with several outlet flip gates 598. These gates press against a gasket 599 surrounding the perimeter of the outlet port in the discharge end 597 of the dryer when closed to maintain the fluidization condition within the cooler. Pneumatic valves 581 are operatively connected to flip gates 598 to open them about shaft 583 to discharge the cooled coal contained within cooler 574. The flip gates may be opened in response to a manual input from an operator when the cooler is full of coal, or else in response to a timer signal. In this manner, the coal continuously dried in fluidized bed dryer 302 likewise may be cooled in cooler 574 on a continuous basis to produce the dried coal ready for transport to the furnace 330 or storage without spontaneously combusting.

Thus, the coal cooler 374 of the present invention may constitute an integrated or stand-alone fluidizing stage of the dryer, but without an inbed heat exchanger. The fluidizing air is used to cool the coal to a temperature condition preferably below 120° F. and slightly dry it further. If a higher degree of temperature reduction is required than what can be supplied by the fluidizing air, alone, then an inbed heat exchanger could be positioned inside coal cooler 374. However, a coolant fluid like cold water or glycol would be passed through the inbed heat exchanger to enable it to produce a temperature condition below the coal temperature to cool it.

Figure 38:
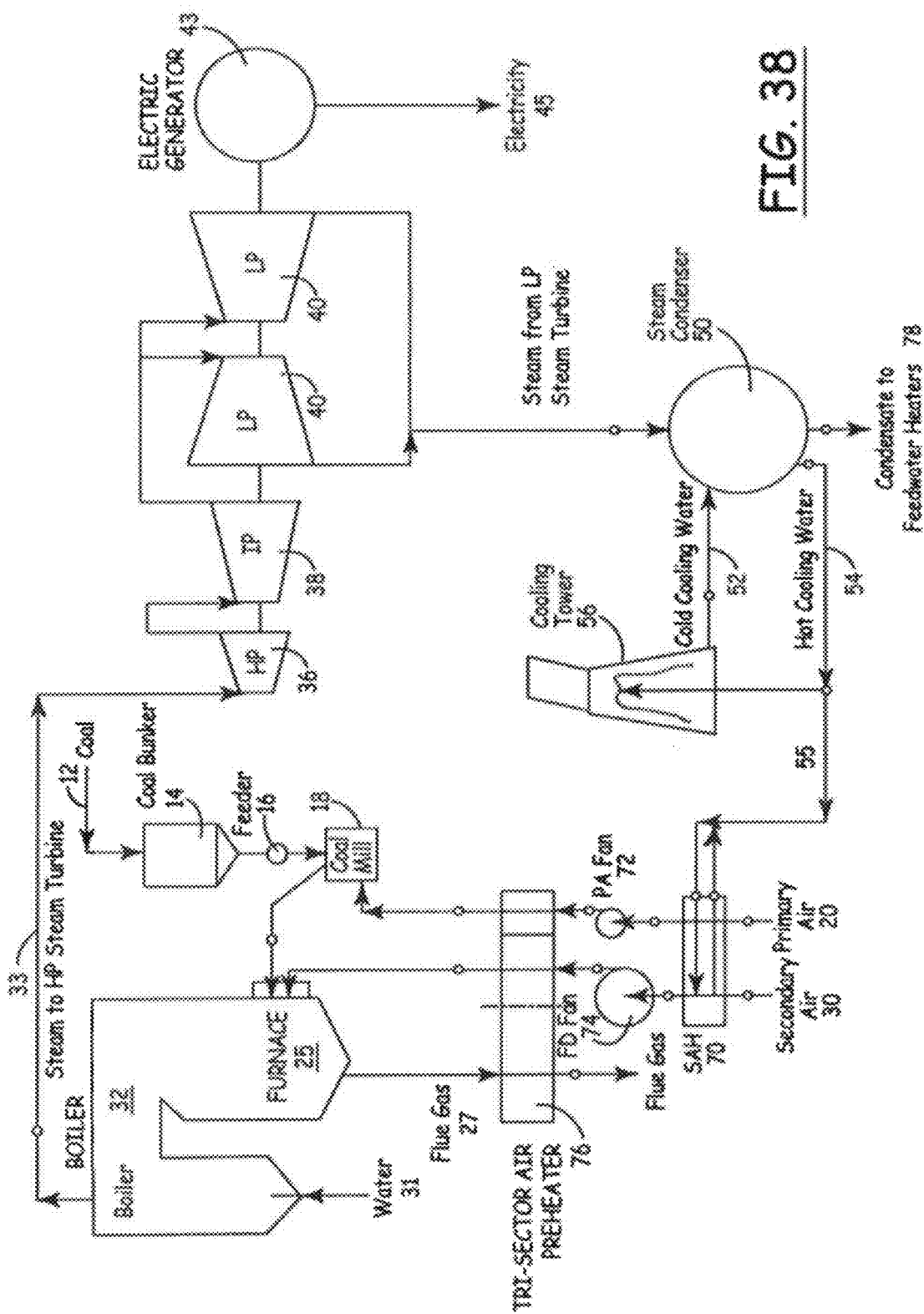
FIG. 38 illustrates a closed-cooling circuit with a tri-sector air pre-heater.

Returning to the electric power plant environment associated with the coal drying process and dryer discussed above, use of the hot flue gas 27 and hot steam 71 extracted from the steam turbines has previously been discussed in FIG. 2 for improving the efficiency of the electric power plant 65. However, other alternative arrangements are also possible. In FIG. 38, for example, another embodiment of a closed-cooling circuit with a tri-sector rotating regenerative air pre-heater 76 is shown. In this case, instead of diverting spent steam 71 from the steam turbines to act as a heat source for the heat exchanger 70 for preheating primary air stream 20 and secondary air stream 30 before they reach the air heater 76 (see FIG. 2), a portion of the hot condenser cooling water 55 in FIG. 38 is routed to the heat coil in heat exchanger 70 for this purpose.

Figure 39:
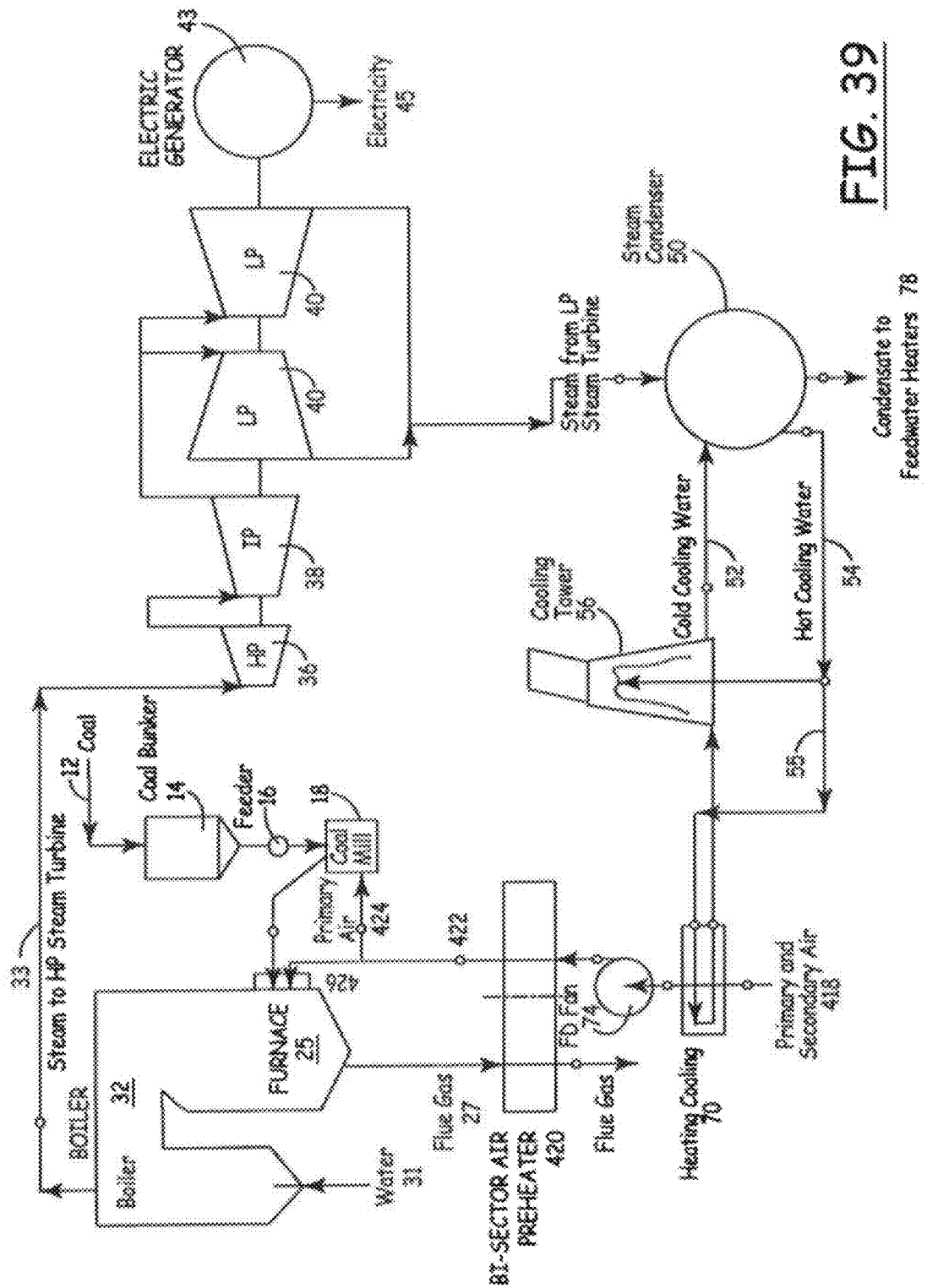
FIG. 39 illustrates a closed-cooling circuit with a bisector air pre-heater.

Meanwhile, FIG. 39 shows an alternative embodiment of the FIG. 38 arrangement in which hot condenser cooling water 54 is used to heat the heat exchanger 70. In this case, however, a bi-sector rotating regenerative air pre-heater 420 is used to further heat the primary and secondary air streams after they exit preliminary heat exchanger 70. A single air stream 418 is routed through the one side of bi-sector air pre-heater 420, and the hot flue gas 27 is directed through the other side to provide the heating medium. The further heated air stream 422 splits downstream of the air pre-heater 420 into separate primary air stream 424 and secondary air stream 426. Primary air stream 424 is sent to coal mill 18 to provide positive pressure for the pulverized coal transported to furnace 25, pre-heating the pulverized coal in the process. Secondary air 426 is routed to the wind box 428 off furnace 25 whereafter it enters the furnace 25 to promote combustion of the coal inside the furnace.

Figure 40:
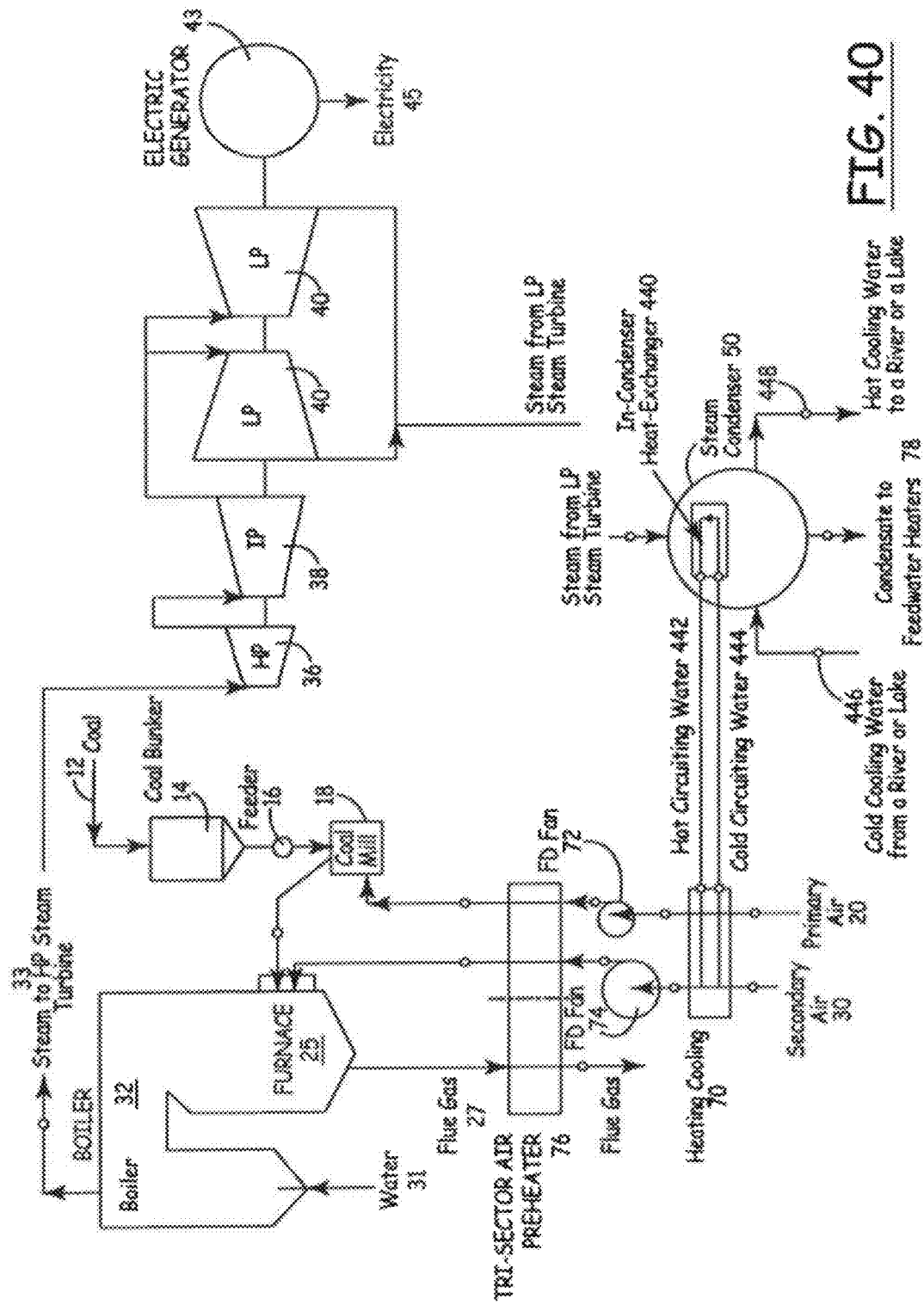
FIG. 40 illustrates an open-cooling circuit with a tri-sector rotating regenerative air pre-heater.

An open-cooling circuit with a tri-sector rotating regenerative air pre-heater 76 is illustrated in FIG. 40. The coal-fired power plant arrangement is similar to the one depicted in FIG. 38 in which hot condenser cooling water is used to heat preliminary heat exchanger 70. However, in this case condenser 50 is cooled by an open-cooling circuit, instead of cooling tower 56. Moreover, an in-condenser heat exchanger 440 is used to utilize waste heat for the inlet preheating. The separate heat exchanger 440 is placed within the shell of steam condenser 50 above the condenser tubes located therein (not shown). This design provides hot circulating water 442 that is somewhat higher in temperature than the hot condenser cooling water 54 that normally leaves stream condenser 50, and is of much higher water purity.

The hot circulating water 442 leaving in-condenser heat exchanger 440 is pumped to the air-to-water preliminary heat exchanger 70 to preheat primary air stream 20 and secondary air stream 30 before they reach tri-sector air pre-heater 76. After giving up its sensible heat within the heating coil of heat exchanger 70, the cooler cold circulating water 444 flows back to in-condenser heat exchanger 440, where it is reheated by the incoming spent turbine stream.

In an open system, cold cooling water from a lake or river 446 is used to condense the spent turbine steam in a steam condenser 50. Heat transferred from the steam to the cold cooling water 446 exits steam condenser 50 as hot cooling water 448 and is typically discharged into the same lake or river.

Figure 41:
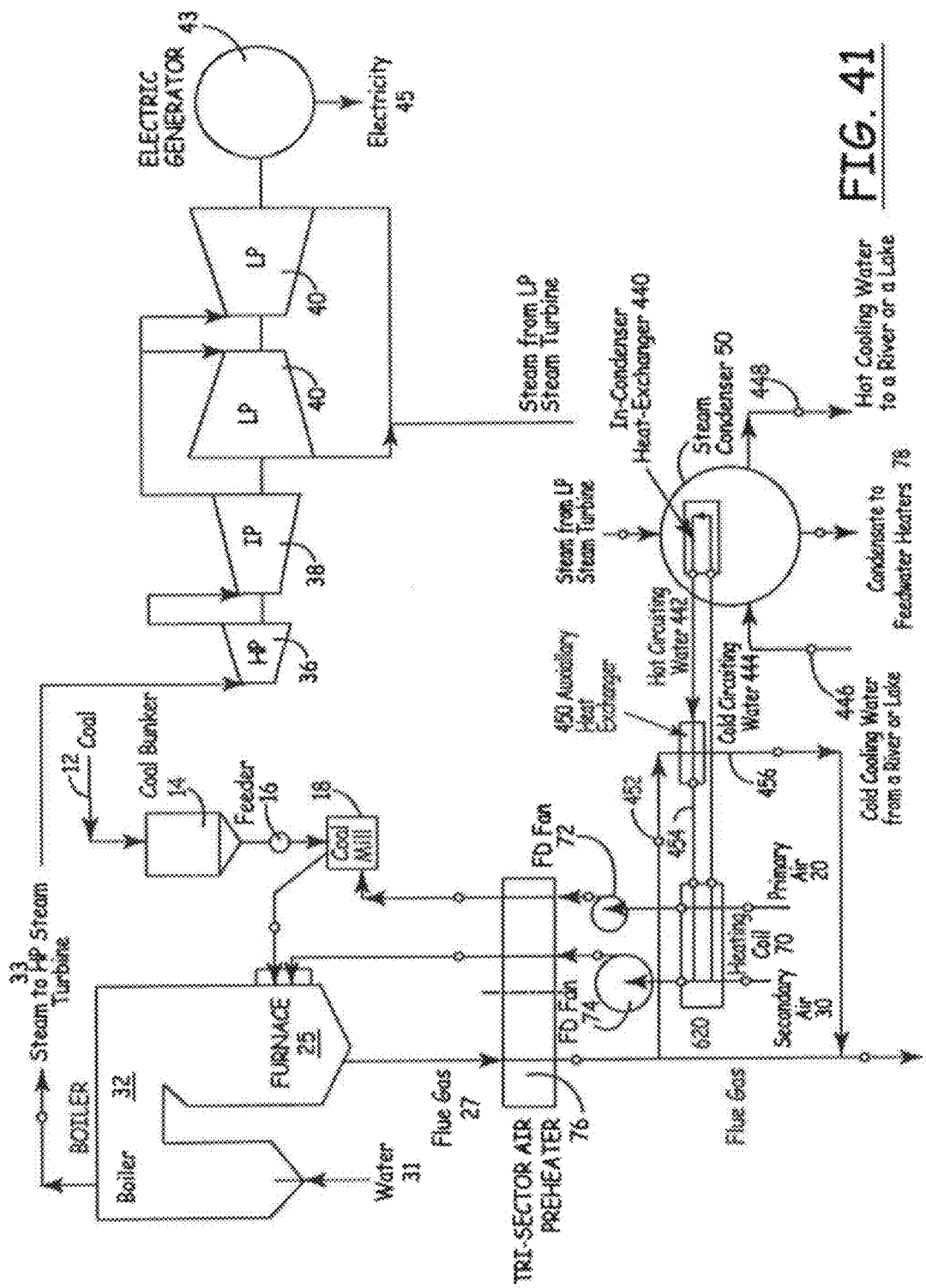
FIG. 41 illustrates a second embodiment of an open-cooling circuit with a tri-sector rotating regenerative air pre-heater.

In case an inlet air preheat temperature is needed that is higher than the one that could be achieved by the in-condenser heat exchanger 440, an auxiliary heat exchanger 450 could be added to increase the air preheat temperature, as illustrated in FIG. 41. A portion 452 of flue gas 27 leaving the tri-sector air pre-heater 76 is diverted to the auxiliary heat exchanger 450 to increase the temperature of the hot circulating water 442 leaving the in-condenser heat exchanger 440. This hotter circulating water 454 then provides sensible heat to the heating coil of preliminary air heat exchanger 70. The cooled flue gas stream 456 leaving the auxiliary heat exchanger 450 combines with the main flue gas stream 27 that has left air heater 76.

Of course, the bi-sector air pre-heater depicted in FIG. 39 could be substituted for the tri-sector air pre-heater 76 shown in FIGS. 40-41. Many other air pre-heater arrangements are possible, and could, by way of example, include a tubular air pre-heater where the combined primary and secondary air streams 20, 30 flow through the same air pre-heater of a tubular design, and a combination of tubular and rotating air pre-heaters where the primary air stream 20 is heated in a tubular air pre-heater, while the secondary air stream 30 is heated in a bi-sector-rotating air pre-heater. Also, a plate heat exchanger design available in the industry could be used instead of a tubular air pre-heater design. Implementation of the inlet air preheat coil would be similar to that described above.

Figure 42:
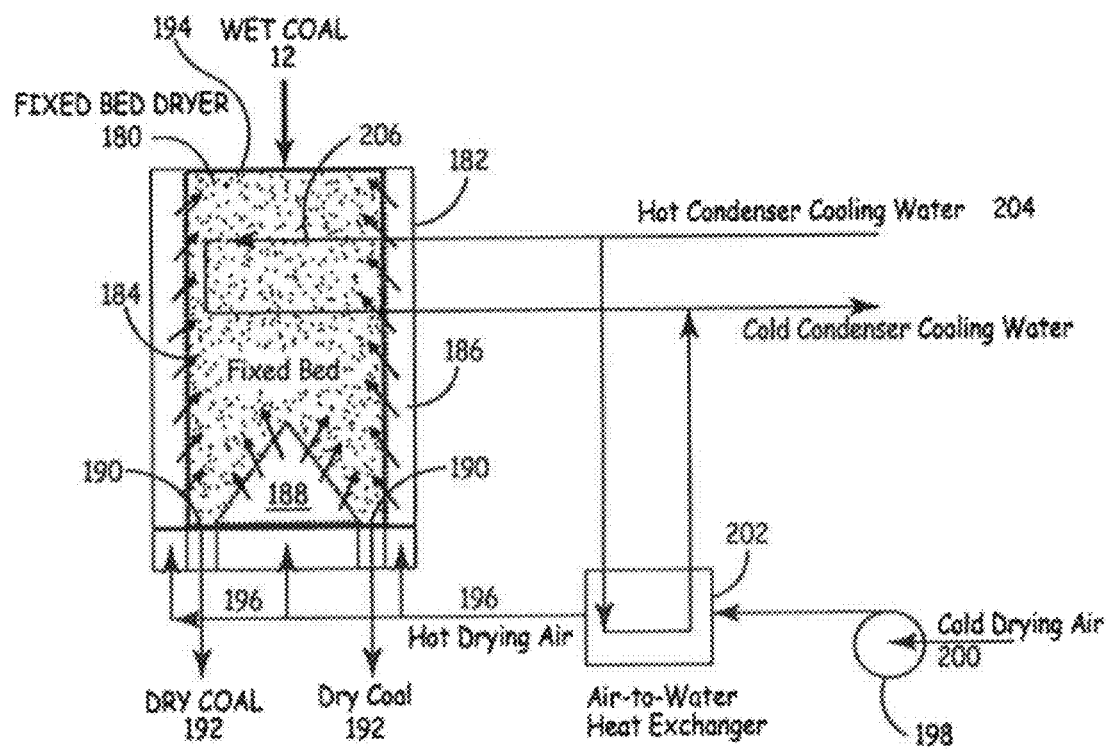
FIG. 42 is a schematic diagram of one embodiment of a fixed bed dryer.

Another type of coal bed dryer for purposes of this invention is a single-vessel, single-stage, fixed-bed dryer with a direct or indirect heat source. One embodiment of such a dryer with a direct heat source is illustrated in FIG. 42, although many other arrangements are possible. A fixed-bed dryer is a good choice for drying coal that will be sold to other power plants or other industrial plants. This is because of the low drying rates and the fact that much longer residence times are needed for fixed-bed dryers, compared with fluidized-bed dryers, to dry a required quantity of coal to a desired degree of moisture reduction. Furthermore, there usually are practical limitations on the use of a fluidized bed dryer in a non-plant situation, such as in the mining field. Under these circumstances, premium waste heat sources, such as the hot condenser cooling water or compressor heat, may not be available for the drying operation. Also, it may be more difficult to cheaply provide the necessary quantity of fluidizing air required for a fluidized bed.

With the arrangement shown in FIG. 42, the fixed-bed dryer 180 has two concentric walls, wherein, a generally cylindrical outer wall 182 and a generally cylindrical inner wall 184 that define a spatial ring 186 between the outer wall 182 and inner wall 184 for air flow. A conical structure 188 having a base diameter smaller than the diameter of the inner wall 184, is positioned at the bottom of the fixed-bed dryer 180, axially aligned with the inner wall 184, to create a ring-shaped floor discharge port 190 for discharge of the dried coal 192.

Coal (typically, but not exclusively, wet sized coal 12) enters the fixed bed 180 at the open top 194. The wet sized coal 12 is drawn by gravity to the bottom of the bed dryer 180. A fluidizing air stream 196 is generated by a fan 198 drawing cold drying air 200 through an air-to-water heat exchanger 202. The fluidizing air 200 is heated by means of waste heat, shown in FIG. 42 as hot condenser cooling water 204 drawn from a steam condenser (not shown). As with all of the embodiments described in this application, other waste heat sources are possible for practice of the invention.

The fluidizing air 200 enters the bottom of the fixed bed 180 through both the conical structure 188 and the spatial ring 186 formed between inner wall 184 and outer wall 182. Both the conical structure 188 and the inner wall 184 are perforated or otherwise suitably equipped to allow fluidizing air 196 to flow through the wet sized coal 12 contained within the inner wall 184 of the fixed bed dryer 180, as shown in FIG. 42. The fluidizing air 196 escapes into the atmosphere through the open top 194 of the fixed bed dryer 180.

The fixed bed dryer 180 includes in-bed heat coils 206. Heat for the in-bed heat transfer coils 206 is provided by waste heat, in this case, hot condenser cooling water 204. Waste heat from other sources or steam extracted from the steam turbine cycle, or any combination thereof, could also be used solely or in combination with the condenser waste heat 204. As wet sized coal 12 is heated and aerated in fixed bed dryer 180, dried coal 192 is drawn by gravity or other commercially available mechanical means to the bottom of the dryer where it is discharged through the discharge ring 190 formed at the bottom of the fixed bed dryer 180.

Many advantages are obtained using the present system. The process allows waste heat to be derived from many sources including hot condenser circulating water, hot flue gas, process extraction steam, and any other heat source that may be available in the wide range of acceptable temperatures for use in the drying process. The process is able to make better use of the hot condenser circulating water waste heat by heating the fan room (APH) by 50 to 100° F. at little cost, thereby reducing sensible heat loss and extracting the heat from the outlet primary and secondary air streams 20, 30 exiting the air pre-heater. This heat could also be extracted directly from the flue gas by use of the air preheat exchanger. This results in a significant reduction in the dryer air flow to coal flow ratio and size of the dryer required.

The dryer can be designed to make use of existing fans to supply the air required for the fluidized bed by adjusting bed differentials and dust collector fan capabilities. The beds may utilize dust collectors of various arrangements, some as described herein. The disclosed embodiments obtain primary air savings because one effect of drier coal is that less coal is required to heat the boiler, and thus fewer mills are required to grind coal and less air flow is required to the mills to supply air to the dryer.

By integrating the dryer into the coal handling system just upstream of the bunkers, the boiler system will benefit from the increase in coal feed temperature into the mills, since the coal exits the dryer at an elevated temperature. The changes to flue gas temperature, residence time in the bed dryer, flue gas water content, and higher scrubbing rates are expected to significantly affect mercury emissions from the plant.

An advantage of pre-heating the inlet air to the APH is to increase the temperature of the heat transfer surfaces in the cold, end of the APH. Higher surface temperatures will result in lower acid deposition rates and, consequently, lower plugging and corrosion rates. This will have a positive effect on fan power, unit capacity, and unit performance. Using waste heat from the condenser to preheat inlet air to the APH instead of the steam extracted from the steam turbine will result in an increase in the turbine and unit power output and improvement in cycle and unit performance. Increasing the temperature of air at the APH inlet will result in a reduction in APH air leakage rate. This is because of the decrease in air density. A decrease in APH air leakage rate will have a positive effect on the forced draft and induced draft fan power, which will result in a reduction in station service usage, increase in net unit power output, and an improvement in unit performance. For power plants with cooling towers, the use of waste heat to preheat inlet air to the APH will reduce cooling tower thermal duty and result in a decrease in cooling tower water usage.

Coal drying using the disclosed process will lower water losses in the boiler system, resulting in higher boiler efficiency. Lower sensible gas losses in the boiler system results in higher boiler efficiency. Moreover, reduced flue gas volumes will enable lower emissions of carbon dioxide, oxides of sulfur, mercury, particulate, and oxides of nitrogen on a per megawatt (MW) basis. There is also lower coal conduit erosion (e.g., erosion in conduit pipe caused by coal, particulates, and air), lower pulverization maintenance, lower auxiliary power required to operate equipment resulting in higher unit capacity, lower ash and scrubber sludge volumes, lower water usage by the plant (water previously tapped from the steam turbine cycle is unaffected), lower air pre-heater cold end fouling and corrosion, lower flue gas duct erosion, and an increase in the percentage of flue gas scrubbed. The bed dryers can also be equipped with scrubbers—devices that remove contaminates, providing pre-burning treatment of the coal. There is an infinite array of temperature levels and design configurations that may be utilized with the present invention to treat other feedstock and fuel as well.

The combination of the APH—hot condenser cooling water arrangement permits a smaller, more efficient bed for drying coal. Present systems that utilize process heat from the steam turbine cycle require a much larger bed. There is material separation in the current invention. This allows for reduced emissions of contaminants like $SO_2$ and mercury. The present arrangement can be used with either a static (fluidized) bed drier or a fixed bed drier. In a two-stage dryer, the relative velocity differential between the first and second stages can be adjusted. There can be various temperature gradients, and flexibility in heat ranges in the various stages to maximize desired results. In a multiple-stage fluidized bed arrangement, there is separation of non-fluidized material. In the first stage, which in one embodiment represents 20% of the dryer distribution surface area more of the air flow, mercury, and sulfur concentrations are pulled out. Because the two-stage bed dryer can be a smaller system, there is less fan power required, which saves tremendously on electricity expenses. A significant economic factor in drying coal is required fan horsepower.

From a system standpoint, there is less wear and tear and maintenance of coal handling conveyors and crushers, a decrease in the amount of ash, and reduced erosion. It is easier to pulverize coal, so there is more complete drying in the mill, less mill power, less primary air required, and lower primary air velocities. Station service power (i.e., auxiliary power) needs will decrease, plant capacity can be increased, and scrubbers and emissions will improve.

The flow rate of flue gas 306 leaving the furnace 330 firing dried, pulverized coal 326 is lower compared to wet pulverized coal. Also, the specific heat of the flue gas 306 is lower due to the lower moisture content in the dried, pulverized coal 326. The result is reduced thermal energy of the flue gas 306 and the need for smaller environmental treatment equipment. Lower flow rates of the flue gas 306 also result in lower rates of convective heat transfer. Therefore, despite the increase in FEGT with drier fuel, less heat will be transferred to the working fluid (water or steam, not shown) in the boiler 334. For boilers with fixed heat transfer geometry, the temperature of the hot reheat steam (recycled circulating process steam) may be lower compared to operation with a wetter fuel. Some decrease in the hot reheat steam temperature could be corrected by increasing the surface area of a re-heater (not shown) or changing boiler operating conditions, such as raising burner tilts (the angle at which heat is applied to the boiler) or operating with a higher level of excess air. A new boiler could be designed for reduced flow rate of flue gas 306 through the convection pass (the exit path of the flue gas through the furnace) to achieve desired steam temperature with normal operating conditions. This should further reduce size and construction costs.

By burning drier coal, station service power will decrease due to a decrease in forced draft (FD), induced draft (ID) and primary air (PA) fan powers and a decrease in mill power. The combination of lower coal flow rate, lower air flow requirements and lower flue gas flow rate caused by firing drier coal will result in an improvement in boiler system efficiency and unit heat rate, primarily due to the lower stack loss and lower mill and fan power. This performance improvement will allow plant capacity to be increased with existing equipment. Performance of the back-end environmental control systems typically used in coal burning energy plants (scrubbers, electrostatic precipitators, and mercury capture devices) will improve with drier coal due to the lower flue gas flow rate and increased residence time.

Burning drier coal also has a positive effect on reducing undesirable emissions. The reduction in required coal flow rate will directly translate into reductions in mass emissions of $NO_x$, $CO_2$, $SO_2$, and particulates. Primary air also affects $NO_x$. With drier coal, the flow rate of primary air will be lower compared to the wet coal. This will result in a reduced $NO_x$ emission rate.

For power plant units equipped with wet scrubbers, mercury emissions resulting from firing drier coal may be reduced due to reduced air pre-heater gas outlet temperature, which favors the formation of HgO and $HgCl_2$ at the expense of elemental mercury. These oxidized forms of mercury are water-soluble and can, therefore, be removed by a scrubber. In addition, flue gas moisture inhibits mercury oxidation to water-soluble forms. Reducing fuel moisture would result in lower flue gas moisture content, which will promote mercury oxidation to water-soluble forms. Therefore, with drier coal, mercury emissions are lower compared to usage of wetter coals.

Advantages of lower moisture content in the coal as it travels through this limited portion of the system include: drier coal is easier to pulverize, and less mill power is needed to achieve the same grind size (coal fineness); increased mill exit temperature (the temperature of the coal and primary air mixture at mill exit); and better conveying (less plugging) of coal in coal pipes which convey the coal to the furnace 25. Additionally, less primary air stream 20 will be needed for coal drying and conveying. Lower primary air velocities have a significant positive impact on erosion in coal mill 324, coal pipes, burners and associated equipment, which reduces coal pipe and mill maintenance costs, which are, for lignite-fired plants, very high.

With drier coal, the flame temperature in the furnace 330 is higher due to lower moisture evaporation loss and the heat transfer processes is improved. The higher flame temperature results in larger radiation heat flux to the walls of furnace 330. Since the moisture content of the exiting flue gas 306 is reduced, radiation properties of the flame are changed, which also affects radiation flux to the walls of furnace 330. With higher flame temperature, the temperature of coal ash particles exiting the furnace 330, is higher, which could increase furnace fouling and slagging. Deposition of slag on furnace walls reduces heat transfer and results in a higher flue gas temperature at the furnace exit. Due to a reduction in coal flow rate as fuel moisture is reduced, the amount of ash entering the boiler will also be reduced. This reduces solid particle erosion in the boiler 32 and maintenance requirements for the boiler 32 (e.g., removal of the soot that collects on the interior surface of the boiler).

The flow rate of flue gas 306 leaving the furnace 330 firing dried, pulverized coal 326 is lower compared to wet pulverized coal. Lower flue gas rates generally permit decreased size of environmental control equipment and fans. Also, the specific heat of the flue gas 306 is lower due to the lower moisture content in the dried, pulverized coal 326. The result is reduced thermal energy of the flue gas 306. Lower flow rates of the flue gas 306 also results in lower rates of convective heat transfer. Therefore, despite the increase in FEGT with drier fuel, less heat will be transferred to the working fluid (water or steam) in the boiler system convective pass.

For economic reasons, complete drying of the coal is not needed, nor is it recommended, as removing a fraction of the total fuel moisture is sufficient. The optimal fraction of removed moisture depends on the site-specific conditions, such as coal type and its characteristics, boiler design, and commercial arrangements (for example, sale of dried fuel to other power stations). Waste process heat is preferably, but not exclusively used for heat and/or fluidization (drying, fluidization air 208) for use in an in-bed heat exchanger. As has been shown, this heat can be supplied directly or indirectly in one or more stages.

It has been found surprisingly that the concentration of sulfur and mercury contaminants contained within the segregation stream streams 260, 268, and 270 are significantly greater than that of wet coal feed stream 12. Likewise, the elutriated fines stream 166 exiting the top of the fluidized-bed dryer is enhanced in the presence of contaminants like fly ash, sulfur, and mercury. By using the particle segregation method of the present invention, the mercury concentration of the coal product stream 168 can be reduced by approximately 27%, compared with the mercury concentration of the wet coal feed stream 12. Moreover, the sulfur concentration of the coal product stream 168 can be reduced by approximately 46%, and the ash concentration can be reduced by 59%. Stated differently, using the present invention, approximately 27-54% of the mercury appearing in the wet coal feed can be concentrated in the segregation stream and elutriated fines output streams, and therefore removed from the coal product stream that will go to the boiler furnace. For sulfur and ash, the corresponding values are 25-51% and 23-43%, respectively. By concentrating the contaminants within the segregation stream in this manner, and significantly reducing the presence of the contaminants in the coal product stream 168 going to the boiler furnace for combustion, there will be less mercury, $SO_2$ and ash contained within the resulting flue gas, and therefore less burden on the scrubber technology conventionally used within industrial plant operations to treat the flue gas stream before it is vented to the atmosphere. This can result in significant operational and capital equipment cost savings for a typical industrial plant operation.

The fluidized bed designs for this invention are intended to be custom designed to maximize use of waste heat streams available from a variety of power plant processes without exposing the coal to temperatures greater than 300° F., preferably between 200-300° F. Other feedstock or fuel temperature gradients and fluid flows will vary, depending upon the intended goal to be achieved, properties of the fuel or feedstock and other factors relevant to the desired result. Above 300° F., typically closer to 400° F., oxidation occurs and volatiles are driven out of the coal, thereby producing another stream containing undesirable constituents that need to be managed, and other potential problems for the plant operations.

The fluidized-bed dryers are able to handle higher-temperature waste heat sources by tempering the air input to the dryer to less than 300° F. and inputting this heat into heat exchanger coils within the bed. The multi-stage design of a fluidized-bed dryer creates temperature zones which can be used to achieve more efficient heat transfer by counter flowing of the heating medium. The coal outlet temperature from a dryer bed of the present invention is relatively low (typically less than 140° F.) and produces a product which is relatively easy to store and handle. If a particular particulate material requires a lower or higher product temperature, the dryers can be designed to provide the reduced or increased temperature.

Figure 19:
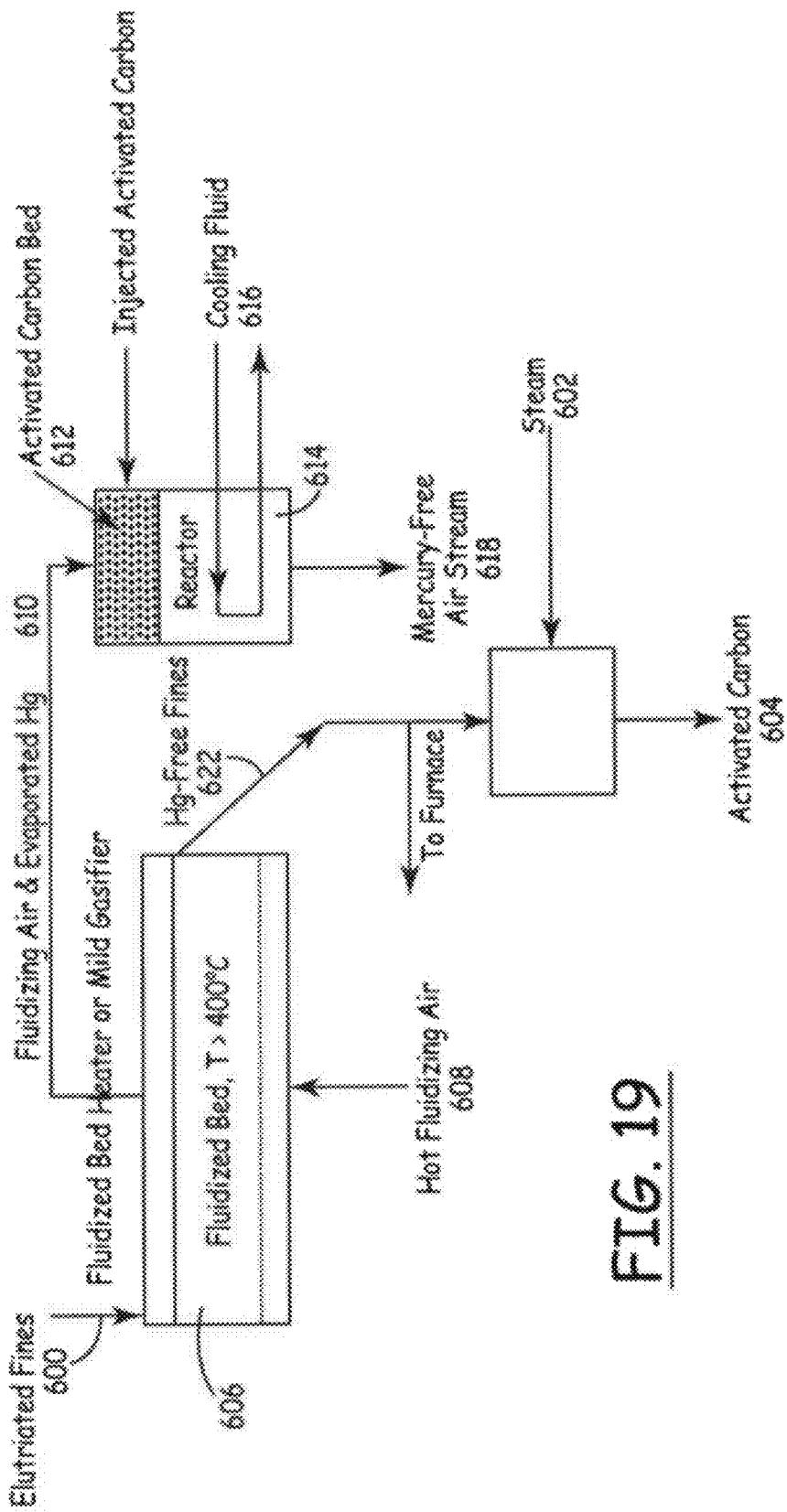
FIG. 19 is a schematic diagram of a fluidized bed dryer in combination with means for separating contaminates from coal fines.

Elutriated particles 600 collected by particle-control equipment are typically very small in size and rich in fly ash, sulfur, and mercury. FIG. 19 is a schematic drawing indicating a process for removing mercury through the use of activated steam 602 to produce activated carbon 604. As shown in FIG. 19, elutriated particle stream 600 is heated in a fluidized-bed heater or mild gasifier 606 to a temperature of 400° F. or higher to evaporate the mercury. Fluidizing air 608, forced through the fluidized bed 608, drives out the mercury into overhead stream 610. Evaporated mercury in overhead stream 610 can be removed by existing commercially available mercury control techniques, for example, by activated carbon injected into the air stream, or the mercury-laden air stream 610 may be passed though a bed of activated carbon 612 as illustrated in FIG. 19. Since mercury concentration in the treatment stream 610 will be much higher compared to the flue gas 306 leaving the furnace 330, and the total volume of the air stream that needs to be treated is very small compared to the flue gas leaving the furnace, this will be a very efficient mercury removal process. A heat exchanger 614 through which cooling fluid 616 is circulated, may be used to cool hot mercury-free stream 618. Heat can be harvested in the cooling process and used to preheat fluidization air 620 to the fluidized bed heater or mild gasifier 606. The mercury-free fines 622 can be burned in the furnace 330 or, as illustrated in FIG. 19, can be activated by steam 602 to produce activated carbon 604. The produced activated carbon 604 can be used for mercury control at the coal-drying site or can be sold to other coal-burning power stations.

Figure 20:
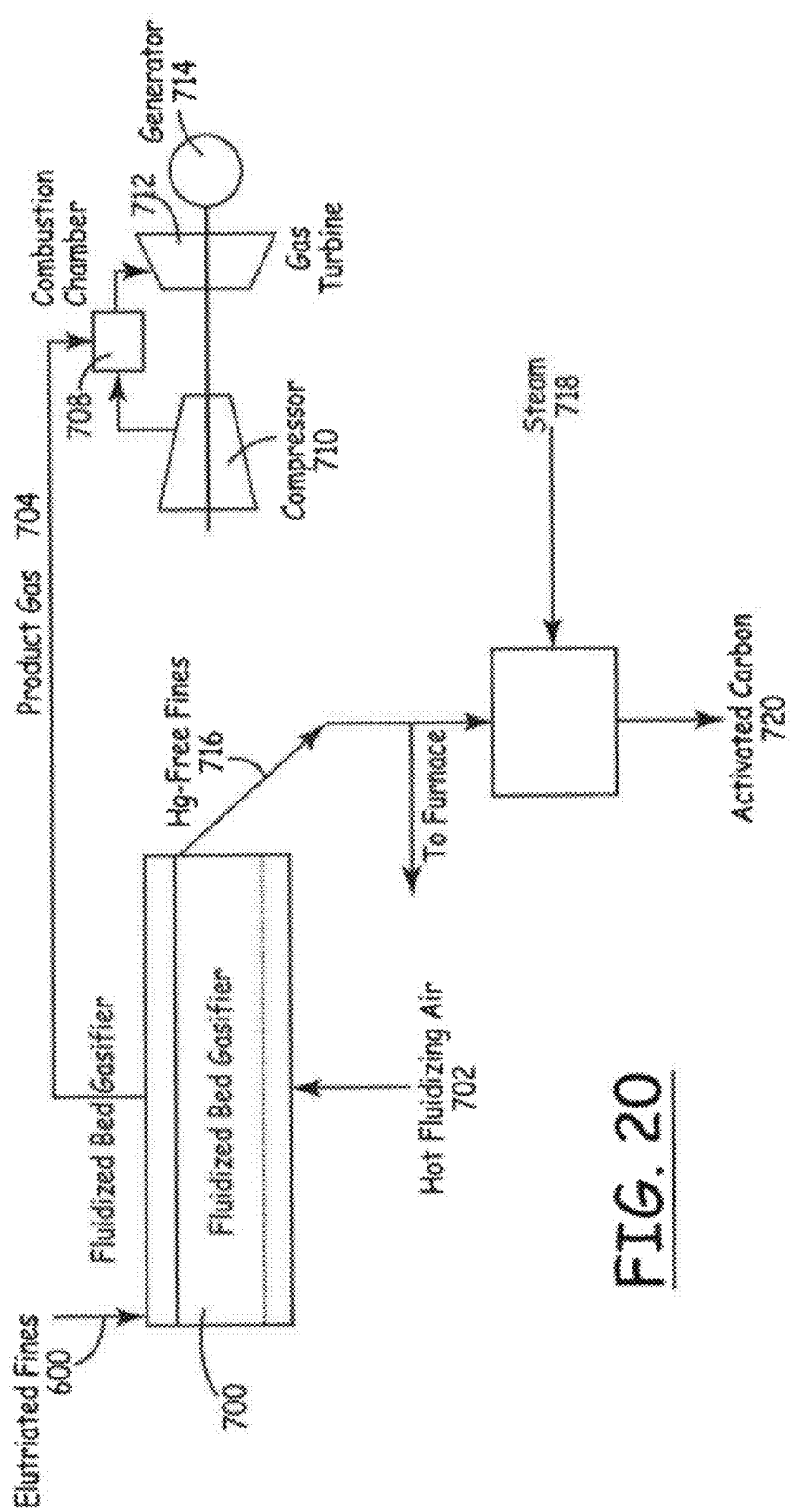
FIG. 20 is a schematic diagram of a fluidized bed dryer in combination with means for separating contaminates from coal fines and burning the contaminates to generate power.

FIG. 20 illustrates a process for gasifying elutriated fines 600. Elutriated particle stream 600 is gasified in fluid bed gasifier 700 in combination with fluidizing air 702. A gasifier is typically utilized at a higher temperature, such as 400° F., where combustible gases and volatiles are driven off. The product gas stream 704 is combusted in a combustion turbine 706 consisting of a combustion chamber 708, compressor 710, gas turbine 712 and generator 714. The remaining char 716 in the fluidized-bed gasifier will be mercury-free, and can be burned in the existing furnace 330 or treated by steam 718 to produce activated carbon 720.

The segregation streams can also be rich in sulfur and mercury. These streams can be removed from the process and land-filled or further processed in a manner similar to the elutriated fines stream, to remove undesirable impurities.

Figure 21A:
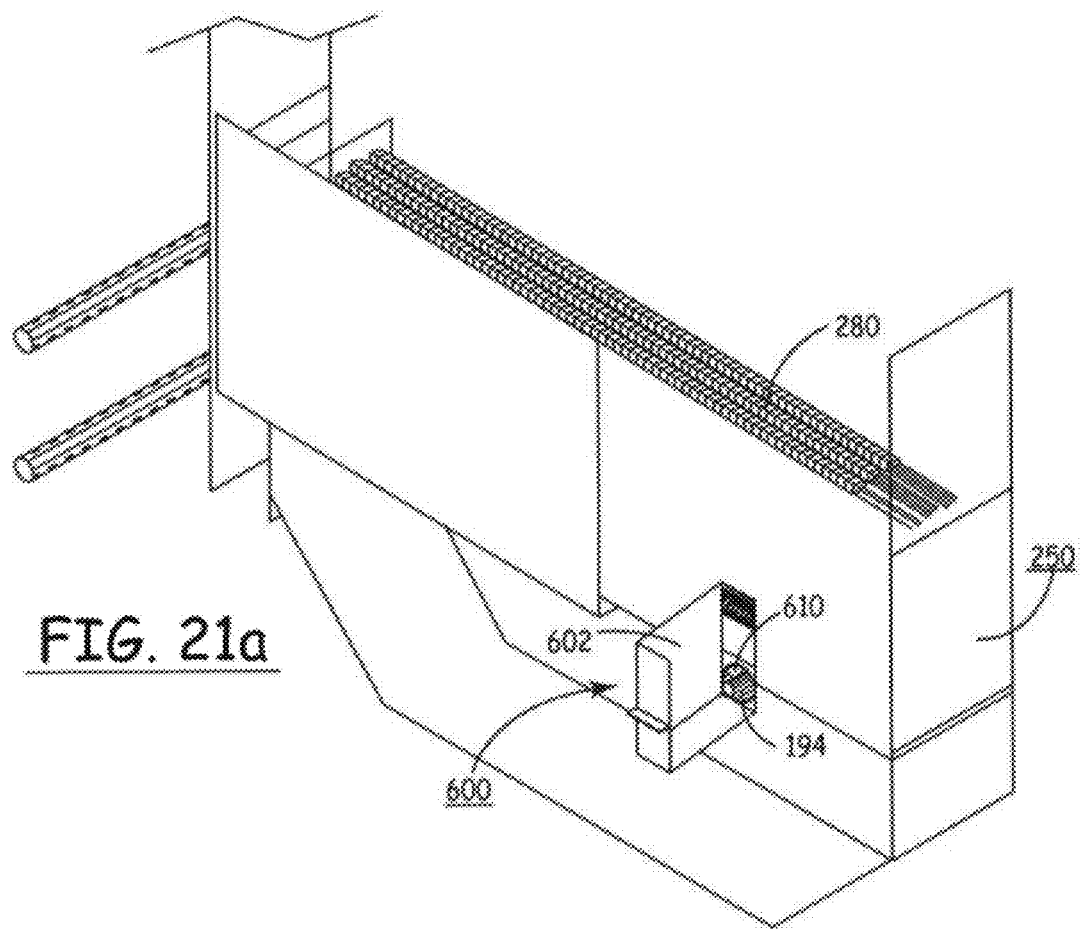
FIGS. 21a and 21b are perspective cut-away views of the scrubber assembly used to remove segregation stream particulate from the fluidized-bed dryer.
Figure 21B:
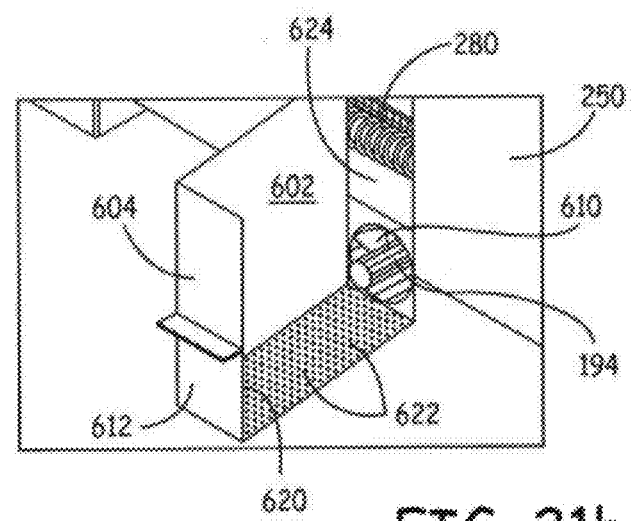

In a preferred embodiment of the present invention, the segregation coal particle stream 170 or 260 is conveyed directly to a scrubber assembly 600 for further concentration of the contaminants by removal of fine coal particles trapped therein. An embodiment of the scrubber assembly 600 of the present invention is shown in a cut-away view in FIGS. 21*a* and 21*b*. The scrubber assembly 600 is a box-like enclosure having side walls 602, an end wall 604, bottom 606, and top 608 (not shown), and is attached to the dryer 250 sidewall to encompass an segregation stream discharge port 610 through which the screw auger 194 partially extends. It should be noted that any other appropriate device that is capable of conveying the segregation stream coal particles in a horizontal manner could be substituted for the screw auger, including a belt, ram, or drag chain.

The screw auger 194 will move the segregation stream particles lying near the bottom of the fluidized bed across the bed, through segregation stream discharge part 610, and into scrubber assembly 600 where they can accumulate separate and apart from the fluidized dryer. Distributor plate 620 is contained within the scrubber assembly 600. A substream of hot fluidizing air 206 passes upwardly through holes 622 in distributor plate 620 to fluidize the segregation particle stream contained within the scrubber assembly. Of course, the segregation stream particles will reside near the bottom of the fluidized bed due to their greater specific gravity, but any elutriated fines trapped amongst these segregation stream particles will rise to the top of the fluidized bed, and be sucked back into the fluidized dryer bed 250 through inlet hole 624 (the heat exchanger coils 280 are shown through this hole in FIG. 22). In this manner, the segregation particles stream is further processed within the scrubber assembly of FIG. 21 to clean out the elutriated fines, thereby leaving an segregation coal particle stream that has a greater concentration of contaminants, and allowing the fines which are lower in contaminants to be returned to the fluidized bed for further processing.

When the segregation stream particles contained within the scrubber assembly have accumulated to a sufficient degree, or are otherwise needed for another purpose, gate 612 in end wall 604 may be opened to allow the accumulated segregation stream particles to be discharged through an outlet hole in the end wall wherein these segregation stream particles are pushed by the positive pressure of the imposed by screw auger 294 on the segregation stream particles through them, or by other suitable mechanical conveyance means. Gate 612 could also be operated by a timer circuit so that it opens on a periodic schedule to discharge the accumulated segregation particles.

Figure 22:
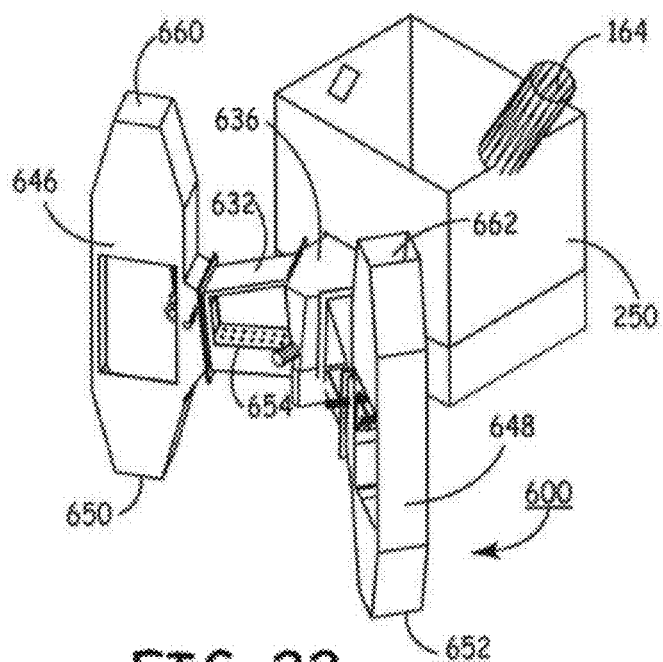
FIG. 22 is perspective view of another scrubber assembly embodiment of the present invention.
Figure 23:
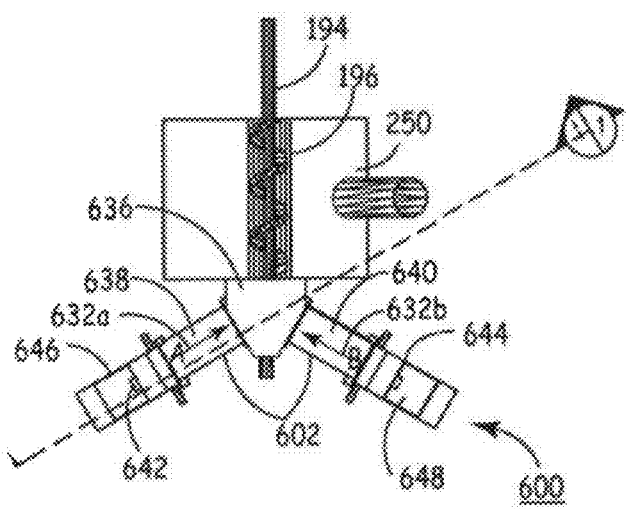
FIG. 23 is a plan view of the scrubber assembly of FIG. 22.
Figure 24:
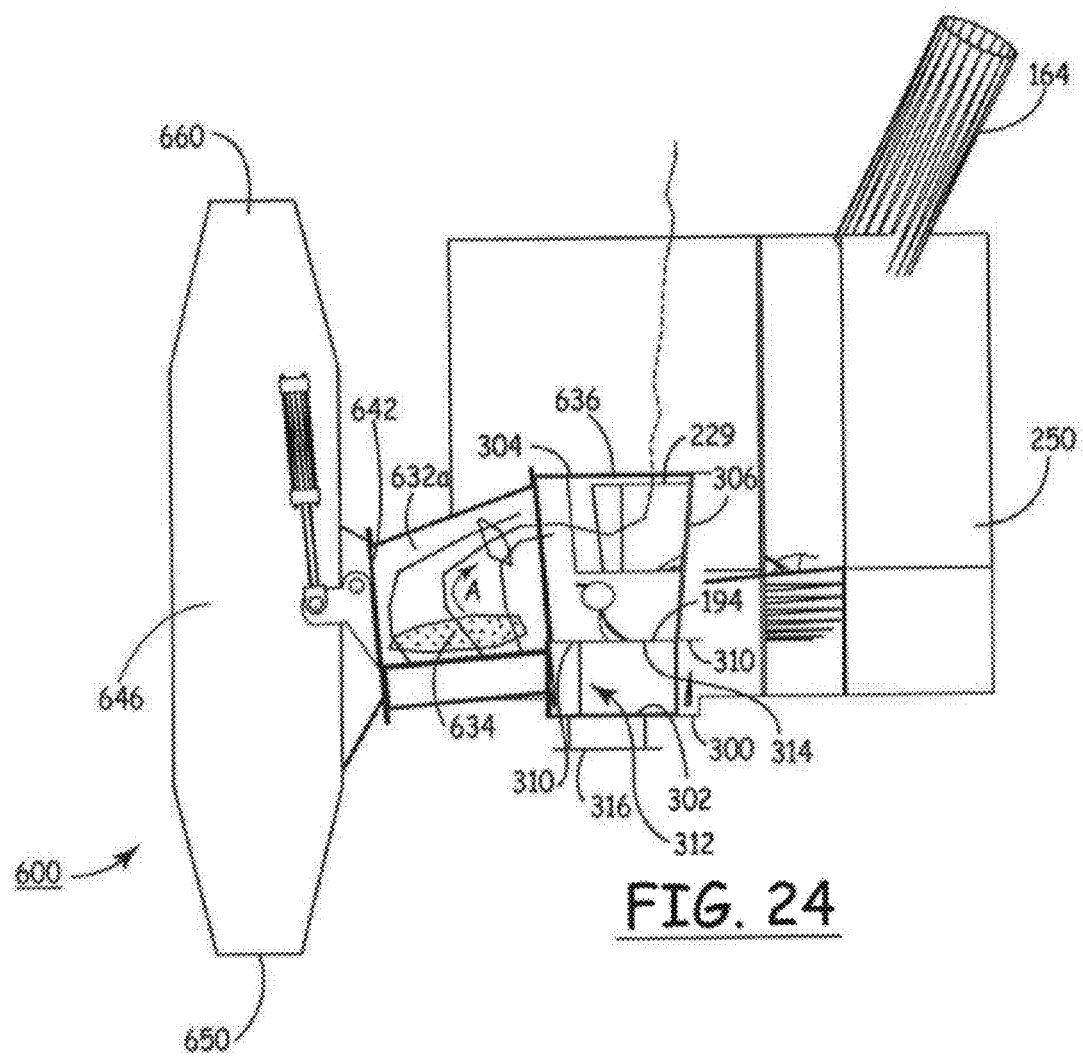
FIG. 24 is an enlarged perspective view of a portion of the scrubber assembly shown in FIG. 22.

Yet another embodiment 630 of the scrubber assembly is shown in FIGS. 22-24, constituting two scrubber subassemblies 632 and 634 for handling larger volumes of segregation stream particles produced by the fluidized-bed dryer 250. As can be seen more clearly in FIG. 24, screw auger 194 extends through vestibule 636. Segregation stream coal particles are conveyed by screw auger 194 to this vestibule 636 and then into collection chambers 638 and 640 which terminate in gates 642 and 644, respectively, or other appropriate type of flow control means.

Figure 26:
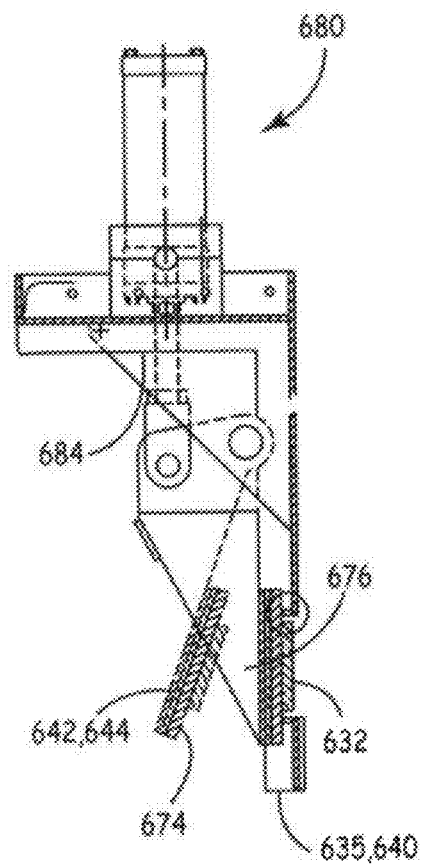
FIG. 26 is a cross section view of the gate according to an example embodiment of the present invention.

As discussed above, distributor plates 654 and 656 may be included inside the collection chambers 638 and 640 (see FIG. 26) so that a fluidizing airstream passed through holes 658 and 660 in the distributor plates fluidize the segregation stream particles to separate any elutriated fines trapped amongst the denser segregation stream particles. Once gates 642 and 644 are opened, the elutriated fines will rise to the tops of chutes 646 and 648 through holes 660 and 662 for conveyance by suitable mechanical means back to the fluidized bed dryer 250. The segregation stream particles will drop through the bottom of chutes 646 and 648, as previously described.

Once a predetermined volume of segregation stream particles have accumulated within the collection chambers 638 and 640, or a predetermined amount of time has elapsed, then gates 642 and 644 are opened to permit the segregation stream particles to be discharged into chutes 646 and 648, respectively. The segregation stream particles will fall by means of gravity through outlet parts 650 and 652 in the bottom of chutes 646 and 648 into some other storage vessel or conveyance means for further use, further processing, or disposal.

Gates 642 and 644 may be pivotably coupled to the collection chambers 638 and 640, although these gates may also be slidably disposed, upwardly pivoting, downwardly pivoting, laterally pivoting, or any other appropriate arrangement. Additionally, multiple gates may be operatively associated with a collection chamber to increase the speed of discharge of the segregation stream coal particles therefrom.

Figure 25:
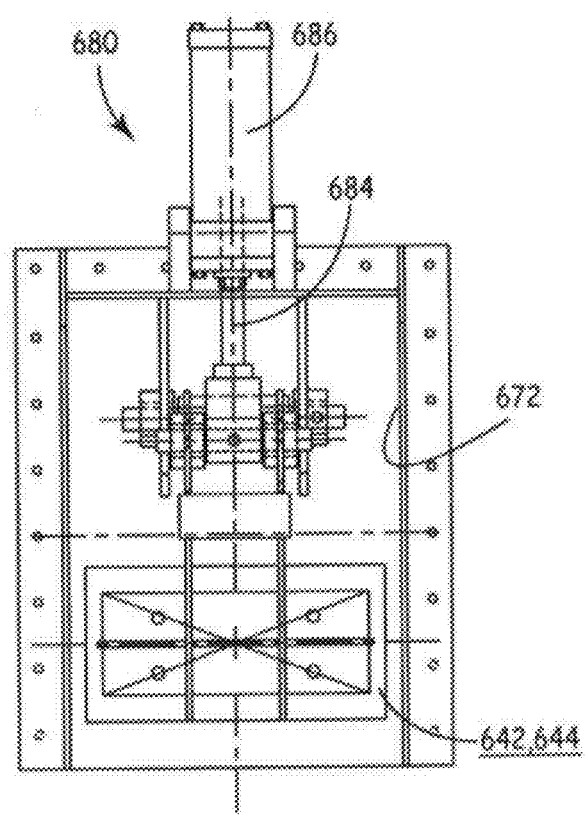
FIG. 25 is an end view of a gate or material flow regulator of a scrubber assembly according to an example embodiment of the present invention.

In an example embodiment, as illustrated in FIG. 25, gate 642 or 644 could include a planar door portion 672 that covers discharge port 632 of collection chamber 638, 640. Door portion 672 may have an area greater than an area of discharge port 632.

Door portion 672 may comprise any rigid material such as steel, aluminum, iron, and like materials with similar physical characteristics. In an alternate embodiment, gate 670 will be repeatedly operated, it may be advantageous to use a thinner material, which can reduce its weight. In this embodiment, the door portion 672 may also include bracing or supports (not shown) to add additional support against any outwardly acting pressure from within collection chamber 638, 640.

Gate 670 also includes at least one seal portion 674 disposed on or to an inner surface of door portion 672 to form a generally positive seal over discharge opening 632. Seal portion 674 could have an area greater than an area of discharge opening 632. Seal member 674 could comprise any resiliently compressible material such as rubber, an elastic plastic, or like devices having similar physical characteristics.

A cover 676 may be disposed on seal member 672 to protect or cover it from the fluidized and non-fluidized material that will confronting seal gate 670. As particularly illustrated in FIG. 26, cover 676 comprises a sheet having an area that can be less than an area of discharge opening 632. When gate 670 is in its closed position cover 676 is nested in discharge port 632. Cover 676 can comprise any rigid material such as steel, aluminum, iron, and like materials with similar physical characteristics. However, other materials may also be utilized for cover 676.

In an example embodiment, an actuation assembly 680 is operatively coupled to gate 670 to move it from an open position and a closed position, whereby the coal is dischargeable from fluidizing collector 620 when gate 670 is in the open position. Actuation assembly 280 comprises a pneumatic piston rod 684 and cylinder 686 that are in operative communication with a fluid pneumatic system (not shown). The fluid pneumatic system may include the utilization of fluid heat streams such as waste heat streams, primary heat streams, or a combination to the two.

Since fluidization will be occurring in the fluidizing collector 632, construction materials may be used that are able to withstand the pressures needed to separate the fine particulates from the denser and/or larger contaminated material. Such construction material can include steel, aluminum, iron, or an alloy having similar physical characteristics. However, other materials may also be used to manufacture the fluidizing collection chamber 638, 640.

The fluidizing collection chamber 638, 640 can also, although not necessary, include an in-collector heater (not shown) that may be operatively coupled to a fluid heat stream to provide additional heat and drying of the coal. The in-collector heater may be fed by any fluid heat stream available in the power plant including primary heat streams, waste streams, and any combination there.

As illustrated in FIGS. 23 and 24, the top, wall 632a and 632b of fluidizing collection chamber 638, 640 may traverse away from the fluidized bed at an angle such that the fluid heat stream entering the fluidizing collection chamber 638, 640 is directed toward passage A or second passage B, as indicated by reference arrows A and B, and into the fluidized bed. An inner surface of the top wall 632 can include impressions, or configurations such as channels, indentations, ridges, or similar arrangements that may facilitate the flow of the fluidized particulate matter through passage A or second passage B and into the fluidized bed.

Figure 27:
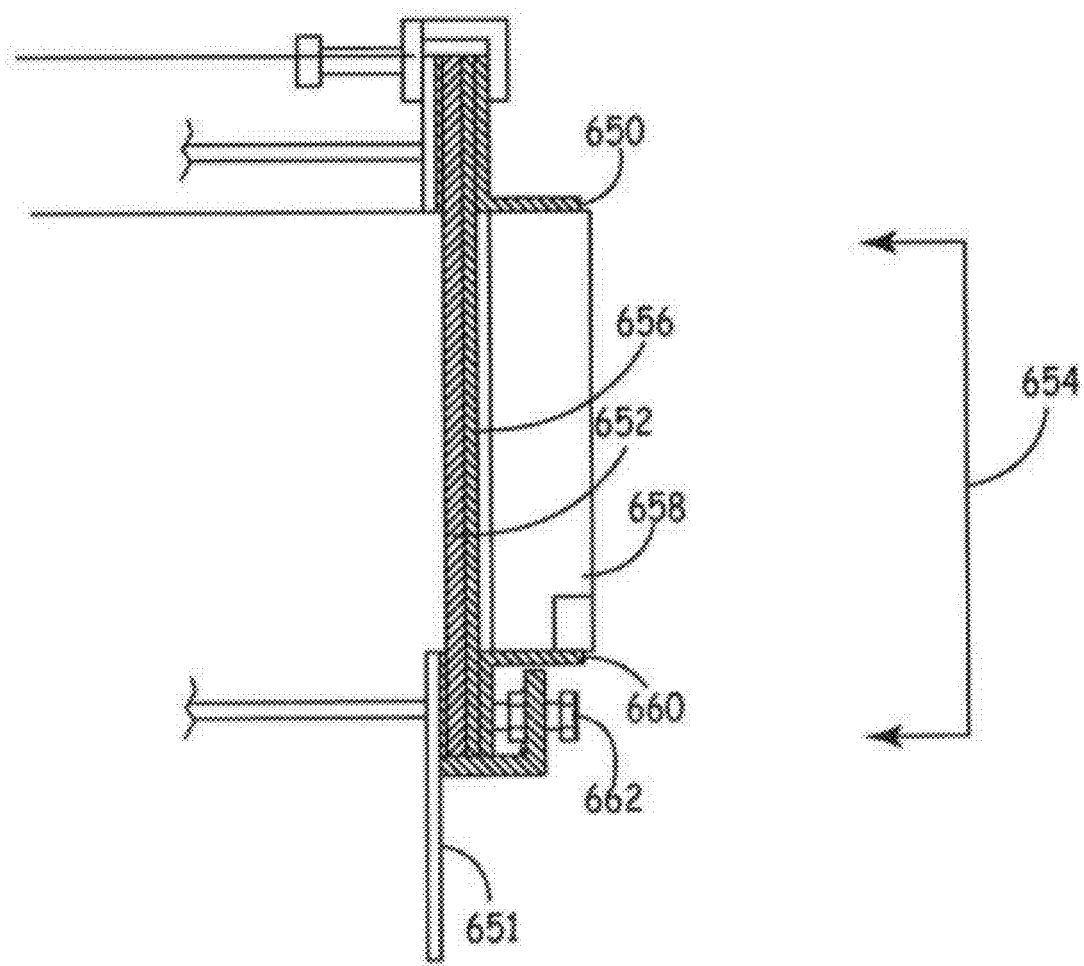
FIG. 27 is a cross-sectional view of a window assembly.

Referring to FIGS. 22 and 27, a window assembly 650 may be disposed on the peripheral wall 651 to permit viewing of the fluidization occurring within the interior of the fluidizing collection chamber 638, 640. In an example embodiment of the present invention, the window assembly 650 comprises at least an inner window 652 comprising a transparent and/or shatter resistant material such as plastic, thermoplastic, and like materials fastened to and extending across a window opening 654. A support or plate 656 may be disposed to a perimeter outer surface of the inner window 652 to provide support against outwardly acting pressure against the inner window 652. The support 656 may comprise any substantially rigid material such as steel, aluminum, or like material. A second or outer window 658 may be disposed to an outer surface of the support 656 to provide additional support against outwardly acting pressures within the fluidizing collection chamber 638, 640. A bracket 660 and fastener 662 may be utilized to secure window assembly 650 into place. Bracket 660 may comprise an L-shape, C-shape, or similar shape that is capable of securing the window assembly 650. Fastener 662 may comprise a bolt, screw, c-clamp, or any fastener known to one skilled in the art.

Junction 300 comprises a bottom wall 302, a top wall 304 and a plurality of side walls 306 defining an interior 308. A distributor plate 310 is spaced a distance from the bottom wall 302 of junction 300 defining a plenum 312 for receiving at least one fluid heat stream that flows into the plenum 312 through at least one inlet 316. Distributor plate 312 of junction 300 is preferably sloped or angled toward fluidizing collector 220 to assist in the transport of non-fluidized material from the fluidized dryer bed 130. As the non-fluidized material travels through junction 300, apertures 314 extending through distributor plate 310 to diffuse a fluid heat stream through the non-fluidized material; thereby causing the separation of fine particulate material. The fine particulate material becomes fluidized and flows back into the interior 106 of fluidized dryer bed 130. The apertures 314 extending through distributor plate 310 of junction 300 may be angled during manufacturing to control a direction of the fluid heat stream.

Use of the segregation stream particles separated from the dryer 250 by the scrubber assembly 600 will depend upon its composition. If these segregation stream particles contain acceptable levels of sulfur, ash, mercury, and other undesirable constituents, then they may be conveyed to the furnace boiler for combustion, since they contain desirable heat values. If the undesirable constituents contained within these segregation stream particles are unacceptably high, however, then the segregation stream particles may be further processed to remove some or all of the levels of these undesirable constituents, as disclosed more fully in U.S. Ser. Nos. 11/107,152 and 11/107,153, both of which were filed on Apr. 15, 2005 and share a common co-inventor and co-owner with this application, and are incorporated hereby. Only if the levels of undesirable constituents contained within the segregation stream particles are so high that they cannot be viably reduced through further processing will the segregation stream particles be disposed of in a landfill, since this wastes the desirable heat values contained within the segregation stream particles. Thus, the scrubber assembly 600 of the present invention not only allows the segregation stream coal particles stream to be automatically removed from the fluidized bed to enhance the efficient and continuous operation of the dryer, but also permits these segregation stream particles to be further processed and productively used within the electricity generation plant or other industrial plant operation.

The following examples illustrate the low-temperature coal drying process and dryer and scrubber apparati that form a part of the present invention.

Example I

Effect of Moisture Reduction on Improvement in Heat Volume of Lignite Coal

Figure 43:
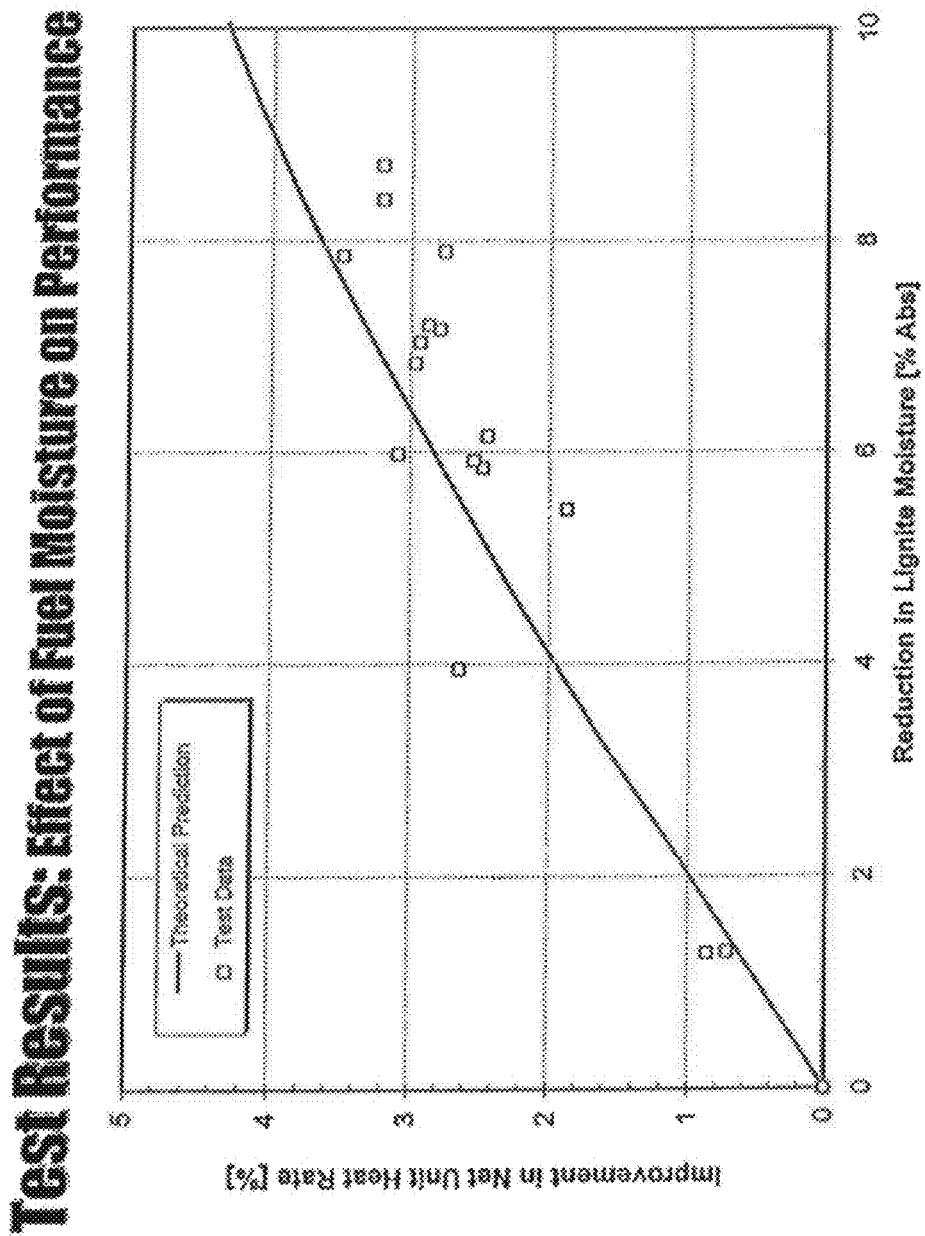
FIG. 43 is a graphical depiction of the improvement in net unit heat rate of coal at different moisture levels.

A coal test burn was conducted at Great River Energy's Coal Creek Unit 2 in North Dakota to determine the effect on unit operations. Lignite was dried for this test by an outdoor stockpile coal drying system. The results are shown in FIG. 43.

As can be clearly seen, on average, the coal moisture was reduced by 6.1% from 37.5% to 31.4%. These results were in close agreement with theoretical predictions, as shown in FIG. 43. More importantly, a 6% reduction in moisture content of the lignite coal translated to approximately a 2.8% improvement in the net unit heat rate of the coal when combusted, while an 8% moisture reduction produced approximately a 3.6% improvement in net unit heat rate for the lignite coal. This demonstrates that drying the coal does, in fact, increase its heat value.

Example II

Effect of Moisture Reduction on the Coal Composition

PRB coal and lignite coal samples were subjected to chemical and moisture analysis to determine their elemental and moisture composition. The results are reported in Table 1 below. As can be seen, the lignite sample of coal exhibited on average 34.03% wt carbon, 10.97% wt oxygen, 12.30% wt fly ash, 0.51% wt sulfur, and 38.50% wt moisture. The PRB subbituminous coal sample meanwhile exhibited on average 49.22% wt carbon, 10.91% wt oxygen, 5.28% wt fly ash, 0.35% wt sulfur, and 30.00% moisture.

An "ultimate analysis" was conducted using the "as-received" values for these lignite and PRB coal samples to calculate revised values for these elemental composition values, assuming 0% moisture and 0% ash ("moisture and ash-free"), and 20% moisture levels, which are also reported in Table 1. As can be seen in Table 1, the chemical compositions and moisture levels of the coal samples significantly change. More specifically for the 20% moisture case, the lignite and PRB coal samples exhibit large increases in carbon content to 44.27% wt and 56.25% wt, respectively, along with smaller increases in oxygen content to 14.27% wt and 12.47% wt, respectively. The sulfur and fly ash constituents increase slightly too (although not on an absolute basis). Just as importantly, the heat value (HHV) for the lignite coal increased from 6,406 BTU/lb to 8,333 BTU/lb, while the HHV value for the PBR coal increased from 8,348 BTU/lb to 9,541 BTU/lb.

Example III

Effect of Moisture Level on Coal Heat Value

Figure 44:
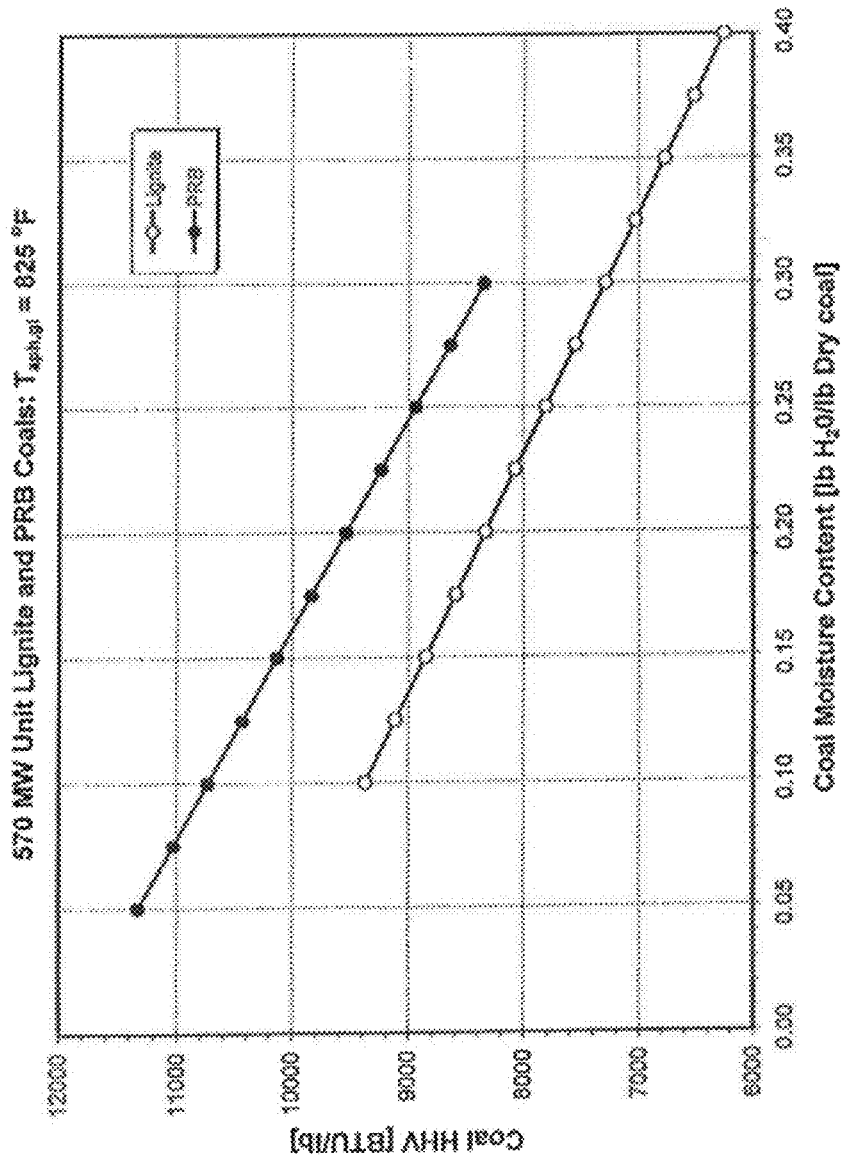
FIG. 44 is a graphical depiction of the HHV value of coal at different moisture levels.

Using the compositional values from Table 1, and assuming a 570 MW power plant releasing 825° F. flue gas, ultimate analysis calculations were performed to predict the HHV heat values for these coal samples at different moisture levels from 5% to 40%. The results are shown in FIG. 44. As can be clearly seen, a linear relationship exists between HHV value and moisture level with higher HHV values at lower moisture levels. More specifically, the PRB coal sample produced HHV values of 11,300 BTU/lb at 5% moisture, 9,541 BTU/lb at 20% moisture, and only 8,400 BTU/lb at 30% moisture. Meanwhile, the lignite coal sample produced HHV values of 9,400 BTU/lb at 10% moisture, 8,333 BTU/lb at 20% moisture, and only 6,200 BTU/lb at 40%. This suggests that boiler efficiency can be enhanced by drying the coal prior to its combustion in the boiler furnace. Moreover, less coal is required to produce the same amount of heat in the boiler.

Example IV

Effect of Coal Moisture Level on Power Plant Efficiency

For purposes of this Example IV, four different dryer system configurations (A, B, C, and D) were used. They are as follows:

Configuration A: Base Case (BC)

Figure 45:
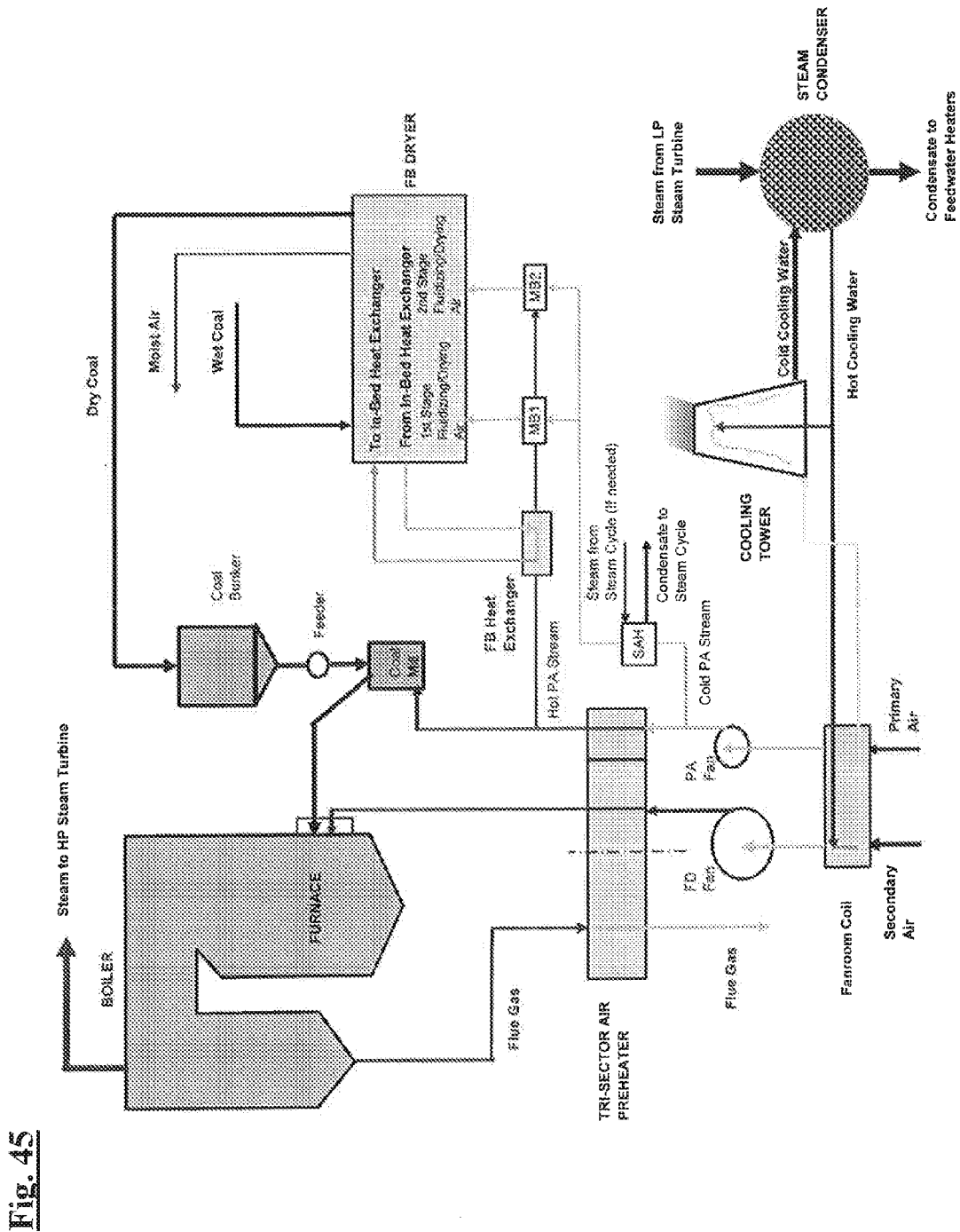
FIG. 45 is a schematic diagram of Configuration A (base case) of this invention.

The BC option is tightly integrated with the power plant equipment. It involves use of a tri-sector rotating regenerative air pre-heater (APH), a heat exchanger for preheating the primary and secondary air streams, a fluidized bed dryer, and a heat exchanger for heating of the heat transfer medium for the in-bed heat exchanger, as shown more fully in FIG. 45. In this arrangement, the APH is used to increase the temperature level of waste heat.

Waste heat from the steam condenser is used to preheat the primary air ("PA"), secondary air ("SA"), and fluidizing air ("FA") streams. This is achieved by diverting a small fraction of the hot condenser cooling water from the rest of the flow and passing it through a water-to-air heat exchanger wherein the PA, SA, and FA streams are preheated to a temperature of approximately 100° F. The cold cooling water is then circulated back to the tower. This lowers cooling tower duty, and reduces the amount of water required for a cooling tower.

Preheated PA and SA streams flow to the PA and FD fans and the, through the primary and secondary air sectors of the APH. The SA stream, heated in the SA sector of the APH, is delivered to the boiler windbox, wherein it is distributed to the

TABLE 1

|  |  | As-Received | | Moisture & Ash-Free | | 20% Fuel Moisture | |
|---|---|---|---|---|---|---|---|
|  | Units | Lignite | PRB | Lignite | PRB | Lignite | PRB |
| Carbon | % wt | 34.03 | 49.22 | 69.17 | 76.05 | 44.27 | 56.25 |
| Hydrogen | % wt | 2.97 | 3.49 | 6.04 | 5.39 | 3.87 | 3.99 |
| Sulfur | % wt | 0.51 | 0.35 | 1.04 | 0.54 | 0.67 | 0.40 |
| Oxygen | % wt | 10.97 | 10.91 | 22.29 | 16.86 | 14.27 | 12.47 |
| Nitrogen | % wt | 0.72 | 0.75 | 1.46 | 1.16 | 0.92 | 0.86 |
| Moisture | % wt | 38.50 | 30.00 | 0.00 | 0.00 | 20.00 | 20.00 |
| Ash | % wt | 12.30 | 5.28 | 0.00 | 0.00 | 16.00 | 6.30 |
| TOTAL | % wt | 100.00 | 100.00 | 100.00 | 100.00 | 100.00 | 100.00 |
| HHV | BTU/lb | 6,406 | 8,348 | 13,021 | 12,899 | 8,333 | 9,541 |
| $H^T_{fuel}$ | BTU/lb | −2,879 | 2,807 |  |  | −1,664 | −2,217 | burners. A portion of the PA, called herein the "hot PA," is extracted downstream of the APH. Temperature of the cold PA stream is in a 140° F. range, while the hot PA temperature is in the 750° F. range. The remaining portion of the PA is delivered to the coal pulverizers.

The hot PA stream passes through an air-to-water heat exchanger, wherein it transfers heat to the heat transfer fluid, in this case water. The hot water is circulated through the in-bed heat exchanger, which transfers heat to a fluidized bed. After passing through the heat exchanger, the hot PA stream is in the 200-240° F. range. The FA stream, as the name suggests, fluidizes and dries coal in the fluidized bed dryer.

For a dryer of the fixed geometry, i.e., given distributor area, the amount of FA (i.e., the sum of the cold and hot PA flows) is constant. In the BC configuration, the temperature of the FA stream can be controlled by changing the proportions of the hot PA and cold PA streams. As the hot PA flow increases, the amount of available heat for the in-bed heat exchanger increases. This increases the amount of coal moisture that can be removed from coal in the fluidized bed dryer. Maximum coal drying is achieved when all the FA needed for the dryer is delivered as the hot PA stream. This operational mode results in the maximum surface temperature of the in-bed heat exchanger tubes and the maximum bed temperature.

As the hot PA flow increases, the amount of the PA and total air flow (PA+SA) through the APH increases. This increase in the air flow through the APH results in a decrease in the flue gas temperature leaving the APH which, in turn, results in a lower stack loss, and an increase in boiler and unit efficiency. Therefore, the performance improvement with the BC arrangement is higher compared to the case when dried coal is delivered to the power plant and burned without the on-site drying.

The BC option will, most likely, be used to retrofit existing or design new power stations burning high-moisture lignite or PRB coals since these are, typically, equipped with tri-sector APHs.

Configuration B: High-Temperature (HT) Case

Figure 46:
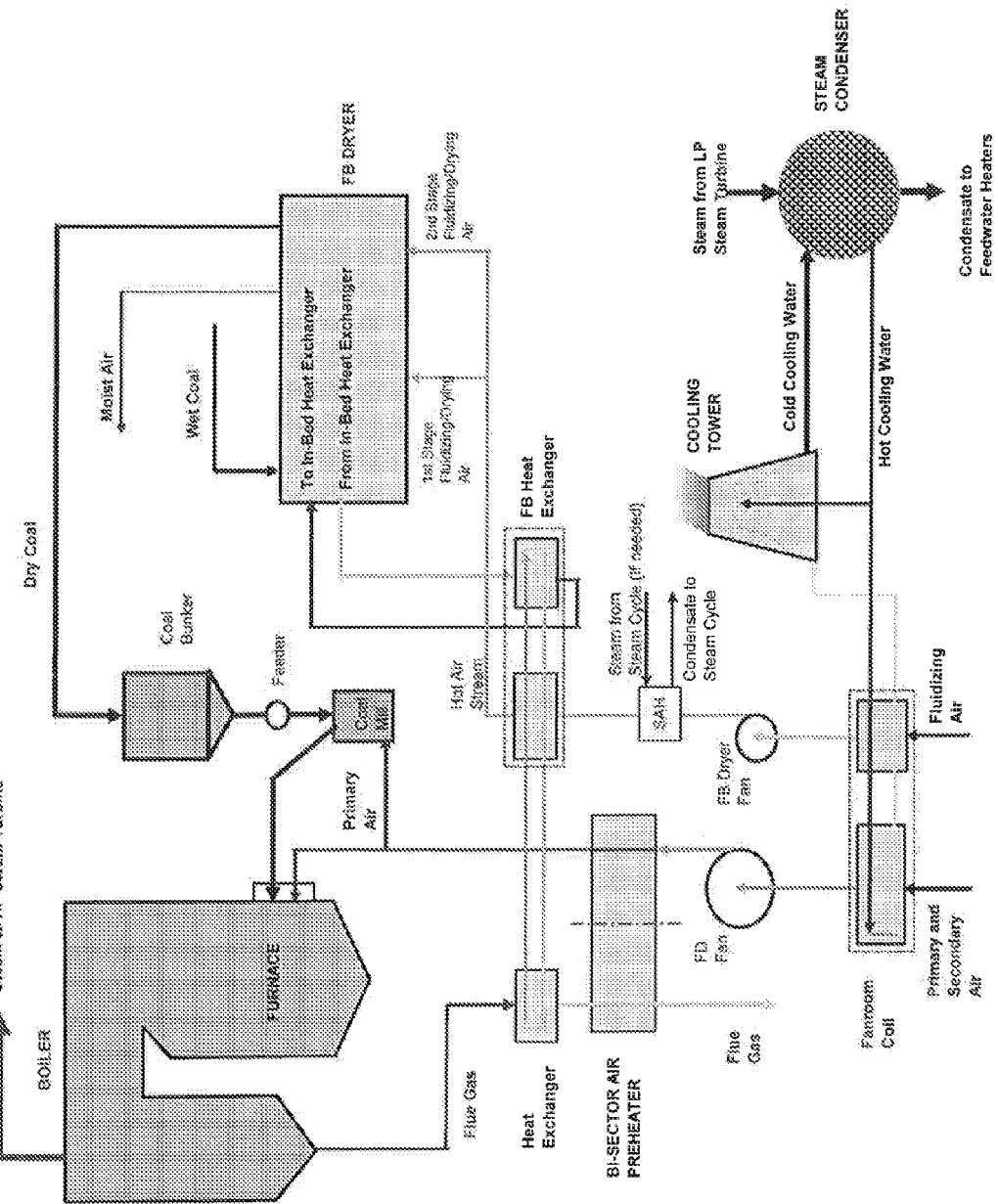
FIG. 46 is a schematic diagram of Configuration B (high temperature) of this invention.

The HT option is less tightly integrated with the power plant equipment, compared to the BC option. As shown more fully in FIG. 46, the FA stream is separate from the PA and SA streams. The HT case involves a bi-sector APH, heat exchangers for preheating the PA/SA and FA streams, a fluidized-bed dryer ("FBD") fan, fluidized-bed dryer, and heat exchangers for heating the FA stream and water for the in-bed heat exchanger by using the high-temperature flue gas.

Similar to the BC case, waste heat from the steam condenser is used to preheat the PA+SA and FA streams. This is achieved by diverting a small fraction of the hot condenser cooling water from the rest of the flow and passing it through a water-to-air heat exchanger wherein the PA+SA and FA streams are preheated to a temperature of approximately 100° F. The cold cooling water is then circulated back to the tower. This lowers cooling tower duty and reduces the amount of water required for a cooling tower.

Preheated primary (PA+SA) streams flow through the FD fan and then through the APH wherein they are further heated. The PA stream is separated from the SA stream, and is delivered to the coal pulverizers. The SA stream is delivered to the boiler windbox, wherein it is distributed to the burners.

The preheated FA stream is passed through the FGD fan, wherein its pressure is increased to about 40". The FA stream then passes through the air-to-water heat exchanger, wherein its temperature is increased to the 200-240° F. range. The heated FA stream is then delivered to the fluidized-bed dryer wherein it fluidizes and dries the coal. The water for the in-bed heat exchanger is heated in a water-to-water heat exchanger that is placed in a serial arrangement.

The heat for both heat exchangers is extracted from the hot flue gas upstream of the APH, using, in this case, water or other suitable liquid as a heat transfer medium. Other, simpler arrangements are possible. For example, the heat transfer medium could be eliminated by combining the above-mentioned three heat exchangers into one combined heat exchanger. In such an arrangement, the FA stream will be heated in the flue gas-to-FA part of the combined heat exchanger and the water for the in-bed heat exchanger will be heated in the flue gas-to-water part of the combined heat exchanger. However, for the purpose of this analysis, the details of the heat exchanger arrangement are not important.

After passing through the heat exchanger, the cooler flue gas flows through the bi-sector APH wherein it is further cooled. As a consequence of this heat exchanger arrangement, the temperature of the flue gas leaving the APH is lower compared to the case where there is no heat extraction upstream of the APH. However, since the PA+SA streams entering the APH is preheated by using waste heat from the condenser, the temperature of metal matrix in the cold end of the APH is not too low to cause increased corrosion and plugging of heat transfer surfaces that is caused by deposition of sulfuric acid.

Performance improvement that could be achieved by the HT arrangement is anticipated to be less compared to the BC configuration. Results of preliminary calculations confirm this. Also, since the FA can be heated to a temperature similar to the BC configuration, the size of the fluidized bed dryer will be similar to or the same as the BC configuration.

The HT configuration will, most likely, be retrofitted at power plants that were originally designed for Eastern bituminous ("EB") coals, but in order to reduce emissions an/or operating costs are not burning Powder River Basin ("PRB") coals or PRB/EB coal blends.

Configuration C: Low-Temperature (LT) Case

Figure 47:
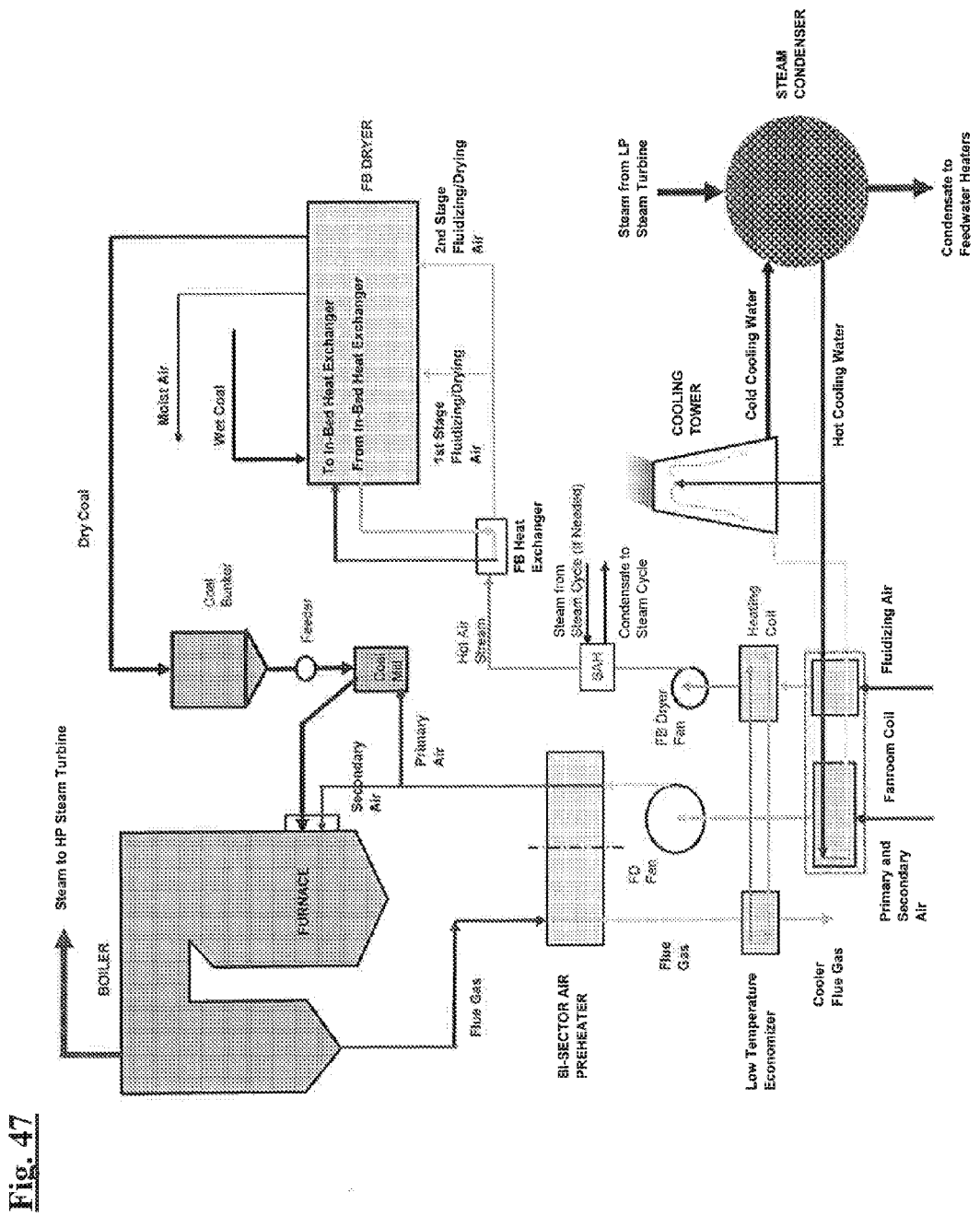
FIG. 47 is a schematic diagram of Configuration C (low temperature) of this invention.

The LT configuration is similar to the HT option. As shown more fully in FIG. 47, the major difference is that the heat for preheating the FA stream is extracted from the flue gas downstream of the APH. The FA stream is separate from the PA and SA streams. The LT configuration also involves a bi-sector APH, heat exchangers for preheating the PA/SA and FA streams, FBD fan, fluidized-bed dryer, and heat exchangers for heating the FA stream and water for the in-bed heat exchanger by using the low-temperature flue gas.

Similar to the BC and HT configurations, waste heat from the steam condenser is utilized to preheat the PA+SA and FA streams. This is accomplished by diverting a small fraction of the hot condenser cooling water from the rest of the flow, and passing it through a water-to-air heat exchanger where the PA+SA and FA streams are preheated to a temperature of approximately 100° F. The cold cooling water is then circulated back to the cooling tower. This lowers cooling tower duty and reduces the amount of water required for a cooling tower.

Preheated primary (PA+SA) streams flow through the FD fan and then through the APH where they are further heated. PA is separated from the SA and is delivered to the coal pulverizers. The SA stream is delivered to the boiler windbox, where it is distributed to the burners.

The FA stream, preheated by the waste heat from the steam condenser, is passed through the FBD fan, where its pressure is increased to about 40". The high-pressure FA stream then passes through the air-to-water heat exchanger, wherein its temperature is increased to the 250+° F. range. If a source of waste process steam is available, a steam-air heater (SAH)

could be used to further increase the temperature of the FA stream, and increase drying capacity of the fluidized bed dryer. The heated FA stream then passes through the fluidized-bed heat exchanger wherein it heats the water for the in-bed heat exchanger. Cooler FA stream is then delivered to the fluidized bed dryer where it fluidizes and dries the coal.

Since in this case the temperature of the FA stream and hot water for the in-bed heat exchanger will be lower, compared to the BC and HT configurations, this will lower drying capacity of the fluidized bed dryer. As a consequence, the fluidized-bed dryer will be larger in size, compared to the BC and HT configurations. This will result in larger FA requirements and higher FBD fan power. Also, the amount of coal moisture that could be removed in the dryer will be less. Therefore, performance of the LT configuration will be less compared to the BC and HT configurations.

The LT option offers no advantage compared to the HT case. This is because the equipment is pretty much the same but is arranged differently, and system performance is lower compared to the BC and HT configurations.

A combination of the HT and LT configurations is also possible, wherein heat is extracted from the flue gas upstream and downstream of the APH. This could also be combined with the waste heat utilization form the steam condenser. Although the combined HT/LT option offers increased operational flexibility, the amount of required equipment and capital cost are significantly increased.

Configuration D: Ultra-Low-Temperature (ULT) Case

Figure 48:
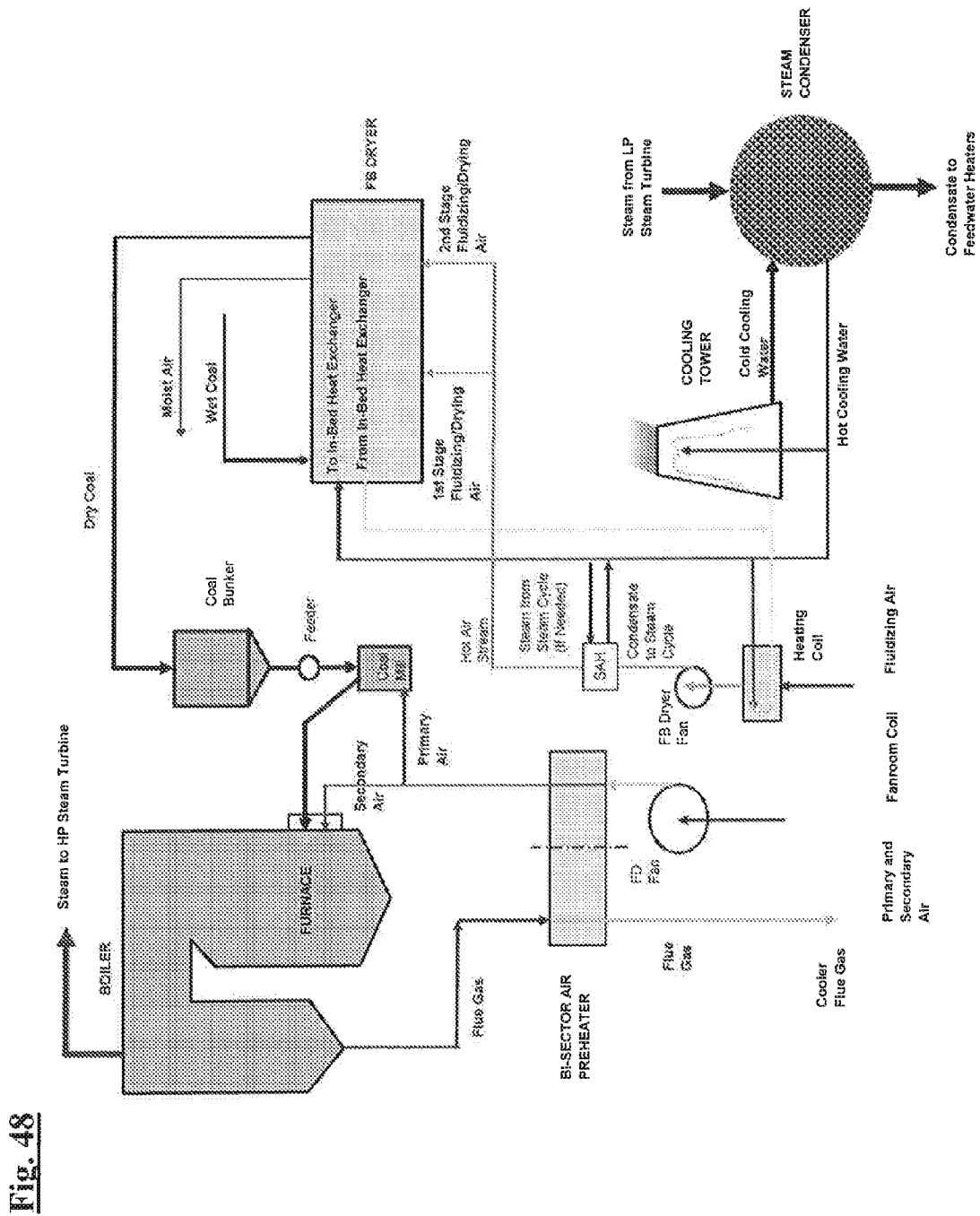
FIG. 48 is a schematic diagram of Configuration D (ultra-low temperature) of this invention.

In the ULT configurations shown in FIG. 48, the FA stream is separate from the PA+SA streams and is heated by using waste heat from the condenser to a temperature of approximately 100° F. The heat for the in-bed heat exchanger will be supplied directly by circulating the hot condenser cooling water through the heat exchanger tubes. This will result in tube surface temperature of approximately 100° F. No waste heat from the flue gas is used in this case.

Since the temperature of the FA stream and the water for the in-bed heat exchanger will be significantly lower compared to the previously described Configurations A, B, and C, this will require a very large FB dryer. Also, the drying capacity of the dryer and the amount of coal moisture that could be removed in the dryer will be significantly lower. However, less equipment will be needed for this option, which will reduce capital cost.

This option could be modified by using waste heat from the condenser to preheat the PA+SA stream into the APH during the winter. This will eliminate the use of process steam to keep the PA+SA stream above the freezing temperature.

Another possible modification of the ULT case involves use of the SAH that could be used to increase the temperature of the FA stream and improve dryer performance.

Figure 49:
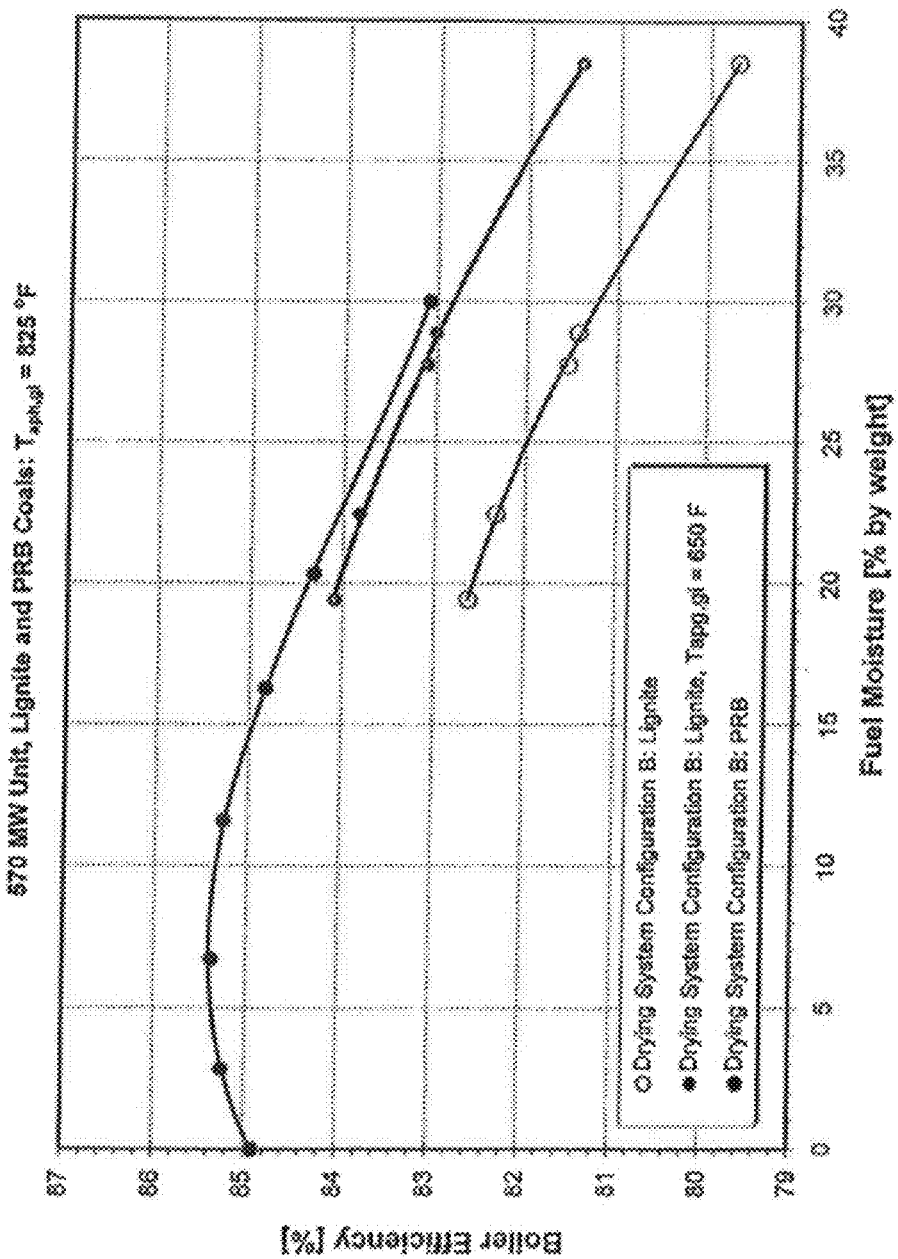
FIG. 49-59 are graphical depictions of different measures of power plant efficiency for coals at different moisture levels using the various coal drying configurations.

The effect on boiler efficiency of lignite (825° F. vs. 650° F. flue gas) and PRB (825° F. flue gas) coal dried to different moisture levels in accordance with the Configuration B dryer system is shown in FIG. 49. Drier coals make the boiler burn more efficiently. In this case, an 8% gain in boiler efficiency was realized.

Figure 50:
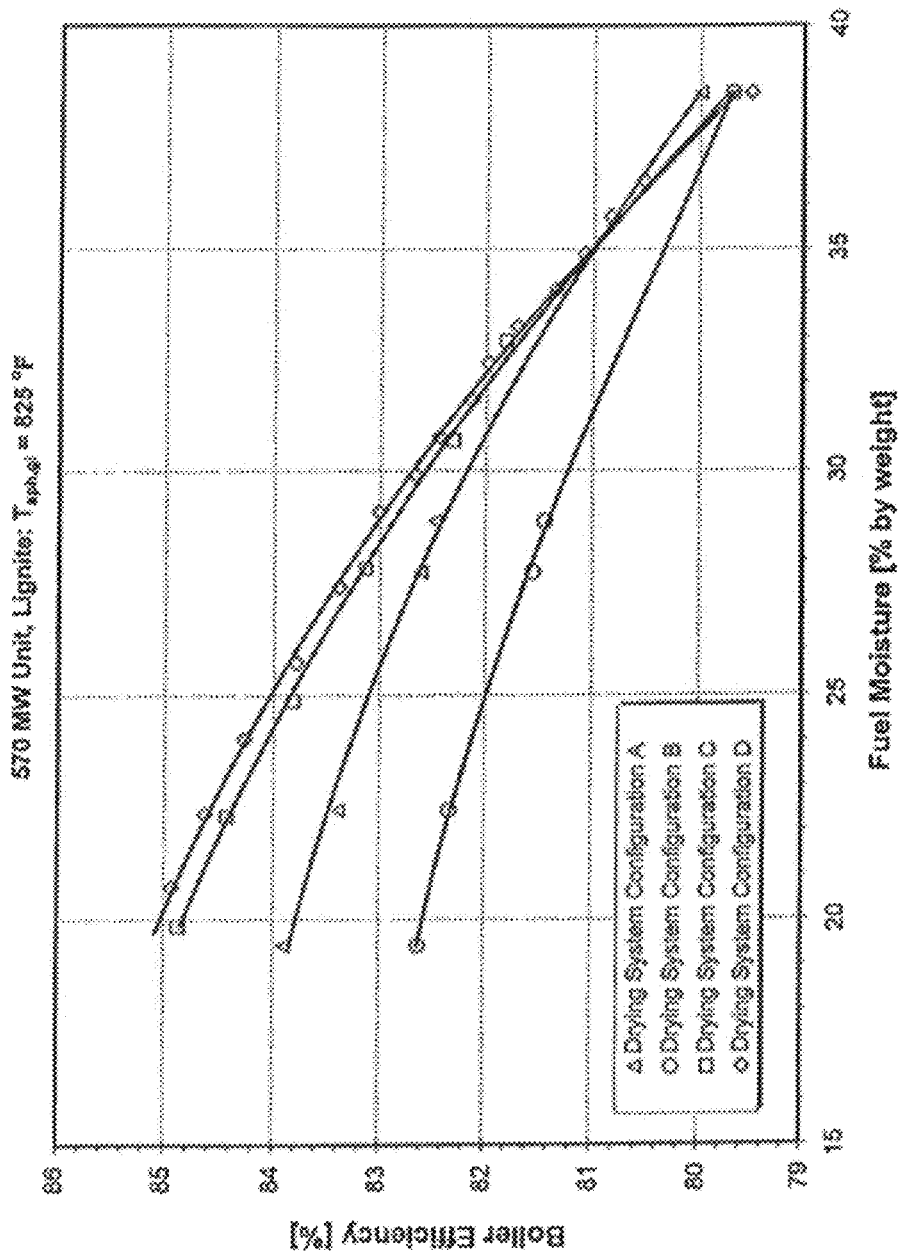

Application of the four different dryer configurations A, B, C, and D to lignite coal at an 825° F. flue gas temperature is shown in FIG. 50. The low-temperature and ultra-low-temperature configurations (C and D) provide the best increases in boiler efficiency.

Figure 51:
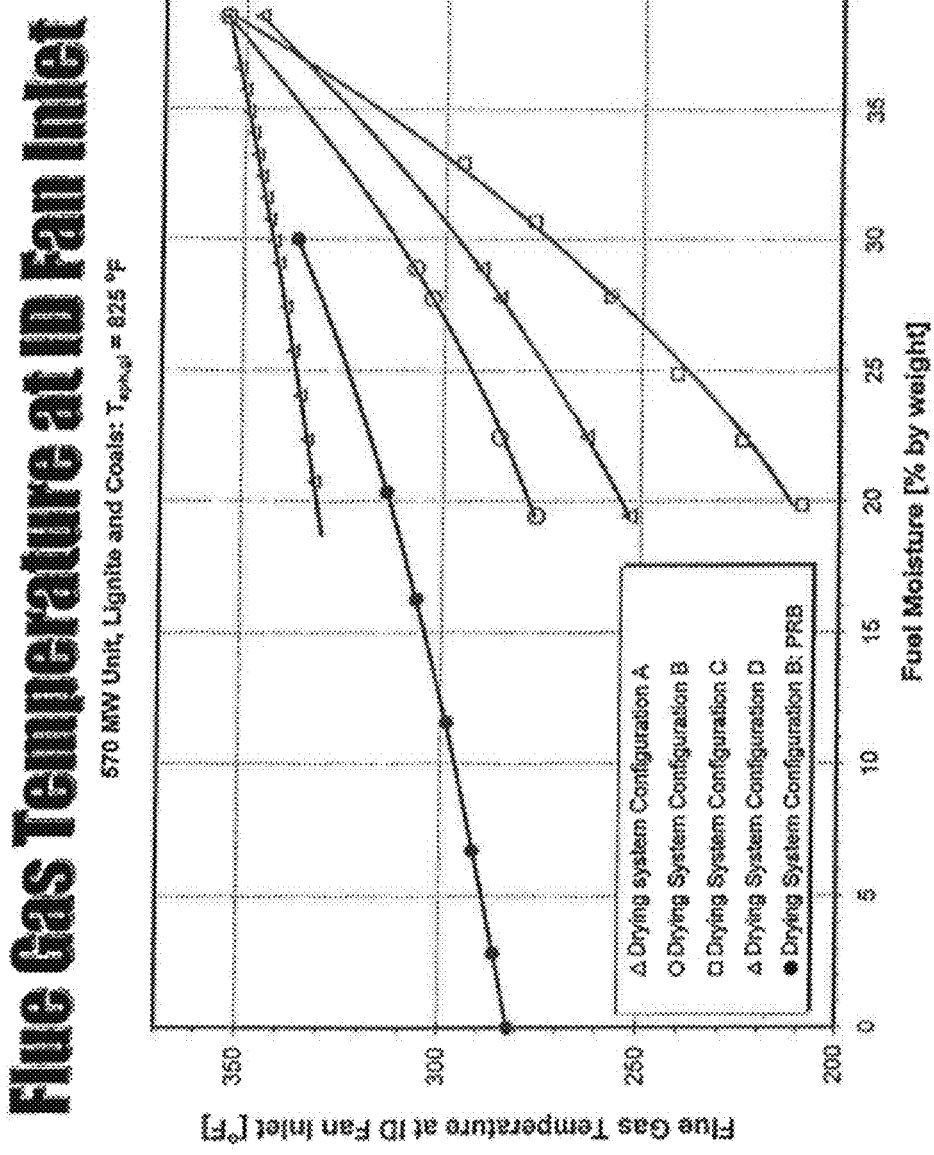

The impact on flue gas temperature exiting the APH for lignite coal using the four different configurations, and PRB coal using the high-temperature configuration is shown in FIG. 51. The flue gas for all of these options entered the APH at 825° F. The lowest flue gas exit temperature (210° F. for 20% moisture coal) is realized for the low-temperature configuration (C). This means that the heat content contained within the flue gas entering the APH was used more productively with this option.

Figure 52:
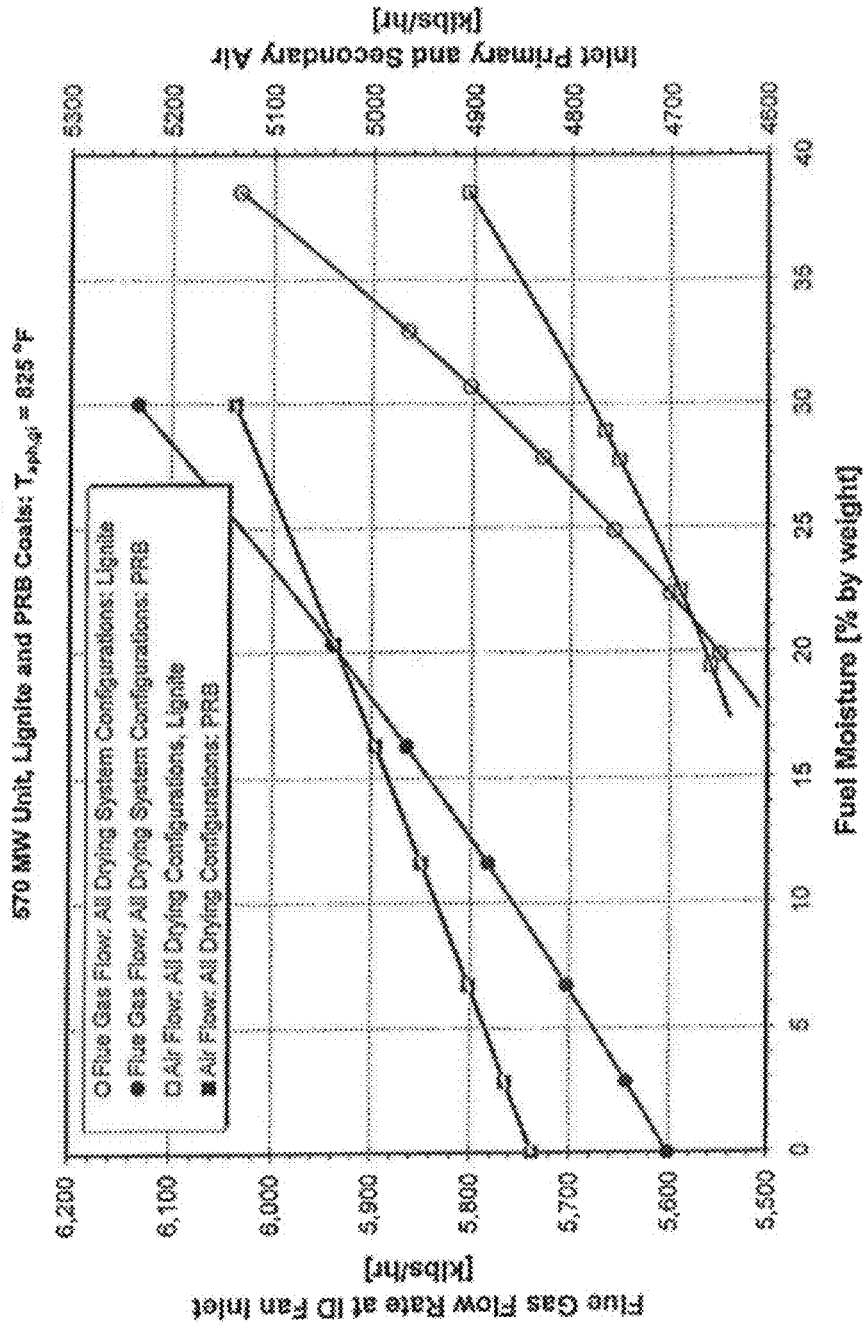

The impact on the flow rate of the flue gas out of the APH (ID fan inlet) for the lignite and PRB coals is shown in FIG. 52. Lower flow rates are produced when lower-moisture coal is burned in the boiler. Thus, smaller scrubbers and precipitators will be required to treat the flue gas when drier coals are used. Moreover, lower levels of energy will be used to run the IP fans needed to pump the flue gas.

Also shown in FIG. 52 is the impact on the air flow entering the boiler for lignite and PRB coals at different moisture levels. At lower moisture levels, this flow rate will also be reduced. Therefore, smaller fans will be needed, and energy costs can be saved.

Figure 53:
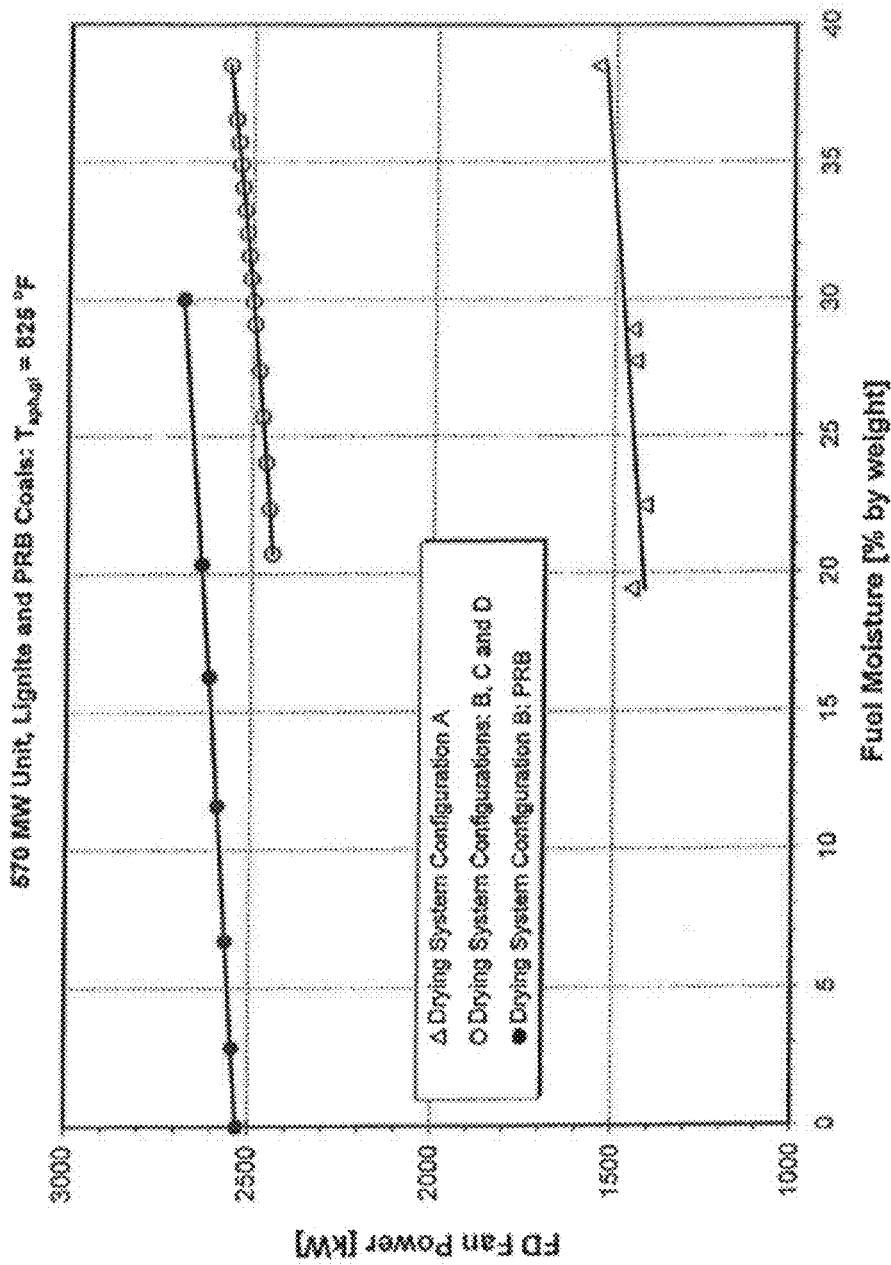

The impact on the power requirements for the FD fan used to drive the secondary air flow is shown in FIG. 53. These power requirements drop slightly at lower moisture levels in the coal, because the air flows are smaller.

Figure 54:
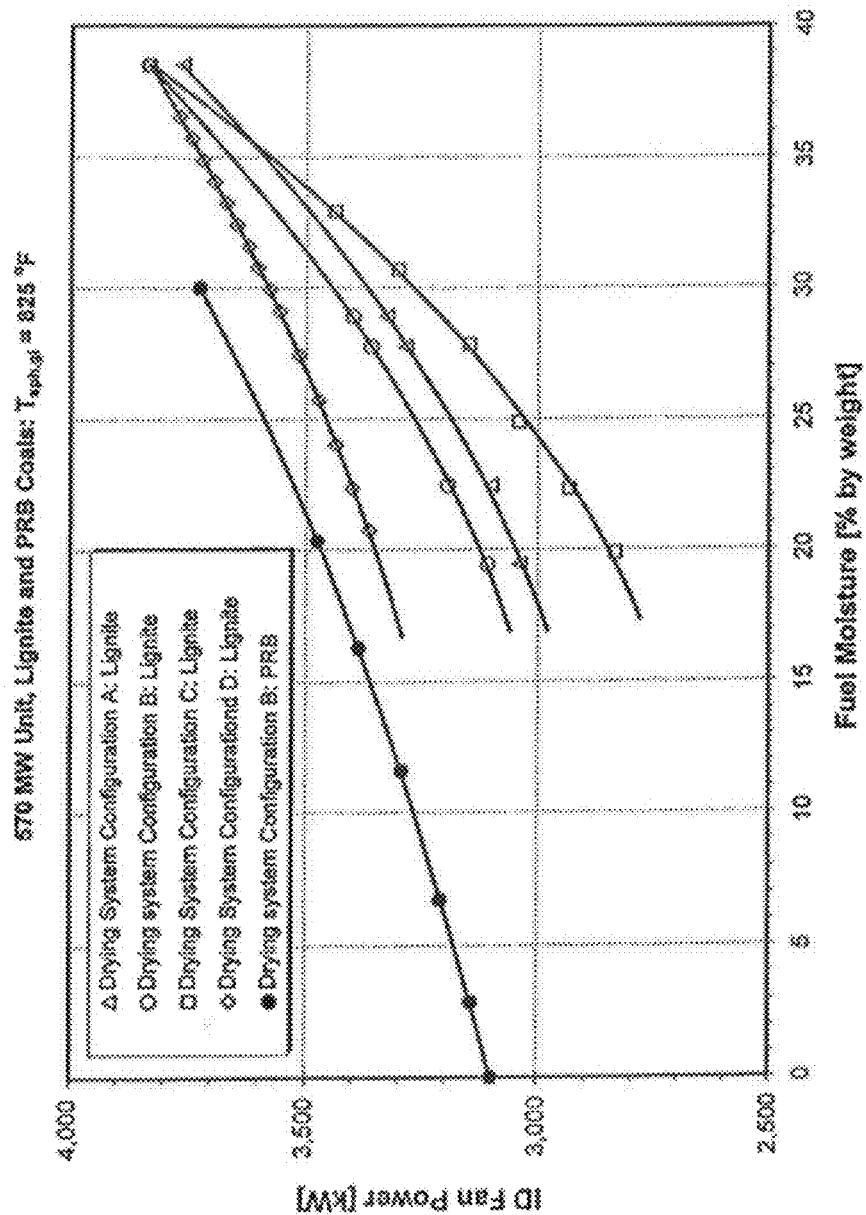

The impact on the power requirements for the ID fans used to drive the flue gas for lignite coal for the four different configurations and PRB coal is shown in FIG. 54. Much bigger energy savings are realized in this area. Again, low-temperature Configuration C seems to provide the largest energy requirement drop. This is very significant, since the power plant uses four ID fans, thereby multiplying four-fold these results.

Figure 55:
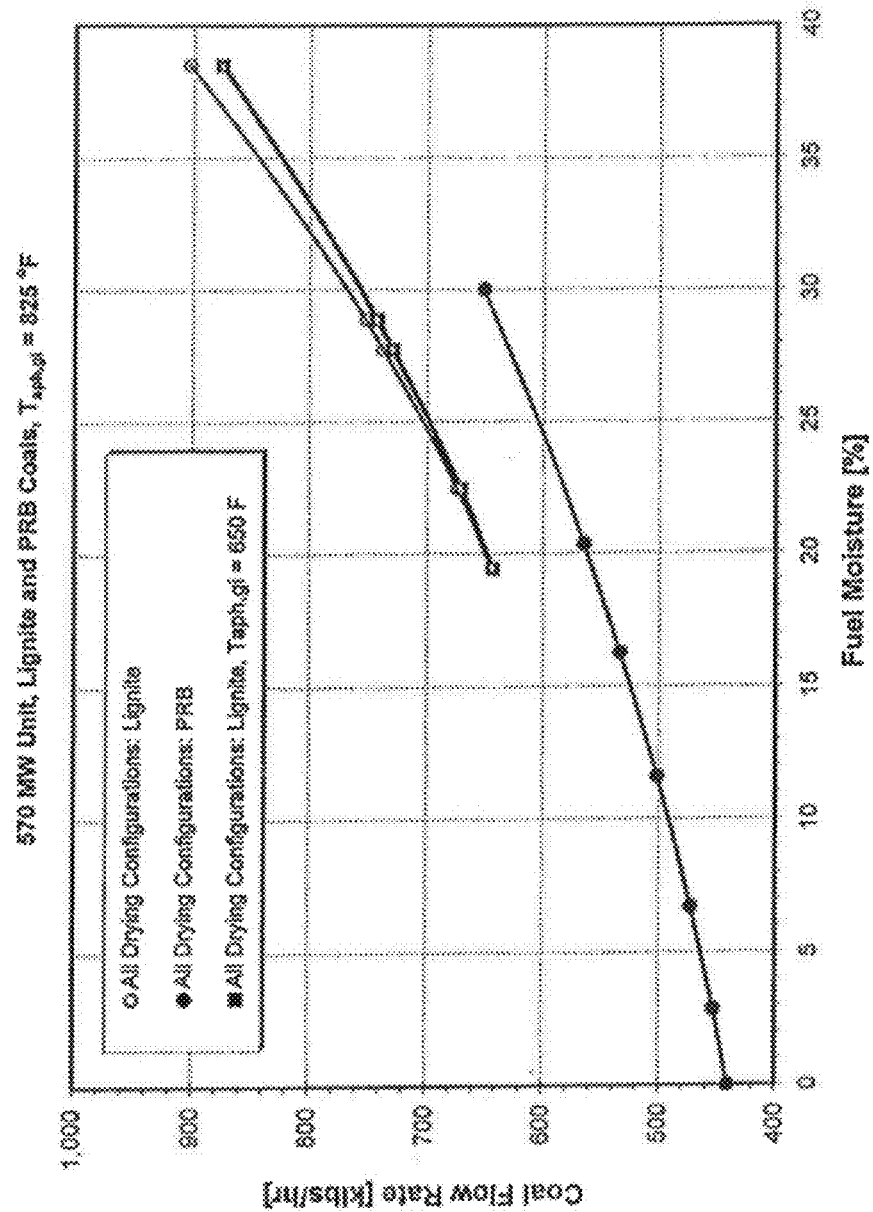

The impact on coal flow rates for lignite (825° F. vs. 650° F. flue gas) and PRB coal (825° F. flue gas) is shown in FIG. 55. The needed coal flow drops because of the boiler efficiency gains and coal weight losses due to the drying process. Therefore, the coal does not need to be fed as quickly to the boiler to produce the necessary heat to run the power plant.

Figure 56:
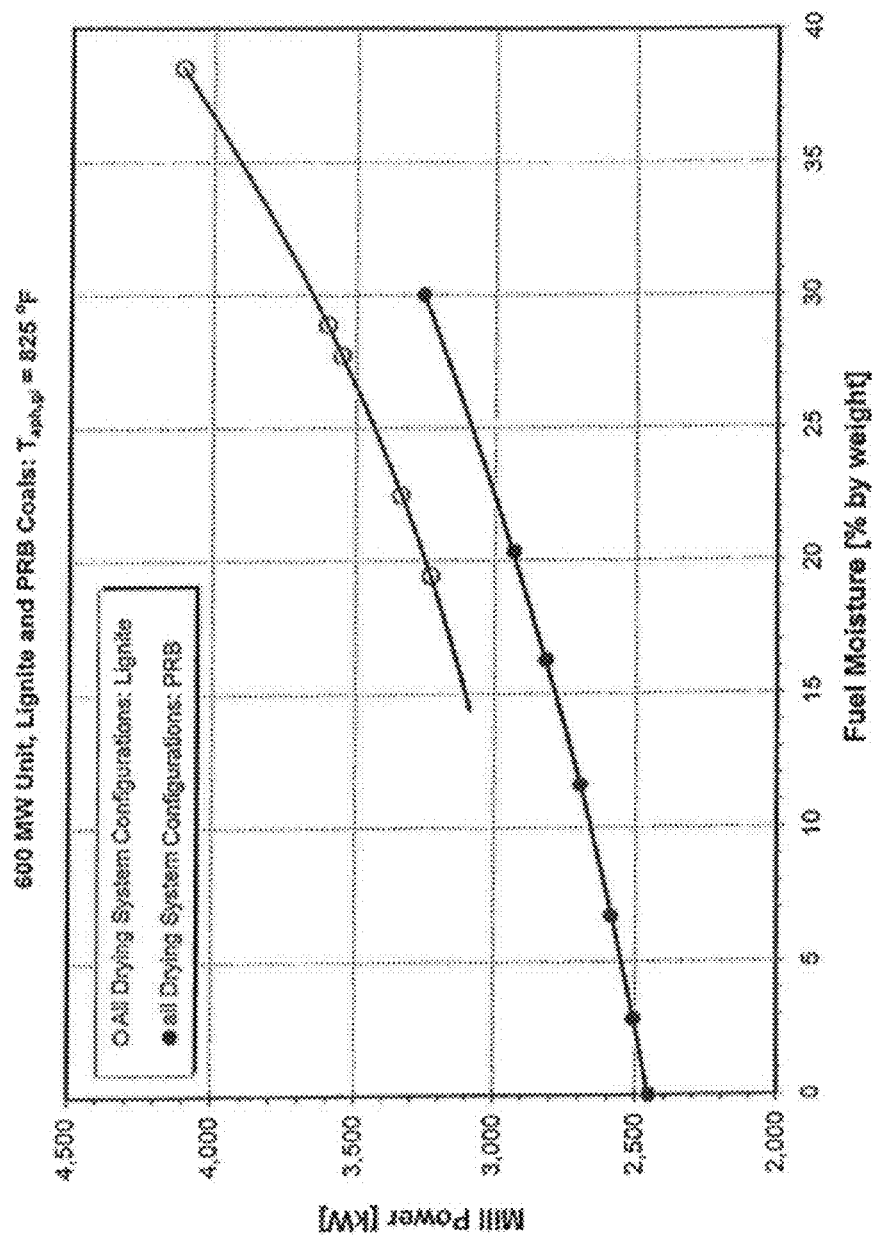

As shown in FIG. 56, lower mill power is required to run the pulverizers at lower coal moistures. A 20% drop in power requirements is realized. This is significant, since power plants may need 6-8 pulverizers to grind the coal.

Figure 57:
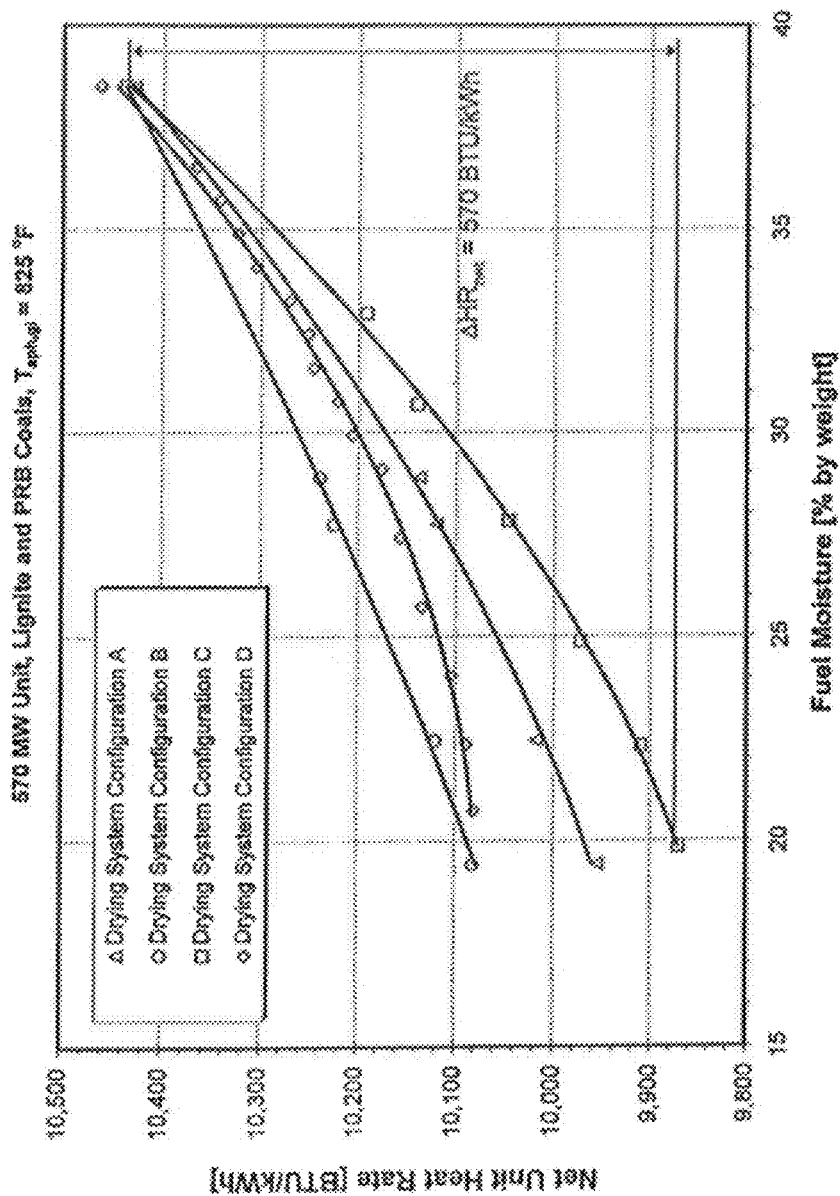
Figure 58:
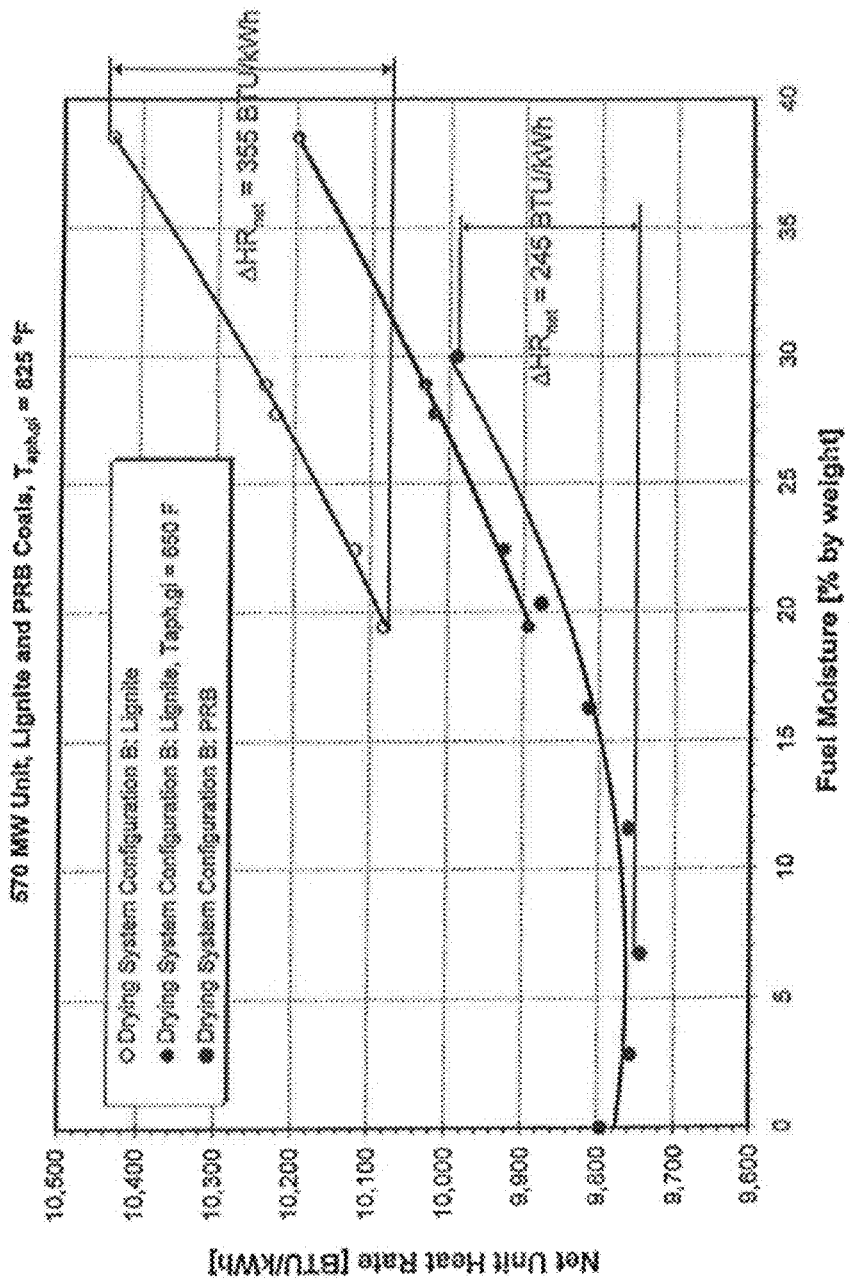

The impact on the net unit heat rate for the different dryer configurations used to dry the lignite and PRB coals is shown in FIG. 57. Net unit heat rate combines the increases in boiler efficiency, turbine efficiency, and reduced station service requirements produced by the drying systems. This indicates the total energy needed to produce electrical power. As shown in FIG. 58, the net unit heat rate is reduced for lower moisture coals. The low-temperature configuration provides the best results, although the base case is also good.

Figure 59:
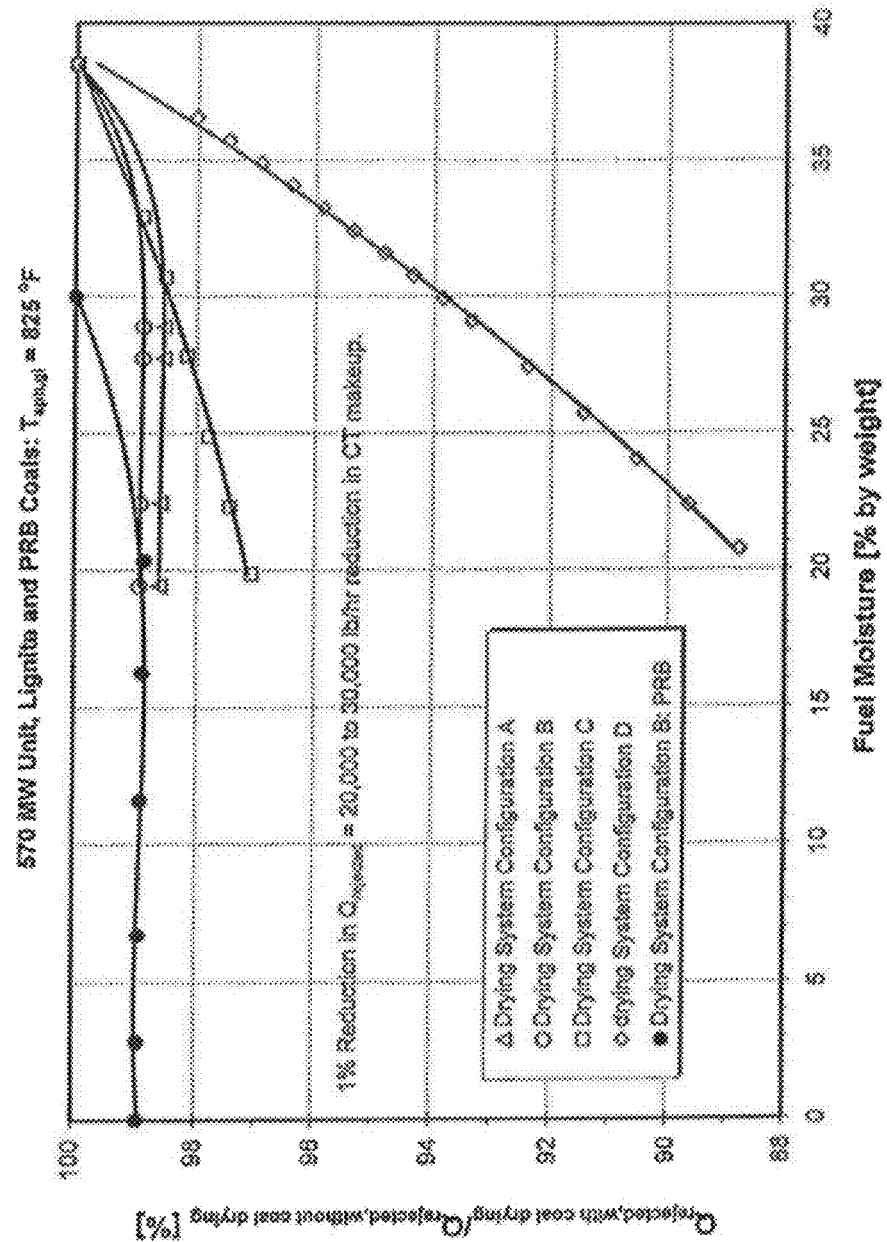

FIG. 59 shows the impact heat rejected to the cooling tower for the different drying configurations. Because some of the hot condenser cooling water has been diverted to heat the fan room coils, less heat is lost in the cooling tower. The ultra-low-temperature option provides the best results with the low-temperature option the next best.

These results collectively demonstrate that use of waste heat sources available at a power plant in the low-temperature drying process of the present invention to dry the coal feed significantly enhances the efficiency of the power plant operation. Improvements in boiler efficiency, net unit heat rate, and fan and mill power were all produced. While the magnitude of these improvements depend upon the specific coal drying system configuration used, reductions in lignite moisture content from 38.5% to 20% result in heat rate improvements within the 350-570 BTU/kWh (3.4-5.4%) range. Performance improvements for PRB coal are somewhat smaller, principally due to the fact that PRB coal starts out with 30% moisture instead of the 38.5% moisture level of lignite coal.

Example V

Pilot Dryer Coal Particle Segregation Results

During the Fall of 2003 and Summer of 2004, over 200 tons of lignite was dried in a pilot fluidized bed coal dryer built by Great River Energy at Underwood, N. Dak. The dryer capacity was 2 tons/hr and was designed for determining the economics of drying North Dakota lignite using low-temperature waste heat and determining the effectiveness of concentrating impurities such as mercury, ash and sulfur using the gravimetric separation capabilities of a fluidized bed.

Coal streams in and out of the dryer included the raw coal feed, processed coal stream, elutriated fines stream and the segregation stream. During tests, coal samples were taken from these streams and analyzed for moisture, heating value, sulfur, ash and mercury. Some of the samples were sized and further analysis was done on various size fractions.

The pilot coal dryer was instrumented to allow experimental determination of drying rates under a variety of operating conditions. A data collection system allowed the recording of dryer instruments on a 1-minute bases. The installed instrumentation was sufficient to allow for mass and energy balance calculations on the system.

Figure 28:
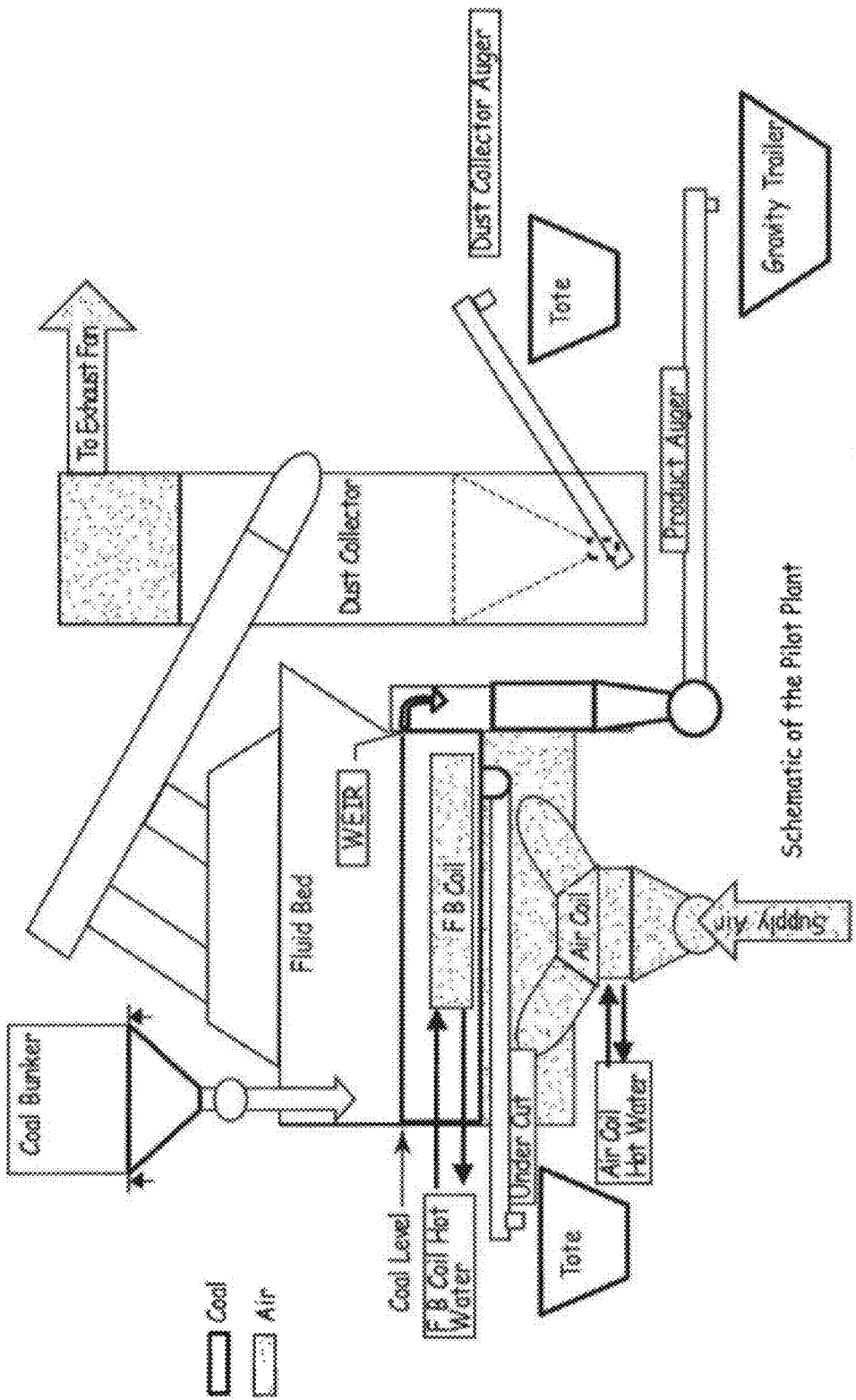
FIG. 28 is a schematic of a two-stage fluidized-bed pilot dryer of the present invention.

The main components of the pilot dryer were the coal screen, coal delivery equipment, storage bunker, fluidized bed dryer, air delivery and heating system, in-bed heat exchanger, environmental controls (dust collector), instrumentation, and a control and data acquisition systems (See FIG. 28). Screw augers were used for feeding coal in and products out of the dryer. Vane feeders are used to control feed rates and provide air lock on the coal streams in and out of the dryer. Load cells on the coal burner provided the flow rate and total coal input into the dryer. The segregation stream and dust collector elutriation were collected in totes which were weighted before and after the test. The output product stream was collected in a gravity trailer which was equipped with a scale. The coal feed system was designed to supply ¼-minus coal at up to 8000 lbs/hr to the dryer. The air system was designed to supply 6000 SCFM @ 40 inches of water. An air heating coil inputted 438,000 BTU/hr and the bed coil inputted about 250,000 BTUs/hr. This was enough heat and air flow to remove about 655 lbs of water per hour.

Typical tests involved filling the coal bunker with 18,000 lbs of ¼" minus coal. The totes would be emptied and the gravity trailer scale reading recorded. Coal samples on the feed stock were collected either while filling the bunker or during the testing at the same time interval as the dust collector, segregation stream and gravity trailer samples (normally every 30 minutes after achieving steady state.) The dust collector and all product augers and air locks were then started. The supply air fan was started and set to 5000 scfm. The coal feed to the dryer was then started and run at high speed to fill the dryer. Once the bed was established in the dryer, the air temperature was increased, heating was lined up to the bed coil, and the air flow adjusted to the desired value. The tests were then run for a period of 2-3 hours. One test was run for eight hours. After the test, the totes were weighed and the gravity trailer scale reading recorded. Instrument reading from the test was transferred to an excel spread sheet and the coal samples taken to the lab for analysis. The totes and gravity trailer were then emptied in preparation for the next test.

During the Fall of 2003, 150 tons of lignite was sent through the single-stage pilot dryer with a distributor area of 23.5 ft$^2$ in 39 different tests. Coal was fed into the fluidized bed at rates between 3000 to 5000 lbs/hr. Air flows were varied from 4400 (3.1 ft/sec) to 5400 (3.8 ft/sec) scfm. The moisture reduction in the coal is a function of the feed rate and the heat input to the drier. The 1$^{st}$ pilot module had the ability to remove about 655 lb water per hour at the design water temperatures of 200° F. Feeding coal at 83.3 lbs/min, one would expect a water removal rate of 0.13 lbs/lb coal.

During the Summer of 2004, the dryer was modified to two stages to improve non-fluidized particle removal, and a larger bed coil was installed. After modifying the dryer module, the drying capability was increased to about 750,000 BTU/hr with a water removal rate of 1100 lbs/hr. An additional 50 tons of coal was dried in the new module. The modified module also allowed for the collection of an segregation stream off the 1$^{st}$ stage. The segregation stream was non-fluidized material which was removed from the bottom of the 1$^{st}$ stage. It was primarily made up of oversized and higher density material that was gravimetrically separated in the 1$^{st}$ stage. The total distributor plate area was 22.5 ft$^2$.

Table 2 shows the coal quality for the dryer feed, elutriation, segregation and product streams. The data indicates that the elutriation stream was high in mercury and ash, the segregation stream was high in mercury and sulfur, and the product stream experienced a significant improvement in heating value, mercury, ash, and # SO$_2$/mBTUs. The elutriation stream was primarily 40-mesh-minus and the segregation stream was 8-mesh-plus.

TABLE 2

Coal Feed Quality Verses Product Streams Test 44

| Coal | Pounds | Mercury ppb | Ash % | HHV BTUs/lb | Sulfur % | #SO$_2$/mbtu |
|---|---|---|---|---|---|---|
| Feed | 14902 | 91.20 | 18.05 | 5830.00 | 0.53 | 1.82 |
| Segregation Stream | 2714 | 100.61 | 15.41 | 6877.00 | 0.76 | 2.20 |
| Elutriation | 789 | 136.58 | 30.26 | 5433.75 | 0.50 | 1.86 |
| Product | 7695 | 65.83 | 14.22 | 7175.25 | 0.55 | 1.54 |

Therefore, Test 44 reduced the mercury and sulfur in the coal product stream by 40% and 15%, respectively.

Figure 29:
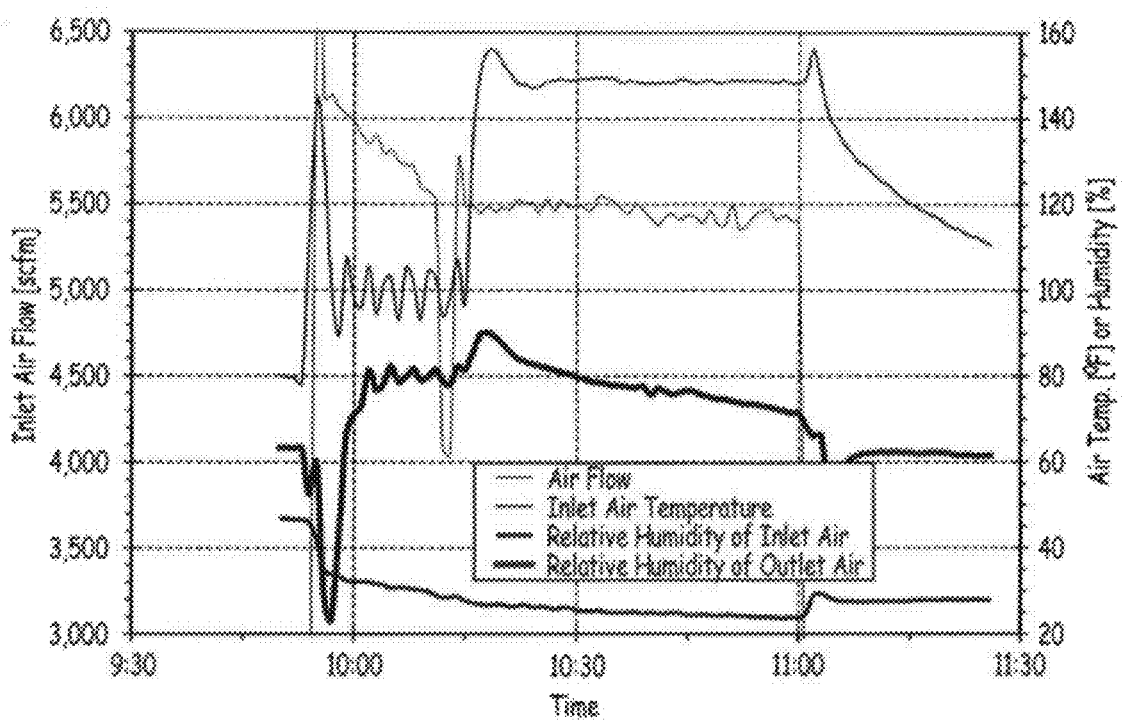
FIGS. 29-30 are graphical depictions of several operational characteristics of the fluidized-bed dryer of FIG. 28.

Time variation of bed temperature, measured at six locations within the bed, and outlet air temperature are presented in FIG. 29. This information was used, along with the information on coal moisture content (obtained from coal samples), to close the mass and energy balance for the dryer and determine the amount or removed moisture from coal.

Figure 30:
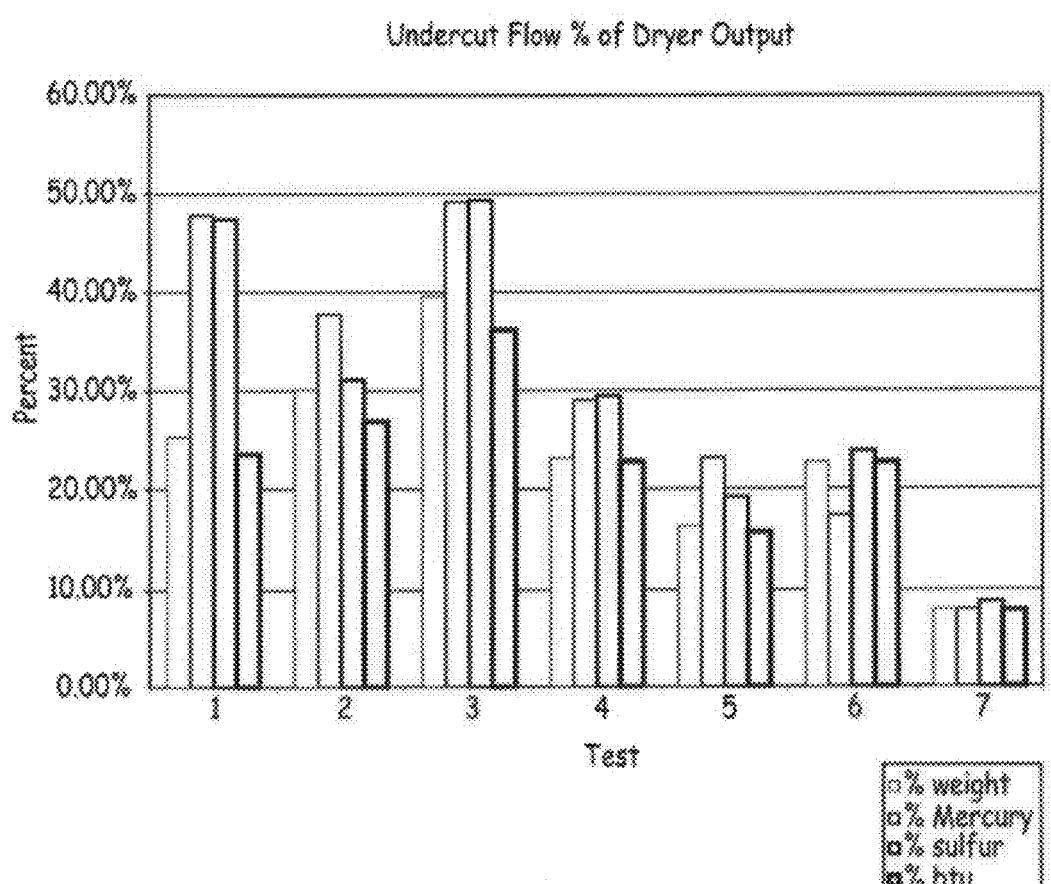

FIG. 30 shows the makeup of the segregation stream product for the 7 tests using the modified pilot dryer. Test 41 had the best results with the segregation stream containing 48% of the sulfur and mercury and only 23% of the Btu and 25% of the weight.

Example VI

Some More Particle Segregation Results

Between September and December 2004, 115 tons of Canadian Lignite was dried at the modified, two-stage pilot dryer located at Underwood, N. Dak. Between 3 and 20 tons of material was run through the dryer during a daily test at flow rates of 2000-7000 lbs/hr. This produced coal with moisture levels of 15-24% from a 31% moisture feed stock.

Load cells on the coal bunker provided the flow rate and total coal input into the dryer. The segregation stream and dust collector elutriation was collected into totes, which were weighed before and after each test. The output product stream was collected in a gravity trailer, which was equipped with a scale. The coal feed system was designed to supply ¼-minus coal particles at up to 8000 lbs/hr to the dryer. The air system was designed to supply 6000 SCFM at 40 inches of water. An air heating coil input of 438,000 BTU/hr and a bed coil input of about 500,000 BTU/hr were applied to the dryer. This was enough heat and air flow to remove about 900 pounds of water per hour, depending upon ambient conditions and the temperature of the heating fluid.

The dryer output was typically 20% elutriation and segregation stream, and 80% product at 7000 lbs/hr flow rates with their percentage increasing as the coal flow to the dryer was reduced. Samples were collected off each stream during the tests and compared with the input feed. The segregation stream ("SS") flow was typically set at 420-840 lbs/hr. As the flow to the dryer was reduced, this became a larger percentage of the output stream. The elutriation stream also tended to increase as a percentage of the output as the coal flow was reduced. This was attributed to longer residence time in the dryer and higher attrition with lower moisture levels.

Typical tests involved filling the coal bunker with 18,000 pounds of ¼-inch-minus coal. Lignite coal sourced from Canadian Mine No. 1 was first crushed to 2-inch-minus. The material was then screened, placing the ¼-inch-minus material (50%) in one pile and the ¼-inch-plus material (50%) in another pile. The pilot dryer was then filled by adding alternating buckets from the two piles. The ¼-inch-plus material was run through a crusher prior to being fed up to the bunker, and the ¼-inch-minus material was fed in directly. Lignite coal sourced from Canadian Mine No. 2 was run directly through a crusher and into the pilot bunker without screening. Coal samples on the feed stock were collected from the respective stock piles. The dust collector ("DC"), segregation stream ("SS"), and gravity trailer ("GT") samples were taken every 30 minutes after achieving steady state. When running the large amounts of the Mine No. 1 coal through the dryer, samples were taken daily with a grain probe on the gravity trailer, DC tote, and UC tote.

The totes were emptied and the gravity scale reading recorded. The dust collector and all product augers and air locks were then started. The supply air fan was started and set to about 5000 SCFM. The coal feed to the dryer was then started and run at high speed to fill the dryer. Once the bed was established in the dryer, the air temperature was increased, heating water lined up to the bed coil, and the air flow adjusted to the desired value. The tests were then run for a period of 2-7 hours. The bed was not always emptied between tests and the nominal 3000 pounds of material accounted for in the results.

Tables 3-4 tabulate the results of the Canadian Lignite tests. Table 3 contains the dryer input, sum of the output streams, actual and calculated, based upon the change in total moisture and the input. Table 4 contains data on the three output streams for the Mine No. 1 Coal Tests.

TABLE 3

Test Summary

| Test | Dryer Input (lbs) | Actual Dryer Output (lbs) | Calculated Dryer Output (lbs) | Percent Difference |
|---|---|---|---|---|
| Test 49 on Mine No. 2 Coal | 6829 | 6088 | 6176 | 1.5 |
| Test 50 on Mine No. 2 Coal | 6871 | 5840 | 5522 | −5.4 |
| Test 52 on Mine No. 1 Coal | 108,517 | 95,474 | 95,474 | 0 |
| Test 57 on Mine No. 1 Coal | 38,500 | 33,206 | 32,931 | −0.8 |
| Test 58 on Mine No. 1 Coal | 7927 | 6396 | 6478 | 1.3 |
| Test 59 on on Mine No. 1 Coal | 27,960 | 25,320 | 25,278 | −0.2 |

TABLE 4

Mine No. 1 Coal Tests 52, 57, and 59 Results

| Output | Tot. Moisture | BTU | % Output | % BTU | % Sulfur | % Mercury | % Ash |
|---|---|---|---|---|---|---|---|
| 52DC | 19.53 | 7117 | 10.1 | 9.26 | 8.54 | 14.24 | 14.21 |
| 52SS | 20.3 | 7280 | 6.9 | 6.48 | 16.83 | 12.97 | 9.36 |
| 52GT | 21.93 | 7869 | 83.02 | 84.26 | 74.63 | 72.79 | 76.43 |
| 57DC | 20.1 | 6019 | 8.62 | 7.11 | 5.69 | 10.0 | 11.81 |
| 57SS | 16.4 | 5321 | 10.85 | 7.90 | 41.52 | 44.23 | 20.78 |
| 57GT | 19.65 | 7711 | 80.53 | 84.99 | 52.79 | 45.76 | 67.4 |
| 58DC | 18.43 | 6721 | 7.60 | 6.54 | 5.35 | 8.70 | 9.63 |
| 58SS | 12.40 | 6375 | 18.96 | 15.48 | 45.38 | 44.03 | 33.49 |
| 58GT | 16.09 | 8294 | 73.44 | 77.98 | 49.28 | 47.27 | 56.88 |
| 59DC | 23.24 | 6324 | 11.49 | 9.46 | 11.65 | N/A | 22.54 |
| 59SS | 30.14 | 6850 | 15.05 | 13.41 | 13.43 | N/A | 15.66 |
| 59GT | 22.42 | 8069 | 73.46 | 77.13 | 74.92 | N/A | 61.8 |

Tests 52, 57, 58, and 59 were conducted on the Mine No. 1 coal. Test 58 was a controlled test, and for Tests 52, 57, and 59 the bunker was being filled with coal during the dryer operation.

Test 52 was conducted for the purpose of removing about 25% of the water in the coal, and then bagging it for shipment to GTI for further testing. During this type of testing, we were filling the bunker at the same time material was being fed into the dryer, thereby making it difficult to track the input. For this test, the input was estimated by correcting the total output back to the coal feed total moisture. Test 52 was conducted on six separate days over a three-week period. After the second day of the test, the bed was not dumped, and the coal remained in the dryer for two-plus days in a fairly dry condition. This coal started smoldering in the SS tote and in the dryer bed. When the dryer was started, ignition took place, and several of the explosion panels needed to be replaced. The very dry condition of the coal and the period of time it sat, as well as the temperature of the bed when the unit was shut down contributed to this problem. We discontinued leaving coal in the dryer bed without proper cool down, and for not longer than one day. This seemed to eliminate the problem.

Tests 57, 58, and 59 were all one-day tests. During Tests 57 and 59, coal was added to the bunker during dryer operation, and we needed to estimate the coal feed. Test 57 was conducted at a coal inlet flow rate of about 7000 lbs/hr. Tests 58 and 59 were conducted at an inlet coal flow of about 5000 lbs/hr. The cooler temperature of early December had reduced the dryer's capacity. The mercury analyzer malfunctioned during Test 59.

The results of Table 4 provide good evidence that the segregation stream is capable of removing a significant amount of the sulfur and mercury from the coal feed stream, while retaining the heat value of the coal feed stream.

Example VII

Prototype System Results

Figure 60:
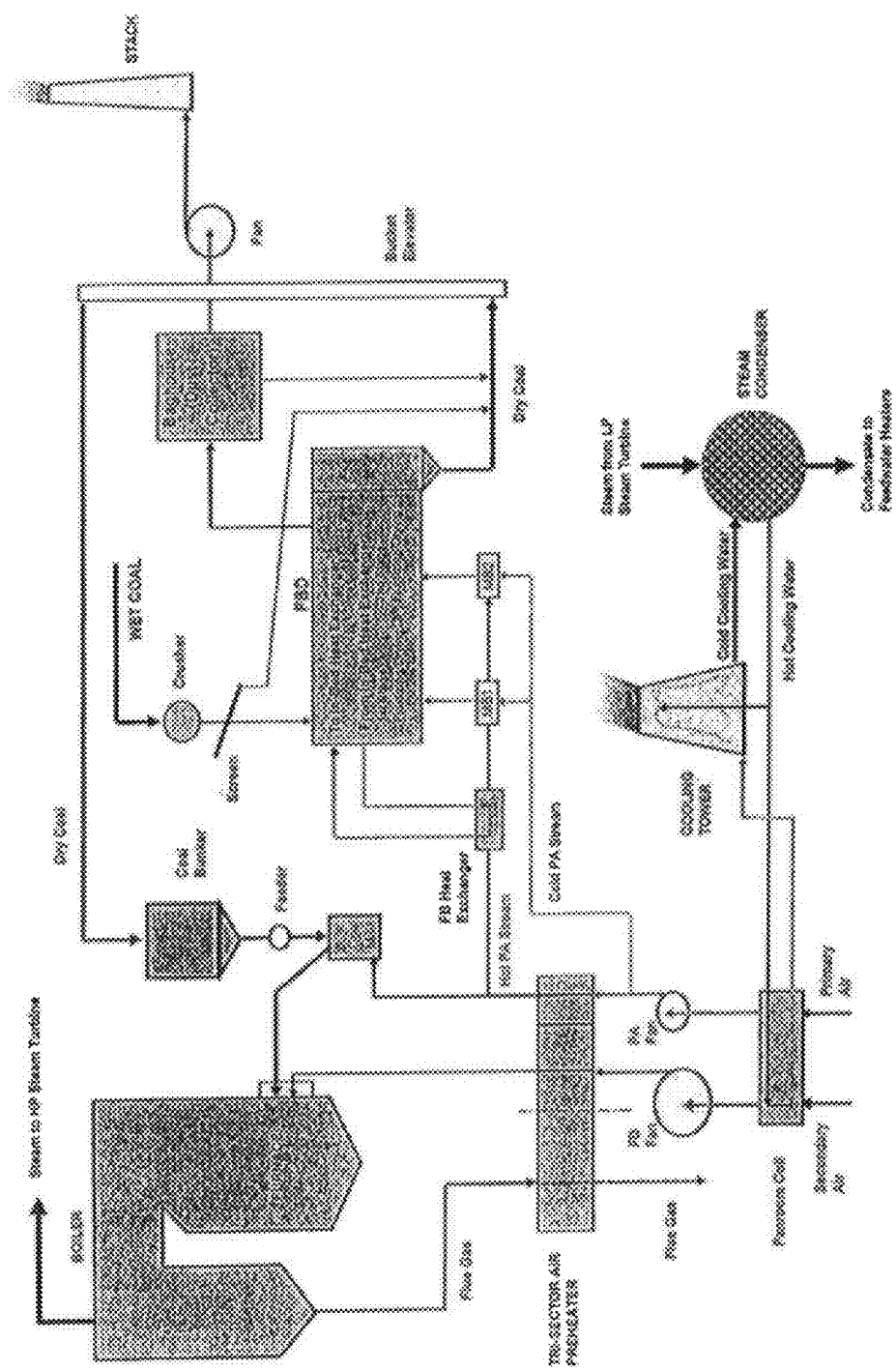
FIG. 60 is a schematic diagram of the prototype dryer system of the present invention.

The prototype coal drying system employed at Coal Creek is based on using waste heat from the steam condenser and hot flue gas to heat the air used for coal drying. The process flow diagram is presented schematically in FIG. 60.

The prototype coal drying system and FBD were designed by a design team assembled by Great River Energy ("GRE"). Fluidizing/drying air was heated indirectly by a source of hot water used to simulate the diversion of a portion of the hot cooling water from the main cooling water stream and passing it through a water-to-air heat exchanger (fanroom coil) to increase the temperature of the air at the air preheater (APH) inlet.

A portion of the primary air (PA) stream, referred to as the cold PA flow, was extracted from the main PA flow downstream of the fanroom coil and upstream from the APH. The rest of the PA flowed through the APH where its temperature is increased. A portion of the PA flow, referred to as the hot PA flow, was extracted downstream from the APH. The remaining portion of the PA flowed to the coal mills.

The hot PA flowed through an air-to-water heat exchanger where it exchanged heat with the water which circulates through heat exchangers immersed in the fluidized bed (in-bed heat exchangers). After exchanging heat with the circulating water, the warm PA was mixed with the cold PA in Mixing Boxes 1 and 2 (MB 1 and 2). The mixture of these two PA streams formed a fluidizing/drying air stream for the first and second stages of the coal dryer. With this prototype design, it was possible to vary the temperature of the fluidizing/drying air stream by changing the ratio of the hot and cold PA flow streams.

This arrangement made it possible to increase the temperature of the fluidizing/drying air and the temperature of the hot circulating water to the in-bed heat exchanger from the 110° F. level to 200° F. and higher. This significant temperature increase had a large positive effect on the flow rate of fluidizing/drying air and FBD distributor size, and the size of the in-bed heat exchanger, which were reduced as temperature of the fluidizing air and heat source is increased.

The hot PA flow required for the FBD flowed through the APH along with the PA flow required for the mills. This increased the total PA flow and, in turn, the total air flow through the APH. As a result, the APH cooling capacity and the APH capacity rate ratio (the X-ratio) increased, and flue gas temperature at the APH outlet was lowered. Lower exit flue gas temperature further improves boiler efficiency and unit performance.

Coal feed for the dryer was supplied from existing coal bunker No. 28. The wet coal (feed stream) is fed by a vibrating coal feeder to a coal crusher and crushed and sieved to −¼". The crushed coal is screened by a vibrating screen and conveyed to the dryer inlet hopper. Two rotary coal feeders (air locks) fed coal to the first stage of the FBD. The screen bypass flow was mixed with a product stream leaving the dryer employing a bypass conveyer. Mixing of the two streams took place downstream of the coal sampling location.

The dried coal (product stream) leaving the dryer was stored in coal bunker No. 26, feeding coal mill 26. A coal conveyor and bucket elevator were used to transport dried coal to the No. 26 bunker. As product stream was transported from the dryer to the bunker, it cooled down, and its temperature dropped by approximately 10° F.

The prototype coal-drying system was designed in modular fashion to allow incremental drying of the coal. Each coal-drying module will dry a portion of the total coal flow and also included environmental controls (baghouse for dust control). With all four coal-drying modules in service it will be possible to dry 100% of the coal feed.

Fluidization and heating of coal and removal of coal moisture was accomplished within the fluidized bed by hot fluidization air. The air stream was cooled and humidified as it flowed upwards through the coal bed. The quantity of moisture, which could be removed from the bed of fluidized coal, was limited by the drying capacity of the fluidization air stream. The drying capacity of the fluidization air stream could be increased by supplying additional heat to the bed by the in-bed heat exchanger. The in-bed heat exchanger not only increased drying capacity of the fluidizing air stream but also it reduced the quantity of drying air required to accomplish a desired degree of coal drying. With sufficient in-bed heat transfer surface, the fluidizing/drying air stream could be reduced to the value corresponding to 1 to 1.2 m/s superficial fluidization velocity.

The prototype dryer design data are summarized in Table 5. The total distributor area was 308 ft$^2$, and the total in-bed heat exchanger area was 8,636 ft$^2$. The dryer was fluidized by using 305 klbs/hr of air, resulting in a superficial fluidization velocity in the 1.0 to 1.2 m/s range.

As the data in Table 5 show, the heat transfer area for individual bed coils, depending on their design, varied from 1,144 to 1,982 ft$^2$. The average heat transfer coefficient for finned tubes of 18 Btu/hr-ft$^2$-° F. was determined experimentally by GRE and Barr engineers.

TABLE 5

Prototype Dryer Design Data

| Prototype Coal Dryer Parameter | Units | Prototype Value |
|---|---|---|
| Distributor Area | ft$^2$ | 308 |
| First Stage Fluidizing Air Flow | klbs/hr | 55 |
| Second Stage Fluidizing Air Flow | klbs/hr | 250 |
| Expanded Bed Depth | " | 38 to 40 |
| In-Bed Heat Exchanger No. 1 HT Area | ft$^2$ | 1,982 |
| In-Bed Heat Exchanger No. 2 HT Area | ft$^2$ | 1,696 |
| In-Bed Heat Exchanger No. 3 HT Area | ft$^2$ | 1,982 |
| In-Bed Heat Exchanger No. 4 HT Area | ft$^2$ | 1,832 |
| In-Bed Heat Exchanger No. 5 HT Area | ft$^2$ | 1,144 |
| Total In-Bed Heat Exchnager Area | ft$^2$ | 8,636 |
| Total Exchanged Heat, In-Bed HXE | MBTU/hr | 16.53 |
| Average Heat Transfer Coefficient | BTU/hr-ft$^2$-° F. | 18.08 |
| Total Water Flow Through the In-Bed Heat Exchangers, Actual | gpm | 1,588 |
| Total Water Flow Through the In-Bed Heat Exchangers, Indicated | gpm | 1,363 |

The flow rate of circulating water through all bed coils, measured by a test-grade flow meter, was approximately 1,600 gpm (758 klbs/hr). The value indicated by the plant flow meter was approximately 14% lower (i.e., 650 klbs/hr).

Sixteen dryer performance tests were performed during time period from Mar. 22$^{nd}$ to May 12$^{th}$ 2006, under controlled conditions with a baseline coal feed rate of 75 t/hr, fluidization air temperature in the 165 to 190° F. range, and average bed coil temperature of 210° F. Under these operating conditions, in-bed heat input to the dryer was in the 15 to 16 MBtu/hr range.

Figure 61:
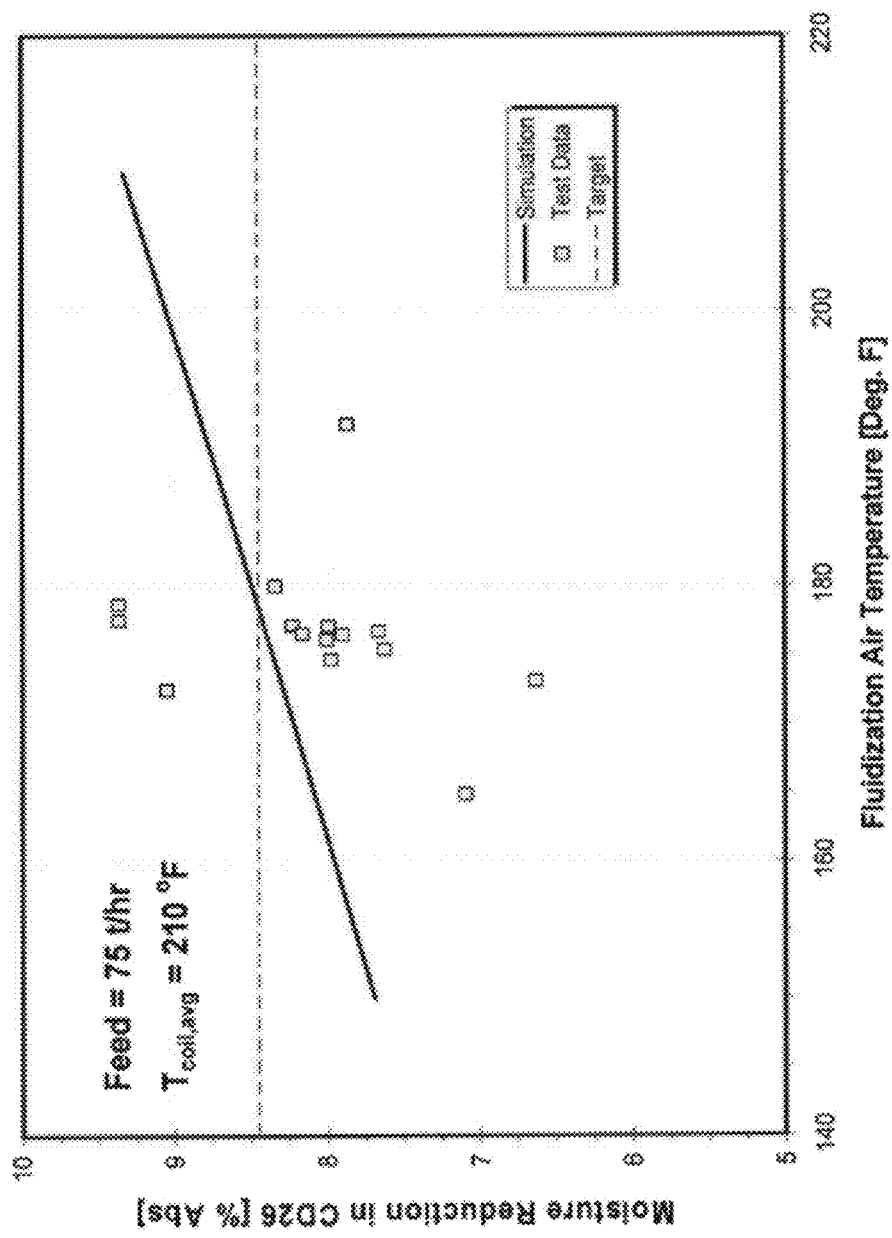
FIGS. 61-73 are graphical depictions of different measures of performance for the prototype dryer.
Figure 62:
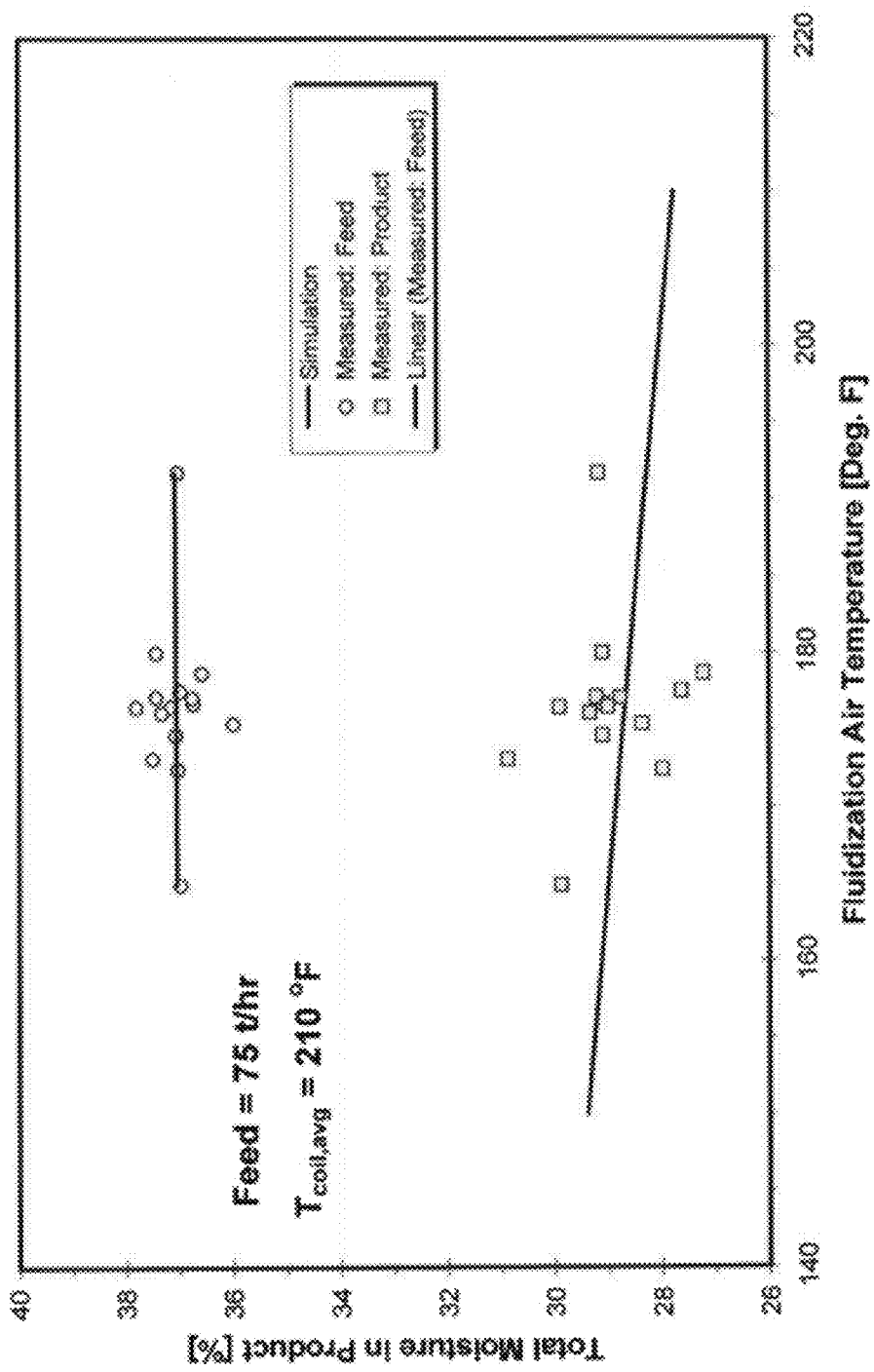

A comparison of measured and predicted (simulated) dryer performance is presented in FIGS. 61 and 62. The total moisture content measured in the product stream is presented in FIG. 61 as a function of fluidization air temperature. Dryer simulation results are represented by a solid line. As FIG. 61 shows, there is a very good agreement between the measured and predicted product moisture contents. The results also show that the prototype dryer was operated with a relatively low fluidization air temperature. Increasing the fluidization temperature will have a positive effect on dryer performance.

FIG. 62 compares the measured and predicted coal moisture reduction in the prototype dryer. Except for a few test points, there is very good agreement between the measurements and simulation. The target moisture removal level, of 8.45%, was easily reached by operating the prototype dryer with fluidization temperature at or above 180° F.

Figure 63:
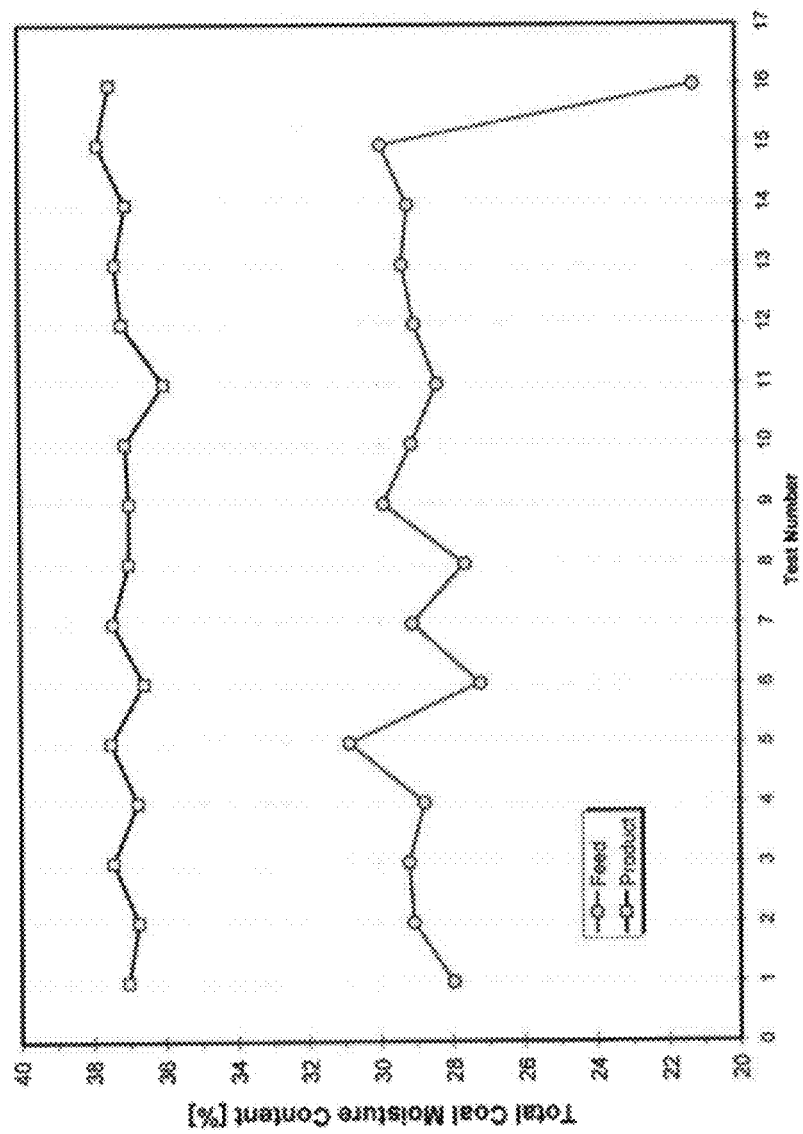
Figure 64:
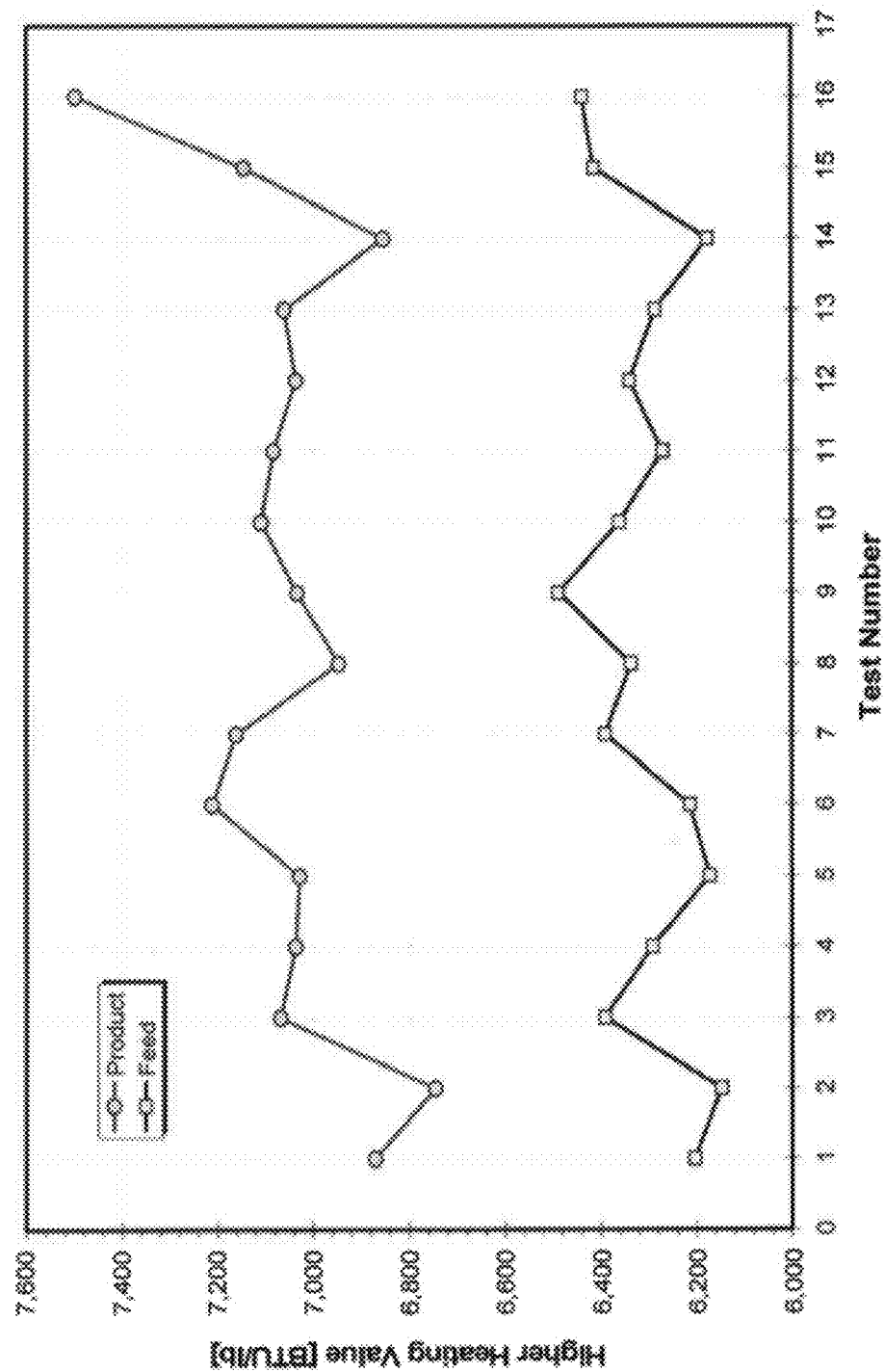
Figure 65:
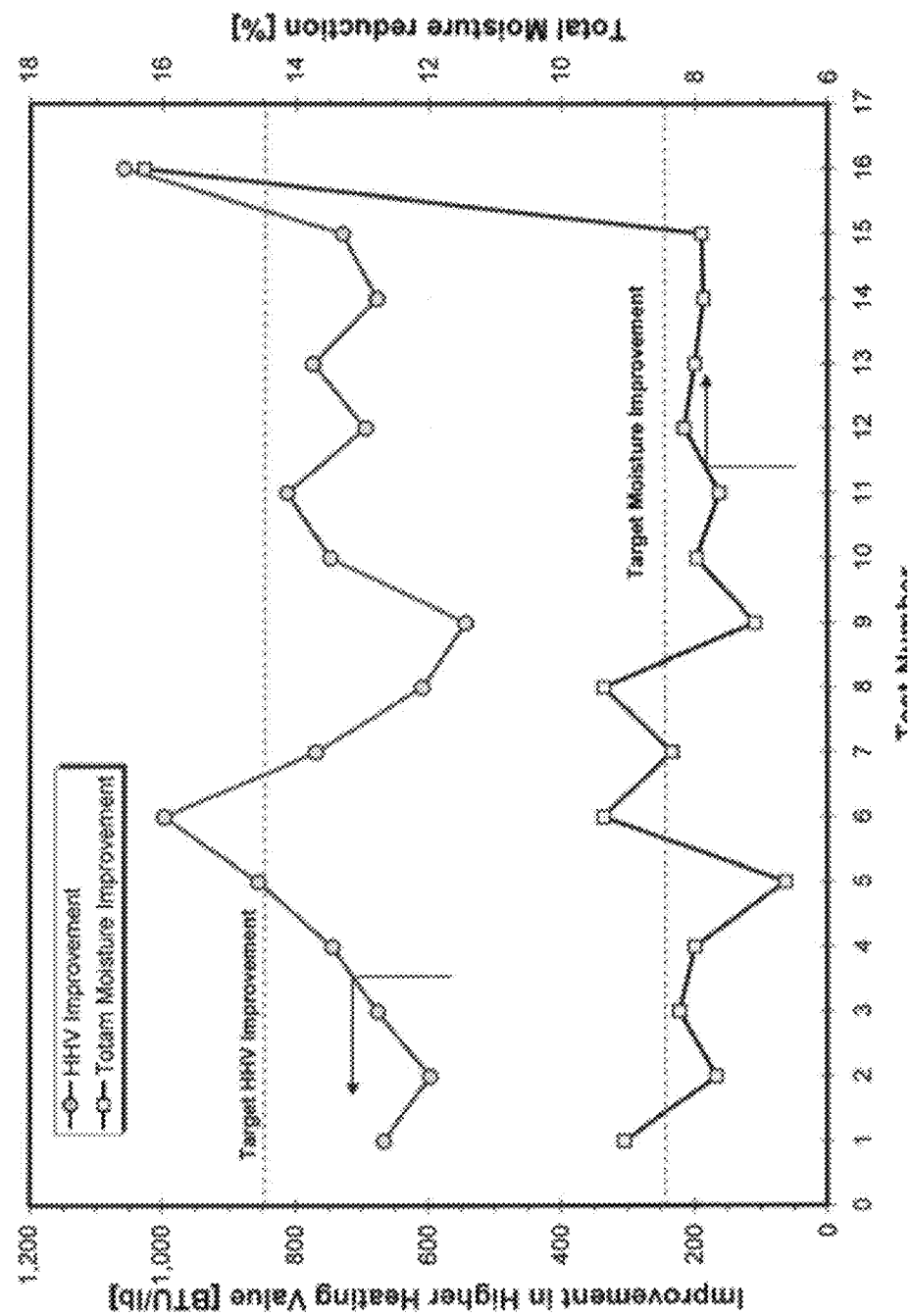

The total coal moisture (TM) and higher heating value (HHV) measured in the feed and product streams during the controlled dryer tests are summarized in Table 6 and presented in FIGS. 63 and 64. The Test 16 results show a much lower TM content and higher HHV value compared to the other tests and were, therefore, not included in the statistical analysis of data. The results show that average moisture reduction was 8.08±0.42%. The HHV was on average improved by 727±62 Btu/lb. The random error in Table 6 represents the 95% confidence interval. The variation in TM and HHV during the controlled tests is presented in FIGS. 63 and 64. The improvement in HHV and reduction in total coal moisture content are presented in FIG. 65.

Figure 66:
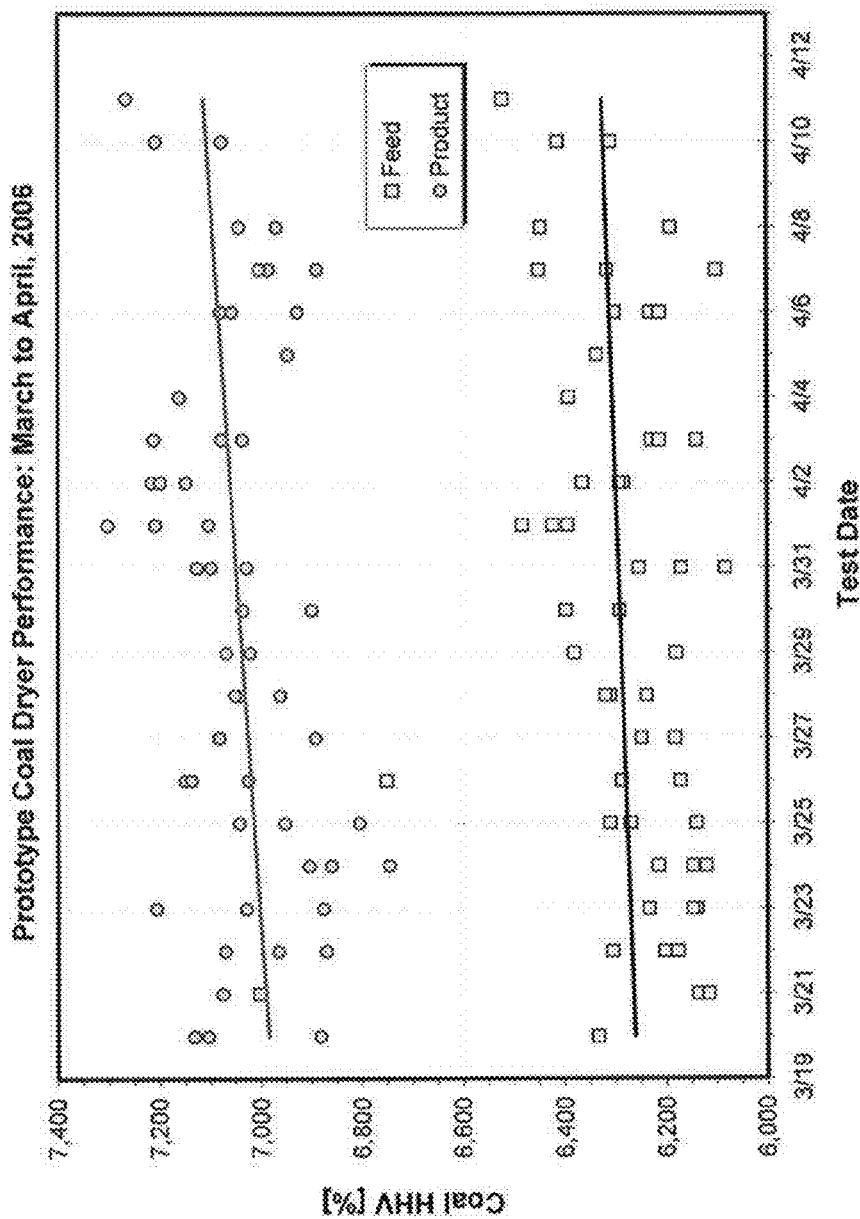
Figure 67:
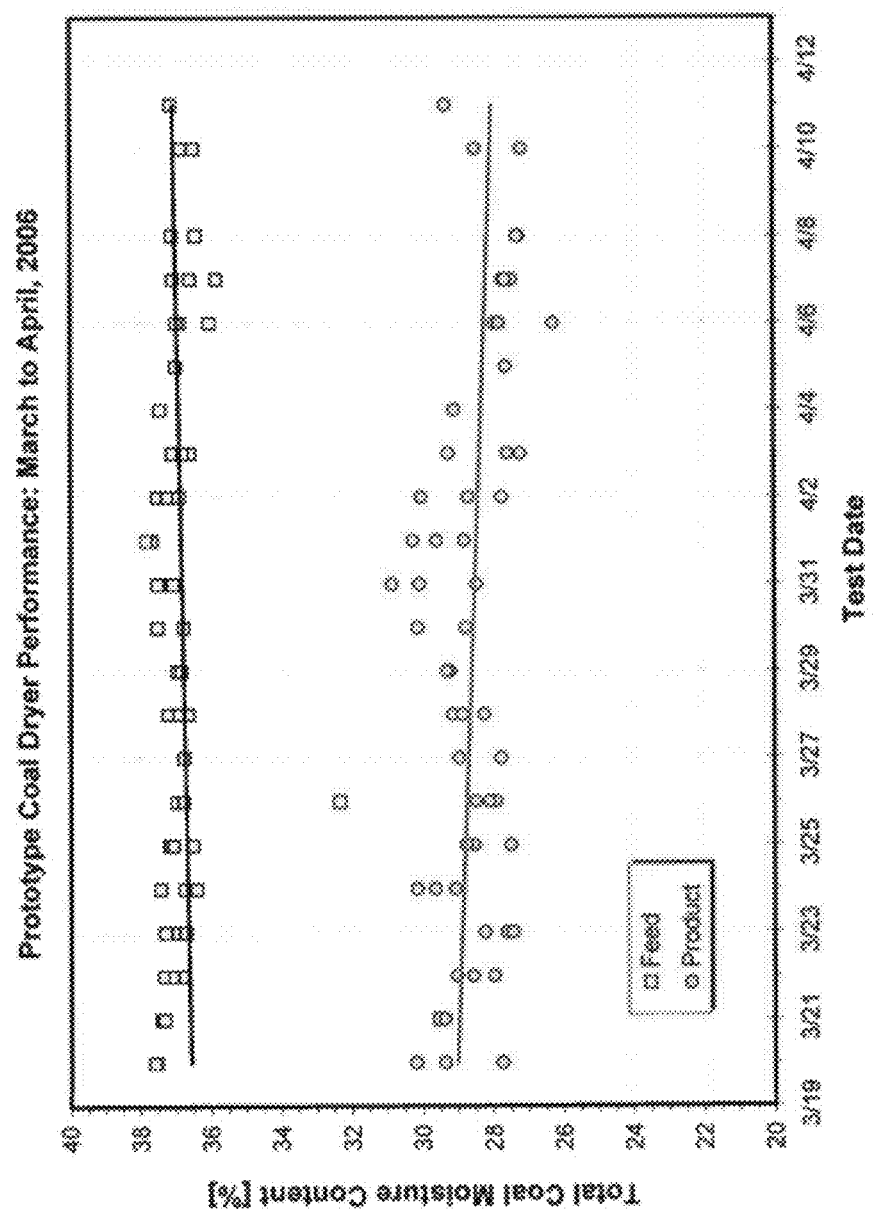
Figure 68:
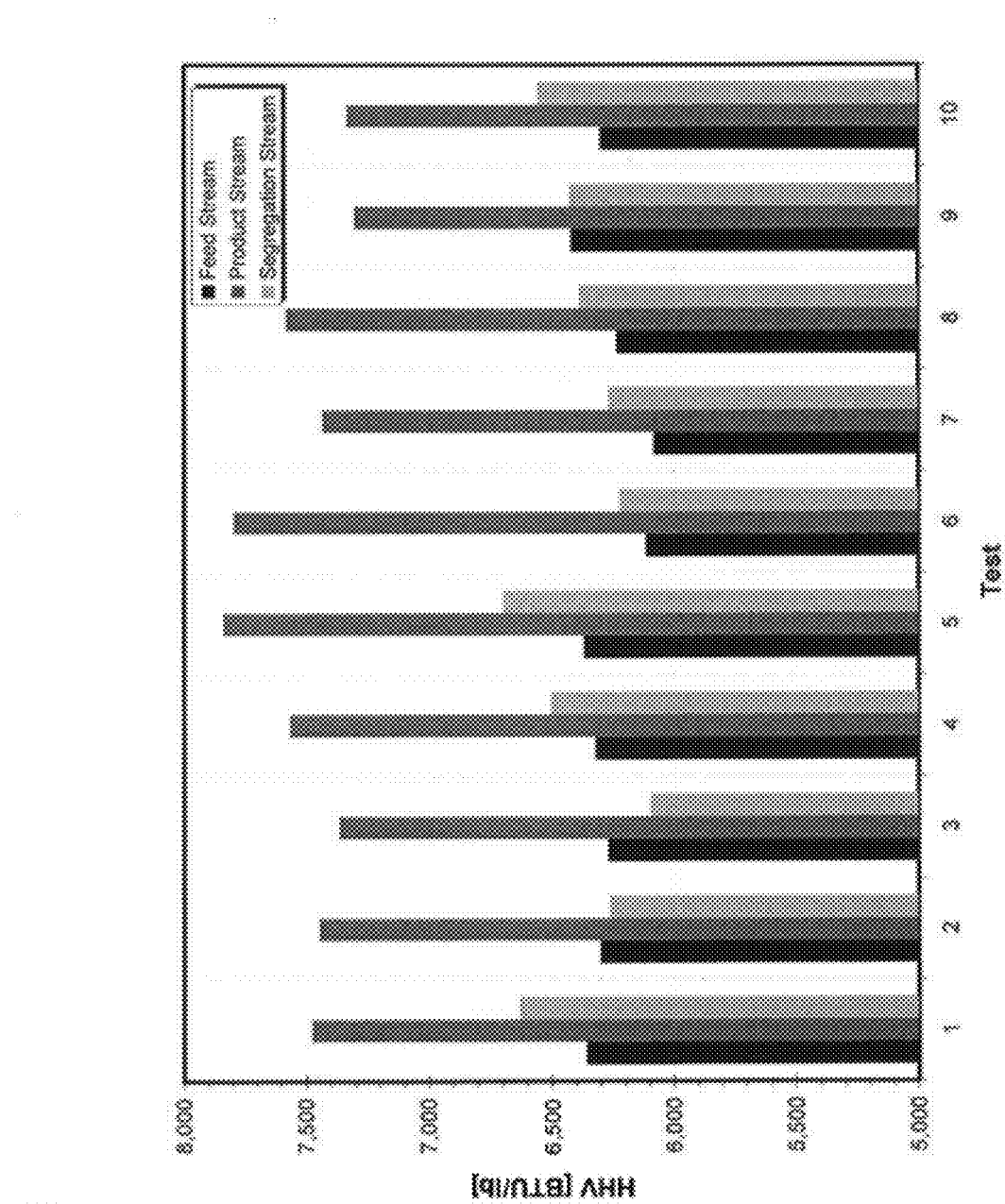
Figure 69:
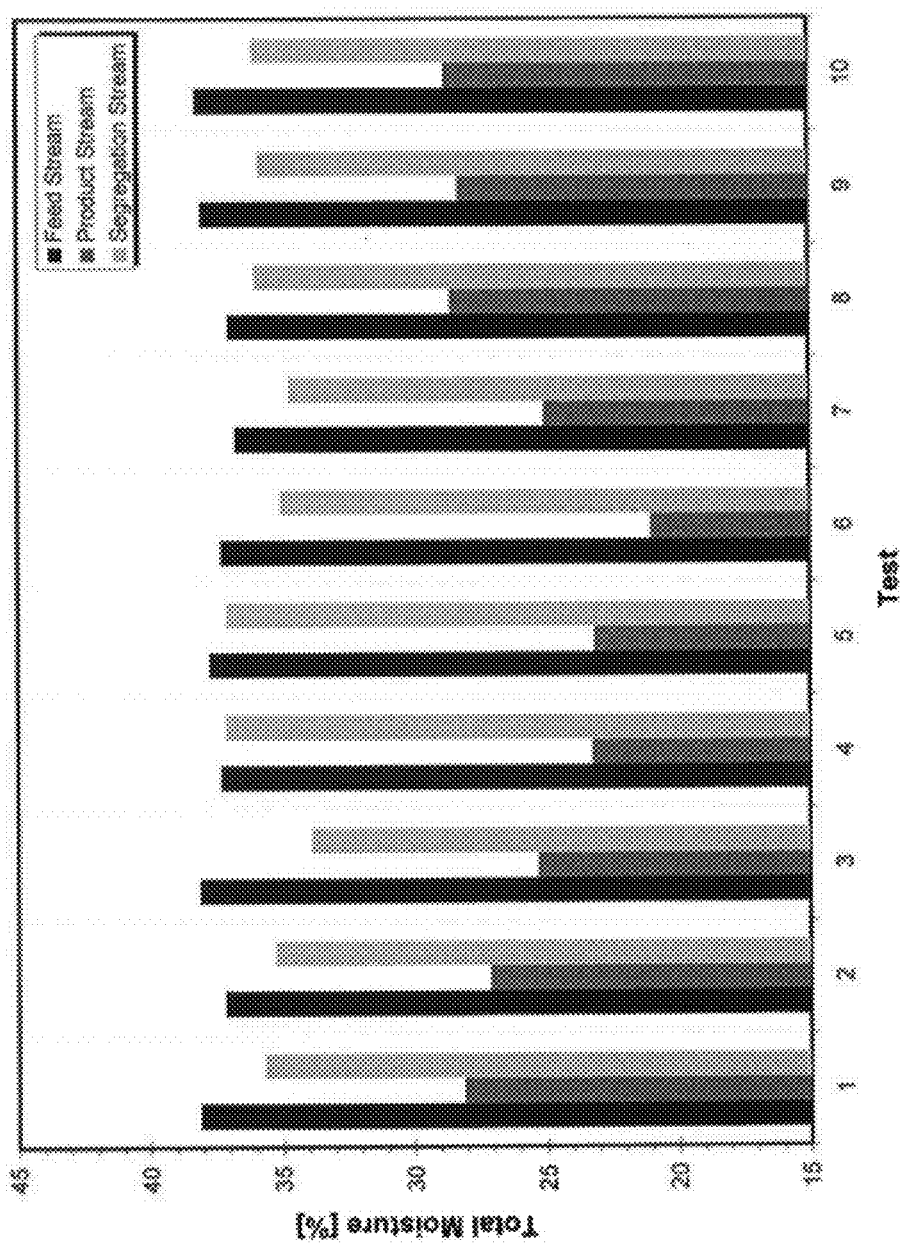
Figure 70:
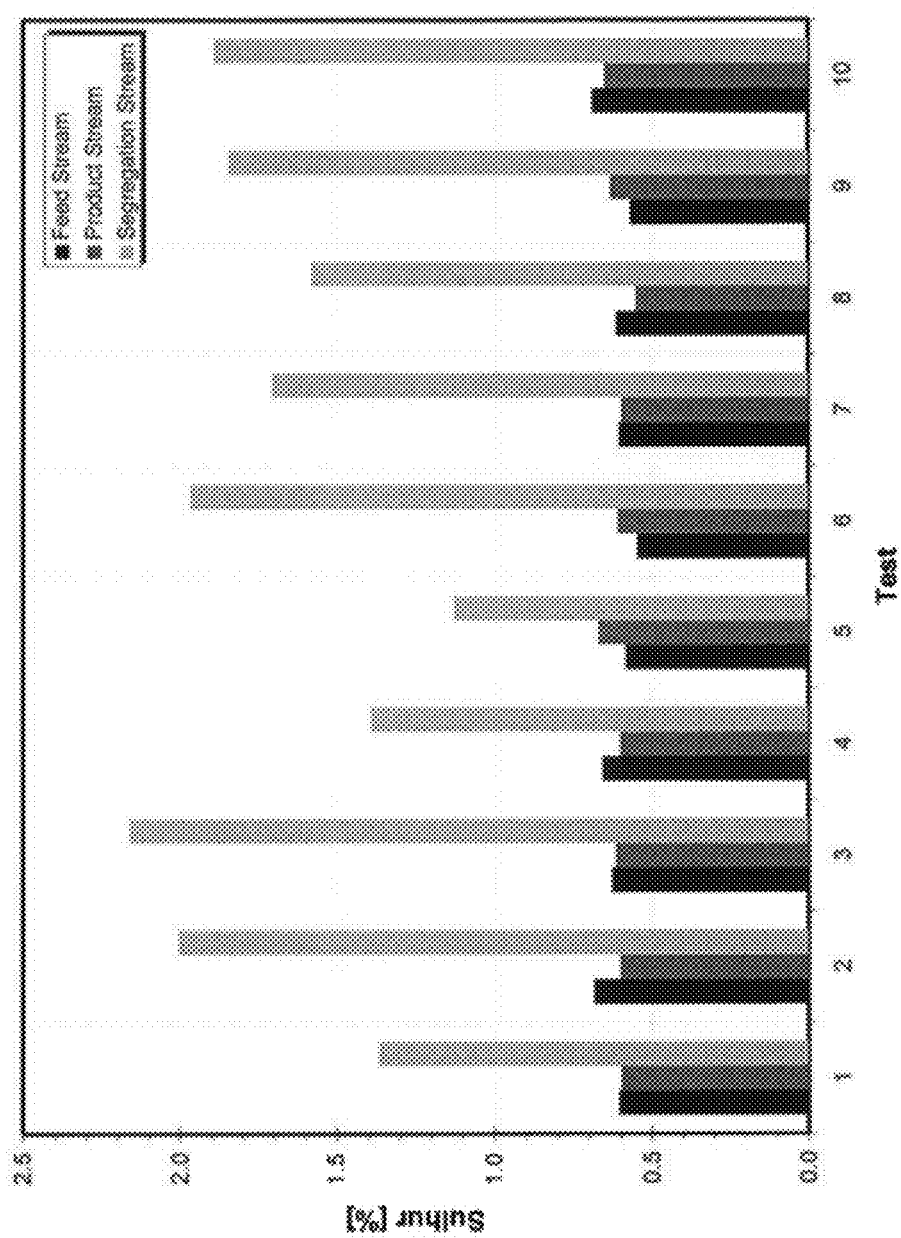
Figure 71:
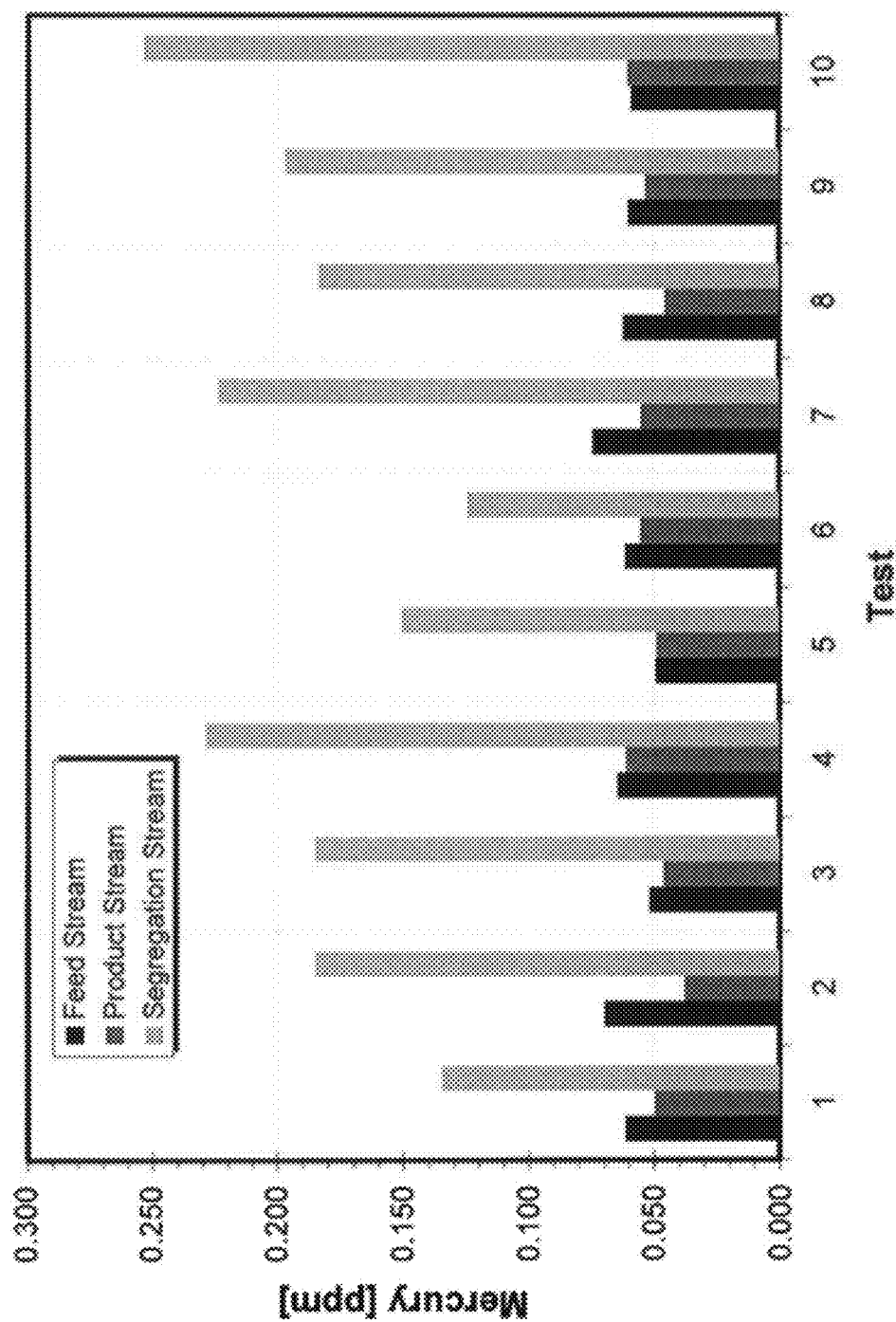

Coal quality data were collected during regular dryer operation for the time period from March to April, 2006. Results are presented in Table 7 and FIGS. 66 and 67.

TABLE 7

Regular Dryer Performance: Coal Moisture and HHV

| Parameter | Feed TM % | Product TM % | Change TM % Abs | Change TM % Rel |
|---|---|---|---|---|
| Average Total Moisture, TM | 36.78 | 28.55 | 8.23 | 22.4 |
| Std. Deviation | 1.26 | 1.00 | 1.07 | |
| Std. Deviation of the Mean | 0.34 | 0.27 | 0.30 | |

TABLE 7-continued

Regular Dryer Performance: Coal Moisture and HHV

| Parameter | Feed HHV [BTU/lb] | Product HHV [BTU/lb] | Change HHV [BTU/lb] | Change HHV [%] |
|---|---|---|---|---|
| Average HHV | 6,290 | 7,043 | 752 | 12.0 |
| Std. Deviation | 159 | 121 | 131 | |
| Std. Deviation of the Mean | 43 | 33 | 37 | |

The average moisture reduction, achieved during regular dryer operation, was 8.23±0.6 percent. This is almost identical to the total moisture reduction achieved during the controlled performance tests. The improvement in HHV during regular dryer operation was 752±74 Btu/lb. Within the accuracy of the data, this is the same improvement in HHV achieved during the controlled dryer performance tests. This means that dryer performance, measured during the controlled tests, is sustainable over the long-term.

The maximum design coal feed rate for the prototype dryer is 112.5 tons per hour. With four dryers in service, each operating at the maximum feed rate, it would be possible to dry the total full-load coal feed for Unit 2 at Coal Creek (450 t/hr).

Three maximum capacity tests (CT1, CT2, and CT3) were performed from Jun. 21 to 23, 2006, where coal feed rate was increased from the baseline value of 75 t/hr first to 90 t/hr, and finally to the maximum value of 101 t/hr. The coal conveying system and dust collector fan power imposed a limit on the maximum coal feed rate, which felt short of the design value by 10%.

The maximum capacity test data are summarized in Tables 8-10. Operating conditions of the dryer, presented in Table 8, show that inlet temperatures of fluidizing air and circulating water were increased above the baseline values to accommodate higher coal feed to the dryer. With the maximum coal feed rate at 101 t/hr, fluidization air temperature was 40° F. higher compared to baseline operation, while the circulating water temperature was 20° F. higher. This was accomplished by increasing hot PA flow to the mixing boxes 1 and 2. With the feed rate at 101 t/hr, the dried coal represented 21% of the total coal feed to the boiler.

TABLE 6

Dryer Performance Tests: Coal Moisture and HHV

| CD 26 Test Number | TM [%] Product | TM [%] Feed | TM [% Abs] Reduction | Dry Coal Flow % of Total | HHV [BTU/lb] Product | HHV [BTU/lb] Feed | ΔHHV [BTU/lb] Difference |
|---|---|---|---|---|---|---|---|
| 1 | 27.98 | 37.03 | 9.05 | 14.28 | 6,871 | 6,203 | 668 |
| 2 | 29.08 | 36.74 | 7.66 | 14.28 | 6,746 | 6,148 | 598 |
| 3 | 29.21 | 37.44 | 8.22 | 13.79 | 7,069 | 6,392 | 677 |
| 4 | 28.77 | 36.76 | 7.99 | 13.91 | 7,037 | 6,292 | 745 |
| 5 | 30.87 | 37.50 | 6.63 | 13.32 | 7,028 | 6,172 | 857 |
| 6 | 27.22 | 36.58 | 9.36 | 13.84 | 7,212 | 6,214 | 997 |
| 7 | 29.10 | 37.44 | 8.34 | 14.28 | 7,162 | 6,392 | 770 |
| 8 | 27.63 | 36.99 | 9.36 | 14.29 | 6,947 | 6,337 | 610 |
| 9 | 29.88 | 36.98 | 7.09 | 14.26 | 7,033 | 6,489 | 544 |
| 10 | 29.10 | 37.07 | 7.97 | 14.14 | 7,109 | 6,361 | 748 |
| 11 | 28.37 | 36.00 | 7.63 | 14.29 | 7,084 | 6,270 | 814 |
| 12 | 29.00 | 37.16 | 8.16 | 14.29 | 7,035 | 6,340 | 695 |
| 13 | 29.34 | 37.34 | 8.00 | 14.29 | 7,060 | 6,285 | 775 |
| 14 | 29.17 | 37.03 | 7.86 | 14.29 | 6,854 | 6,176 | 679 |
| 15 | 29.91 | 37.81 | 7.90 | 14.29 | 7,145 | 6,415 | 730 |
| 16 | 21.19 | 37.47 | 16.28 | 13.90 | 7,499 | 6,440 | 1,059 |
| Average | 28.98 | 37.06 | 8.08 | 14.12 | 7,026 | 6,299 | 727 |
| Std. Dev | 0.92 | 0.44 | 0.75 | 0.29 | 125 | 102 | 112 |
| St. Error | 0.24 | 0.11 | 0.19 | 0.07 | 32 | 26 | 29 |
| Random Error | 0.51 | 0.24 | 0.42 | 0.16 | 69 | 56 | 62 |

Note:
The data from Test 16 are considered outliers and are not included in the calculated average and standard deviation values.

TABLE 8

Maximum Capacity Tests -- Dryer Operating Conditions

| Test | Date | Test Duration hours | Dryer Coal Feed t/hr | Total Coal Flow t/hr | Dried Coal % of Total | Fluidization Air Flow klbs/hr | Fluidization Temperature ° F. | Circulating Water Inlet Temperature ° F. | Circulating Water Outlet Temperature ° F. | In-Bed Heat Transfer MBTU/hr |
|---|---|---|---|---|---|---|---|---|---|---|
| 1 | Jun. 21, 2006 | 4 | 90 | 494.0 | 18.2 | 301 | 188 | 219 | 200 | 15.1 |
| 2 | Jun. 22, 2006 | 4 | 90 | 484.5 | 18.6 | 291 | 214 | 233 | 211 | 16.4 |
| 3 | Jun. 23, 2006 | 2 | 101 | 480.5 | 21.0 | 288 | 220 | 236 | 214 | 16.9 |

TABLE 9

Maximum Capacity Tests -- Coal Moisture Reduction

| | | | Coal Dryer | | Coal Feed to the Boiler | |
|---|---|---|---|---|---|---|
| Test | Coal Feed t/hr | Feed Moisture % | Product Moisture % | Moisture Reduction % Abs | Moisture Reduction % Rel | Average Coal Moisture % | Moisture Reduction % Abs |
| 1 | 90 | 35.2 | 27.9 | 7.3 | 20.7 | 33.9 | 1.3 |
| 2 | 90 | 36.8 | 27.4 | 9.4 | 25.5 | 35.1 | 1.7 |
| 3 | 101 | 36.4 | 29.1 | 7.3 | 20.1 | 34.9 | 1.5 |

TABLE 10

Maximum Capacity Tests -- Improvement in HHV

| | | | Coal Dryer | | Coal Feed to the Boiler | |
|---|---|---|---|---|---|---|
| Test | Coal Feed t/hr | Feed HHV BTU/lb | Product HHV BTU/lb | HHV Increase BTU/lb | HHV Increase % | Average Coal HHV BTU/lb | HHV Improvement BTU/lb | HHV Improvement % |
| 1 | 90 | 5,895 | 6,886 | 991 | 16.8 | 6,076 | 181 | 3.1 |
| 2 | 90 | 6,198 | 7,074 | 876 | 14.1 | 6,361 | 163 | 2.6 |
| 3 | 101 | 6,116 | 7,393 | 1,277 | 20.9 | 6,384 | 268 | 4.4 |

The reduction in coal moisture, achieved in the maximum capacity tests, is summarized in Table 9. The results show that the coal moisture reduction in the 7 to 9 percentage point range (20-26% relative) was achieved. The average coal moisture in the coal feed to the boiler (blend of dried and wet coal), was in the 1.3-1.7% range.

The coal HHV improved as moisture was removed from the coal in the prototype coal dryer, as shown in Table 10. The achieved HHV improvement was in the 875 to 1,280 Btu/lb range, or 14 to 21%. The improvement in the HHV of the boiler coal feed was in the 160 to 270 Btu/lb range, or from 2.6-4.4%.

The non-fluidizable material sunk to the bottom of the first dryer stage, and was removed from the dryer as the segregation stream by an mechanically-driven auger and a system of locks, gates and scrubbing boxes. Samples were taken from the segregation stream and analyzed to determine its composition. Results are presented in Tables 11 and 12 and in FIGS. 68 through 71 for baseline coal feed flow rate.

The total moisture, sulfur, and mercury content, and HHV of the feed, product, and segregation streams, determined from samples that were collected during the May-June time period, are summarized in Table 11. While the total moisture content of the product stream was significantly lower and its HHV higher compared to the feed stream, the moisture content and HHV of the undercut stream were similar to the feed stream. These experimental findings are in agreement with the dryer simulation results that show that only 10% of the total moisture removed in the dryer is removed in the first stage.

Table 12 presents the sulfur, mercury, and HHV of the segregation stream as percentages of the feed stream. The results show that approximately 30% of sulfur and mercury in the feed stream entering the dryer were removed in the first stage and discharged as the segregation stream. The segregation stream also contained approximately 10% of the inlet HHV. Additional processing of the segregation stream was needed to further concentrate sulfur and mercury and reduce the HHV content. Segregation stream processing will be incorporated into the commercial coal drying system.

The segregation stream samples were also collected during the maximum dryer capacity tests. During these tests, the gate cycling time was parametrically varied from 7 to 15 seconds to improve segregation characteristics of the first stage.

TABLE 11

Composition of Feed, Product and Segregated Streams (May-June, 2006)

| | Feed Stream | | | | Product Stream | | | | Segregation Stream | | | |
|---|---|---|---|---|---|---|---|---|---|---|---|---|
| Test | HHV BTU/lb | TM % | Sulfur % AR | Hg ppm AR | HHV BTU/lb | TM % | Sulfur % AR | Hg ppm AR | HHV BTU/lb | TM % | Sulfur % AR | Hg ppm AR |
| 1 | 6,359 | 38.1 | 0.61 | 614 | 7,477 | 28.1 | 0.60 | 498 | 6,631 | 35.7 | 1.37 | 1,347 |
| 2 | 6,303 | 37.2 | 0.69 | 700 | 7,448 | 27.1 | 0.60 | 380 | 6,263 | 35.3 | 2.00 | 1,853 |

TABLE 11-continued

Composition of Feed, Product and Segregated Streams (May-June, 2006)

| | Feed Stream | | | | Product Stream | | | | Segregation Stream | | | |
|---|---|---|---|---|---|---|---|---|---|---|---|---|
| Test | HHV BTU/lb | TM % | Sulfur % AR | Hg ppm AR | HHV BTU/lb | TM % | Sulfur % AR | Hg ppm AR | HHV BTU/lb | TM % | Sulfur % AR | Hg ppm AR |
| 3 | 6,271 | 38.1 | 0.63 | 500 | 7,363 | 25.3 | 0.62 | 463 | 6,097 | 33.9 | 2.16 | 2,290 |
| 4 | 6,324 | 37.3 | 0.66 | 648 | 7,565 | 23.2 | 0.60 | 615 | 6,504 | 37.2 | 1.39 | 1,509 |
| 5 | 6,370 | 37.8 | 0.58 | 495 | 7,840 | 23.2 | 0.67 | 493 | 6,696 | 37.1 | 1.13 | 1,246 |
| 6 | 6,115 | 37.3 | 0.55 | 616 | 7,796 | 21.0 | 0.61 | 555 | 6,223 | 35.0 | 1.97 | 2,237 |
| 7 | 6,085 | 36.8 | 0.61 | 748 | 7,434 | 25.1 | 0.60 | 553 | 6,267 | 34.7 | 1.71 | 1,839 |
| 8 | 6,236 | 37.0 | 0.61 | 625 | 7,583 | 28.6 | 0.55 | 457 | 6,389 | 36.0 | 1.58 | 1,970 |
| 9 | 6,421 | 38.1 | 0.57 | 604 | 7,303 | 28.3 | 0.63 | 536 | 6,427 | 35.9 | 1.85 | 2,537 |
| 10 | 6,303 | 38.2 | 0.69 | 591 | 7,335 | 28.8 | 0.65 | 606 | 6,558 | 36.1 | 1.89 | 2,121 |

TABLE 12

Sulfur and Mercury Removed by the First Stage and HHV Content of the Segregated Stream
Segregated Stream

| Test | S % of Feed | Hg % of Feed | HHV % of Feed |
|---|---|---|---|
| 1 | 22.5 | 21.9 | 10.4 |
| 2 | 29.3 | 26.5 | 9.9 |
| 3 | 34.5 | 45.8 | 9.7 |
| 4 | 21.2 | 23.3 | 10.3 |
| 5 | 19.4 | 25.2 | 10.5 |
| 6 | 36.0 | 36.3 | 10.2 |
| 7 | 28.2 | 24.6 | 10.3 |
| 8 | 25.7 | 31.5 | 10.2 |
| 9 | 32.5 | 42.0 | 10.0 |
| 10 | 27.4 | 35.9 | 10.4 |
| Average | 27.7 | 31.3 | 10.2 |

The $NO_x$ and $SO_x$ emissions, flue gas flow rate, and flue gas $CO_2$ composition, measured by the plant CEM for 16 paired performance tests, are summarized in Table 13. As discussed earlier, firing partially dried coal resulted in lower flue gas flow rate. For the coal moisture reduction of 1.14%, achieved in the dryer performance tests, the reduction in flue gas mass flow rate was 0.55%.

TABLE 13

$NO_x$ and $SO_x$ Emissions, Stack Flow Rate,
and Flue Gas $CO_2$ Concentration Measured by the Plant CEM

| Description | Units | Mass-Average Dry | Average Wet | % Change WRT Wet | Absolute Change WRT Wet |
|---|---|---|---|---|---|
| NOx Emissions | lbs/hr | 1,359 | 1,469 | −7.52 | −111 |
| SOx Emissions | lbs/hr | 3,641 | 3,670 | −0.81 | −30 |
| Flue Gas Flow Rate | kscfm | 1,613 | 1,625 | −0.73 | −12 |
| Flue Gas Flow Rate | klbs/hr | 7,101 | 7,140 | −0.55 | −39 |
| Flue Gas CO2 | % | 11.90 | 11.87 | 0.27 | 0 |

Figure 72:
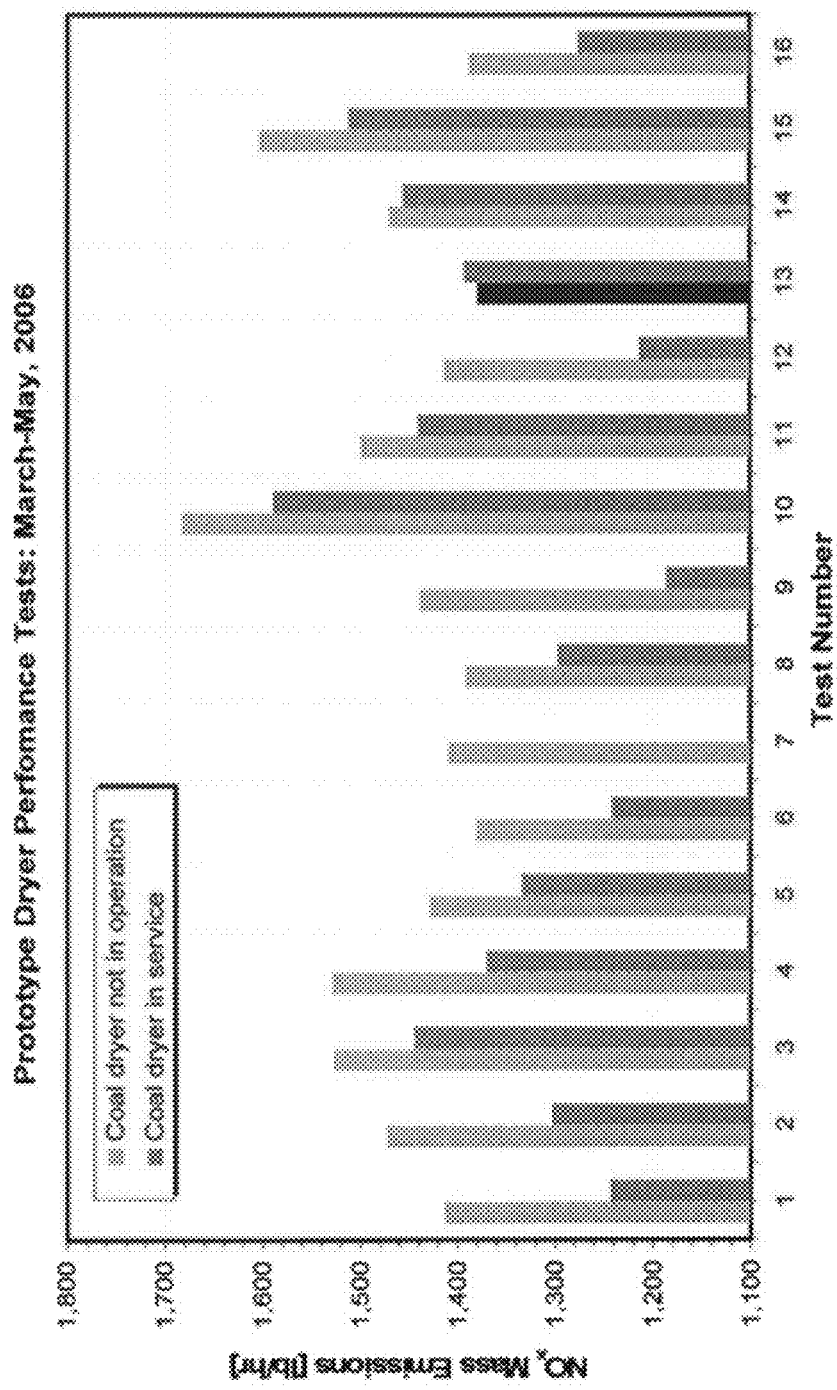

The 7.5% average reduction in $NO_x$ mass emissions, measured during the paired performance tests (FIG. 72), was significantly higher than the percentage reduction in flue gas flow rate. This reduction in $NO_x$ emissions cannot be explained by a lower flue gas flow rate. Instead it is attributed to a lower primary air flow rate to Mill No. 26, which was handling partially dried coal. From combustion optimization tests, performed by the ERC and GRE engineers at Coal Creek in 1997, it is known that $NO_x$ emissions at this plant are quite sensitive to the primary air flow; $NO_x$ decreases as primary air flow is reduced. With partially dried coal, the primary air flow rate to the No. 26 mill was, on average, reduced from 355 to 310 klbs/hr, a 12% reduction. Modifications to the coal mills will allow the primary air flow to be decreased even more to 255 klbs/hr. This is expected to result in a further decrease in $NO_x$ emissions.

With the commercial coal drying system in service, i.e., with 100% dried coal delivered to the coal mills, and the reduced PA flows to the mills, the reduction in $NO_x$ emissions is expected to exceed 10%.

Figure 73:
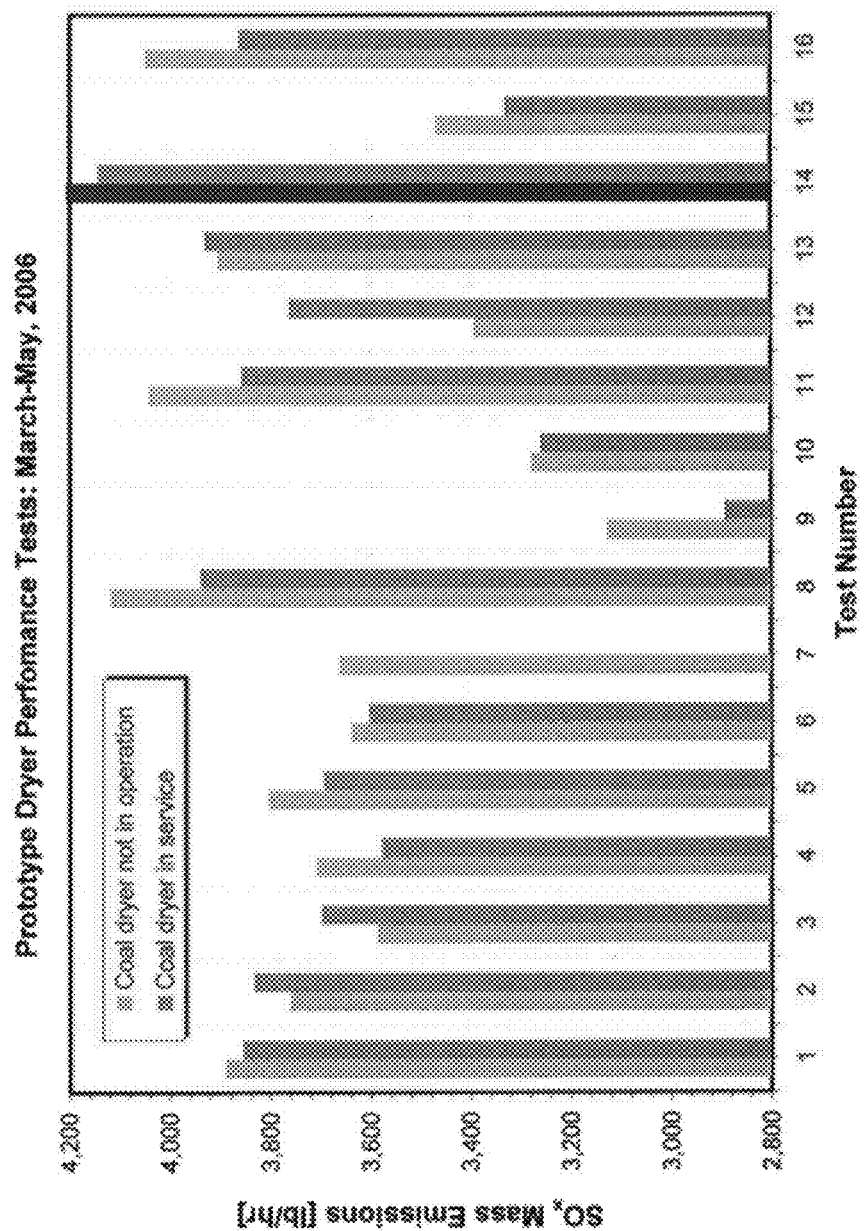

The measured reduction in $SO_x$ emissions with partially dried coal, measured during the series of 16 paired parametric tests, was approximately 0.8% (Table 14 and FIG. 73). The red bar in Test 14 represents a bad reading.

A closer inspection of the recorded plant data and the results presented in FIG. 73 points to problems with $SO_x$ measurement that occurred during tests 12 to 14, where measured $SO_x$ emissions were higher with a partially dried coal compared to the wet coal. These inconsistencies are explained by a malfunctioning $SO_x$ monitor that was providing unreliable $SO_x$ readings for tests 12 to 14. A comparison of the results for the first 11 paired tests and for all 16 paired tests shows a significant difference in $SO_x$ reduction (1.9% for the first 11 tests vs. 0.8% for all 16 tests). It is, therefore, reasonable to assume that the actual reduction in $SO_x$ emissions, achieved with partially dried coal, is in the 1.9% range.

The percentage reduction in $SO_x$ emissions is larger than the percentage the reduction in flue gas mass flow rate. This is because with a lower flue gas flow rate, the flue gas bypass around the scrubber decreases (CCS is a partially scrubbed unit), resulting in a higher $SO_x$ removal. With 100% partially dried coal fired in the boiler, the flue gas flow rate to the wet scrubber will be reduced by an estimated 4%. Combined with lower APH leakage, that would be achieved by using double-edge APH seals, the percentage of the scrubbed flue gas flow will further increase, approaching a zero scrubber bypass configuration. This will result in an additional reduction in $SO_x$ emissions.

Due to a gravitational separation that is taking place in the first dryer stage, the sulfur concentration in the segregation stream is three times higher compared to the product and feed streams. This increase in sulfur content in the segregation stream can be explained by the fact that pyrites, having higher density than coal, are segregated out in the first dryer stage. For the present configuration of the prototype coal drying system at CCS, the segregation stream is returned to and mixed with the product stream from the coal dryer. Therefore, the benefit of sulfur removal in the first dryer stage, is not being realized, and the measured reduction in $SO_x$ emissions is solely due to the lower flue gas and scrubber bypass flows.

The commercial coal drying system is designed to further process the segregation stream. After processing, the segregation stream will not be mixed with the product stream from the commercial dryers. With the segregation stream representing 5-10% of the dryer feed, the reduction in mass flow rate of sulfur to the boiler would be in the 7-12% range. By combining reductions due to the lower scrubber bypass and lower sulfur input to the boiler, the potential reduction in $SO_x$, emissions that could be achieved with the commercial coal drying system at CCS operating at 100% capacity is expected to be in the 12-17% range.

The reduction in $CO_2$ mass emissions is proportional to the improvement in unit performance (net unit heat rate). For the target moisture reduction of 8.5% and fanroom coils in service, the expected reduction in $CO_2$ emissions is approximately 2.4%.

The reduction in Hg emissions, achieved during paired performance tests at CCS, is proportional to the improvement in unit performance, and is estimated to be in the 0.4% range.

Figure 74:
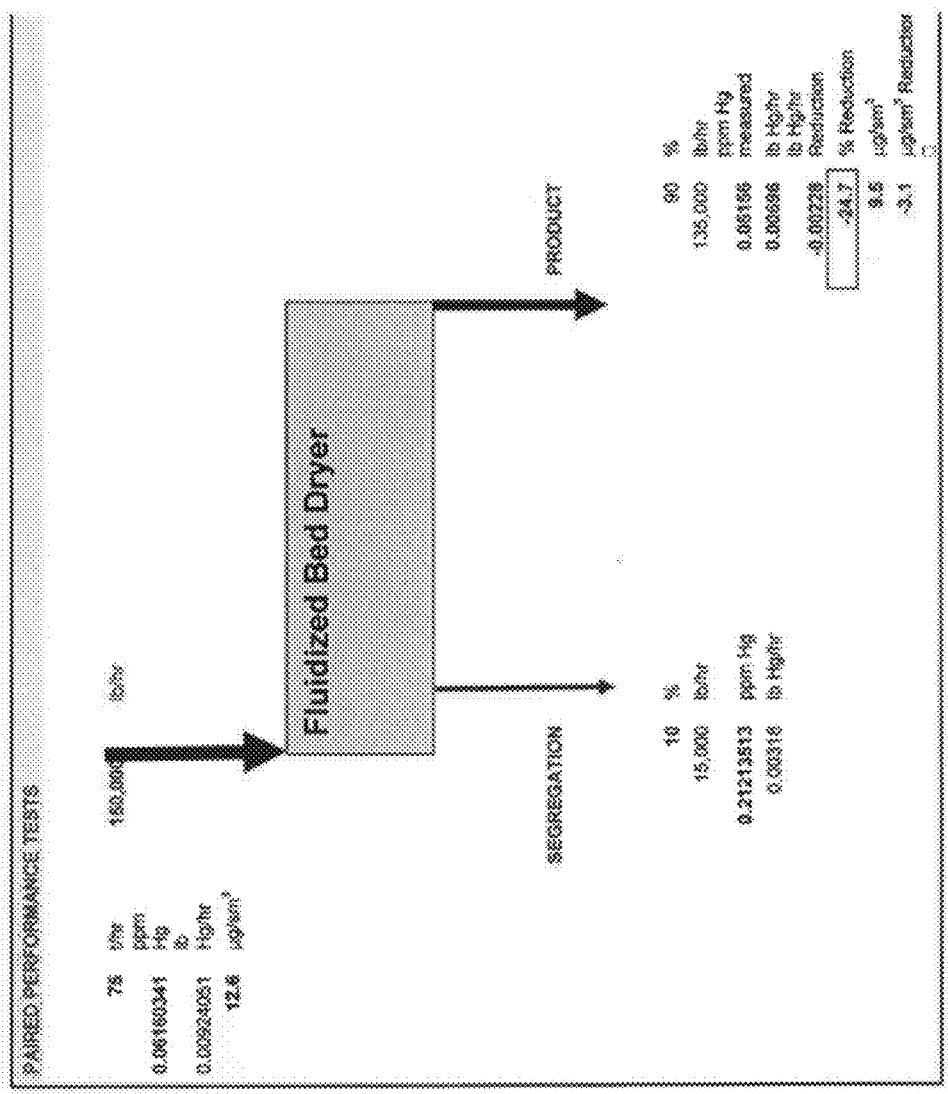
FIGS. 74-75 are mercury mass balances around the fluidized bed dryer.
Figure 75:
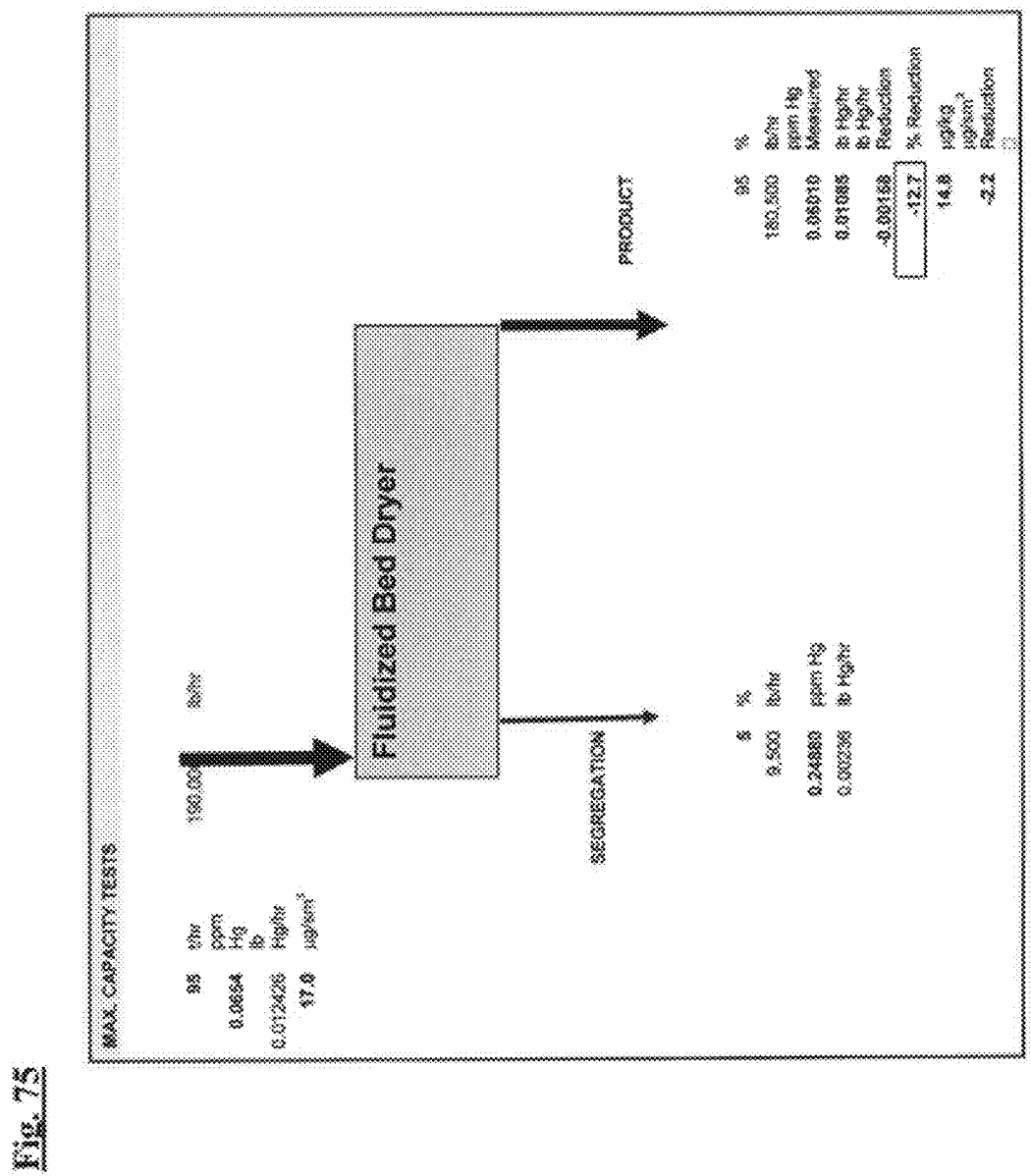

The segregation stream from the first dryer stage contains approximately 3.5 to 4 times more Hg compared to the product and feed streams (see FIGS. 74-75). This increase in Hg content in the segregation stream can be explained by the fact that for the Falkirk lignite, a significant portion of mercury is bound to pyrites that are segregated out in the first dryer stage.

With the present configuration of the prototype coal drying system at CCS, the segregation stream is returned to the product stream from the coal dryer. Therefore, the benefit of Hg removal in the first dryer stage on Hg emissions is not realized.

The commercial coal drying system is designed to further process the segregation stream. After processing, the segregation stream will not be mixed with the product stream from the commercial dryers and will not be burned in the CCS boiler. With the segregation stream representing 5 to 10% of the dryer feed, the estimated reduction in mass flow rate of mercury to the boiler is in the 13-25% range (see FIGS. 74-75).

Figure 76:
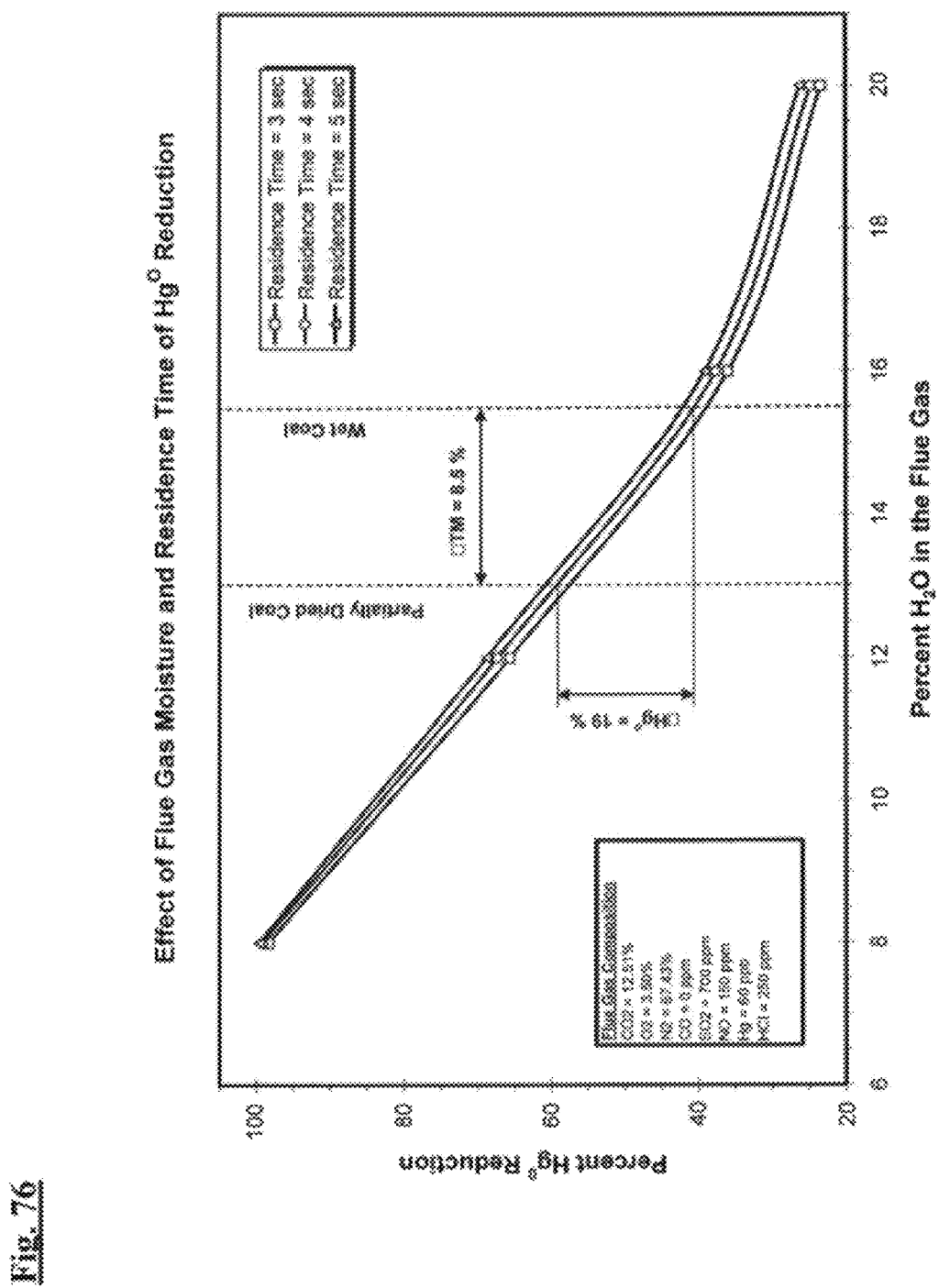
FIG. 76 is a graphical depiction of the effect of flue gas moisture content and residence time on mercury speciation.

Mercury speciation is, among many other factors, affected by flue gas moisture content and residence time. With the target moisture removal of 8.5%, the flue gas moisture content is 2.5 percentage points lower compared to that with wet coal. According to the theoretical gas-phase results shown in FIG. 76, this would result in approximately a 20% reduction in elemental mercury, $Hg^o$, in the flue gas. Expressed differently, with a partially dried coal, approximately 20% more elemental mercury will be oxidized compared to the wet coal. The oxidized mercury, $Hg^{+2}$, is water soluble and can be removed in the wet scrubber.

Also, an increase in residence time has a positive effect on mercury oxidation. This effect is, however, small, of the order of one percent per one second increase in residence time. With a partially dried coal, the residence time will increase due to lower flow rates.

The total vapor phase mercury concentration at CCS is in the 15 to 18 microgram/$Nm^3$ range. This compares favorably to flue gas Hg concentrations calculated from the mercury content in coal and flue gas flow rate. Also, approximately 65% (12 microgramsg/$Nm^3$) of the vapor phase mercury at CCS is elemental mercury, $Hg^o$, Assuming a 20% relative reduction in elemental mercury due to lower flue gas moisture content and increased residence time, the reduction in $Hg^o$ in flue gas stream would be 13%, or approximately 2.3 micro g/$Nm^3$, assuming 98% Hg removal in the wet scrubber.

By combining a reduction in coal mercury content due to gravitational separation in a fluidized bed coal dryer (13-25%), and reduction in $Hg^o$ due to the lower flue gas moisture content (13%), the total reduction in Hg emissions that could be achieved at CCS with the commercial coal drying system operating at 100% capacity, is predicted to be in the 25-35% range.

The above specification, drawings, and examples provide a complete description of the structure and operation of the particulate material separator of the present invention. However, the invention is capable of use in various other combinations, modifications, embodiments, and environments without departing from the spirit and scope of the invention.

For example, it can be utilized with any combination of direct or indirect heat source, fluidized or non-fluidized beds, and single or multiple stages. Moreover, the drying approach described in this invention is not limited to enhancing the quality of coal to be burned in the utility or industrial boilers but can also be applied to dry particulate materials for the glass, aluminum, pulp and paper and other industries. For example, sand used as a feedstock in the glass industry can be dried and preheated by a fluidized bed dryer using waste heat harvested from flue gas exiting the furnace stack before the sand is fed to the glass furnace. This will improve thermal efficiency of the glass-making process.

As another example, a fluidized bed dryer can be used as a calcinatory in aluminum production. To refine alumina from raw bauxite ore, the ore is broken up and screened when necessary to remove large impurities like stone. The crushed bauxite is then mixed in a solution of hot caustic soda in digesters. This allows the alumina hydrate to be dissolved from the ore. After the red mud residue is removed by decantation and filtration, the caustic solution is piped into huge tanks, called precipitators, where alumina hydrate crystallizes. The hydrate is then filtered and sent to calciners to dry and under very high temperature, is transformed into the fine, white powder known as alumina. The present invention could be used as a calciner in this and similar processes.

As still another example for purposes of illustration, waste heat sources could be applied to a greenhouse used to grow tomatoes or other crops. Therefore, the description is not intended to limit the invention to the particular form disclosed.

Therefore, the description is not intended to limit the invention to the particular form disclosed.

We claim:

1. An open air apparatus for segregating particulate material by density and/or size to concentrate a contaminant for separation from the particulate material feed stream, comprising:
    (a) a fluidizing bed having a receiving inlet for receiving the particulate material feed, an inlet opening for receiving a fluidizing stream, a first discharge outlet for discharging a fluidized particulate material product stream, and a second discharge outlet for discharging a non-fluidized particulate material stream;
    (b) a source of fluidizing stream at a temperature of about 300° F. or less operatively connected to the inlet opening for introducing the fluidizing stream into the fluidizing bed to achieve separation of the fluidized particulate material product stream from the non-fluidized particulate material stream;
    (c) a conveyor means located within the fluidized bed for transporting the non-fluidized particulate material from inside the fluidized bed to the outside of the fluidized bed through the second discharge outlet; and
    (d) wherein the fluidized particulate material product stream contains a reduction in the contaminant relative to the particulate material feed stream, and the non-fluidized particulate material stream contains an increase in the contaminant relative to the particulate material feed stream.

2. The particulate material segregating apparatus of claim 1, wherein the particulate material is coal.

3. The particulate material segregating apparatus of claim 2, wherein the coal material is lignite coal.

4. The particulate material segregating apparatus of claim 2, wherein the coal material is subbituminous coal.

5. The particulate material segregating apparatus of claim 2, wherein the contaminant is selected from the group consisting of fly ash, sulfur, mercury, and ash.

6. The particulate material segregating apparatus of claim 5, wherein the non-fluidized coal particulate material stream contains about 21-46% of the mercury originally contained in the coal particulate material feed stream, which is removed from the fluidized coal particulate product stream.

7. The particulate material segregating apparatus of claim 5, wherein the non-fluidized coal particulate material stream contains about 19-36% of the sulfur originally contained in the coal particulate material feed stream, which is removed from the fluidized coal particulate product stream.

8. The particulate material segregating apparatus of claim 5, wherein the non-fluidized coal particulate material stream contains about 23-43% of the fly ash originally contained in the coal particulate material feed stream, which is removed from the fluidized coal particulate product stream.

9. The particulate material segregating apparatus of claim 2, wherein the coal of the fluidized particulate material product stream, when combusted, produces a flue gas having a reduction in $SO_x$ of about 4%.

10. The particulate material segregating apparatus of claim 2, wherein the coal of the fluidized particulate material product stream, when combusted, produces a flue gas having a reduction in $NO_x$ of about 10%.

11. The particulate material segregating apparatus of claim 1, wherein the fluidizing stream is air.

12. The particulate material segregating apparatus of claim 1, wherein the fluidizing stream is steam.

13. The particulate material segregating apparatus of claim 1, wherein the fluidizing stream is an inert gas.

14. The particulate material segregating apparatus of claim 1, wherein the fluidizing stream is heated by a heat source prior to its introduction to the fluidizing bed.

15. The particulate material segregating apparatus of claim 14, wherein the heat source is a principal heat source.

16. The particulate material segregating apparatus of claim 14, wherein the heat source is a waste heat source.

17. The particulate material segregating apparatus of claim 16, wherein the waste heat source is selected from the group consisting of hot condenser cooling water, hot stack gas, hot flue gas, spent process steam, and discarded heat from operating equipment.

18. The particulate material segregating apparatus of claim 1 further comprising a collection chamber operatively connected to the non-fluidized particulate material stream second discharge outlet for receiving the non-fluidized particulate material stream, the collection chamber including a second fluidizing bed and means for directing a second fluidizing stream through the non-fluidized particulate material contained within the collection chamber for separating fluidizable particles therefrom to further concentrate the contaminant within the non-fluidized particulate material stream.

19. The particulate material segregating apparatus of claim 18, wherein the fluidizable particles separated from the non-fluidized particulate material stream in the collection chamber are returned to the fluidizing bed by a second fluidizing stream.

* * * * *